US012292577B2

(12) United States Patent
Davidson et al.

(10) Patent No.: US 12,292,577 B2
(45) Date of Patent: May 6, 2025

(54) POSITIONING, STABILISING, AND INTERFACING STRUCTURES AND SYSTEM INCORPORATING SAME

(71) Applicant: RESMED PTY LTD, Bella Vista (AU)

(72) Inventors: Aaron Samuel Davidson, Sydney (AU); Ian Andrew Law, Sydney (AU); Riley Joel Moore, Sydney (AU)

(73) Assignee: ResMed Pty Ltd, Bella Vista (AU)

( * ) Notice: Subject to any disclaimer, the term of this patent is extended or adjusted under 35 U.S.C. 154(b) by 0 days.

(21) Appl. No.: 18/556,027

(22) PCT Filed: Apr. 19, 2022

(86) PCT No.: PCT/AU2022/050350
§ 371 (c)(1),
(2) Date: Oct. 18, 2023

(87) PCT Pub. No.: WO2022/221907
PCT Pub. Date: Oct. 27, 2022

(65) Prior Publication Data
US 2024/0210709 A1   Jun. 27, 2024

(30) Foreign Application Priority Data

Apr. 19, 2021  (AU) ................................ 2021901149
May 12, 2021  (AU) ................................ 2021901408
(Continued)

(51) Int. Cl.
*G02B 27/00*  (2006.01)
*G02B 27/01*  (2006.01)

(52) U.S. Cl.
CPC .............................. *G02B 27/0176* (2013.01)

(58) Field of Classification Search
CPC ........ G02B 27/0176; G02B 2027/0192; G02B 27/01; G02B 27/0101; G02B 27/0103;
(Continued)

(56) References Cited

U.S. PATENT DOCUMENTS 4,782,832 A   11/1988  Trimble et al.
4,944,310 A    7/1990  Sullivan
(Continued)

FOREIGN PATENT DOCUMENTS

WO   WO 98/004310 A1   2/1998
WO   WO 98/034665 A1   8/1998
(Continued)

OTHER PUBLICATIONS

"*Respiratory Physiology*", by John B. West, Lippincott Williams & Wilkins, 9th edition published 2012 (8 pages).
(Continued)

*Primary Examiner* — Henry Duong
(74) *Attorney, Agent, or Firm* — Nixon & Vanderhye P.C.

(57) ABSTRACT

A head-mounted display system comprising a head-mounted display unit; and a positioning and stabilising structure structured and arranged to hold the head-mounted display unit in an operational position over a user's face in use, the head-mounted display unit comprising an interfacing structure constructed and arranged to be in opposing relation with the user's face, wherein the interfacing structure comprises a flexible and resilient face engaging portion, the face engaging portion having a pair of cheek portions configured to contact the user's cheeks in use, each cheek portion comprising at least one loop portion having an at least partially enclosed cross section; wherein the interfacing structure comprises a medial support portion medial of each cheek portion configured to provide support for the at least one loop portion.

22 Claims, 71 Drawing Sheets

(30) Foreign Application Priority Data

| | | | |
|---|---|---|---|
| Jun. 4, 2021 | (AU) | ................................ | 2021901671 |
| Jun. 30, 2021 | (AU) | ................................ | 2021901993 |
| Jun. 30, 2021 | (AU) | ................................ | 2021901994 |
| Jul. 16, 2021 | (AU) | ................................ | 2021902184 |
| Aug. 31, 2021 | (AU) | ................................ | 2021902827 |
| Sep. 3, 2021 | (AU) | ................................ | 2021902861 |
| Oct. 1, 2021 | (AU) | ................................ | 2021903158 |
| Oct. 6, 2021 | (AU) | ................................ | 2021903200 |
| Dec. 10, 2021 | (AU) | ................................ | 2021903996 |
| Jan. 28, 2022 | (WO) | ................ | PCT/AU2022/050043 |
| Jan. 28, 2022 | (WO) | ................ | PCT/AU2022/050045 |

(58) Field of Classification Search

CPC .............. G02B 27/0149; G02B 27/017; G02B 27/0172; G02B 27/0179; G02B 27/0189; G02B 2027/0105; G02B 2027/0107; G02B 2027/0109; G02B 2027/011; G02B 2027/0112; G02B 2027/0114; G02B 2027/0116; G02B 2027/0118; G02B 2027/012; G02B 2027/0121; G02B 2027/0123; G02B 2027/0125; G02B 2027/0127; G02B 2027/0129; G02B 2027/013; G02B 2027/0132; G02B 2027/0134; G02B 2027/0136; G02B 2027/0138; G02B 2027/014; G02B 2027/0141; G02B 2027/0143; G02B 2027/0145; G02B 2027/0147; G02B 2027/015; G02B 2027/0152; G02B 2027/0154; G02B 2027/0156; G02B 2027/0158; G02B 2027/0159; G02B 2027/0161; G02B 2027/0163; G02B 2027/0165; G02B 2027/0167; G02B 2027/0169; G02B 2027/0174; G02B 2027/0178; G02B 2027/0181; G02B 2027/0183; G02B 2027/0185; G02B 2027/0187; G02B 2027/019; G02B 2027/0194; G02B 2027/0196; G02B 2027/0198; G06F 3/011

USPC ........................................................ 359/630

See application file for complete search history.

(56) References Cited

U.S. PATENT DOCUMENTS

| | | | |
|---|---|---|---|
| 5,687,715 | A | 11/1997 | Landis |
| 6,532,959 | B1 | 3/2003 | Berthon-Jones |
| 6,581,594 | B1 | 6/2003 | Drew et al. |
| 7,866,944 | B2 | 1/2011 | Kenyon et al. |
| 8,636,479 | B2 | 1/2014 | Kenyon et al. |
| 8,638,014 | B2 | 1/2014 | Sears et al. |
| 8,733,349 | B2 | 5/2014 | Bath et al. |
| 9,857,839 | B1 | 1/2018 | Bristol et al. |
| 11,726,337 | B1* | 8/2023 | Huang ............... G02B 27/0176 345/80 |
| 2004/0061663 | A1 | 4/2004 | Reynolds et al. |
| 2009/0044808 | A1 | 2/2009 | Guney et al. |
| 2009/0050156 | A1 | 2/2009 | Ng et al. |
| 2010/0000534 | A1 | 1/2010 | Kooij et al. |
| 2016/0062454 | A1 | 3/2016 | Wang et al. |
| 2017/0082859 | A1* | 3/2017 | Drinkwater ........ G02B 27/0176 |
| 2017/0168303 | A1 | 6/2017 | Petrov |
| 2019/0258065 | A1 | 8/2019 | Yun et al. |
| 2020/0064653 | A1 | 2/2020 | Tsao |
| 2020/0159040 | A1 | 5/2020 | Kiritz et al. |
| 2023/0314808 | A1* | 10/2023 | Olson ................ G02B 27/0172 359/630 |

FOREIGN PATENT DOCUMENTS

| | | |
|---|---|---|
| WO | WO 2000/078381 A1 | 12/2000 |
| WO | WO 2004/073778 A1 | 9/2004 |
| WO | WO 2005/063328 A1 | 7/2005 |
| WO | WO 2006/074513 A1 | 7/2006 |
| WO | WO 2006/130903 A1 | 12/2006 |
| WO | WO 2009/052560 A1 | 4/2009 |
| WO | WO 2010/135785 A1 | 12/2010 |
| WO | WO 2012/171072 A1 | 12/2012 |
| WO | WO 2013/020167 A1 | 2/2013 |
| WO | WO 2021/043305 A1 | 3/2021 |

OTHER PUBLICATIONS

International Search Report dated Jul. 11, 2022 issued in International Application No. PCT/AU2022/050350 (6 pages).

International Preliminary Report on Patentability dated Jul. 28, 2023 issued in International Application No. PCT/AU2022/050350 (60 pages).

Written Opinion of the International Searching Authority dated Jul. 11, 2022 issued in International Application No. PCT/AU2022/050350 (5 pages).

Written Opinion of the International Preliminary Examining Authority mailed Mar. 23, 2023 issued in International Application No. PCT/AU2022/050350 (7 pages).

\* cited by examiner

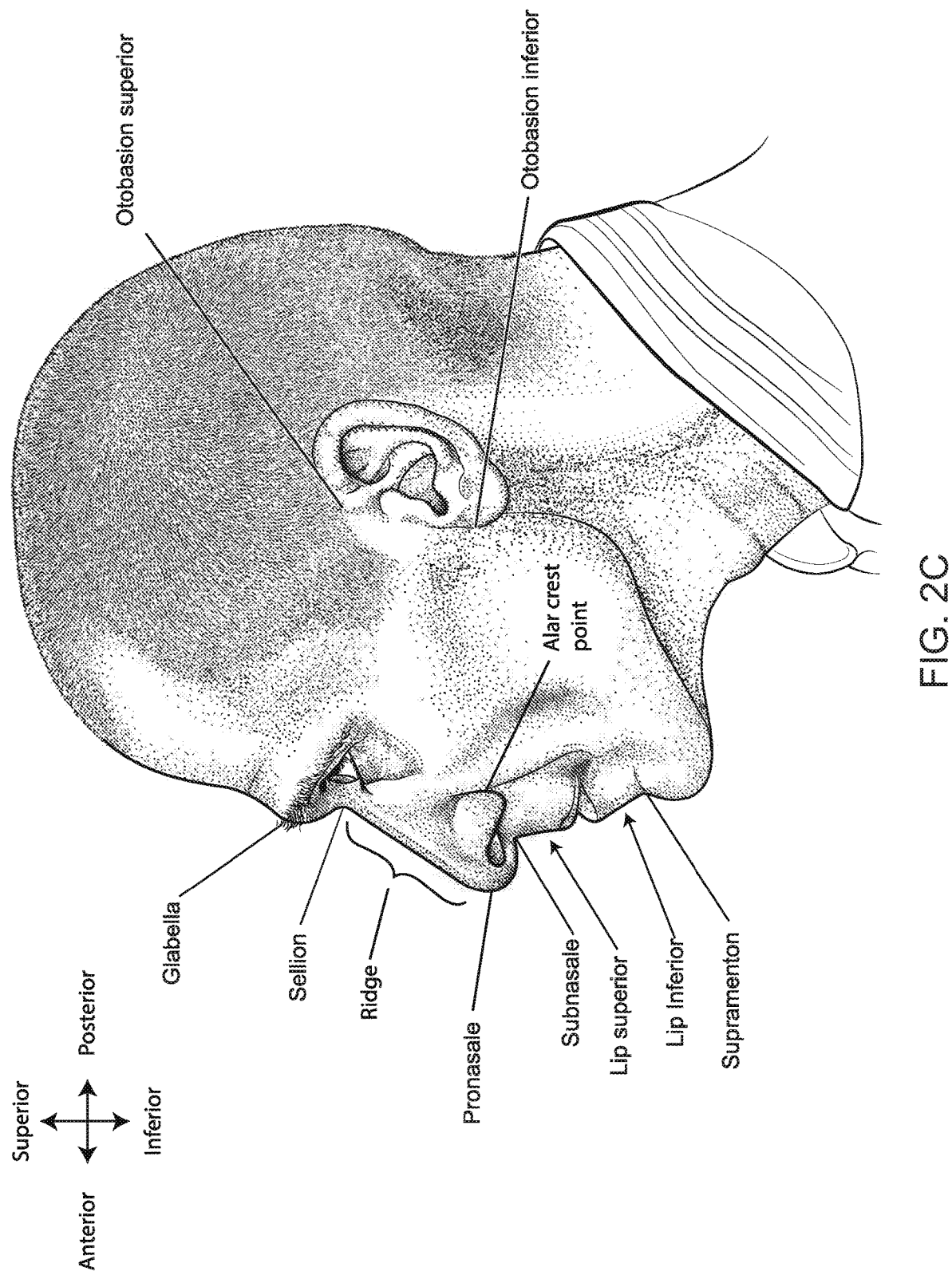

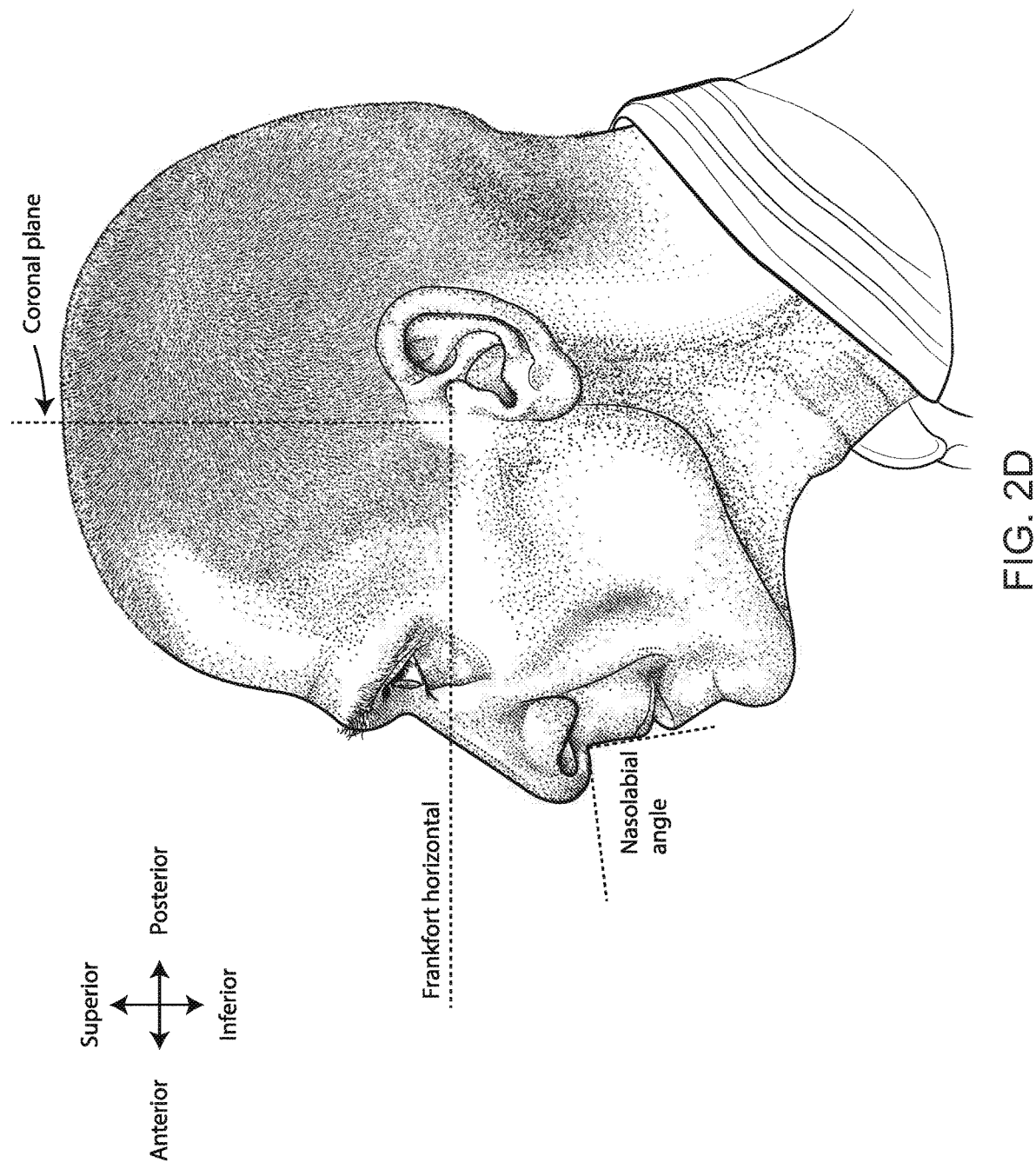

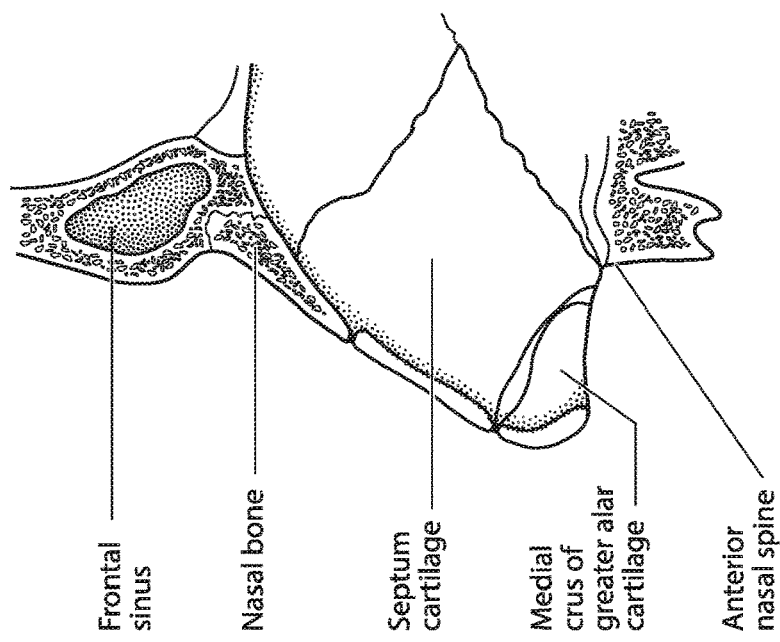
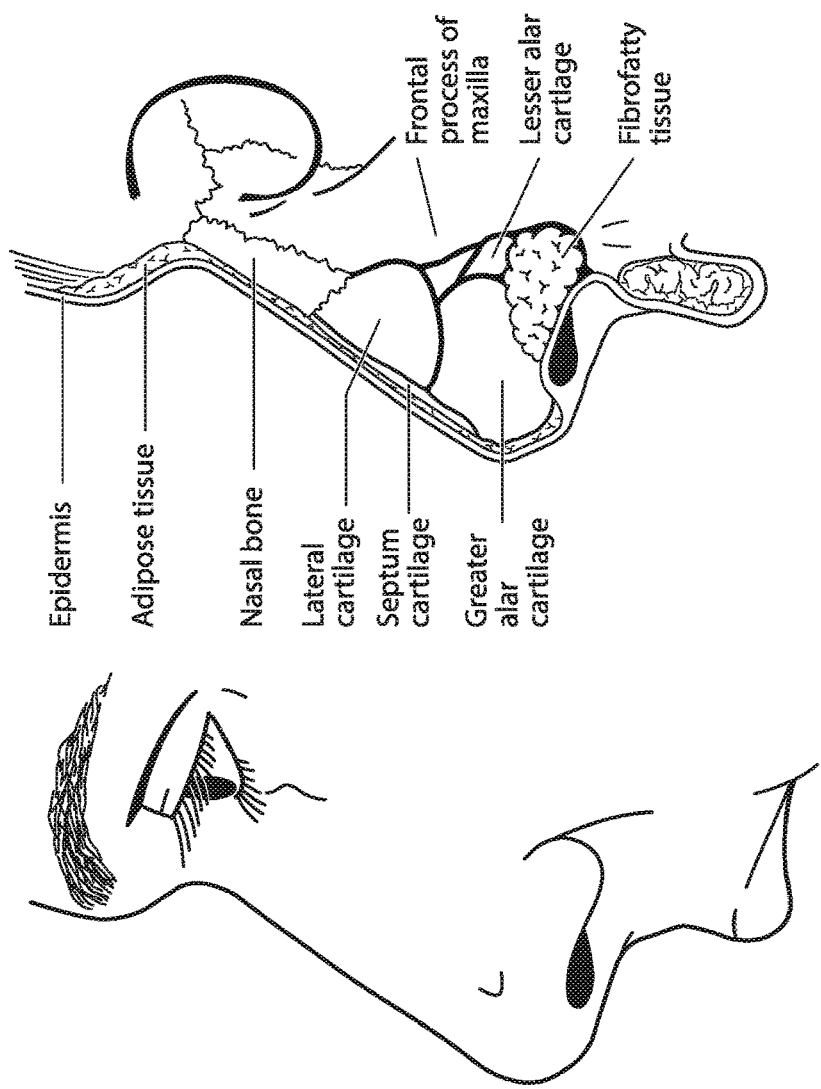
FIG. 2H
FIG. 2G
FIG. 2F

Relatively Large Positive Curvature

Relatively Small Positive Curvature

Zero Curvature

Relatively Small Negative Curvature

Relatively Large Negative Curvature

Left-hand rule

Right-hand rule

Left ear helix

Right ear helix

Right-hand helix
Right-hand positive

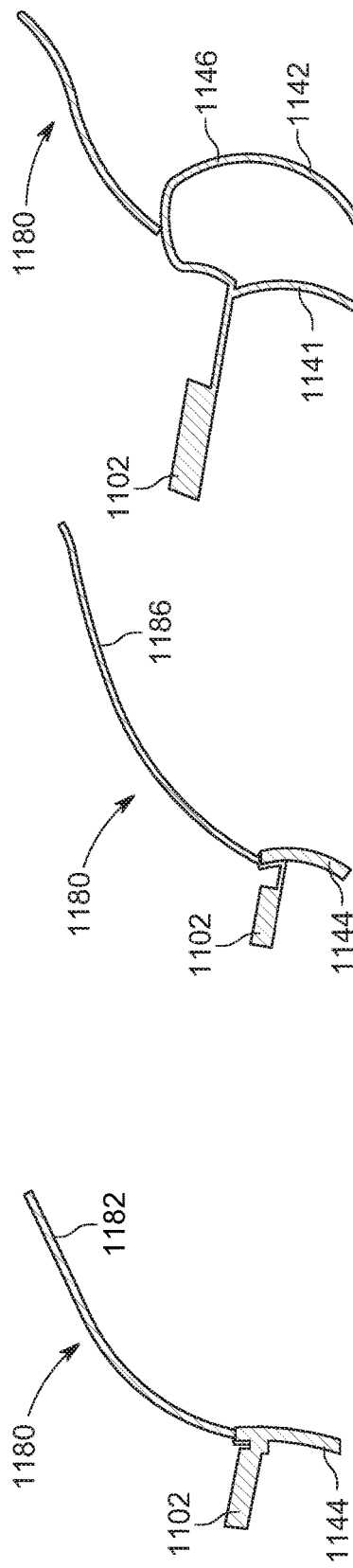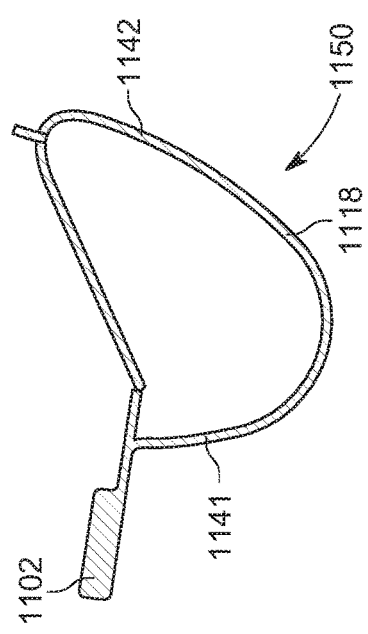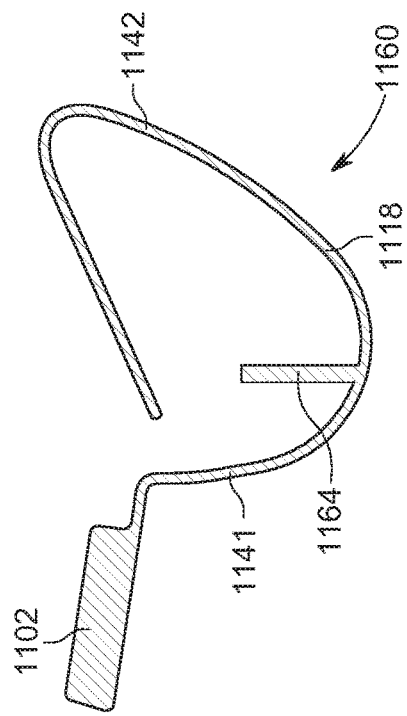

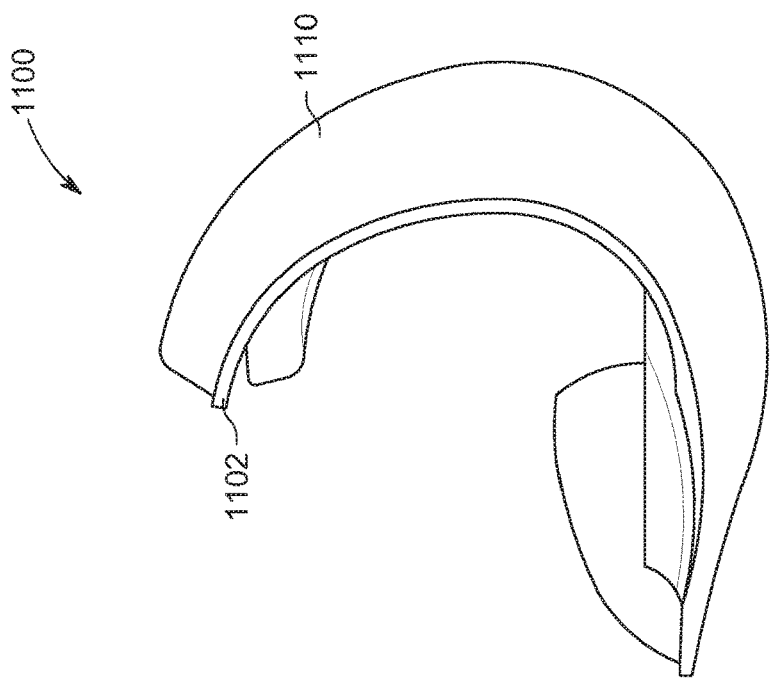
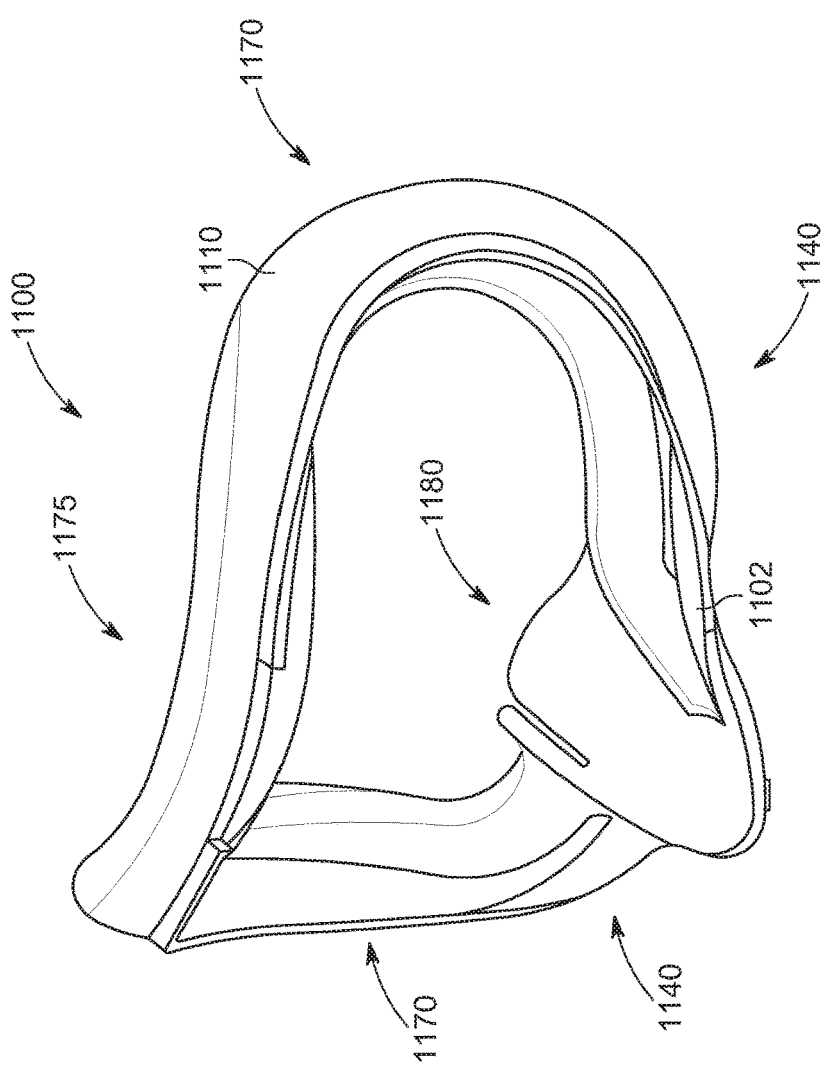
FIG. 11B
FIG. 11A

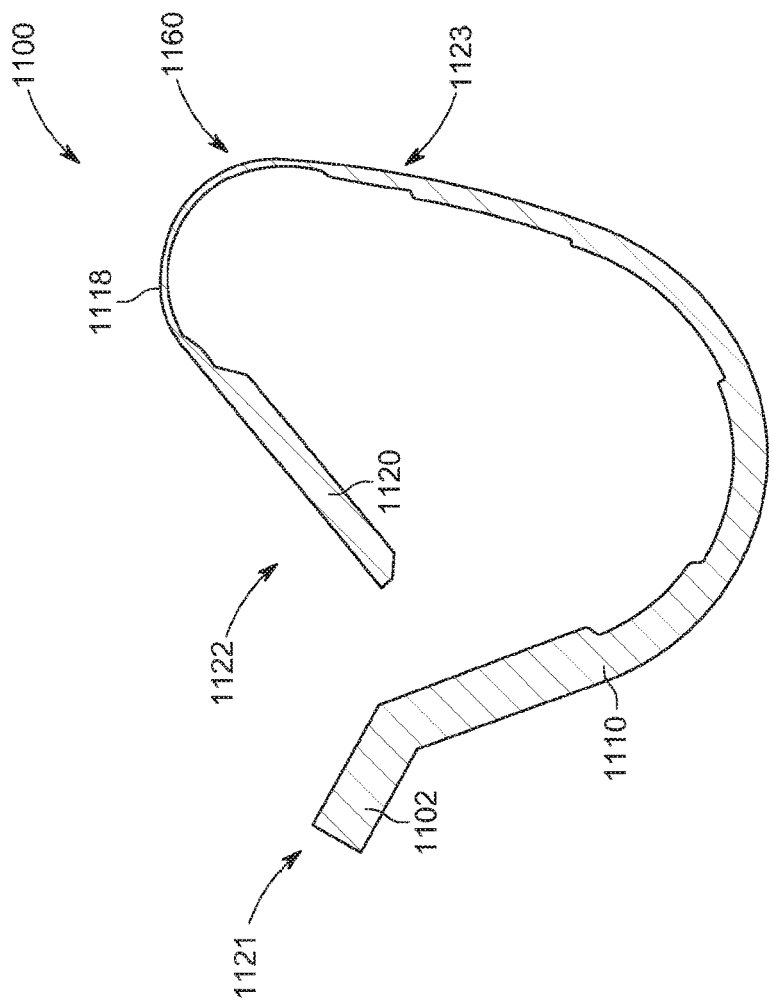
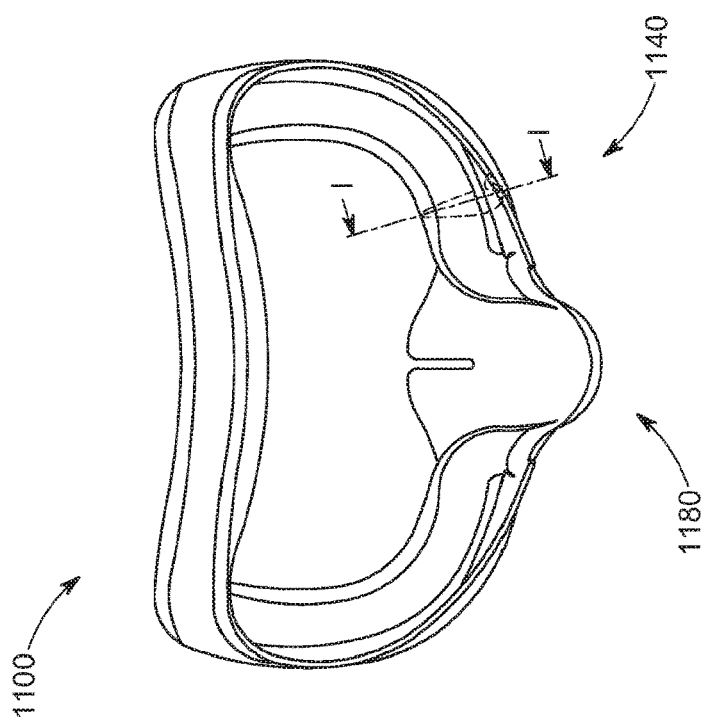
FIG. 11I
FIG. 11H

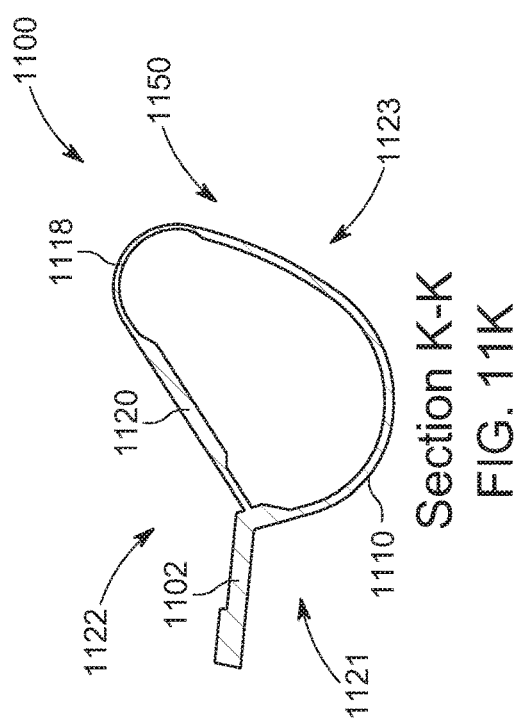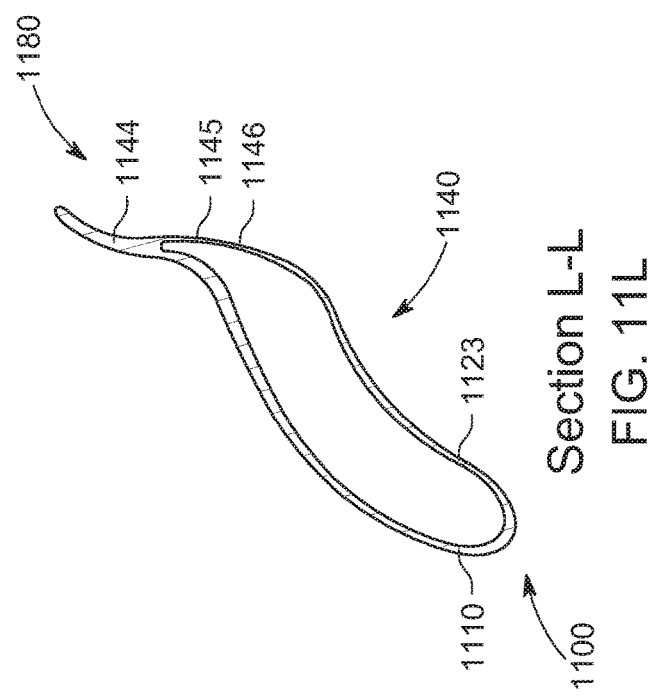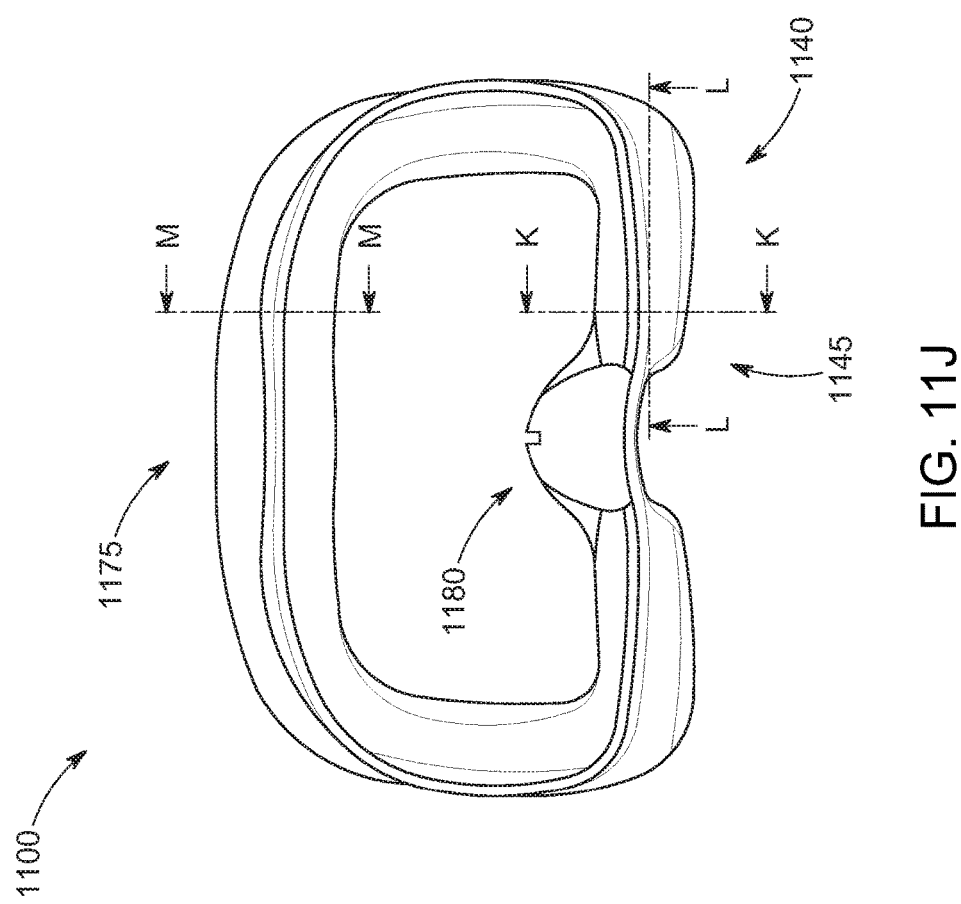

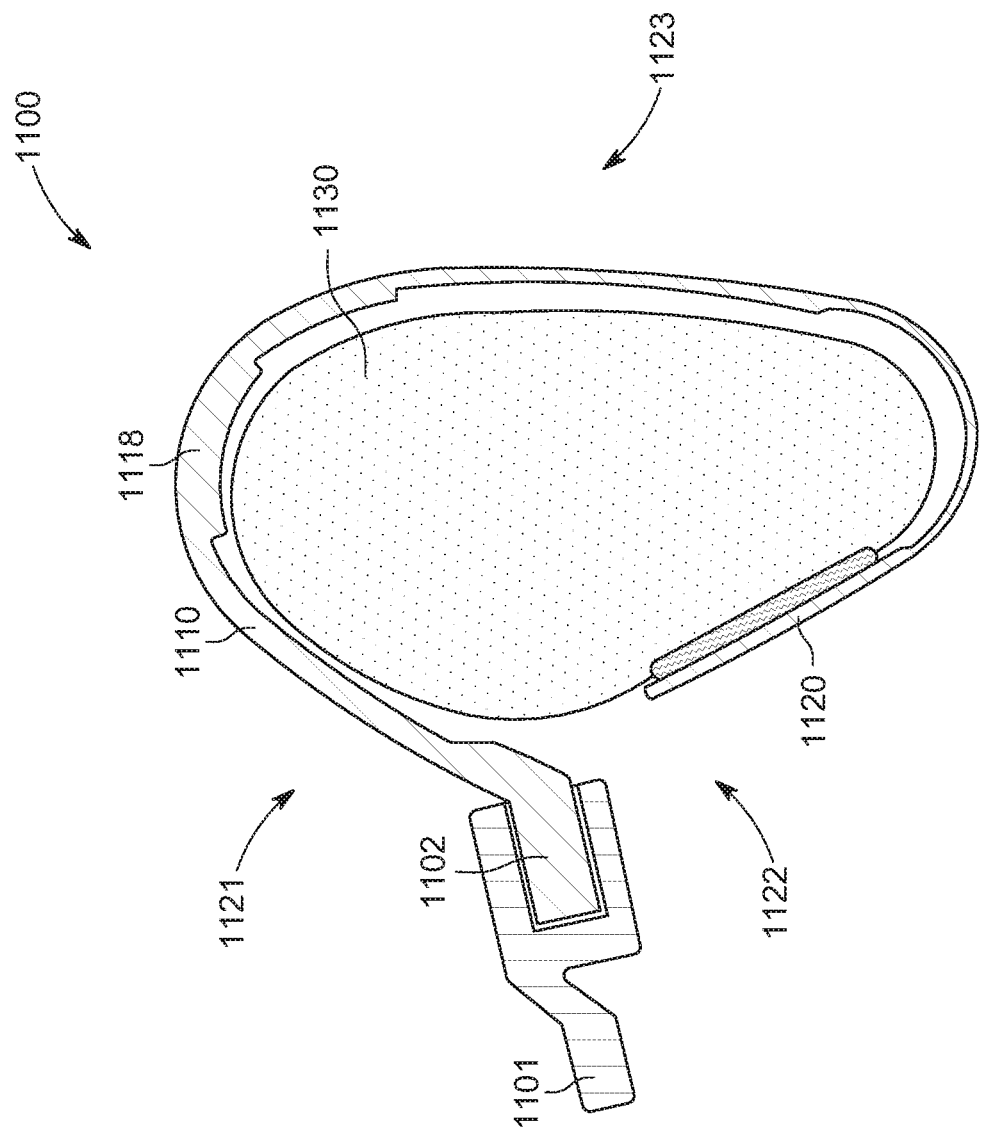

Section B-B

Section C-C

Section D-D

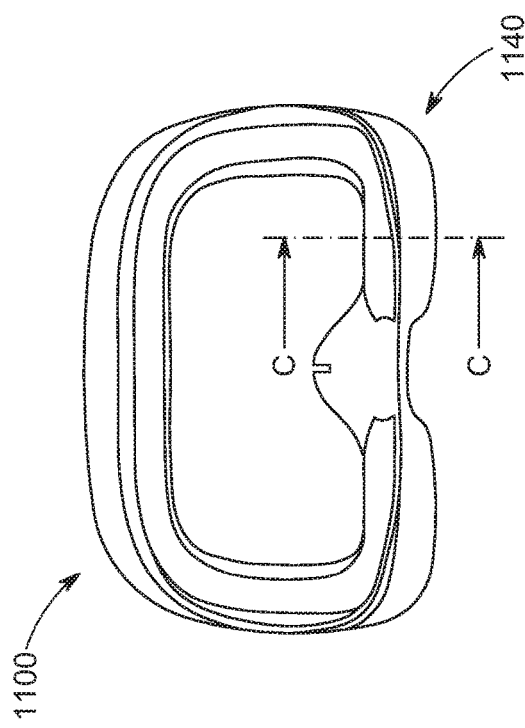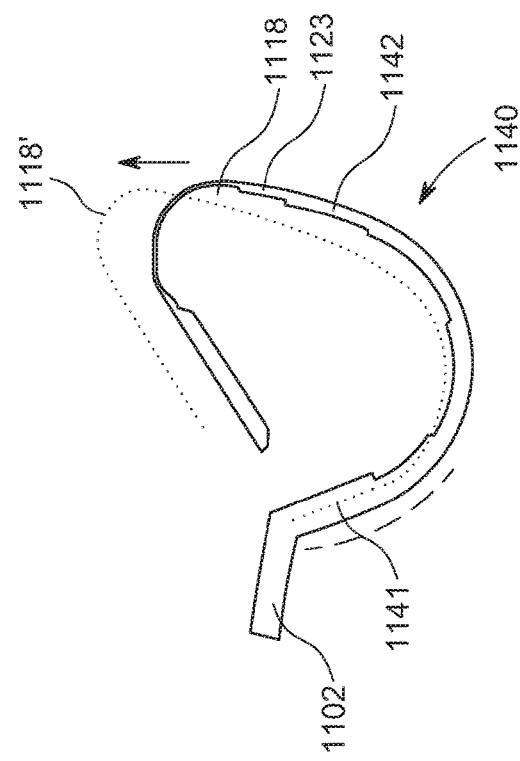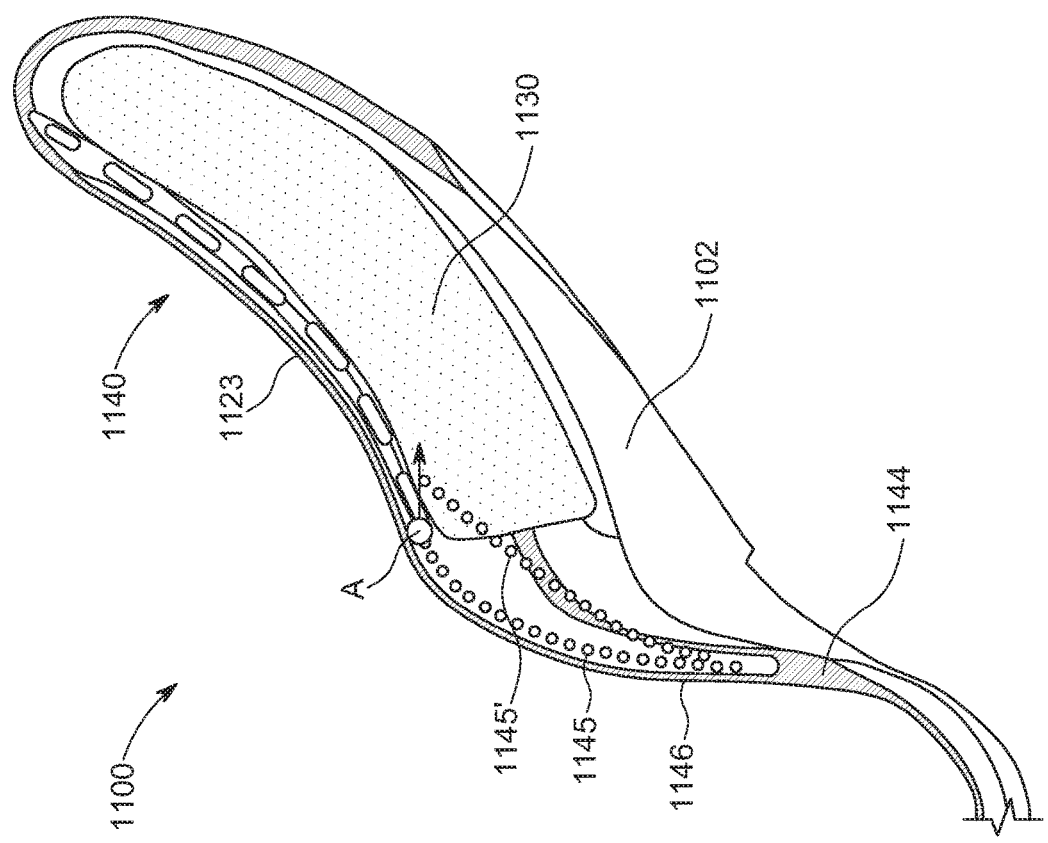
FIG. 14B
FIG. 14C
FIG. 14A

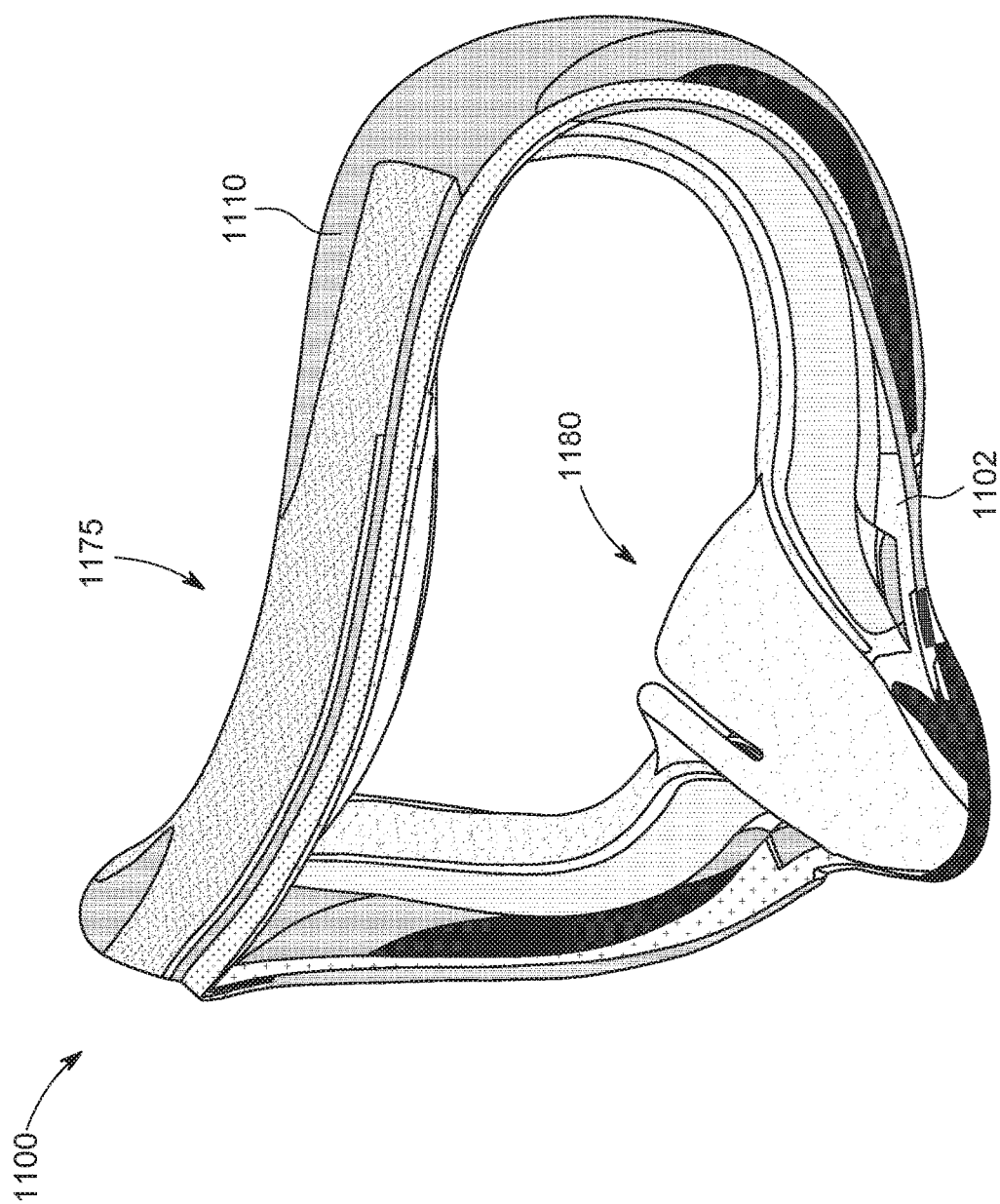
FIG. 15B
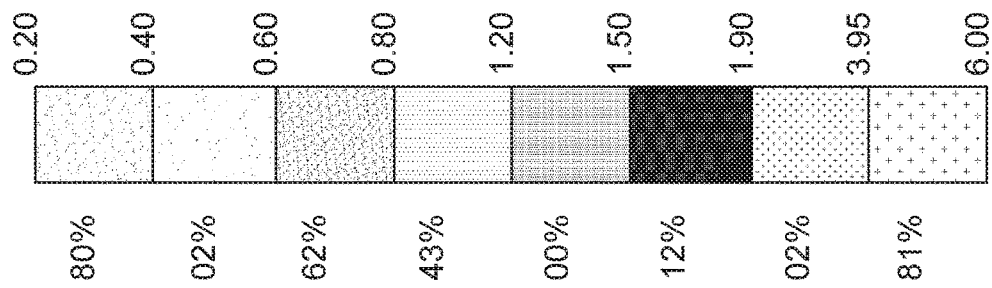

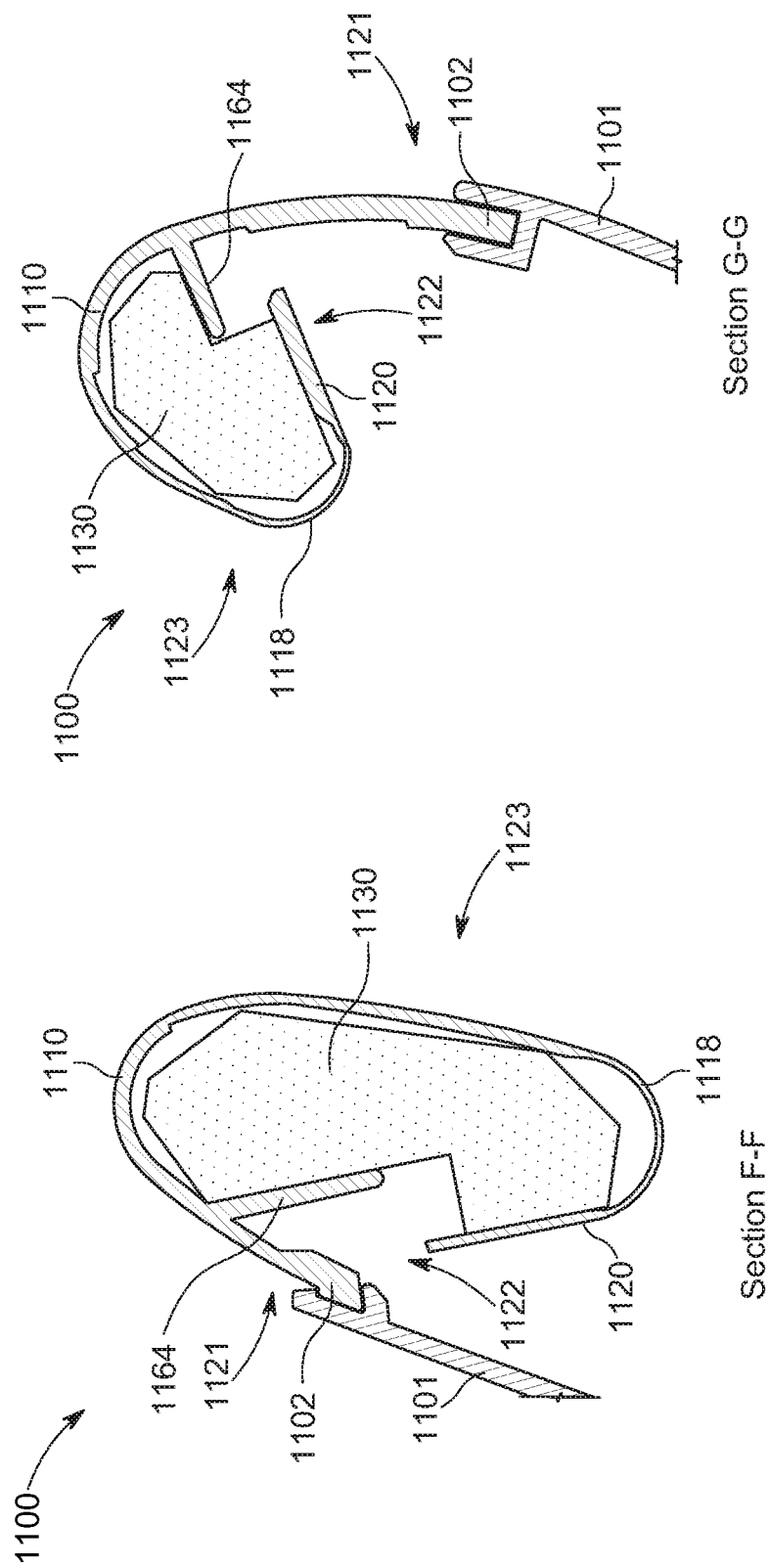

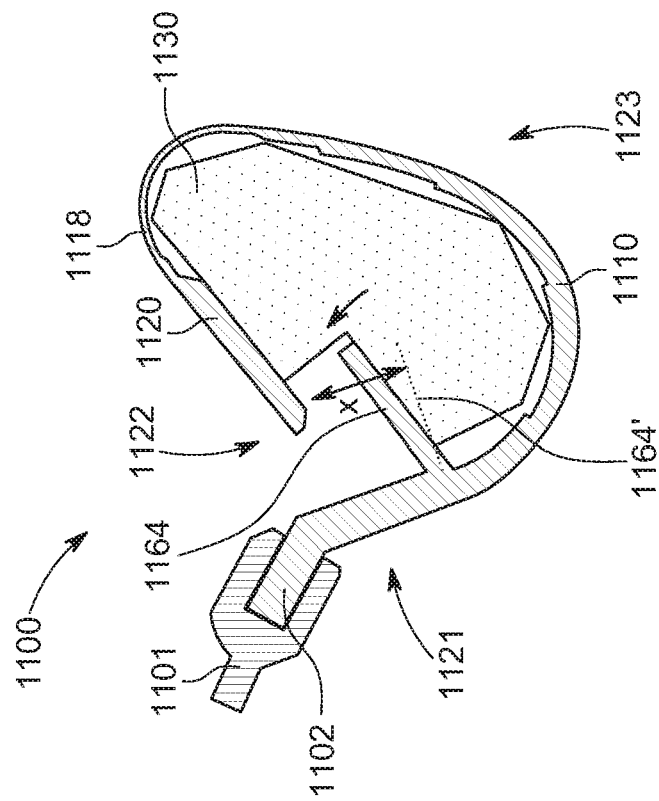
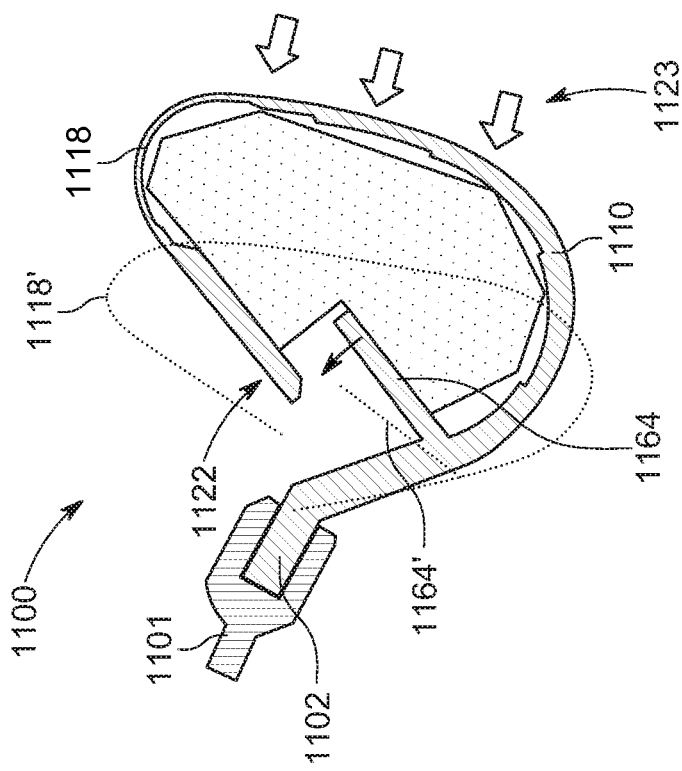
FIG. 17K
FIG. 17J

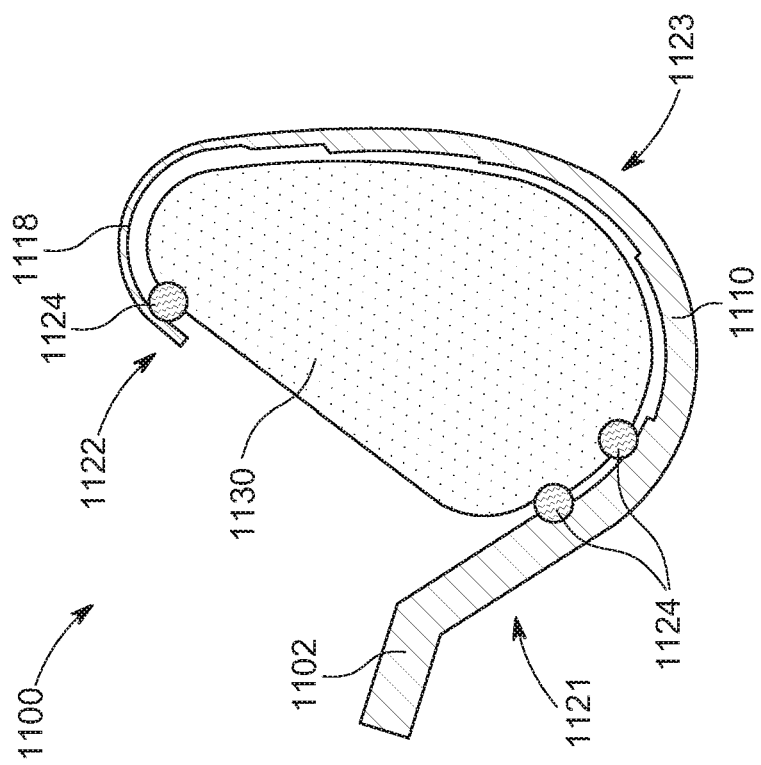
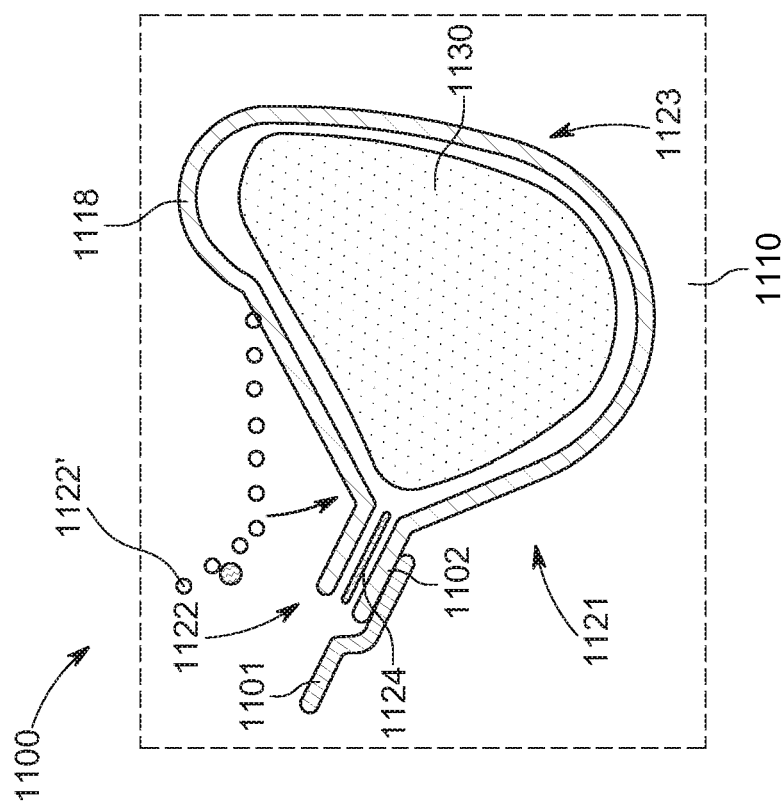

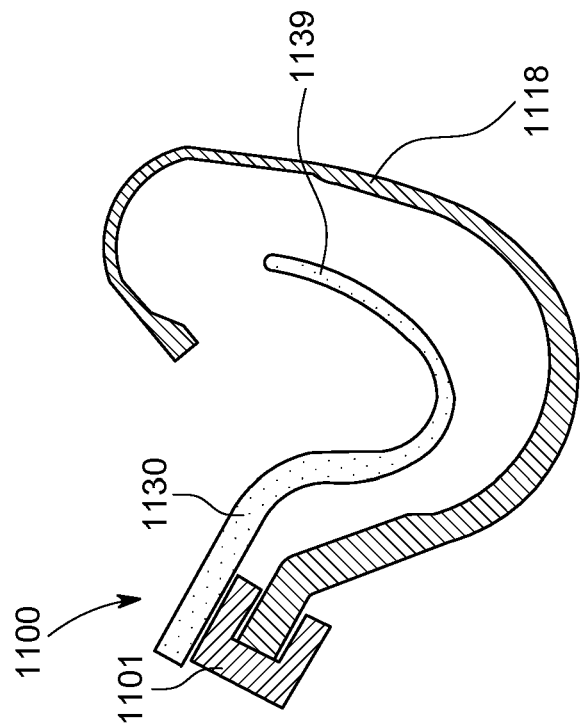
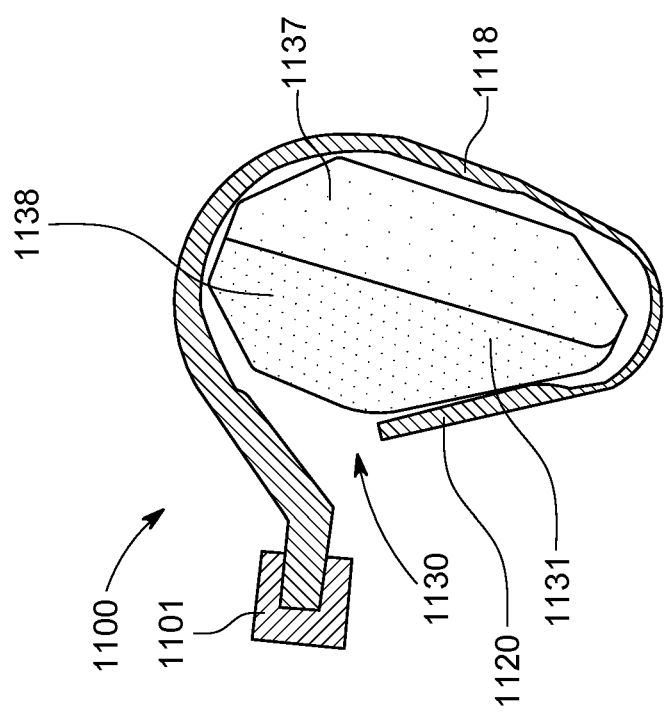
FIG. 19A
FIG. 19B

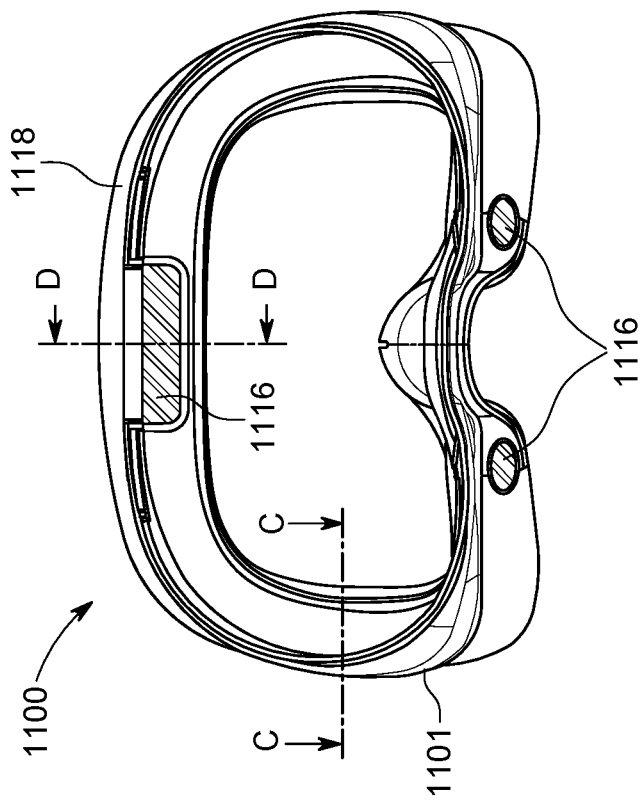
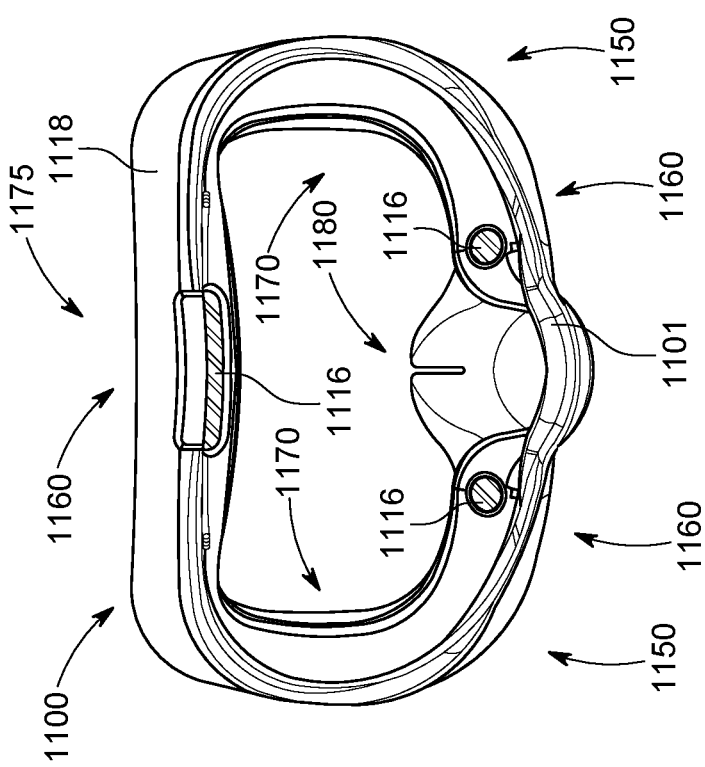
FIG. 20B
FIG. 20A

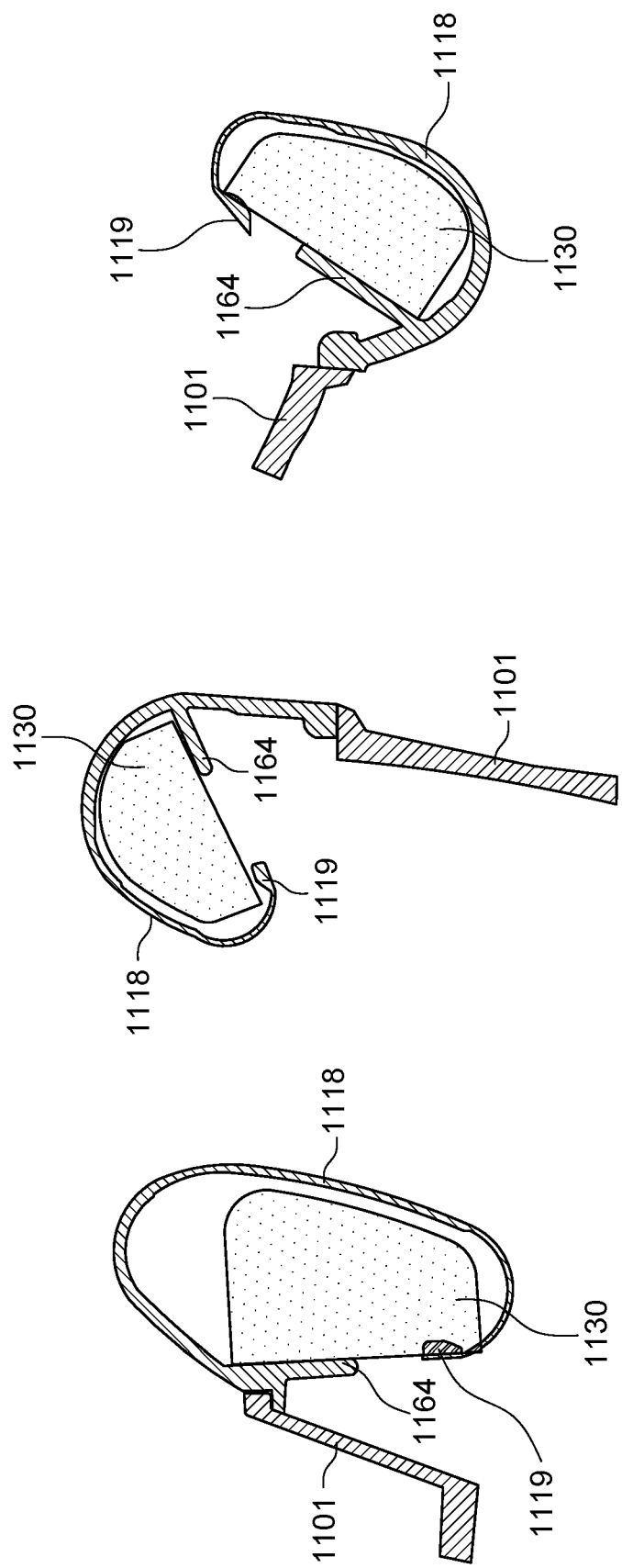

POSITIONING, STABILISING, AND INTERFACING STRUCTURES AND SYSTEM INCORPORATING SAME

1 CROSS-REFERENCE TO RELATED APPLICATIONS

This application is the U.S. national phase of International Application No. PCT/AU2022/050350 filed Apr. 19, 2022 which designated the U.S. and claims priority to Australian Patent Application No. 2021901149 filed 19 Apr. 2021, Australian Patent Application No. 2021901408 filed 12 May 2021, Australian Patent Application No. 2021901671 filed 4 Jun. 2021, Australian Patent Application No. 2021901993 filed 30 Jun. 2021, Australian Patent Application No. 2021901994 filed 30 Jun. 2021, Australian Patent Application No. 2021902184 filed 16 Jul. 2021, Australian Patent Application No. 2021902827 filed 31 Aug. 2021, Australian Patent Application No. 2021902861 filed 3 Sep. 2021, Australian Patent Application No. 2021903158, filed 1 Oct. 2021, Australian Patent Application No. 2021903200 filed 6 Oct. 2021, Australian Patent Application No. 2021903996 filed 10 Dec. 2021, International (PCT) Application No. PCT/AU2022/050043 filed 28 Jan. 2022 and International (PCT) Application No. PCT/AU2022/050045 filed 28 Jan. 2022, the entire contents of each of which are hereby incorporated by reference.

2 BACKGROUND OF THE TECHNOLOGY

2.1 Field of the Technology

The present technology relates generally to head mounted displays, positioning and stabilizing structures, user interfacing structures, and other components for use in head mounted displays, associated head-mounted display assemblies and systems including a display unit and positioning and stabilizing structure, interfacing structures and or components, and methods. The present technology finds particular application in the use of immersive reality head mounted displays and is herein described in that context. It is to be appreciated that the present technology may have broader application and may be used in any type of head-mounted display arrangement including, but not limited to, virtual reality displays, augmented reality displays, and/or mixed reality displays.

2.2 Description of the Related Art

It is to be understood that, if any prior art is referred to herein, such reference does not constitute an admission that the prior art forms a part of the common general knowledge in the art, in Australia or any other country.

2.2.1 Immersive Technology

An immersive technology refers to technology that attempts to replicate or augment a physical environment through the means of a digital or virtual environment by creating a surrounding sensory feeling, thereby creating a sense of immersion.

In particular, an immersive technology provides the user visual immersion, and creates virtual objects and/or a virtual environment. The immersive technology may also provide immersion for at least one of the other five senses.

2.2.2 Virtual Reality

Virtual reality (VR) is a computer-generated three-dimensional image or environment that is presented to a user. In other words, the environment may be entirely virtual. Specifically, the user observes an electronic screen in order to observe virtual or computer generated images in a virtual environment. Since the created environment is entirely virtual, the user may be blocked and/or obstructed from interacting with their physical environment (e.g., they may be unable to hear and/or see the physical objects in the physical environment that they are currently located).

The electronic screen may be supported in the user's line of sight (e.g., mounted to the user's head). While observing the electronic screen, visual feedback output by the electronic screen and observed by the user may produce a virtual environment intended to simulate an actual environment. For example, the user may be able to look around (e.g., 360°) by pivoting their head or their entire body, and interact with virtual objects observable by the user through the electronic screen. This may provide the user with an immersive experience where the virtual environment provides stimuli to at least one of the user's five senses, and replaces the corresponding stimuli of the physical environment while the user uses the VR device. Typically, the stimuli relates at least to the user's sense of sight (i.e., because they are viewing an electronic screen), but other senses may also be included. The electronic screens are typically mounted to the user's head so that they may be positioned in close proximity to the user's eyes, which allows the user to easily observe the virtual environment.

The VR device may produce other forms of feedback in addition to, or aside from, visual feedback. For example, the VR device may include and/or be connected to a speaker in order to provide auditory feedback. The VR device may also include tactile feedback (e.g., in the form of haptic response), which may correspond to the visual and/or auditory feedback. This may create a more immersive virtual environment, because the user receives stimuli corresponding to more than one of the user's senses.

While using a VR device, a user may wish to limit to block ambient stimulation. For example, the user may want to avoid seeing and/or hearing the ambient environment in order to better process stimuli from the VR device in the virtual environment. Thus, VR devices may limit and/or prevent the user's eyes from receiving ambient light. In some examples, this may be done by providing a seal against the user's face. In some examples, a shield may be disposed proximate to (e.g., in contact or close contact with) the user's face, but may not seal against the user's face. In either example, ambient light may not reach the user's eyes, so that the only light observable by the user is from the electronic screen.

In other examples, the VR devices may limit and/or prevent the user's ears from hearing ambient noise. In some examples, this may be done by providing the user with headphones (e.g., noise cancelling headphones), which may output sounds from the VR device and/or limit the user from hearing noises from their physical environment. In some examples, the VR device may output sounds at a volume sufficient to limit the user from hearing ambient noise.

In any example, the user may not want to become overstimulated (e.g., by both their physical environment and the virtual environment). Therefore, blocking and/or limiting the ambient from stimulating the user assists the user in focusing on the virtual environment, without possible distractions from the ambient.

Different types of VR devices are described below. Generally, a single VR device may include at least two different classifications. For example, the VR device may be classified by its portability and by how the display unit is coupled to the rest of the interface. These classifications may be independent, so that classification in one group (e.g., the portability of the unit) does not predetermine classification into another group. There may also be additional categories to classify VR devices, which are not explicitly listed below.

2.2.2.1 Portability 2.2.2.1.1 Fixed Unit

In some forms, a VR device may be used in conjunction with a separate device, like a computer or video game console. This type of VR device may be fixed, since it cannot be used without the computer or video game console, and thus locations where it can be used are limited (e.g., by the location of the computer or video game console).

Since the VR device can be used in conjunction with the computer or video game console, the VR device may be connected to the computer or video game console. For example, an electrical cord may tether the two systems together. This may further "fix" the location of the VR device, since the user wearing the VR device cannot move further from the computer or video game console than the length of the electrical cord. In other examples, the VR device may be wirelessly connected (e.g., via Bluetooth, Wi-Fi, etc.), but may still be relatively fixed by the strength of the wireless signal.

The connection to the computer or video game console may provide control functions to the VR device. The controls may be communicated (i.e., through a wired connector or wirelessly) in order to help operate the VR device. In examples of a fixed unit VR device, these controls may be necessary in order to operate the display screen, and the VR device may not be operable without the connection to the computer or video game console.

In some forms, the computer or video game console may provide electrical power to the VR device, so that the user does not need to support a battery on their head. This may make the VR device more comfortable to wear, since the user does not need to support the weight of a battery.

The user may also receive outputs from the computer or video game console at least partially through the VR device, as opposed to through a television or monitor, which may provide the user with a more immersive experience while using the computer or video game console (e.g., playing a video game). In other words, the display output of the VR device may be substantially the same as the output from a computer monitor or television. Some controls and/or sensors necessary to output these images may be housed in the computer or video game console, which may further reduce the weight that the user is required to support on their body.

In some forms, movement sensors may be positioned remote from the VR device, and connected to the computer or video game console. For example, at least one camera may face the user in order to track movements of the user's head. The processing of the data recorded by the camera(s) may be done by the computer or video game console, before being transmitted to the VR device. While this may assist in weight reduction of the VR device, it may also further limit where the VR device can be used. In other words, the VR device must be in the sight line of the camera(s).

2.2.2.1.2 Portable Unit

In some forms, the VR device may be a self-contained unit, which includes a power source and sensors, so that the VR device does not need to be connected to a computer or video game console. This provides the user more freedom of use and movement. For example, the user is not limited to using the VR device near a computer or video game console, and could use the VR device outdoors, or in other environments that do not include computers or televisions.

Since the VR device is not connected to a computer or video game console in use, the VR device is required to support all necessary electronic components. This includes batteries, sensors, and processors. These components add weight to the VR device, which the user must support on their body. Appropriate weight distribution may be needed so that this added weight does not increase discomfort to a user wearing the VR device.

In some forms, the electrical components of the VR device are contained in a single housing, which may be disposed directly in front of the user's face, in use. This configuration may be referred to as a "brick." In this configuration, the center of gravity of the VR device without the positioning and stabilizing structure is directly in front of the user's face. In order to oppose the moment created by the force of gravity, the positioning and stabilizing structure coupled to the brick configuration must provide a force directed into the user's face, for example created by tension in headgear straps. While the brick configuration may be beneficial for manufacturing (e.g., since all electrical components are in close proximity) and may allow interchangeability of positioning and stabilizing structures (e.g., because they include no electrical connections), the force necessary to maintain the position of the VR device (e.g. tensile forces in headgear) may be uncomfortable to the user. Specifically, the VR device may dig into the user's face, leading to irritation and markings on the user's skin. The combination of forces may feel like "clamping" as the user's head receives force from the display housing on their face and force from headgear on the back of their head. This may make a user less likely to wear the VR device.

As VR and other mixed reality devices may be used in a manner involving vigorous movement of the user's head and/or their entire body (for example during gaming), there may be significant forces/moments tending to disrupt the position of the device on the user's head. Simply forcing the device more tightly against the user's head to tolerate large disruptive forces may not be acceptable as it may be uncomfortable for the user or become uncomfortable after only a short period of time.

In some forms, electrical components may be spaced apart throughout the VR device, instead of entirely in front of the user's face. For example, some electrical components (e.g., the battery) may be disposed on the positioning and stabilizing structure, particularly on a posterior contacting portion. In this way, the weight of the battery (or other electrical components) may create a moment directed in the opposite direction from the moment created by the remainder of the VR device (e.g., the display). Thus, it may be sufficient for the positioning and stabilizing structure to apply a lower clamping force, which in turn creates a lower force against the user's face (e.g., fewer marks on their skin). However, cleaning and/or replacing the positioning and stabilizing structure may be more difficult in some such existing devices because of the electrical connections.

In some forms, spacing the electrical components apart may involve positioning some of the electrical components separate from the rest of the VR device. For example, a battery and/or a processor may be electrically connected, but carried separately from the rest of the VR device. Unlike in the "fixed units" described above, the battery and/or processor may be portable, along with the remainder of the VR device. For example, the battery and/or the processor may be carried on the user's belt or in the user's pocket. This may provide the benefit of reduced weight on the user's head, but would not provide a counteracting moment. The tensile force provided by the positioning and stabilizing structure may still be less than the "brick" configuration, since the total weight supported by the head is less.

2.2.2.2 Display Connection

2.2.2.2.1 Integrated Display Screen

In some forms, the display screen is an integral piece of the VR device, and generally cannot be detached or removed from the rest of the VR device.

The display screen may be fixed within a housing, and protected from damage. For example, the display screen may be completely covered by the housing, which may reduce the occurrence of scratches. Additionally, integrating display screen with the rest of the VR device eliminates the occurrence of losing the display screen.

In these forms, the display screen functions purely as an immersive technology display. The vast majority of "fixed units" will include an integrated display screen. "Portable units" may include an integrated display screen, or may include a removable display screen (described below).

2.2.2.2.2 Removable Display Screen

In some forms, the display screen is a separate structure that can be removed from the VR device, and used separately.

In some forms, a portable electronic device (e.g., a cell phone) may be selectively inserted into a housing of the VR device. The portable electronic device may include most or all of the sensors and/or processors, and may create a virtual environment through a downloadable app.

Portable electronic devices are generally light weight, and may not require the positioning and stabilizing structure to apply a large force to the user's head.

2.2.3 Augmented Reality

In some forms, augmented reality (AR) is a computer-generated three-dimensional image or environment that is presented to a user.

While similar to VR, AR differs in that the virtual environment created at least in part by the electronic screen is observed in combination with the user's physical environment. In other words, AR creates virtual objects in order to alter and/or enhance the user's physical environment with elements of a virtual environment. The result of AR is a combined environment that includes physical and virtual objects, and therefore an environment that is both physical and virtual.

For example, images created by the electronic screen may be overlayed into the user's physical environment. Only a portion of an AR combination environment presented to the user includes is virtual. Thus, the user may wish to continue to receive ambient stimulation from their physical environment while using an AR device (e.g., in order to continue to observe the physical or non-virtual component of the combination environment).

Since AR may be used with the user's physical environment, an AR device may not be electrically connected, or otherwise tethered, to a computer or video game console. Instead the AR device may include a battery, or other power source. This may provide the user with the greatest freedom of movement, so that they can explore a variety of physical environments while using the AR device.

This key difference between VR and AR may lead to different types of wearable electronic screens. As described above, a user of a VR device may wish to block ambient light, so the housing of the electronic screen may be opaque in order to limit or prevent ambient light from reaching the user. However, the user of an AR device may want to see the virtual environment blended with their actual environment. The electronic screen in an AR device may be similarly supported in front of the user's eyes, but, screens in AR devices may be transparent or translucent, and the screens may not be supported by an opaque housing (or opaque material may not substantially obstruct the user's line of sight). This may allow the user to continue receiving ambient stimulation, where the virtual environment is simultaneously present. Notwithstanding, some VR devices that do not have a transparent screen through which the user can see their real world surroundings may be configurable for AR by acquiring real-time video of the user's real-world surroundings from the user's perspective (e.g. with cameras on the display housing) and displaying it on the display screen.

Additionally, a person using an AR device may be more mobile than a person using a VR device (e.g., because an AR user can see their physical environment and/or are not tethered to a computer or video game console). Thus, a person using an AR device may wish to wear the device for an extended period of time, while also moving around (e.g., walking, running, biking, etc.). Including components, like batteries, on the AR device may make the AR device uncomfortable for the user's head and/or neck, and may discourage the user from wearing the AR device for long periods of time.

2.2.4 Mixed Reality

Mixed reality (MR) is similar to AR but may be more immersive because the MR device may provide the user more ways to interact with virtual objects or environment than an AR device. The virtual reality in MR may also be overlayed and/or blended with the user's physical environment. Unlike AR however, a user may be able to interact with the virtual environment akin to what occurs in VR. In other words, while AR may present only an computer generated image in the physical environment, MR may present the user with the same or similar computer generated image but allow for interaction with the image in the physical environment (e.g., using a hand to "grab" an object produced virtually). Thus, the virtual environment may further merge with a physical environment so that the combined environment better replicates an actual environment.

2.2.5 Head-Mounted Display Interface

A head-mounted display interface enables a user to have an immersive experience of a virtual environment and have broad application in fields such as communications, training, medical and surgical practice, engineering, and video gaming.

Different head-mounted display interfaces can each provide a different level of immersion. For example, some head-mounted display interfaces can provide the user with a total immersive experience. One example of a total immersive experience is virtual reality (VR). The head-mounted display interface can also provide partial immersion consistent with using an AR device.

VR head-mounted display interfaces typically are provided as a system that includes a display unit which is arranged to be held in an operational position in front of a user's face. The display unit typically includes a housing containing a display and a user interface structure constructed and arranged to be in opposing relation with the user's face. The user interface structure may extend about the display and define, in conjunction with the housing, a viewing opening to the display. The user interfacing structure may engage with the face and include a cushion for user comfort and/or be light sealing to block ambient light from the display. The head-mounted display system further comprises a positioning and stabilizing structure that is disposed on the user's head to maintain the display unit in position.

Other head-mounted display interfaces can provide a less than total immersive experience. In other words, the user can experience elements of their physical environment, as well as a virtual environment. Examples of a less than total immersive experience are augmented reality (AR) and mixed reality (MR).

AR and/or MR head-mounted display interfaces are also typically provided as a system that includes a display unit which is arranged to be held in an operational position in front of a user's face. Likewise, the display unit typically includes a housing containing a display and a user interface structure constructed and arranged to be in opposing relation with the user's face. The head-mounted display system of the AR and/or MR head-mounted display is also similar to VR in that it further comprises a positioning and stabilizing structure that is disposed on the user's head to maintain the display unit in position. However, AR and/or MR head-mounted displays do not include a cushion that totally seals ambient light from the display, since these less than total immersive experience require an element of the physical environment. Instead, head-mounted displays in augmented and/or mixed allow the user to see the physical environment in combination with the virtual environment.

In any types of immersive technology, it is important that the head-mounted display interface is comfortable in order to allow the user to wear the head-mounted display for extended periods of time. Additionally, it is important that the display is able to provide changing images with changing position and/or orientation of the user's head in order to create an environment, whether partially or entirely virtual, that is similar to or replicates one that is entirely physical.

2.2.5.1 Interfacing Structure

The head-mounted displays may include a user interfacing structure. Since it is in direct contact with the user's face, the shape and configuration of the interfacing portion can have a direct impact on the effectiveness and comfort of the display unit.

The design of a user interfacing structure presents a number of challenges. The face has a complex three-dimensional shape. The size and shape of noses and heads varies considerably between individuals. Since the head includes bone, cartilage and soft tissue, different regions of the face respond differently to mechanical forces.

One type of interfacing structure extends around the periphery of the display unit and is intended to seal against the user's face when force is applied to the user interface with the interfacing structure in confronting engagement with the user's face. The interfacing structure may include a pad made of a polyurethane (PU). With this type of interfacing structure, there may be gaps between the interfacing structure and the face, and additional force may be required to force the display unit against the face in order to achieve the desired contact.

The regions not engaged at all by the user interface may allow gaps to form between the facial interface and the user's face through which undesirable light pollution may ingress into the display unit (e.g., particularly when using virtual reality). The light pollution or "light leak" may decrease the efficacy and enjoyment of the overall immersive experience for the user. In addition, previous systems may be difficult to adjust to enable application for a wide variety of head sizes. Further still, the display unit and associated stabilizing structure may often be relatively heavy and may be difficult to clean which may thus further limit the comfort and useability of the system.

Another type of interfacing structure incorporates a flap seal of thin material positioned about a portion of the periphery of the display unit so as to provide a sealing action against the face of the user. Like the previous style of interfacing structure, if the match between the face and the interfacing structure is not good, additional force may be required to achieve a seal, or light may leak into the display unit in-use. Furthermore, if the shape of the interfacing structure does not match that of the user, it may crease or buckle in-use, giving rise to undesirable light penetration.

A user interface may be partly characterised according to the design intent of where the interfacing structure is to engage with the face in-use. Some interfacing structures may be limited to engaging with regions of the user's face that protrude beyond the arc of curvature of the face engaging surface of the interfacing structure. These regions may typically include the user's forehead and cheek bones. This may result in user discomfort at localised stress points. Other facial regions may not be engaged at all by the interfacing structure or may only be engaged in a negligible manner that may thus be insufficient to increase the translation distance of the clamping pressure. These regions may typically include the sides of the user's face, or the region adjacent and surrounding the users nose. To the extent to which there is a mismatch between the shape of the users' face and the interfacing structure, it is advantageous for the interfacing structure or a related component to be adaptable in order for an appropriate contact or other relationship to form.

2.2.5.2 Positioning and Stabilizing

To hold the display unit in its correct operational position, the head-mounted display system further comprises a positioning and stabilizing structure that is disposed on the user's head. These structures may be responsible for providing forces to counter gravitational forces of the head-mounted display and/or interfacing structure. In the past these structures have been formed from expandable rigid structures that are typically applied to the head under tension to maintain the display unit in its operational position. Such systems have been prone to exert a clamping pressure on the user's face which can result in user discomfort at localised stress points. Also, previous systems may be difficult to adjust to allow wide application head sizes. Further, the display unit and associated stabilizing structure are often heavy, difficult to clean which further limit the comfort and useability of the system.

Certain other head mounted display systems may be functionally unsuitable for the present field. For example, positioning and stabilizing structures designed for ornamental and visual aesthetics may not have the structural capabilities to maintain a suitable pressure around the face. For example, an excess of clamping pressure may cause discomfort to the user, or alternatively, insufficient clamping pressure on the users' face may not effectively seal the display from ambient light.

Certain other head mounted display systems may be uncomfortable or impractical for the present technology. For example, if the system is used for prolonged time periods.

As a consequence of these challenges, some head mounted displays suffer from being one or more of obtrusive, aesthetically undesirable, costly, poorly fitting, difficult to use, and uncomfortable especially when worn for long periods of time or when a user is unfamiliar with a system. Wrongly sized positioning and stabilizing structures can give rise reduced comfort and in turn, shortened periods of use.

Therefore, an interfacing portion of a user interface used for the fully immersive experience of a virtual environment are subject to forces corresponding to the movement of a user during the experience.

2.2.5.3 Materials

Materials used in head mounted display assemblies have included dense foams for contacting portions in the interfacing structures, rigid shells for the housings, and positioning and stabilizing structures formed from rigid plastic clamping structures. These materials have various drawbacks including not permitting the skin covered by the material to breathe, being inflexible, difficult to clean and to prone trapping bacteria. As a result, products made with such material may be uncomfortable to wear for extended periods of time, causes skin irritation in some individuals and limit the application of the products.

3 BRIEF SUMMARY OF THE TECHNOLOGY

The present technology may be directed toward providing positioning and stabilizing structures used in the supporting, stabilizing, mounting, utilizing, and/or securing of a head-mounted display having one or more of improved comfort, cost, efficacy, ease of use and manufacturability.

A first aspect of the present technology relates to apparatuses used in the supporting, stabilizing, mounting, utilizing, and/or securing of a head-mounted display.

Another aspect of the present technology relates to methods used in the supporting, stabilizing, mounting, utilizing, and/or securing of a head-mounted display.

Another aspect is a positioning and stabilizing structure for a head-mounted display that comprising a rear (or posterior) support structure (or portion) arranged, in use, to contact a posterior region of the user's head.

In some forms, the posterior support portion or at least a portion thereof is disposed posterior of the otobasion superior of the user.

In some forms, the posterior support portion is biased into contact with the occipital region of the user.

In some forms, the positioning and stabilizing structure further comprises opposing connectors that are disposed on opposing sides of, and extending along the temporal regions of, the user's head to interconnect the posterior support portion to the head-mounted display unit. In some forms the positioning and stabilising structure comprises an anterior support portion connecting the posterior support portion to the head-mounted display unit.

The present technology may also be directed toward providing interfacing structures used in the supporting, cushioning, stabilizing, positioning, and/or sealing a head-mounted display in opposing relation with the user's face.

Another aspect relates to apparatuses used in the supporting, cushioning, stabilizing, positioning, and/or sealing a head-mounted display in opposing relation with the user's face.

Another aspect relates to methods used in supporting, cushioning, stabilizing, positioning, and/or sealing a head-mounted display in opposing relation with the user's face.

3.1 Interfacing Structures with Medial Support Portions

Another aspect of the present technology relates to a head-mounted display system, comprising:
  a head-mounted display unit comprising a display, the head-mounted display unit comprising an interfacing structure constructed and arranged to be in opposing relation to the user's face in use; and
  a positioning and stabilising structure structured and arranged to hold the head-mounted display unit in an operable position on the user's head in use,
wherein the interfacing structure comprises a face engaging portion configured to engage the user's face in use, the face engaging portion being flexible and resilient and comprising:
  a pair of cheek portions configured to engage the user's cheeks in use, and
  a pair of medial support portions, each medial support portion located medially of a respective one of the cheek portions and configured to provide support for the respective cheek portion;
wherein the face engaging portion comprises at least one face engaging flange, the face engaging flange forming one or more loop portions having an at least partially enclosed cross section.

In examples:
the face engaging portion is configured to engage the user's face around a periphery of the user's eyes in use;
the face engaging portion is configured to engage the sides of the user's face lateral of the user's eyes and engage the user's forehead in use;
at each medial support portion, the interfacing structure curves anteriorly from a respective one of the cheek portions;
each medial support portion is integrally formed with the respective cheek portion;
the medial support portions are configured to resist deformation of the cheek portions;
each of the medial support portions comprises a medially-facing wall located alongside the user's nose in use and each of the cheek portions comprises a face engaging region configured to contact a respective one of the user's cheeks in use;
each medially-facing wall comprises a thickness that is the same or less than the face engaging regions of the cheek portions;
the medial support portions resist deformation of the cheek portions by resistance to elongation in the medially-facing wall in use;
the interfacing structure comprises one or more cushions positioned at least at the cheek portions;
the one or more cushions are formed from foam;
each medially-facing wall comprises a greater thickness than face engaging regions of the cheek portions;
the medial support portions resist deformation of the cheek portions by resistance to bending in the medially facing walls in use;
the medial support portions provide a greater resistance to movement of the cheek portions in the superior-inferior directions and/or in the lateral direction than in the anterior-posterior directions; and/or
the interfacing structure comprises a medial anchor portion intersecting the sagittal plane of the user's head in use and connecting the pair of medial support portions, the medial anchor portion being stiffer than the medial support portions.

3.1.1 Loop Portions

In further examples:
the at least one face engaging flange of the face engaging portion forms a pair of closed loop portions on respective lateral sides of the face engaging portion, each closed loop portion having an enclosed cross section;
the medial support portions of the face engaging portion are formed at least partially by the closed loop portions;
the at least one face engaging flange of the face engaging portion forms a pair of open loop portions each having a partially open cross section;

each open loop portion is laterally adjacent to a respective one of the closed loop portions;

each open loop portion is in a respective cheek portion;

the interfacing structure further comprises a chassis portion being stiffer than the face engaging portion, the face engaging portion being attached to and supported by the chassis portion;

in each of the cheek portions the face engaging flange extends inferiorly from the chassis portion and then posteriorly, superiorly, and anteriorly;

in each of the medial support portions the face engaging flange extends inferiorly from the chassis portion and then medially, superiorly and laterally;

in each of the closed loop portions, after extending inferiorly from the chassis portion and then posteriorly, superiorly, and anteriorly, the face engaging flange connects back to itself;

the face engaging portion comprises a forehead portion configured to engage the user's forehead in use, and a pair of sphenoid portions located on respective lateral sides of the interfacing structure connecting between the forehead portion and the cheek portions and configured to engage the user's head proximate the sphenoid bone;

the open loop portions extend longitudinally along the interfacing structure from the cheek portions into the sphenoid portions and into the forehead portion;

in each loop portion, the face engaging flange comprises an anterior portion connected to the chassis portion and a posterior portion connected to the anterior portion and being positioned posteriorly to the anterior portion, the posterior portion being in contact with the user's face in use, the anterior portions and posterior portions together forming the closed loop portions and open loop portions of the face engaging portions;

the closed loop portions reduce in size in the pair of medial support portions;

in each closed loop portion, the posterior portion and anterior portion of the face engaging flange meet at the medial anchor portion;

the face engaging portion comprises a cushion support flange extending inwardly from the face engaging flange with respect to the loop formed by the open loop portion in each of the cheek portions;

the cushion support flanges in the cheek portions extend longitudinally along the face engaging portion from the respective cheek portions into respective sphenoid portions and into the forehead portion and meet in the forehead portion at the sagittal plane of the user's head in use such that the face engaging portion comprises a single cushion support flange forming the cushion support flange in each cheek portion;

the interfacing structure comprises one or more cushions supported by the cushion support flange;

the one or more cushions are formed from foam;

the face engaging flange is formed from an elastomeric material; and/or the medial support portion is formed from an elastomeric material.

3.1.2 Nasal Portion

In further examples:

the face engaging portion comprises a nasal portion between the cheek portions, the nasal portion configured to engage the user's nose in use and configured to at least partially block light from reaching the user's eyes from the user's nose region;

the nasal portion is attached to the medial support portions;

the nasal portion comprises a pronasale portion configured to be positioned proximate the user's pronasale in use;

the interfacing structure comprises a medial anchor portion aligned in use with the sagittal plane of the user's head, and the pronasale portion is connected to the medial anchor portion and extends from the medial anchor portion in superior and posterior directions;

the pronasale portion is connected to and extends from the medial support portions in medial and posterior directions;

the pronasale portion is dome shaped;

the pronasale portion occupies a space superior, anterior and/or laterally of the user's pronasale in use;

the face engaging portion comprises a pair of closed loop portions each having an enclosed cross section, the nasal portion being integrally formed with each of the closed loop portions;

the nasal portion comprises a first bridge portion and a second bridge portion extending at least partially posteriorly from the pronasale portion to engage the user's nose, the first bridge portion configured to bridge between one of the medial support portions and a first lateral side of the user's nose, and the second bridge portion configured to bridge between the other of the medial support portions and a second lateral side of the user's nose;

the first bridge portion and the second bridge portion are separated by a slot;

the first bridge portion and the second bridge portion engage respective lateral sides of the user's nose in use;

the first bridge portion and the second bridge portion are each connected to a respective medial support portion along an entirety of a lateral side of the respective bridge portion;

the first bridge portion and the second bridge portion are integrally formed with each other;

the first bridge portion and the second bridge portion are integrally formed with the pronasale portion; and/or the nasal portion is integrally formed with the medial support portions.

Another aspect of the present technology relates to an interfacing structure for a head-mounted display unit constructed and arranged to be in opposing relation with a user's face, the interfacing structure comprises a flexible and resilient face engaging portion, the face engaging portion having a pair of cheek portions configured to contact the user's cheeks in use, each cheek portion comprising at least one loop portion having an at least partially enclosed cross section, wherein the interfacing structure comprises a medial support portion medial of each cheek portion configured to provide support for the at least one loop portion.

3.2 Interfacing Structures with Closed Loop Portions

Another aspect of the present technology relates to a head-mounted display system, comprising:

a head-mounted display unit comprising a display, the head-mounted display unit comprising an interfacing structure constructed and arranged to be in opposing relation to the user's face in use; and a positioning and stabilising structure structured and arranged to hold the head-mounted display unit in an operable position on the user's head in use, wherein the interfacing structure comprises a face engaging portion configured to engage the user's face in use, the face engaging portion being flexible and resilient and comprising at least one face engaging flange forming at least one closed loop portion having an enclosed cross section, the closed loop portion of the face engaging flange being integrally formed in a continuous loop.

In examples:

the at least one closed loop portion comprises a pair of closed loop portions positioned on respective lateral sides of the user's nose in use;

each of the pair of closed loop portions engages a lateral surface of the user's nose in use;

the face engaging portion comprises a pair of cheek portions within which the pair of closed loop portions are configured to engage the user's cheeks in use;

the face engaging portion comprises a pair of medial support portions formed at least partially by the closed loop portions, each medial support portion located medially of a respective one of the cheek portions;

each medial support portion is configured to provide support for a respective one of the cheek portions;

each medial support portion is integrally formed with the respective cheek portion;

the interfacing structure comprises a medial anchor portion intersecting the sagittal plane of the user's head in use and connecting the pair of medial support portions, the medial anchor portion being stiffer than the medial support portions;

the interfacing structure comprises one or more cushions within the closed loop portions positioned at least at the cheek portions;

the one or more cushions are formed from foam;

the at least one face engaging flange of the face engaging portion forms a pair of open loop portions each having a partially open cross section;

each open loop portion is laterally adjacent to a respective one of the closed loop portions;

each open loop portion is in a respective cheek portion;

the interfacing structure further comprises a chassis portion being stiffer than the face engaging flange, the face engaging flange being attached to and supported by the chassis portion;

in each closed loop portion within a respective cheek portion the face engaging flange extends inferiorly from the chassis portion and posteriorly, superiorly, anteriorly and then connects back to itself;

in each open loop portion within a respective cheek portion the face engaging flange extends inferiorly from the chassis portion and then posteriorly, superiorly and anteriorly;

in each closed loop portion within a respective medial support portion the face engaging flange extends inferiorly from the chassis portion and then medially, superiorly, laterally and then connects back to itself;

the face engaging portion comprises a forehead portion configured to engage the user's forehead in use, and a pair of sphenoid portions located on respective lateral sides of the interfacing structure connecting between the forehead portion and the cheek portions and configured to engage the user's head proximate the sphenoid bone;

the open loop portions extend longitudinally along the interfacing structure from the cheek portions into the sphenoid portions and into the forehead portion;

in each loop portion, the face engaging flange comprises an anterior portion connected to the chassis portion and a posterior portion connected to the anterior portion and being positioned posteriorly to the anterior portion, the posterior portion being in contact with the user's face in use, the anterior portions and posterior portions together forming the closed loop portions and open loop portions of the face engaging portions;

the closed loop portions reduce in size in the medial support portions;

in each closed loop portion, the posterior portion and anterior portion of the face engaging flange meet at the medial anchor portion; and/or the face engaging flange is formed from an elastomeric material.

3.3 Interfacing Structures with Nasal Portion

Another aspect of the present technology relates to a head-mounted display system, comprising:

a head-mounted display unit comprising a display, the head-mounted display unit comprising an interfacing structure constructed and arranged to be in opposing relation to the user's face in use; and a positioning and stabilising structure structured and arranged to hold the head-mounted display unit in an operable position on the user's head in use, wherein the interfacing structure comprises a face engaging portion configured to engage the user's face in use around a periphery of an eye region of the user's face, the face engaging portion being flexible and resilient and comprising:

a pair of cheek portions configured to engage the user's cheeks in use;

a nasal portion connected to and positioned between the cheek portions, the nasal portion configured to engage the user's nose in use and configured to at least partially block light from reaching the user's eyes from the user's nose region;

wherein the nasal portion is integrally formed with the cheek portions; and wherein the nasal portion comprises a pronasale portion configured to contact the user's nose proximate to the user's pronasale in use.

In examples:

the nasal portion is configured to contact the user's nasal ridge and extend at least partially between the user's pronasale and sellion;

the pronasale portion is dome shaped;

the pronasale portion occupies a space superior, anterior and/or laterally of the user's pronasale in use;

the nasal portion comprises a first bridge portion and a second bridge portion extending at least partially posteriorly from the pronasale portion to engage the user's nose, the first bridge portion configured to bridge between one of the cheek portions and a first lateral side of the user's nose, and the second bridge portion configured to bridge between the other of the cheek portions and a second lateral side of the user's nose;

the first bridge portion and the second bridge portion are separated by a slot;

the first bridge portion and the second bridge portion engage respective lateral sides of the user's nose in use;

the first bridge portion and the second bridge portion are integrally formed with each other;

the first bridge portion and the second bridge portion are integrally formed with the pronasale portion;

the interfacing structure comprises a medial anchor portion aligned in use with the sagittal plane of the user's head, and the pronasale portion is connected to the medial anchor portion and extends from the medial anchor portion in superior and posterior directions;

the face engaging portion comprises a pair of medial support portions, each medial support portion located medially of a respective one of the cheek portions and configured to provide support for the respective cheek portion;

the pronasale portion is connected to and extends from the medial support portions in medial and posterior directions;

the nasal portion is integrally formed with the medial support portions;

the first bridge portion of the nasal portion is configured to bridge between one of the medial support portions and a first lateral side of the user's nose, and the second bridge portion of the nasal portion is configured to bridge between the other of the medial support portions and a second lateral side of the user's nose; and/or the first bridge portion and the second bridge portion are each connected to a respective medial support portion and cheek portion along an entirety of a lateral side of the respective bridge portion.

3.4 Interfacing Structures Allowing Airflow Through Chassis with Cover

Another aspect of the present technology relates to a head-mounted display system, comprising:

a head-mounted display unit comprising a display; and a positioning and stabilising structure structured and arranged to hold the head-mounted display unit in an operable position on the user's head in use, the head-mounted display unit comprising an interfacing structure constructed and arranged to be in opposing relation with the user's face, the interfacing structure comprising:

a chassis portion having one or more openings configured to allow air transfer into and/or out of a volume anterior to the user's eyes defined by the head-mounted display unit and the user's face in use; and a face engaging portion connected to the chassis portion configured to engage the user's face in use, the face engaging portion being flexible and resilient; and wherein the interfacing structure comprises a cover portion configured to at least partially block light from passing through the openings in the chassis portion, the cover portion extending anteriorly from the face engaging portion to cover the openings.

In examples:

the face engaging portion is configured to engage the user's face around a periphery of the user's eyes in use;

the face engaging portion is configured to engage the user's cheeks, the sides of the user's face lateral of the user's eyes and the user's forehead in use;

the face engaging portion comprises a face engaging flange extending from the chassis portion to engage the user's face in use;

the cover portion is in the form of a cover flange extending anteriorly from the face engaging flange to cover the openings;

the cover flange and the face engaging flange are integrally formed;

the face engaging portion comprises a forehead portion configured to engage the user's forehead in use;

the one or more openings comprise one or more openings in the chassis portion proximate the forehead portion of the face engaging portion and opening in a superior direction in use;

the face engaging flange comprises an anterior portion extending at least partially superiorly from the chassis portion proximate the forehead portion of the face engaging portion, the cover flange extending in an anterior direction from the anterior portion of the face engaging flange;

the face engaging portion comprises a pair of cheek portions configured to engage the user's cheeks in use and a pair of sphenoid portions located on respective lateral sides of the interfacing structure connecting between the forehead portion and the cheek portions and configured to engage the user's head proximate the sphenoid bone in use;

the face engaging portion is formed from an elastomeric material; and/or the cover portion is formed from the elastomeric material.

Another aspect of the present technology relates to an interfacing structure for a head-mounted display unit constructed and arranged to be in opposing relation with a user's face, the interfacing structure comprising: a flexible and resilient face engaging portion and a chassis having one or more openings configured allow air transfer into and/or out of an interior volume defined by the head-mounted display unit and the user's face in use, wherein the face engaging portion forms a cover configured to at least partially block light from passing through the openings in the chassis, the cover extending anteriorly from an anterior surface of the face engaging portion.

3.5 Cushion Attachment Portion

Another aspect of the present technology relates to a head-mounted display system, comprising:

a head-mounted display unit comprising a display; and a positioning and stabilising structure structured and arranged to hold the head-mounted display unit in an operable position on the user's head in use, the head-mounted display unit comprising a display unit housing and an interfacing structure connected to the display unit housing, the interfacing structure constructed and arranged to be in opposing relation with the user's face in use, the interfacing structure comprising:

a face engaging flange provided around a periphery of an eye region of the user's face and configured to engage the user's face in use, the face engaging flange being flexible and resilient and having a cross sectional shape comprising:

a first end connected to the display unit housing, a second end and a cushion attachment portion located at or proximate the second end; and a face engaging region at which the face engaging flange contacts the user's face in use, the face engaging region located between the first end and the cushion attachment portion, the cushion attachment portion being separate from the face engaging region such that the user's face does not contact the cushion attachment portion in use;

a cushion attached to the face engaging flange at the cushion attachment portion.

In examples:
the cushion is formed from foam;
the cushion is glued to the face engaging flange at the cushion attachment portion;
the face engaging flange comprises a lesser thickness in the face engaging region than in the cushion attachment portion;
the face engaging flange reduces in thickness from the first end towards the cushion attachment portion;
the thickness of the face engaging flange at the first end is within the range of 0.2-4 mm, 1-3 mm, 1.5-2.5 mm or 1.8-2.2 mm;
the face engaging flange comprises a thickness in the face engaging region in the range of 0.2-2.5 mm, 0.5-2.2 mm or 0.5-1.5 mm;
the thinnest portion of the face engaging flange between the first end and the cushion attachment portion is within the range of 0.2-0.5 mm or 0.25-0.4 mm;
the face engaging flange comprises a series of stepped reductions in thickness from the first end towards the cushion attachment portion;
the face engaging flange comprises two, three, four, five, six or more stepped reductions in thickness from the first end towards the cushion attachment portion;
the cushion attachment portion comprises a thickness within the range of 0.75 mm-2 mm;
the cushion attachment portion comprises a thickness within the range of 1 mm-1.5 mm; and/or
the face engaging flange and the cushion are constructed and arranged to leave a spacing between the face engaging flange and the cushion at or proximate an end of the face engaging region located inside of the periphery of the user's eye region in use, at least in an at-rest state prior to donning of head-mounted display system by the user.

In further examples:
the face engaging flange is shaped to curl towards the user's face between the first end and the face engaging region and is shaped to curl away from the user's face between the face engaging region and the second end;
the cross-sectional shape of the face engaging flange comprises a height dimension in a direction parallel to a target sealing surface on the user's face and parallel to the sagittal plane of the user's head that is within the range of 10 mm-40 mm;
the face engaging flange extends from the first end at least partially inferiorly a distance of between 10% and 80% of the height dimension measured parallel to the height dimension;
the cross-sectional shape of the face engaging flange comprises a depth dimension in a direction perpendicular to the target sealing surface and parallel to the sagittal plane of the user's head, between the first end of the face engaging flange and the face engaging region, that is within the range of 5 mm-40 mm;
the interfacing structure comprises a pair of sphenoid portions each configured to engage the user's head proximate the sphenoid bone in use, and in each sphenoid portion the face engaging flange extends posteriorly from the first end and curls medially into the face engaging region and then curls anteriorly and then laterally away from the user's face into the cushion attachment portion;
the interfacing structure comprises a pair of cheek portions each configured to engage a respective one of the user's cheeks in use, and in each cheek portion the face engaging flange extends at least partially inferiorly from the first end and curls posteriorly and superiorly into the face engaging region and then curls anteriorly away from the user's face into the cushion attachment portion; and/or
the interfacing structure comprises a nasal portion located proximate the user's nose in use, the interfacing structure further comprising a pair of closed loop portions each located on a respective side of the nasal portion, wherein in each closed loop portion the second end of the face engaging flange connects back to the first end of the face engaging flange to form in cross section a closed loop.

3.6 Spacing Between Cushion and Flange

Another aspect of the present technology relates to a head-mounted display system, comprising:
a head-mounted display unit comprising a display; and
a positioning and stabilising structure structured and arranged to hold the head-mounted display unit in an operable position on the user's head in use,
the head-mounted display unit comprising a display unit housing and an interfacing structure connected to the display unit housing, the interfacing structure constructed and arranged to be in opposing relation with the user's face, the interfacing structure comprising:
a face engaging flange provided around a periphery of an eye region of the user's face and configured to engage the user's face in use, the face engaging flange being flexible and resilient and having a cross sectional shape comprising a first end connected to the display unit housing, a second end and a face engaging region at which the face engaging flange contacts the user's face in use, the face engaging region located between the first end and the second end, and wherein the face engaging flange curls between the first end and the second end to form an at least partially enclosed cross-sectional area;
a cushion within the at least partially enclosed cross sectional area;
wherein the face engaging flange and the cushion are constructed and arranged to leave a spacing between the face engaging flange and the cushion at or proximate an end of the face engaging region located inside of the periphery of the user's eye region in use, at least in an at-rest state prior to donning of head-mounted display system by the user.

In examples:
the cushion is formed from foam;
the spacing between the face engaging flange and the cushion is located adjacent a thinnest portion of the face engaging flange;
the cushion is attached to the face engaging flange;
the cross-sectional shape of the face engaging flange comprises a cushion attachment portion located at or proximate the second end of the face engaging flange, and the cushion is attached to the face engaging flange at the cushion attachment portion;
the cushion is glued to the face engaging flange at the cushion attachment portion;
the face engaging flange comprises a lesser thickness in the face engaging region than in the cushion attachment portion;
the face engaging flange reduces in thickness from the first end towards the cushion attachment portion;

the thickness of the face engaging flange at the first end is within the range of 0.2-4 mm, 1-3 mm, 1.5-2.5 mm or 1.8-2.2 mm;

the face engaging flange comprises a thickness in the face engaging region in the range of 0.2-2.5 mm, 0.5-2.2 mm or 0.5-1.5 mm;

the thinnest portion of the face engaging flange between the first end and the cushion attachment portion is within the range of 0.2-0.5 mm or 0.25-0.4 mm;

the thinnest portion of the face engaging flange is at the spacing between the face engaging flange and the cushion at or proximate the end of the face engaging region located inside of the periphery of the user's eye region in use;

the face engaging flange comprises a series of stepped reductions in thickness from the first end towards the cushion attachment portion;

the face engaging flange comprises two, three, four, five, six or more stepped reductions in thickness from the first end towards the cushion attachment portion;

the cushion attachment portion comprises a thickness within the range of 0.75 mm-2 mm; and/or the cushion attachment portion comprises a thickness within the range of 1 mm-1.5 mm.

In further examples:

the face engaging flange is shaped to curl towards the user's face between the first end and the face engaging region and is shaped to curl away from the user's face between the face engaging region and the second end;

the cross-sectional shape of the face engaging flange comprises a height dimension in a direction parallel to a target sealing surface on the user's face and parallel to the sagittal plane of the user's head that is within the range of 10 mm-40 mm;

the face engaging flange extends from the first end at least partially inferiorly a distance of between 10% and 80% of the height dimension measured parallel to the height dimension;

the cross-sectional shape of the face engaging flange comprises a depth dimension in a direction perpendicular to the target sealing surface and parallel to the sagittal plane of the user's head, between the first end of the face engaging flange and the face engaging region, that is within the range of 5 mm-40 mm;

the interfacing structure comprises a pair of sphenoid portions each configured to engage the user's head proximate the sphenoid bone in use, and in each sphenoid portion the face engaging flange extends posteriorly from the first end and curls medially into the face engaging region and then curls anteriorly and then laterally away from the user's face into the cushion attachment portion;

the interfacing structure comprises a pair of cheek regions each configured to engage a respective one of the user's cheeks in use, and in each cheek region the face engaging flange extends at least partially inferiorly from the first end and curls posteriorly and superiorly into the face engaging region and then curls anteriorly away from the user's face into the cushion attachment portion; and/or the interfacing structure comprises a nasal portion located proximate the user's nose in use, the interfacing structure further comprising a pair of closed loop portions each located within a respective one of the cheek regions and located adjacent the nasal portion, wherein in each closed loop portion the second end of the face engaging flange connects back to the first end of the face engaging flange to form in cross section a closed loop.

3.7 Face Engaging Flange Overlaps with Cushion Support Flange

Another aspect of the present technology relates to a head-mounted display system, comprising:

a head-mounted display unit comprising a display; and a positioning and stabilising structure structured and arranged to hold the head-mounted display unit in an operable position on the user's head in use, the head-mounted display unit comprising a display unit housing and an interfacing structure connected to the display unit housing, the interfacing structure constructed and arranged to be in opposing relation with the user's face, the interfacing structure comprising:

a face engaging flange provided around a periphery of an eye region of the user's face and configured to engage the user's face in use, the face engaging flange being flexible and resilient and having a cross-sectional shape comprising a first end connected to the display unit housing, a second end and a face engaging region at which the face engaging flange contacts the user's face in use, the face engaging region located between the first end and the second end, and wherein the face engaging flange curls between the first end and the second end to form an at least partially enclosed cross-sectional area;

a cushion within the at least partially enclosed cross-sectional area;

a cushion support flange extending from the face engaging flange inwardly with respect to the cross-sectional area and configured to contact the cushion;

wherein the face engaging flange and the cushion support flange overlap to cover the cushion.

In examples:

the cushion is formed from foam;

the cushion is attached to the cushion support flange;

the cushion is glued to the cushion support flange;

the cushion is attached to the face engaging flange;

the cross-sectional shape of the face engaging flange comprises a cushion attachment portion located at or proximate the second end of the face engaging flange, and the cushion is attached to the face engaging flange at the cushion attachment portion;

the cushion is glued to the face engaging flange at the cushion attachment portion;

the cushion support flange and face engaging flange are connected by an adhesive;

the face engaging flange and the cushion support flange overlap to hide the cushion from view;

the face engaging flange and the cushion support flange overlap to prevent the user from touching the cushion;

the face engaging flange is shaped to curl towards the user's face between the first end and the face engaging region and is shaped to curl away from the user's face between the face engaging region and the second end;

the cushion support flange has a fixed end attached to the face engaging flange and a free end opposite the fixed end along a length of the cushion support flange in cross section;

the second end of the face engaging flange is spaced from the free end of the cushion support flange;

the cushion support flange is aligned parallel to a portion of the face engaging flange proximate the second end of the face engaging flange, in cross section;

the cushion support flange and the face engaging flange overlap such that in a direction parallel to the length of the cushion support flange in cross section, the second end of the face engaging flange is located between the fixed end and the free end of the cushion support flange;

the second end of the face engaging flange is spaced from the free end of the cushion support flange by more than 0.5 mm in the direction parallel to the length of the cushion support flange;

the second end of the face engaging flange is spaced from the free end of the cushion support flange by more than 1 mm in the direction parallel to the length of the cushion support flange, or by 2 mm or more;

the second end of the face engaging flange is spaced from the cushion support flange by less than 6 mm in a direction perpendicular to the length of the cushion support flange;

the second end of the face engaging flange is spaced from the cushion support flange by less than 5 mm in the direction perpendicular to the length of the cushion support flange, or by less than 4 mm, or by 3 mm or less;

the cushion support flange is configured to bias the cushion against the face engaging flange;

the cushion support flange has a first configuration prior to assembly of the cushion with the face engaging flange, and the cushion support flange is deformed by the cushion into a second configuration during assembly of the cushion with the face engaging flange;

in the first configuration the free end of the cushion support flange is closer to the face engaging region than it is in the second configuration;

in the first configuration, the free end of the cushion support flange is spaced further from the second end of the face engaging flange than in the second configuration;

in the first configuration the cushion support flange is, in cross section, oriented at an angle to a portion of the face engaging flange proximate the second end of the face engaging flange and, in the second configuration, is oriented parallel to said portion of the face engaging flange;

the cushion support flange is moulded in the first configuration;

the cushion support flange is oriented at an oblique angle to a target sealing surface of the user's face at one or more locations; and/or the cushion support flange is aligned parallel to a target sealing surface of the user's face at one or more locations.

3.8 Face Contacting Flange Curls Over Cushion

Another aspect of the present technology relates to a head-mounted display system, comprising:

a head-mounted display unit comprising a display; and a positioning and stabilising structure structured and arranged to hold the head-mounted display unit in an operable position on the user's head in use, the head-mounted display unit comprising a display unit housing and an interfacing structure connected to the display unit housing, the interfacing structure constructed and arranged to be in opposing relation with the user's face, the interfacing structure comprising:

a face engaging flange provided around a periphery of an eye region of the user's face and configured to engage the user's face in use, the face engaging flange being flexible and resilient and having a cross-sectional shape comprising a first end connected to the display unit housing, a second end and a face engaging region at which the face engaging flange contacts the user's face in use, the face engaging region located between the first end and the second end, and wherein the face engaging flange curls between the first end and the second end to form an at least partially enclosed cross-sectional area;

a cushion within the at least partially enclosed cross-sectional area; and wherein between the face engaging region and the second end, the face engaging flange curls over a portion of the cushion.

In examples:

the cushion is formed from foam;

the cushion is attached to the face engaging flange;

the face engaging flange reduces in thickness from the first end towards the second end;

the thickness of the face engaging flange at the first end is within the range of 0.2-4 mm, 1-3 mm, 1.5-2.5 mm or 1.8-2.2 mm;

the face engaging flange comprises a thickness in the face engaging region in the range of 0.2-2.5 mm, 0.5-2.2 mm or 0.5-1.5 mm;

the thinnest portion of the face engaging flange between the first end and the second end is within the range of 0.2-0.5 mm or 0.25-0.4 mm;

the thinnest portion of the face engaging flange is at the location between the face engaging region and the second end at which the face engaging flange curls over a portion of the cushion;

the face engaging flange comprises a series of stepped reductions in thickness from the first end towards the second end;

the face engaging flange comprises two, three, four, five, six or more stepped reductions in thickness from the first end towards the second end;

the face engaging flange and the cushion are constructed and arranged to leave a spacing between the face engaging flange and the cushion at or proximate an end of the face engaging region located inside of the periphery of the user's eye region in use, at least in an at-rest state prior to donning of head-mounted display system by the user;

the face engaging flange is shaped to curl towards the user's face between the first end and the face engaging region and is shaped to curl away from the user's face between the face engaging region and the second end;

the cross-sectional shape of the face engaging flange comprises a height dimension in a direction parallel to a target sealing surface on the user's face and parallel to the sagittal plane of the user's head that is within the range of 10 mm-40 mm;

the face engaging flange extends from the first end at least partially inferiorly a distance of between 10% and 80% of the height dimension measured parallel to the height dimension;

the cross-sectional shape of the face engaging flange comprises a depth dimension in a direction perpendicular to the target sealing surface and parallel to the sagittal plane of the user's head, between the first end of the face engaging flange and the face engaging region, that is within the range of 5 mm-40 mm;

the interfacing structure comprises a pair of sphenoid portions each configured to engage the user's head proximate the sphenoid bone in use, and in each sphenoid portion the face engaging flange extends posteriorly from the first end and curls medially into the face engaging region and then curls anteriorly and then at least partially laterally;

the interfacing structure comprises a pair of cheek portions each configured to engage a respective one of the user's cheeks in use, and in each cheek portion the face engaging flange extends at least partially inferiorly from the first end and curls posteriorly and superiorly into the face engaging region and then curls anteriorly and at least partially inferiorly; and/or the interfacing structure comprises a forehead portion configured to engage the user's forehead in use, and in the forehead portion the face engaging flange extends superiorly from the first end and curls posteriorly and inferiorly into the face engaging region and then curls anteriorly and partially superiorly.

3.9 Cushion Support Flange Resists Compression of Interfacing Structure

Another aspect of the present technology relates to a head-mounted display system, comprising:

a head-mounted display unit comprising a display; and a positioning and stabilising structure structured and arranged to hold the head-mounted display unit in an operable position on the user's head in use, the head-mounted display unit comprising a display unit housing and an interfacing structure connected to the display unit housing, the interfacing structure constructed and arranged to be in opposing relation with the user's face, the interfacing structure comprising:

a face engaging flange provided around a periphery of an eye region of the user's face and configured to engage the user's face in use, the face engaging flange being flexible and resilient and having a cross-sectional shape comprising a first end connected to the display unit housing, a second end and a face engaging region at which the face engaging flange contacts the user's face in use, the face engaging region located between the first end and the second end, and wherein the face engaging flange curls between the first end and the second end to form an at least partially enclosed cross-sectional area;

a cushion within the at least partially enclosed cross-sectional area;

a cushion support flange extending from the face engaging flange inwardly with respect to the cross-sectional area and configured to contact the cushion; and wherein the cushion support flange is structured to resist compression of the interfacing structure in use.

In examples:

the cushion is formed from foam;
the cushion is attached to the cushion support flange;
the cushion is glued to the cushion support flange;
the cushion is attached to the face engaging flange;
the cross-sectional shape of the face engaging flange comprises a cushion attachment portion located at or proximate the second end of the face engaging flange, and the cushion is attached to the face engaging flange at the cushion attachment portion;

the cushion is glued to the face engaging flange at the cushion attachment portion;

the cushion support flange and face engaging flange are connected by an adhesive;

the face engaging flange and the cushion support flange overlap to hide the cushion from view;

the face engaging flange and the cushion support flange overlap to prevent the user from touching the cushion;

the face engaging flange is shaped to curl towards the user's face between the first end and the face engaging region and is shaped to curl away from the user's face between the face engaging region and the second end;

the cushion support flange has a fixed end attached to the face engaging flange and a free end opposite the fixed end along a length of the cushion support flange in cross section;

the second end of the face engaging flange is spaced from the free end of the cushion support flange;

the cushion support flange is aligned parallel to a portion of the face engaging flange proximate the second end of the face engaging flange, in cross section;

the cushion support flange and the face engaging flange overlap such that in a direction parallel to the length of the cushion support flange in cross section, the second end of the face engaging flange is located between the fixed end and the free end of the cushion support flange;

the second end of the face engaging flange is spaced from the free end of the cushion support flange by more than 0.5 mm in the direction parallel to the length of the cushion support flange;

the second end of the face engaging flange is spaced from the free end of the cushion support flange by more than 1 mm in the direction parallel to the length of the cushion support flange, or by 2 mm or more;

the second end of the face engaging flange is spaced from the cushion support flange by less than 6 mm in a direction perpendicular to the length of the cushion support flange;

the second end of the face engaging flange is spaced from the cushion support flange by less than 5 mm in the direction perpendicular to the length of the cushion support flange, or by less than 4 mm, or by 3 mm or less;

the cushion support flange is configured to bias the cushion against the face engaging flange;

the cushion support flange has a first configuration prior to assembly of the cushion with the face engaging flange, and the cushion support flange is deformed by the cushion into a second configuration during assembly of the cushion with the face engaging flange;

in the first configuration the free end of the cushion support flange is closer to the face engaging region than it is in the second configuration;

in the first configuration, the free end of the cushion support flange is spaced further from the second end of the face engaging flange than in the second configuration;

in the first configuration the cushion support flange is, in cross section, oriented at an angle to a portion of the face engaging flange proximate the second end of the face engaging flange and, in the second configuration, is oriented parallel to said portion of the face engaging flange;

the cushion support flange is moulded in the first configuration;

the cushion support flange is oriented at an oblique angle to a target sealing surface of the user's face at one or more locations around the periphery of the user's eye region; and/or the cushion support flange is aligned parallel to a target sealing surface of the user's face at one or more locations around the periphery of the user's eye region.

3.10 Second End of Face Engaging Flange Fixed Proximate First End

Another aspect of the present technology relates to a head-mounted display system, comprising:

a head-mounted display unit comprising a display; and a positioning and stabilising structure structured and arranged to hold the head-mounted display unit in an operable position on the user's head in use, the head-mounted display unit comprising a display unit housing and an interfacing structure connected to the display unit housing, the interfacing structure constructed and arranged to be in opposing relation with the user's face, the interfacing structure comprising:

a face engaging flange provided around a periphery of an eye region of the user's face and configured to engage the user's face in use, the face engaging flange being flexible and resilient and having a cross-sectional shape comprising a first end connected to the display unit housing, a second end and a face engaging region at which the face engaging flange contacts the user's face in use, the face engaging region located between the first end and the second end, and wherein the face engaging flange curls between the first end and the second end and the second end is fixed in place proximate the first end to form an enclosed cross-sectional area; and a cushion within the enclosed cross-sectional area; and wherein during assembly, the cushion is inserted between the first end and the second end into the enclosed cross-sectional area, after which the second end is fixed in place proximate the first end.

In examples:

the interfacing structure comprises a chassis portion configured to attach to the display unit housing, and a face engaging portion connected to the chassis portion and comprising the face engaging flange;

the face engaging flange and the chassis portion are integrally formed;

the second end of the face engaging flange is attached to the chassis portion;

the second end of the face engaging flange is glued to the chassis portion;

the interfacing structure comprises an interfacing structure clip configured to attach the chassis portion to the display unit housing;

the second end of the face engaging flange is attached to the interfacing structure clip;

the second end of the face engaging flange is glued to the interfacing structure clip;

the interfacing structure comprises a first surface and the face engaging flange comprises a second surface proximate the second end, the second surface shaped and sized to correspond to the first surface, the second surface and first surface being adhered together in an assembled state;

the face engaging flange is formed in an unassembled state in which the second surface is unattached to the first surface;

the face engaging flange may be moulded in the unassembled state;

during assembly, the first surface and second surface are adhered together;

the face engaging flange is not adhered to the cushion;

the cushion is formed from foam; and/or the face engaging flange is formed from an elastomer.

3.11 Cushion Attached to Interfacing Structure Clip

Another aspect of the present technology relates to a head-mounted display system, comprising:

a head-mounted display unit comprising a display; and a positioning and stabilising structure structured and arranged to hold the head-mounted display unit in an operable position on the user's head in use, the head-mounted display unit comprising a display unit housing and an interfacing structure connected to the display unit housing, the interfacing structure constructed and arranged to be in opposing relation with the user's face, the interfacing structure comprising:

an interfacing structure clip configured to attach the interfacing structure to the display unit housing;

a face engaging flange provided around a periphery of an eye region of the user's face and configured to engage the user's face in use, the face engaging flange being flexible and resilient and having a cross sectional shape comprising a first end attached to the interfacing structure clip, a second end and a face engaging region at which the face engaging flange contacts the user's face in use, the face engaging region located between the first end and the second end; and a cushion positioned against or proximate the face engaging region of the face engaging flange in use, the cushion attached to the interfacing structure clip.

In examples:

the cushion comprises a compressible cushion body and a cushion clip configured to attach to the interfacing structure clip;

the cushion body is overmoulded to the cushion clip;

the cushion clip holds the cushion body in a predetermined shape;

the interfacing structure clip is removably attachable to the display unit housing;

the interfacing structure clip is configured to form a snap fit connection with the display unit housing;

the cushion clip is removably attachable to the interfacing structure clip;

the cushion clip is configured to form a snap fit connection with the interfacing structure clip;

the face engaging flange is overmoulded to the interfacing structure clip;

the interfacing structure clip is stiffer than the face engaging flange;

the face engaging flange curls between the first end and the second end around the cushion body;

the second end of the face engaging flange is located on an opposite side of the cushion to the face engaging region;

the face engaging flange is formed from an elastomer; and/or the cushion is formed at least partially from foam.

3.12 Medially-Facing Wall of Medial Support Portion Thinner than Face Engaging Region of Cheek Portion Another aspect of the present technology relates to a head-mounted display system, comprising:

a head-mounted display unit comprising a display, the head-mounted display unit comprising an interfacing structure constructed and arranged to be in opposing relation to the user's face in use; and a positioning and stabilising structure structured and arranged to hold the head-mounted display unit in an operable position on the user's head in use, wherein the interfacing structure comprises a face engaging portion configured to engage the user's face in use, the face engaging portion being flexible and resilient and comprising:

a pair of cheek portions configured to engage the user's cheeks in use, each cheek portion comprising a face engaging region configured to contact a respective one of the user's cheeks in use, and a pair of medially-facing walls located alongside the user's nose in use, each medially-facing wall located medially of a respective one of the cheek portions, the medially-facing walls being thinner than the face engaging regions of the cheek portions.

In examples:

the interfacing structure curves anteriorly from each cheek portion to form the pair of medially-facing walls;

each medially-facing wall is integrally formed with the cheek portions;

the pair of medially-facing walls are flexible to allow the user's nose to displace the medially-facing walls laterally when the user dons the head-mounted display system;

the pair of medially-facing walls at least partially form medial support portions configured to resist deformation of the cheek portions;

the medial support portions resist deformation of the cheek portions by resistance to elongation in the medially-facing wall in use;

the interfacing structure comprises one or more cushions;

the one or more cushions are located at least in the cheek portions;

the one or more cushions are formed from foam; and/or the interfacing structure comprises a medial anchor portion intersecting the sagittal plane of the user's head in use and connecting the pair of medially-facing walls, the medial anchor portion being stiffer than the medially-facing walls.

3.13 Automatic Sizing

One form of the present technology comprises automatic sizing of a Augmented Reality (AR)/Virtual Reality (VR)/Mixed Reality (MR) facial interface (also referred to as "facial interface" hereinafter) without the assistance of a trained individual or others.

Another aspect of one form of the present technology is the automatic measurement of a subject's (e.g. a user's) facial features based on data collected from the user.

Another aspect of one form of the present technology is the automatic recommendation of a facial interface size based on a comparison between data collected from a user to a corresponding data record.

Another aspect of one form of the present technology is the automatic recommendation of a customized facial interface size based on a data collected from a user. The customized facial interface may be unique to a given user based on his/her facial geometry.

Another aspect of one form of the present technology is a mobile application that conveniently determines an appropriate facial interface size for a particular user based on a two-dimensional image.

Another aspect of one form of the present technology is a mobile application that conveniently determines an appropriate facial interface size for a particular user based on a three-dimensional image.

Some versions of the present technology include automated method(s) for selecting a facial interface according to facial interface size. The method(s) may operate in one or more processors. The method may include receiving image data captured by an image sensor. The captured image data may contain one or more facial features of an intended user of the facial interface in association with a predetermined reference feature having a known dimension. The method may include detecting one or more facial features of the user in the captured image data. The method may include detecting the predetermined reference feature in the captured image data. The method may include processing image pixel data of the image to measure an aspect of the one or more facial features detected in the image based on the predetermined reference feature. The method may include selecting a facial interface size from a group of standard facial interface sizes based on a comparison between the measured aspect of the one or more facial features and a data record relating sizing information of the group of standard facial interface sizes and the measured aspect of the one or more facial features.

In some versions, the aspect of the one or more facial features may include a distance between a sellion and supramenton of the user. The method may include calculating a value of the measured aspect based on a scaling factor derived from the reference feature. The method may include adjusting a value of the measured aspect with an anthropometric correction factor. The anthropometric correction factor may be calculated based on facial interface return data. The method may include calculating the scaling factor as a function of the known dimension of the predetermined reference feature and a detected pixel count for the detected reference feature. The predetermined reference feature may be a coin. The detecting the reference feature may include applying a cascade classifier to the captured image data. The method may include calculating a value of the measured aspect based on a scaling factor derived from the coin. The method may include calculating the scaling factor as a function of the known dimension of the coin in the captured image data and a detected pixel count for the coin that is detected. The detected pixel count for the coin that is detected may be a width of an ellipse fitted to the coin. The predetermined reference feature may be a cornea or iris of the user.

In some versions, the method may include, for image capture, displaying the reference feature on a display interface of a display device coupled with the image sensor. The display interface may include a targeting guide and a live action preview of content detected by the image sensor. The content may include the reference feature as displayed on the display interface. The method may include controlling capturing of the image data to satisfy at least one alignment condition. The at least one alignment condition may include detection of positioning of the reference feature of the live action preview within a box of the targeting guide. The at least one alignment condition may include detection of a tilt condition being within about +/−10 degrees of a superior-inferior extending axis. The at least one alignment condition may include detection of a tilt condition being within about +/−5 degrees of a superior-inferior extending axis. Detection of a tilt condition may be performed by reading an inertial measurement unit (IMU).

In some versions, the predetermined reference feature may be a QR code. Optionally, the processing image pixel data may include counting pixels. The method may include generating an automated electronic offer for purchase and/or automated shipment instructions for a facial interface based on the selected facial interface size. The method may include calculating an average of the measured aspect of the facial feature from a plurality of captured images of the one or more facial features. Optionally, the method may include automatic recommendation of a customized facial interface size based on a data collected from a user and the customized facial interface may be unique to a given user based on his/her facial geometry.

Some versions of the present technology include a system(s) for automatically recommending a facial interface size complementary to a particular user's facial features. The system(s) may include one or more servers. The one or more servers may be configured to communicate with a computing device over a network. The one or more servers may be configured to receive image data captured by an image sensor, where the captured image data may contain one or more facial features of an intended user of the facial interface in association with a predetermined reference feature having a known dimension. The one or more servers may be configured to detect one or more facial features of the user in the captured image data. The one or more servers may be configured to detect the predetermined reference feature in the captured image data. The one or more servers may be configured to process image pixel data of the image to measure an aspect of the one or more facial features detected in the image based on the predetermined reference feature. The one or more servers may be configured to select a facial interface size from a group of standard facial interface sizes based on a comparison between the measured aspect of the one or more facial features and a data record relating sizing information of the group of standard facial interface sizes and the measured aspect of the one or more facial features.

In some versions, the aspect of the one or more facial features may include a distance between a sellion and supramenton of the user. The one or more servers may be configured to calculate a value of the measured aspect based on a scaling factor derived from the reference feature. The one or more servers may be configured to adjust a value of the measured aspect with an anthropometric correction factor. The anthropometric correction factor may be calculated based on facial interface return data. The one or more servers may be configured to calculate the scaling factor as a function of the known dimension of the predetermined reference feature and a detected pixel count for the detected reference feature. The predetermined reference feature may include a coin. The one or more servers may be configured to detect the reference feature by applying a cascade classifier to the captured image data. The one or more servers may be further configured to calculate a value of the measured aspect based on a scaling factor derived from the coin. The one or more servers may be configured to calculate the scaling factor as a function of the known dimension of the coin in the captured image data and a detected pixel count for the coin that is detected. The detected pixel count for the coin that is detected may be a width of an ellipse fitted to the coin. The predetermined reference feature may be a cornea of the user.

In some versions, the system may include the computing device. The computing devices may be configured to, for image capture, generate a display of the reference feature on a display interface of a display device that may be coupled with the image sensor. The display interface may include a targeting guide and a live action preview of content detected by the image sensor. The content may include the reference feature as displayed on the display interface. The computing device may be further configured to control capturing of the image data to satisfy at least one alignment condition. The at least one alignment condition may include detection of positioning of the reference feature of the live action preview within a box of the targeting guide. The at least one alignment condition may include detection of a tilt condition being within about +/−10 degrees of a superior-inferior extending axis. The at least one alignment condition may include detection of a tilt condition being within about +/−5 degrees of a superior-inferior extending axis. The detection of a tilt condition may be performed by reading an inertial measurement unit (IMU).

In some versions, the predetermined reference feature may include a QR code. In some cases, to process image pixel data, the one or more servers may be configured to count pixels. The one or more servers may be configured to generate an automated electronic offer for purchase and/or automated shipment instructions for a facial interface based on the selected facial interface size. The one or more servers may be configured to calculate an average of the measured aspect of the facial feature from a plurality of captured images of the facial features. The one or more servers may be configured to communicate the selected facial interface size to the computing device over the network. Optionally, the server may be configured to automatically recommend a customized facial interface size based on a data collected from a user and the customized facial interface may be unique to a given user based on his/her facial geometry.

Some versions of the present technology include a system(s) for automatically recommending a facial interface size complementary to a particular user's facial features. The system(s) may include a mobile computing device. The mobile computing device may be configured to communicate with one or more servers over a network. The mobile computing device may be configured to receive captured image data of an image. The captured image data may contain one or more facial features of a user in association with a predetermined reference feature having a known dimension. The image data may be captured with an image sensor. The mobile computing device may be configured to detect one or more facial features of the user in the captured image data. The mobile computing device may be configured to detect the predetermined reference feature in the captured image data. The mobile computing device may be configured to process image pixel data of the image to measure an aspect of the one or more facial features detected in the image based on the predetermined reference feature. The mobile computing device may be configured to select a facial interface size from a group of standard facial interface sizes based on a comparison between the measured aspect of the one or more facial features and a data record relating sizing information of the group of standard facial interface sizes and the measured aspect of the one or more facial features.

In some versions, the aspect of the one or more facial features may include a distance between a sellion and supramenton of the user. The mobile computing device may be configured to calculate a value of the measured aspect based on a scaling factor derived from the reference feature. The mobile computing device may be further configured to adjust a value of the measured aspect with an anthropometric correction factor. The anthropometric correction factor may be calculated based on facial interface return data. The mobile computing device may be configured to calculate the scaling factor as a function of the known dimension of the predetermined reference feature and a detected pixel count for the detected reference feature. The predetermined reference feature may be a coin. The mobile computing device may be configured to detect the reference feature by applying a cascade classifier to the captured image data. The mobile computing device may be configured to calculate a value of the measured aspect based on a scaling factor derived from the coin. The mobile computing device may be configured to calculate the scaling factor as a function of the known dimension of the coin in the captured image data and a detected pixel count for the coin that is detected. The detected pixel count for the coin that is detected may be a width of an ellipse fitted to the coin. In some versions, the predetermined reference feature may be a cornea or iris of the user.

The mobile computing device may be configured to, for the image capture, generate a display of the reference feature on a display interface of a display device that may be coupled with the image sensor. The display interface may include a targeting guide and a live action preview of content detected by the image sensor. The content may include the reference feature as displayed on the display interface. The mobile computing device may be configured to control capturing of the image data to satisfy at least one alignment condition. The at least one alignment condition may include detection of positioning of the reference feature of the live action preview within a box of the targeting guide. The at least one alignment condition may include detection of a tilt condition being within about +/−10 degrees of a superior-inferior extending axis. The at least one alignment condition may include detection of a tilt condition being within about +/−5 degrees of a superior-inferior extending axis. Detection of a tilt condition may be performed by reading an inertial measurement unit (IMU).

In some versions, the predetermined reference feature may be a QR code. In some cases, to process image pixel data, the mobile computing device may be configured to count pixels. The mobile computing device may be configured to request an automated electronic offer for purchase and/or automated shipment instructions for an interface based on the selected facial interface size. The mobile computing device may be configured to calculate an average of the measured aspect of the facial feature from a plurality of captured images of the facial features. The mobile computing device may be configured to communicate the selected facial interface size to a server over the network. Optionally, the mobile phone may be configured to automatic recommend a customized facial interface size based on a data collected from a user, where the customized facial interface may be unique to a given user based on his/her facial geometry.

Some versions of the present technology include apparatus for automatically recommending a facial interface size complementary to a particular user's facial features. The apparatus may include means for receiving image data captured by an image sensor. The captured image data may contain one or more facial features of an intended user of the facial interface in association with a predetermined reference feature having a known dimension. The apparatus may include means for detecting one or more facial features of the user in the captured image data. The apparatus may include means for detecting the predetermined reference feature in the captured image data. The apparatus may include means for processing image pixel data of the image to measure an aspect of the one or more facial features detected in the image based on the predetermined reference feature. The apparatus may include means for selecting a facial interface size from a group of standard facial interface sizes based on a comparison between the measured aspect of the one or more facial features and a data record relating sizing information of the group of standard facial interface sizes and the measured aspect of the one or more facial features.

Another form of the present technology comprises a head mounted display system for a person comprising:
  a head-mounted display unit comprising a display;
  a control system for operation of the head-mounted display system; and
  a positioning and stabilizing structure configured to configured to hold the head-mounted display unit anterior to a user's eyes such that the display is viewable by the user in use.

The head-mounted display system may be helmet mounted, may be configured for virtual reality display, may be configured for augmented reality display, may be configured for mixed reality display.

Another form of the present technology comprises a head-mounted display system for a person comprising:
  a head-mounted display unit comprising a display;
  a control system for operation of the head-mounted display system; and
  a positioning and stabilizing structure comprising an anterior support portion and a posterior support portion, wherein:
    the posterior portion is configured to engage in use a posterior region of the person's head;
    the anterior support portion comprises:
      a left lateral portion configured to interconnect the posterior support portion and the head-mounted display system; and
      a right lateral portion configured to interconnect the posterior portion and the head-mounted display system.

In some examples: a) the head mounted display apparatus further comprises a light shield; b) the light shield is constructed and arranged to substantially obstruct in use the receipt of ambient light upon an eye region of the person; c) the light shield is configured for use in virtual reality display; d) the head-mounted display system comprises an interfacing structure constructed and arranged to contact in use an eye region of the person's face; e) the interfacing structure is constructed from foam, silicone, and/or gel; f) the interfacing structure is constructed from a light absorbing material; and/or g) the interfacing structure is configured to function as a light shield.

In some examples: a) the head mounted display apparatus further comprises a sound system; b) a left ear transducer; and/or c) a right ear transducer.

In some examples: a) the head-mounted display unit comprises a binocular display unit; and/or b) the positioning and stabilizing structure is configured to maintain the binocular display unit in an operation position in use.

In some examples: a) the control system comprises a visual display controller and at least one battery; b) the at least one battery includes a first battery and a second battery; c) the first battery is a lower power system battery configured to power an RT clock; d) the second battery is a main battery; e) a battery support configured to retain the battery; f) the battery support is connected to the positioning and stabilizing structure using a tether; g) an orientation sensor configured to sense the orientation of the person's head in use; and/or h) a control support system.

In some examples: a) the positioning and stabilising structure comprises a forehead support configured to contact a region overlying a frontal bone of the person's head; and/or (b) the positioning and stabilising structure comprises a length adjustment mechanism for adjusting a length of a portion of the positioning and stabilising structure.

Another form of the present technology comprises a head mounted display apparatus for a person comprising: a display unit; a light shield; a control system comprising a visual display controller, at least one battery, a battery support, an orientation sensor, and a control support system; a sound system; and a positioning and stabilizing structure comprising an anterior portion, a frontal portion, a left lateral portion, a right lateral portion, a posterior portion, and a length adjustment mechanism, wherein: the anterior portion comprises an eye cushion constructed and arranged to contact in use an eye region of the user; the posterior portion is configured to engage in use a region of the person's head adjacent to a junction between the occipital bone and the trapezius muscle; the left lateral portion is configured to interconnect the anterior portion and the posterior portion; the right lateral portion is configured to interconnect the anterior portion and the posterior portion; the frontal portion configured to interconnect the anterior portion and the posterior portion; and the length adjustment mechanism adjustable to a first position and to a second position; wherein: the display unit comprises a binocular display unit; the light shield is constructed and arranged to substantially obstruct in use the receipt of ambient light upon an eye region of the person; the orientation sensor configured to sense the orientation of the person's head in use the sound system comprises a left ear transducer and a right ear transducer; and the positioning and stabilizing structure is configured to maintain the binocular display unit in an operational position in use. The head-mounted display apparatus may comprise a positioning and stabilising structure and/or an interfacing structure substantially as described in any example disclosed herein.

Another form of the present technology comprises a head mounted display interface comprising:
an electronic display screen configured to output multiple images to a user;
a display housing configured to at least partially house the electronic display screen; and
a positioning and stabilizing structure coupled to the display housing and supporting the display housing and the electronic display screen in an operating position, the positioning and stabilizing structure being configured to provide a force against a user's head in order to counteract a moment produced by a combined weight of the electronic display screen and the display housing, and maintain a position of the electronic display screen anterior to the user's eyes while in the operating position;
wherein the positioning and stabilising structure is substantially as described in any example disclosed herein.

Another form of the present technology comprises a positioning and stabilizing structure for supporting an electronic display screen of a head-mounted display interface, the positioning and stabilizing structure being configured to provide a force against a user's head in order to counteract a moment produced by a weight of the electronic display screen, and maintain a position of the electronic display screen anterior to the user's eyes while in use, the positioning and stabilizing structure comprising:
a rear strap configured to contact a region of the user's head posterior to the coronal plane of the user's head, the rear strap configured to anchor the head-mounted display interface to the user's head.

Another form of the present technology comprises a positioning and stabilizing structure for supporting an electronic display unit, the positioning and stabilizing structure being configured to provide a force against a user's head in order to counteract a moment produced by a weight of the electronic display unit, and maintain a position of the electronic display unit anterior to the user's eyes while in use, the positioning and stabilizing structure comprising:
headgear configured to be coupled to a housing of the electronic display unit and engage the user's head in order to support the housing.

Another aspect of the present technology comprises a display interface comprising:
a display screen configured to output a computer generated image observable by a user;
a display housing at least partially supporting the display screen;
an interfacing structure coupled to the display screen and/or the display housing, the interfacing structure configured to be positioned and/or arranged to conform to at least a portion of the user's face;
a positioning and stabilizing structure configured to maintain a position of the display screen and/or the display housing relative to the user's eyes, the positioning and stabilizing structure configured to provide a force against a user's head in order to counteract a moment produced by a weight of the display screen and/or the display housing; and
a control system configured to assist in controlling the computer generated image observable by the user, the control system including at least one sensor.

Another aspect of the present technology comprises a virtual reality display interface comprising:
a display screen configured to output a computer generated image observable by a user;
a display housing at least partially supporting the display screen;
an interface structure coupled to the display housing, the interfacing structure configured to be positioned and/or arranged to conform to at least a portion of a user's face, the interface structure including a light shield configured to at least partially block ambient light from reaching the user's eyes;
a positioning and stabilizing structure coupled to the display housing and configured to provide a force against a user's head in order to counteract a moment produced by a weight of the display screen and/or the display housing, the positioning and stabilizing structure comprising,
a pair of temporal connectors, each temporal connector of the pair of temporal connectors being directly coupled to the display housing, each temporal connector configured to overlay a respective temporal bone when in contact the user's head, and
a rear support coupled to each of the temporal connectors, the rear support configured to contact a posterior portion of the user's head; and
a control system configured to assist in controlling the computer generated image observable by the user, the control system including at least one sensor configured to measure movement of the user.

In some forms, the light shield is configured to seal against the user's face and prevent ambient light from reaching the user's eyes.

In some forms, the display screen is completely enclosed within the display housing.

In some forms, the light shield is constructed from an opaque material.

In some forms, the interfacing structure is constructed from a resilient material.

In some forms, the positioning and stabilizing structure includes a rotational control configured to allow the display housing and/or the display interface to pivot relative to the rear support.

For example, the temporal arms may rotate with the display housing and/or the display interface. In other examples, the rotational control may couple the display housing to each of the temporal connectors, so that the display housing and/or the display interface pivots relative to the temporal connectors.

In some forms, the temporal connectors may include an adjustable length.

Another aspect of the present technology comprises an augmented reality display interface comprising:
a display screen configured to output a computer generated image observable by a user, the display screen including at least one optical lens constructed from a transparent and/or translucent material configured to allow a user to observe their physical environment while observing the computer generated image;
a display housing at least partially supporting the display screen;
an interface structure coupled to the display housing and/or the display interface, the interfacing structure configured to be positioned and/or arranged to conform to at least a portion of a user's face;
a positioning and stabilizing structure coupled to the display housing and configured to provide a force against a user's head in order to counteract a moment produced by a weight of the display screen and/or the display housing, the positioning and stabilizing structure comprising,
a pair of temporal connectors, each temporal connector of the pair of temporal connectors being directly coupled to the display housing, each temporal connector configured to overlay a respective temporal bone when in contact the user's head; and
a control system configured to assist in controlling the computer generated image observable by the user, the control system including at least one sensor configured to measure movement of the user.

In some forms, the positioning and stabilizing structure further includes a rear support configured to overlay the user's occiput, each temporal connector coupled to the rear support.

In some forms, the augmented reality display interface further comprises a power source coupled to the display interface and/or to the positioning and stabilizing structure.

For example, the power source may be a rechargeable battery.

In some forms, the display screen configured to selectively output a computer generated image observable by a user.

For example, the computer generated image may be displayed on the transparent and/or translucent material. The user may be able to see observe their physical environment regardless of whether the computer generated image is displayed on the transparent and/or translucent material.

Another aspect of the present technology comprises a virtual reality display interface comprising examples of the aspects of the head-mounted display system described above.

In examples of the aspects of the head-mounted display system described above, the display unit comprises a display configured to selectively output computer generated images that are visible to the user in an operational position.

In examples of the aspects of the head-mounted display system described above, the display unit comprises a housing.

In some forms, the housing supports a display.

In examples of the aspects of the head-mounted display system described above, the display unit comprises an interfacing structure coupled to the housing and arranged to be in opposing relation with the user's face in the operational position.

In some forms, the interfacing structure at least partially forms a viewing opening configured to at least partially receive the user's face in the operational position.

In some forms, the interfacing structure being constructed at least partially from an opaque material configured to at least partially block ambient light from reaching the viewing opening in the operational position.

In examples of the aspects of the head-mounted display system described above, the display unit comprises at least one lens coupled to the housing and disposed within the viewing opening and aligned with the display so that in the operational position.

In some forms, the user can view the display through the at least one lens.

In examples of the aspects of the head-mounted display system described above, a control system having at least one sensor in communication with a processor.

In some forms, the at least one sensor configured to measure a parameter and communicate a measured value to the processor.

In some forms, the processor configured to change the computer generated images output by the display based on the measured value.

Another aspect of the present technology comprises an augmented reality display interface comprising examples of the aspects of the head-mounted display system described above.

In examples of the aspects of the head-mounted display system described above, the display unit comprises a display constructed from a transparent or translucent material and configured to selectively provide computer generated images viewable by the user.

In examples of the aspects of the head-mounted display system described above, the display unit comprises a housing.

In some forms, the housing that supports a display.

In examples of the aspects of the head-mounted display system described above, the display unit comprises an interfacing structure coupled to the housing and arranged to be in opposing relation with the user's face in the operational position.

In examples of the aspects of the head-mounted display system described above, in an operational position, the positioning and stabilizing structure configured to support the display unit.

In examples of the aspects of the head-mounted display system described above, the display configured to be aligned with the user's eyes in an operation position such that the user may at least partially view a physical environment through the display regardless of the computer generated images output by the display.

In examples of the aspects of the head-mounted display system described above, the head-mounted display system further comprising a control system having at least one sensor in communication with a processor.

In some forms, the at least one sensor configured to measure a parameter and communicate a measured value to the processor.

In some forms, the processor configured to change the computer generated images output by the display based on the measured value.

In some forms, the at least one lens includes a first lens configured to be aligned with the user's left eye in the operational position and a second lens configured to be aligned with the user's right eye in the operational position In some forms, the first lens and the second lens are Fresnel lenses.

In some forms, the display comprises a binocular display partitioned into a first second and a second section, the first section aligned with the first lens and the second section aligned with the second lens.

In some forms, a controller having at least one button selectively engageable by a user's finger, the controller being in communication with the processor and configured to send a signal to the processor when the at least one button is engaged, the processor configured to change the computer generated images output by the display based on the signal.

In some forms, the at least one lens includes a first lens configured to be aligned with the user's left eye in the operational position and a second lens configured to be aligned with the user's right eye in the operational position.

Another aspect of one form of the present technology is a positioning and stabilizing structure that is constructed with a shape which is complementary to that of an intended wearer.

Another aspect of one form of the present technology is an interfacing structure that is constructed with a shape which is complementary to that of an intended wearer.

An aspect of one form of the present technology is a method of manufacturing apparatus.

An aspect of certain forms of the present technology is a positioning and stabilizing structure that is easy to use, e.g. by a person who has limited dexterity, vision or by a person with limited experience in using a head-mounted display.

An aspect of certain forms of the present technology is an interfacing structure that is easy to use, e.g. by a person who has limited dexterity, vision or by a person with limited experience in using a head-mounted display.

The methods, systems, devices and apparatus described may be implemented so as to improve the functionality of a head-mounted display, such as an electronic display or computer. Moreover, the described methods, systems, devices and apparatus can provide improvements in the technological field of virtual reality, augmented reality, and/or mixed reality.

Of course, portions of the aspects may form sub-aspects of the present technology. Also, various ones of the sub-aspects and/or aspects may be combined in various manners and also constitute additional aspects or sub-aspects of the present technology.

Other features of the technology will be apparent from consideration of the information contained in the following detailed description, abstract, drawings and claims.

4 BRIEF DESCRIPTION OF THE DRAWINGS

The present technology is illustrated by way of example, and not by way of limitation, in the figures of the accompanying drawings, in which like reference numerals refer to similar elements including:

4.1 Head-Mounted Display Systems

4.2 Display System and Facial Anatomy

Figure 2A:
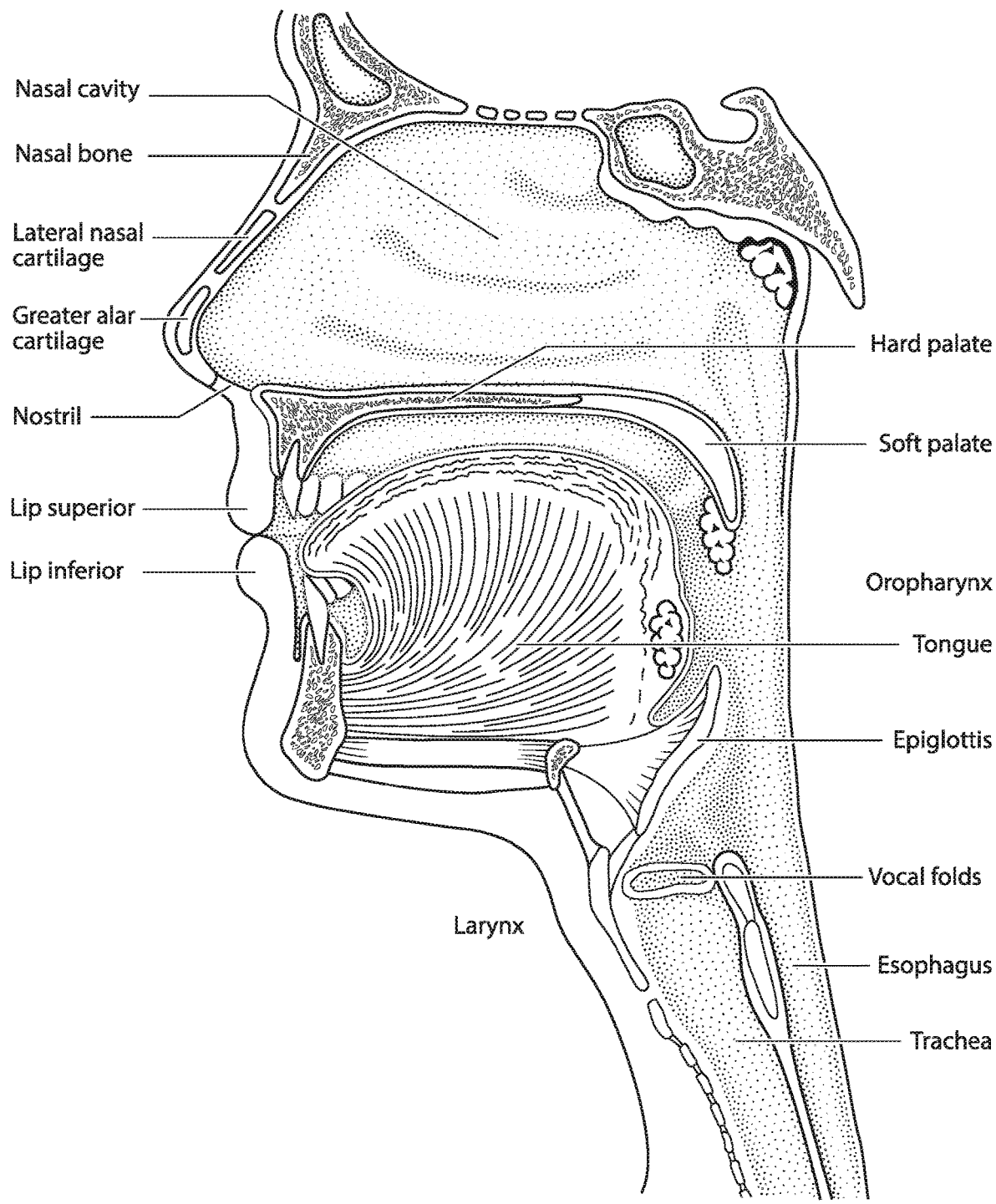

FIG. 2A shows a view of a human upper airway including the nasal cavity, nasal bone, lateral nasal cartilage, greater alar cartilage, nostril, lip superior, lip inferior, larynx, hard palate, soft palate, oropharynx, tongue, epiglottis, vocal folds, oesophagus and trachea.

Figure 2B:
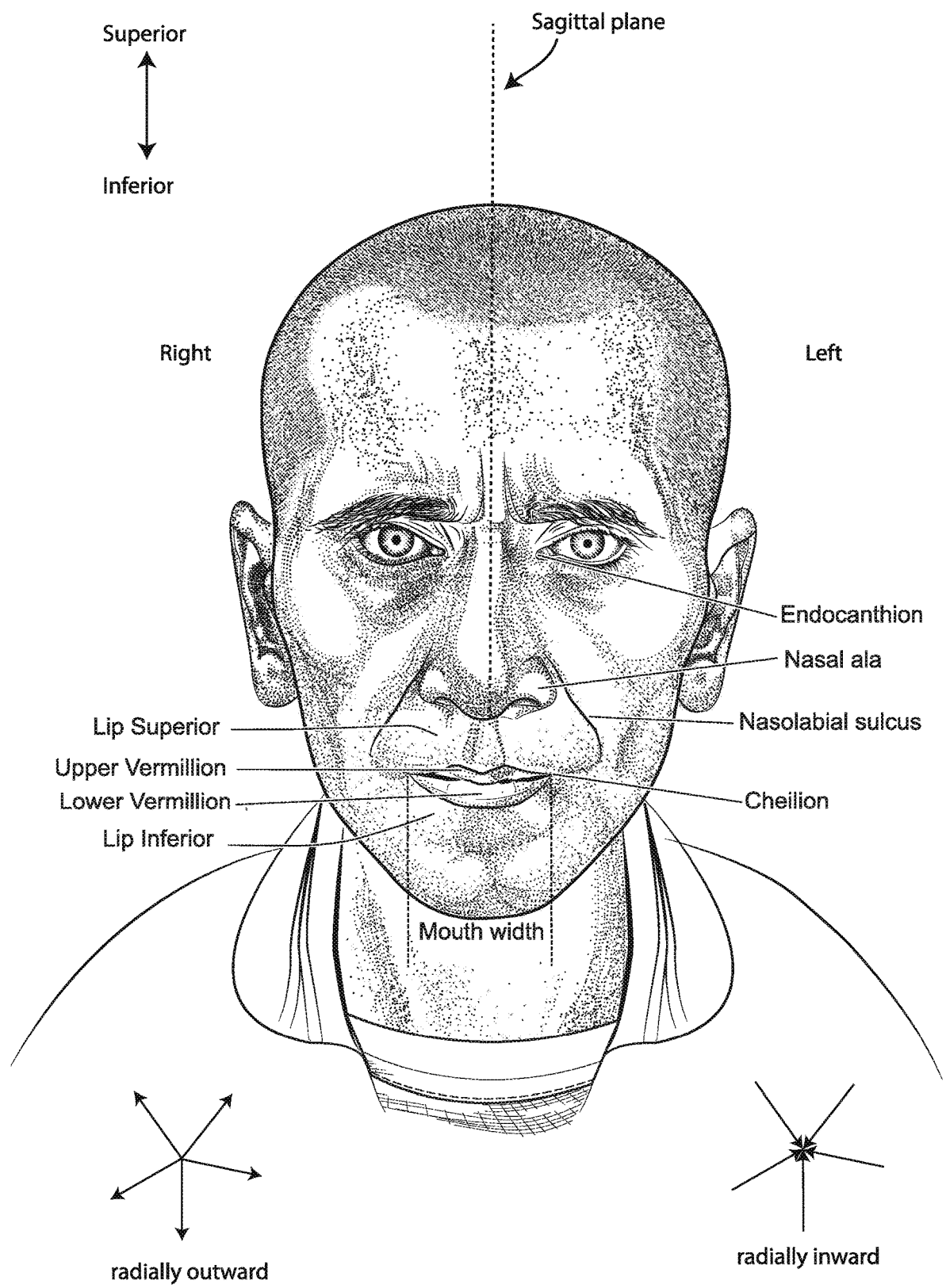

FIG. 2B is a front view of a face with several features of surface anatomy identified including the lip superior, upper vermilion, lower vermilion, lip inferior, mouth width, endocanthion, a nasal ala, nasolabial sulcus and cheilion. Also indicated are the directions superior, inferior, radially inward and radially outward.

FIG. 2C is a side view of a head with several features of surface anatomy identified including glabella, sellion, pronasale, subnasale, lip superior, lip inferior, supramenton, nasal ridge, alar crest point, otobasion superior and otobasion inferior. Also indicated are the directions superior & inferior, and anterior & posterior.

FIG. 2D is a further side view of a head. The approximate locations of the Frankfort horizontal and nasolabial angle are indicated. The coronal plane is also indicated.

Figure 2E:
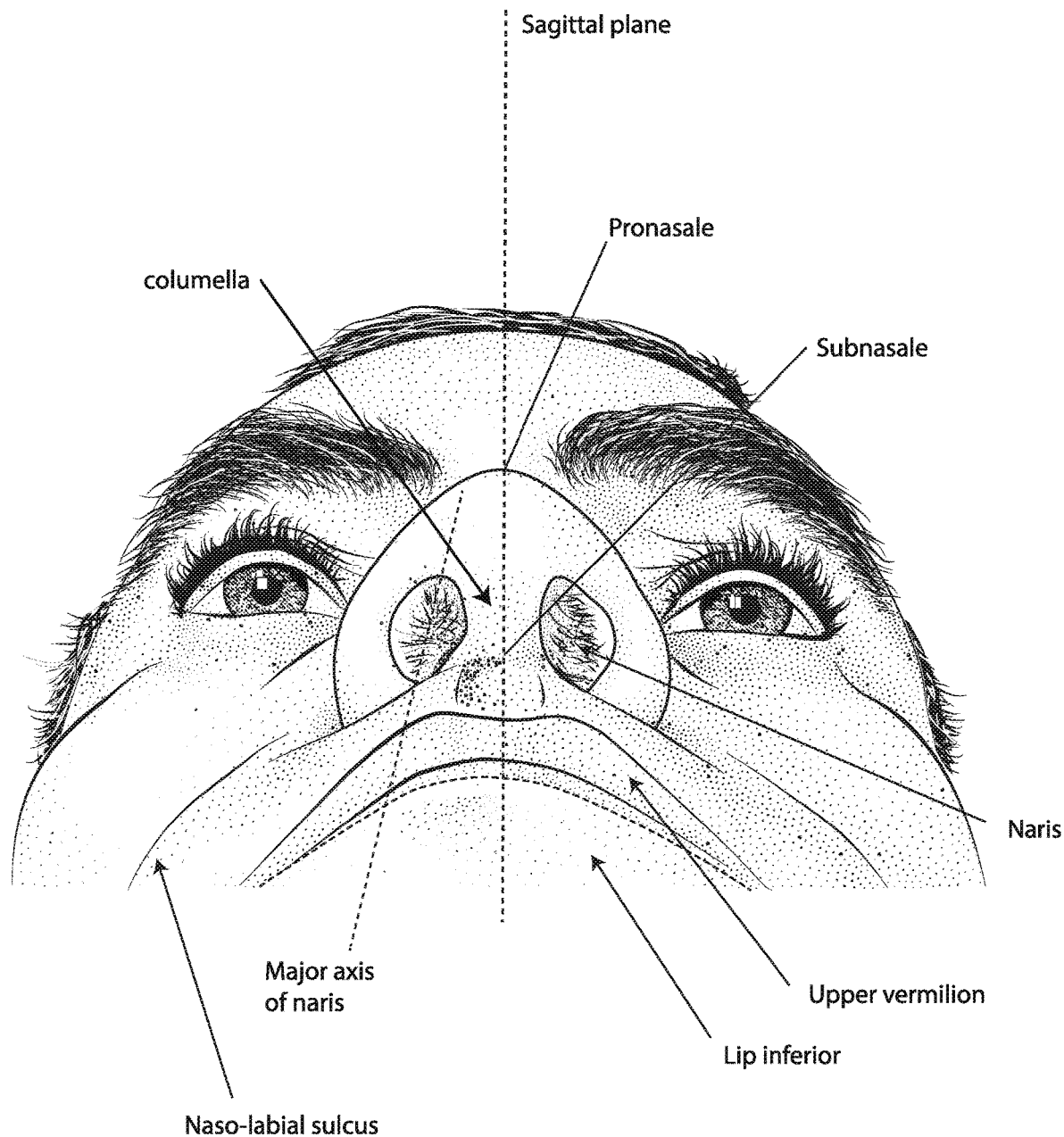

FIG. 2E shows a base view of a nose with several features identified including naso-labial sulcus, lip inferior, upper Vermilion, naris, subnasale, columella, pronasale, the major axis of a naris and the midsagittal plane.

FIG. 2F shows a side view of the superficial features of a nose.

FIG. 2G shows subcutaneal structures of the nose, including lateral cartilage, septum cartilage, greater alar cartilage, lesser alar cartilage, sesamoid cartilage, nasal bone, epidermis, adipose tissue, frontal process of the maxilla and fibrofatty tissue.

FIG. 2H shows a medial dissection of a nose, approximately several millimeters from the midsagittal plane, amongst other things showing the septum cartilage and medial crus of greater alar cartilage.

Figures 2I, 2J:
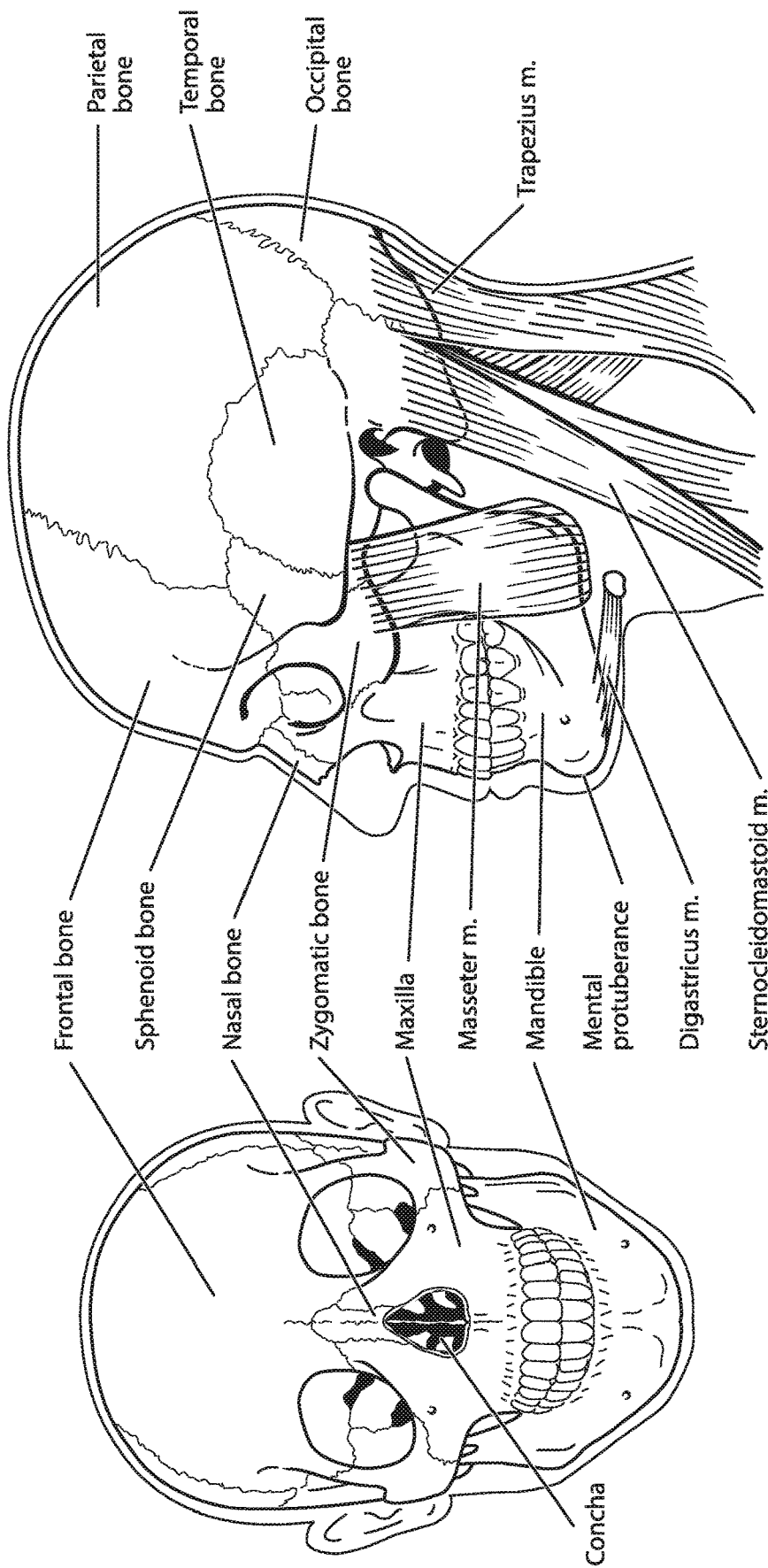

FIG. 2I shows a front view of the bones of a skull including the frontal, nasal and zygomatic bones. Nasal concha are indicated, as are the maxilla, and mandible.

FIG. 2J shows a lateral view of a skull with the outline of the surface of a head, as well as several muscles. The following bones are shown: frontal, sphenoid, nasal, zygomatic, maxilla, mandible, parietal, temporal and occipital. The mental protuberance is indicated. The following muscles are shown: digastricus, masseter, sternocleidomastoideo trapezius.

Figure 2K:
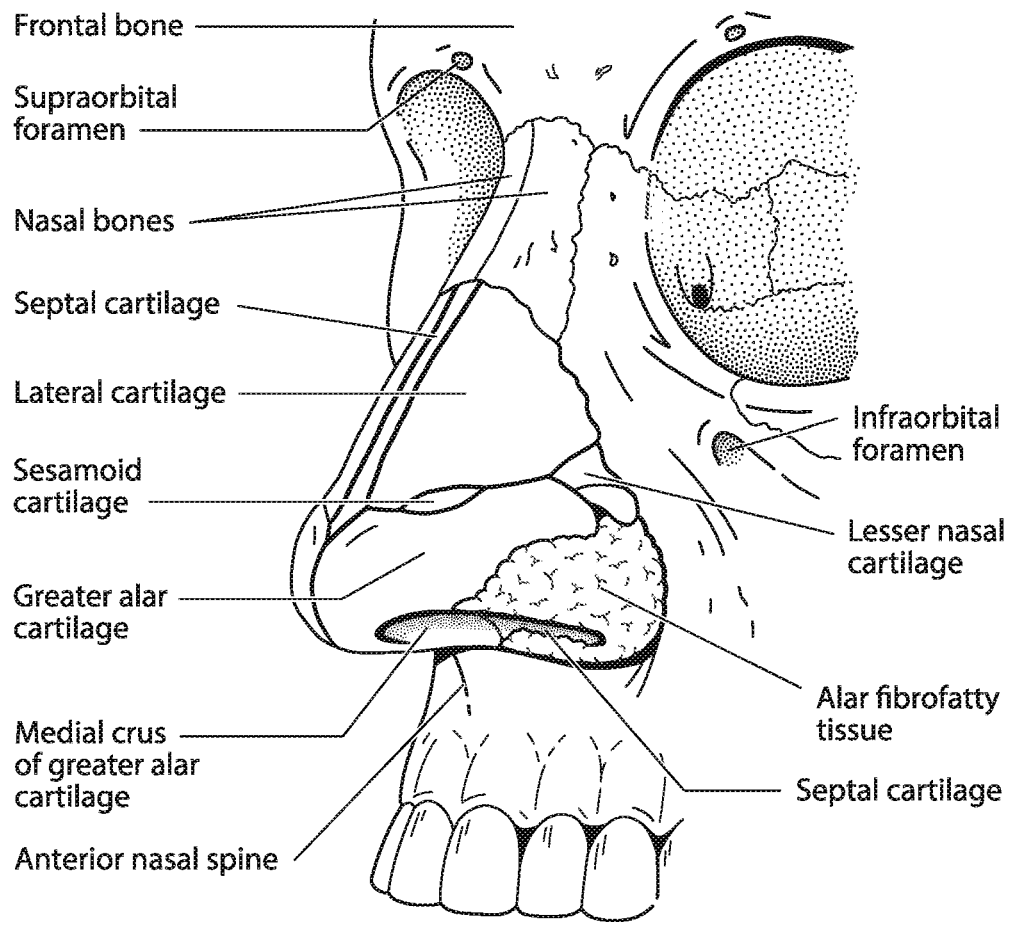

FIG. 2K shows an anterolateral view of a nose. The following bones are shown: frontal, supraorbital foramen, nasal, septal cartilage, lateral cartilage, orbit and infraorbital foramen.

Figure 2L:
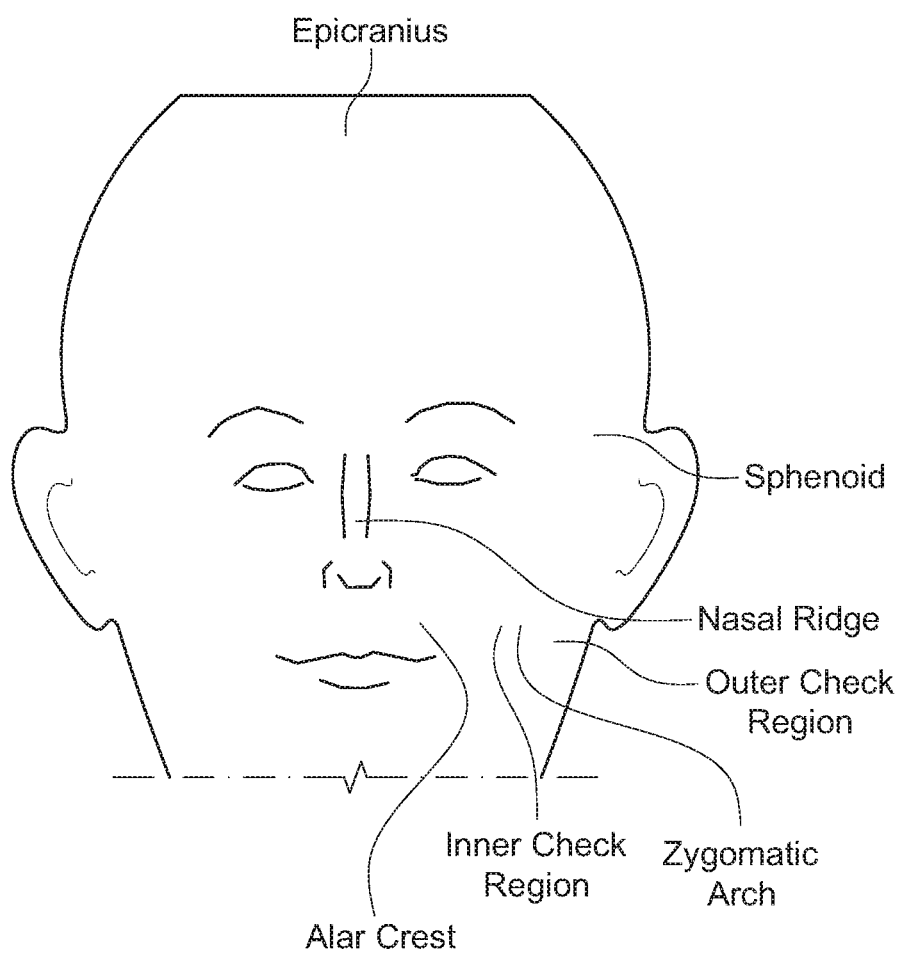

FIG. 2L shows another front view of the face with several features of surface anatomy identified including the epicranius, the sphenoid, the nasal ridge, the outer and inner cheek regions, the zygomatic arch, and the alar crest.

Figure 2M:
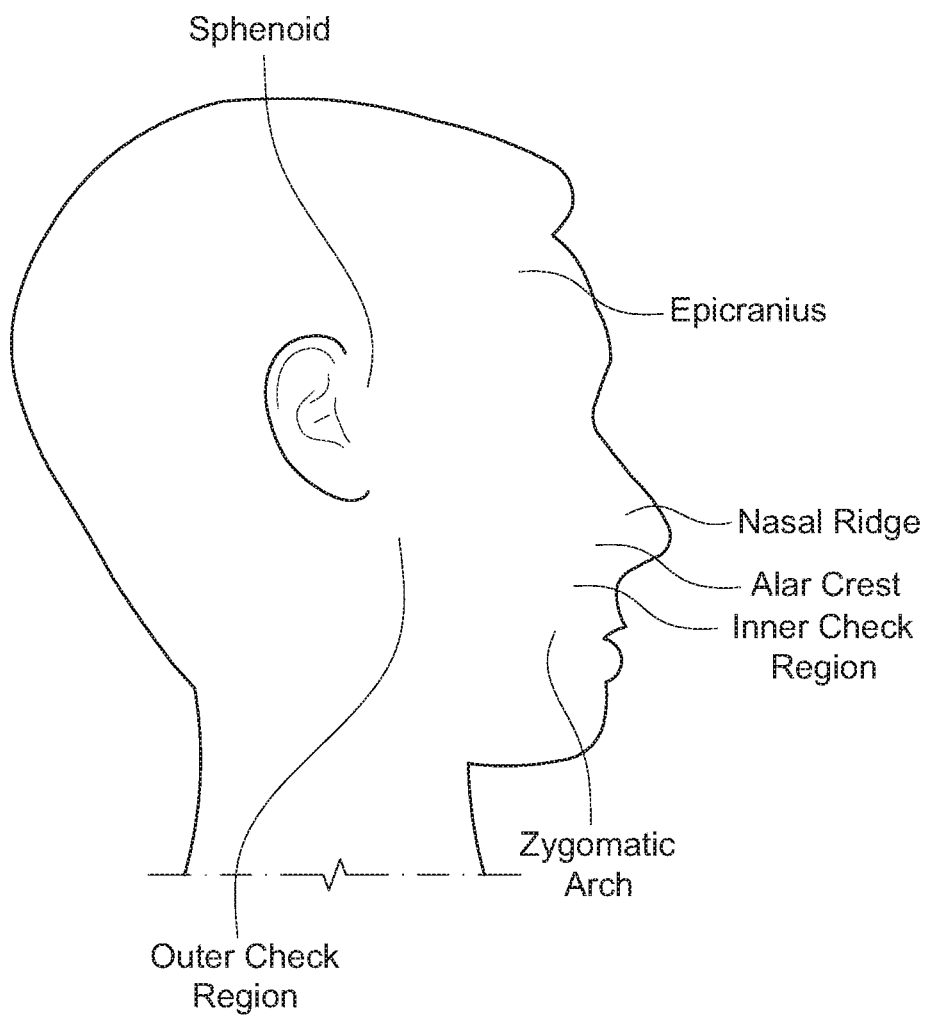

FIG. 2M shows another side view of the face with several features of surface anatomy identified including the epicranius, the sphenoid, the nasal ridge, the outer and inner cheek regions, the zygomatic arch, and the alar crest.

4.3 Shape of Structures

Figure 3A:
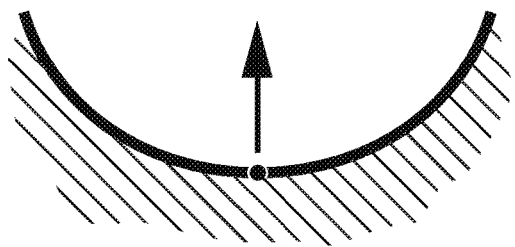

FIG. 3A shows a schematic of a cross-section through a structure at a point. An outward normal at the point is indicated. The curvature at the point has a positive sign, and a relatively large magnitude when compared to the magnitude of the curvature shown in FIG. 3B.

Figure 3B:
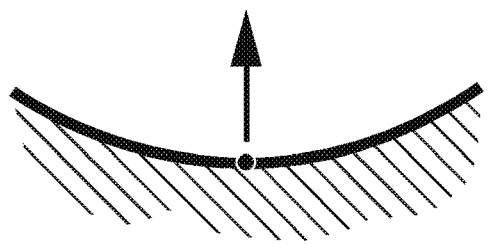

FIG. 3B shows a schematic of a cross-section through a structure at a point. An outward normal at the point is indicated. The curvature at the point has a positive sign, and a relatively small magnitude when compared to the magnitude of the curvature shown in FIG. 3A.

Figure 3C:
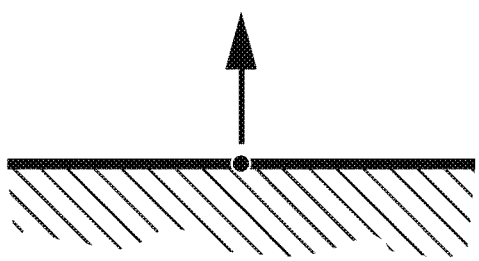

FIG. 3C shows a schematic of a cross-section through a structure at a point. An outward normal at the point is indicated. The curvature at the point has a value of zero.

Figure 3D:
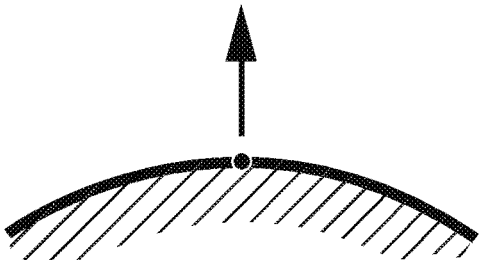

FIG. 3D shows a schematic of a cross-section through a structure at a point. An outward normal at the point is indicated. The curvature at the point has a negative sign, and a relatively small magnitude when compared to the magnitude of the curvature shown in FIG. 3E.

Figure 3E:
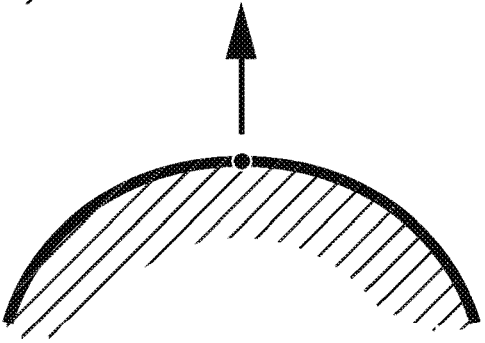

FIG. 3E shows a schematic of a cross-section through a structure at a point. An outward normal at the point is indicated. The curvature at the point has a negative sign, and a relatively large magnitude when compared to the magnitude of the curvature shown in FIG. 3D.

Figure 3F:
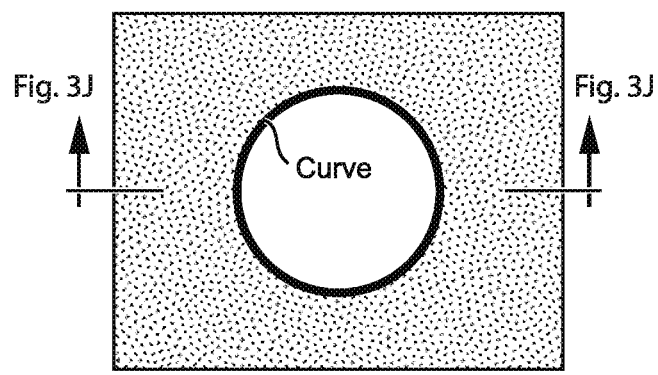

FIG. 3F shows the surface of a structure, with a one dimensional hole in the surface. The illustrated plane curve forms the boundary of a one dimensional hole.

Figure 3G:
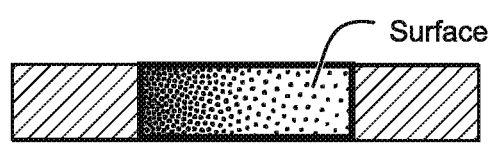

FIG. 3G shows a cross-section through the structure of FIG. 3F. The illustrated surface bounds a two dimensional hole in the structure of FIG. 3F.

Figure 3H:
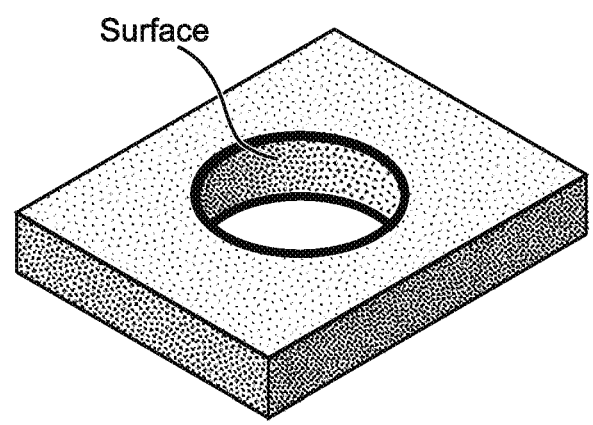

FIG. 3H shows a perspective view of the structure of FIG. 3F, including the two dimensional hole and the one dimensional hole. Also shown is the surface that bounds a two dimensional hole in the structure of FIG. 3F.

Figures 3I, 3J:
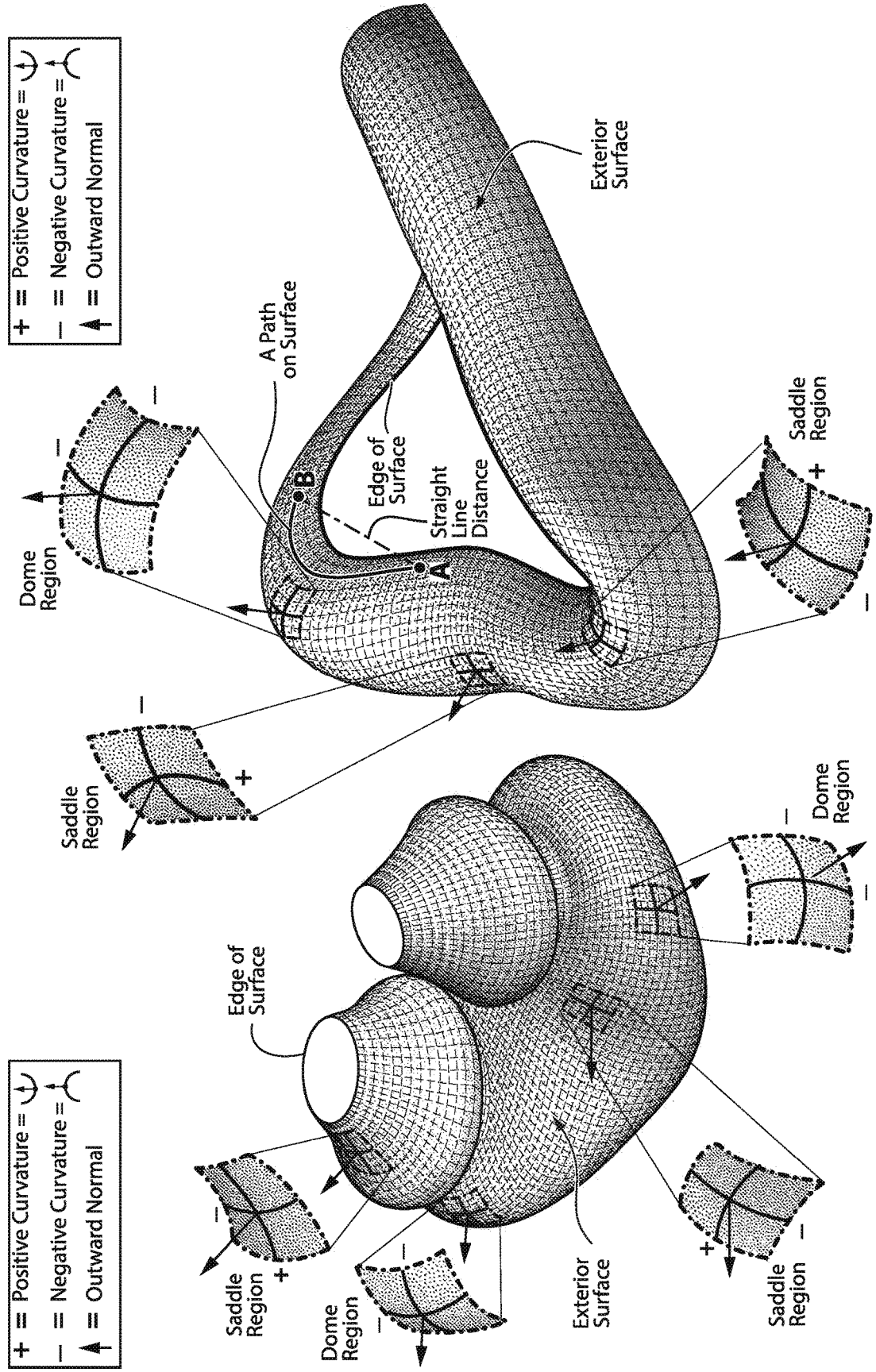

FIGS. 3I-3J shows a seal forming structure. An exterior surface of the cushion is indicated. An edge of the surface is indicated. A path on the surface between points A and B is indicated. A straight-line distance between A and B is indicated. Two saddle regions and a dome region are indicated.

Figure 3K:
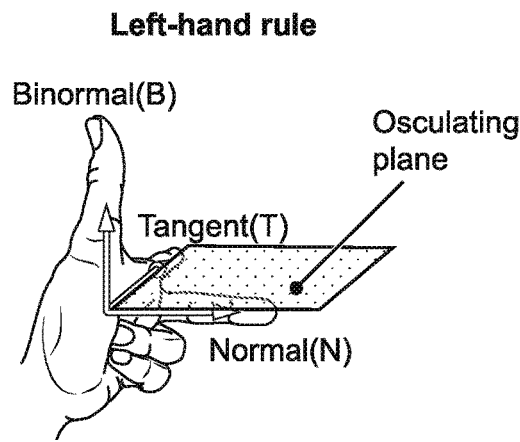
Figure 3L:
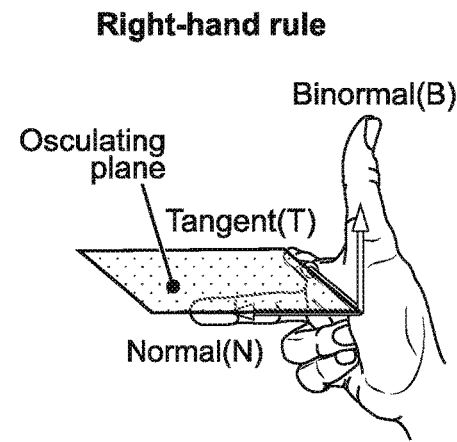
Figure 3M:
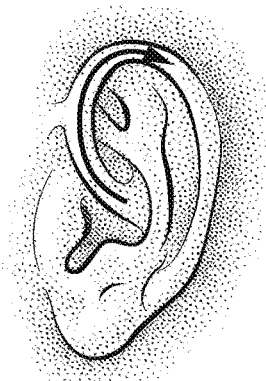
Figure 3N:
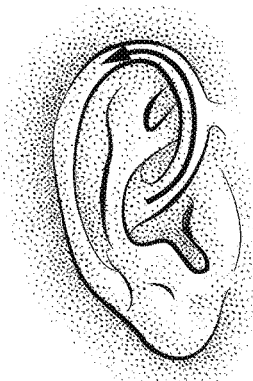
Figure 3O:
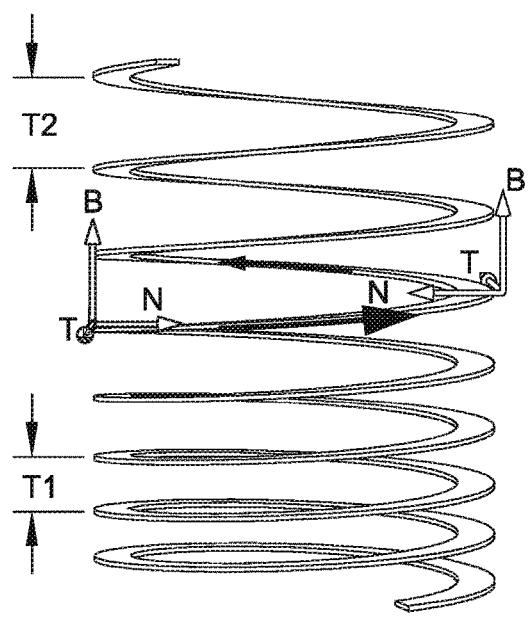

FIG. 3K illustrates a left-hand rule.
FIG. 3L illustrates a right-hand rule.
FIG. 3M shows a left ear, including the left ear helix.
FIG. 3N shows a right ear, including the right ear helix.
FIG. 3O shows a right-hand helix.

4.4 Head-Mounted Virtual Reality Display

Figure 4A:
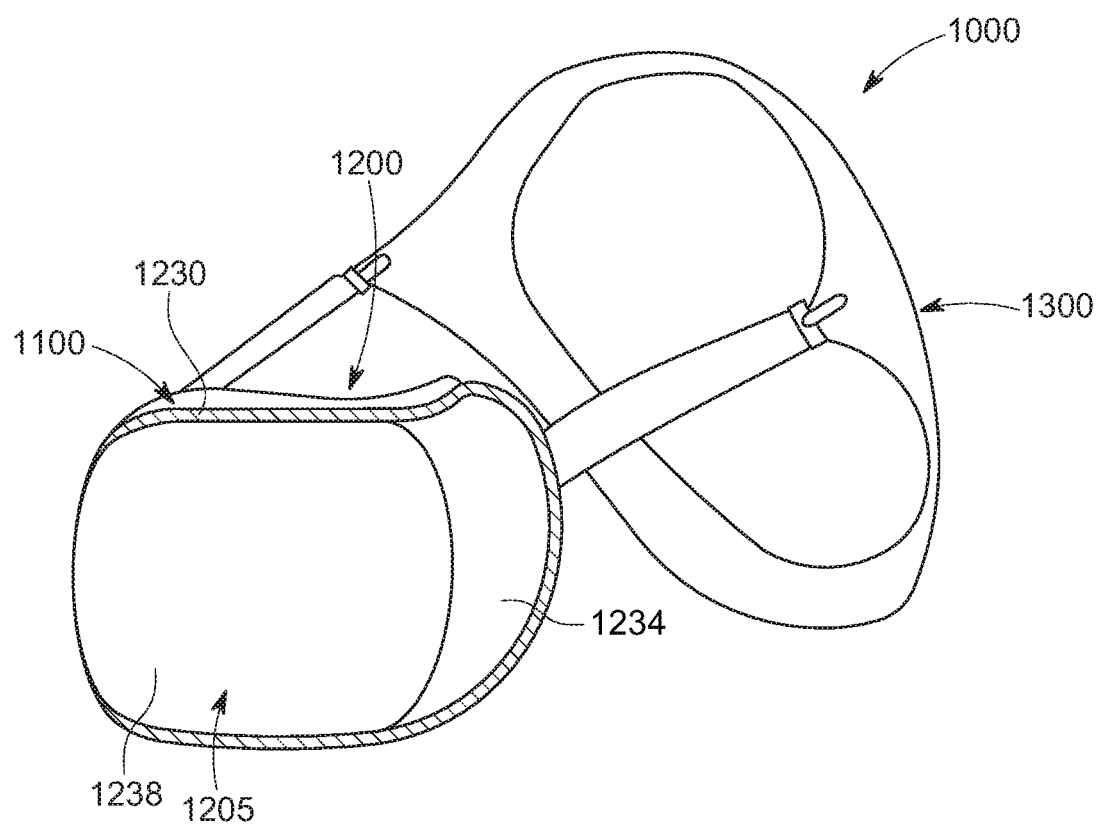

FIG. 4A shows a front perspective view of a head-mounted display interface in accordance with one form of the present technology.

Figure 4B:
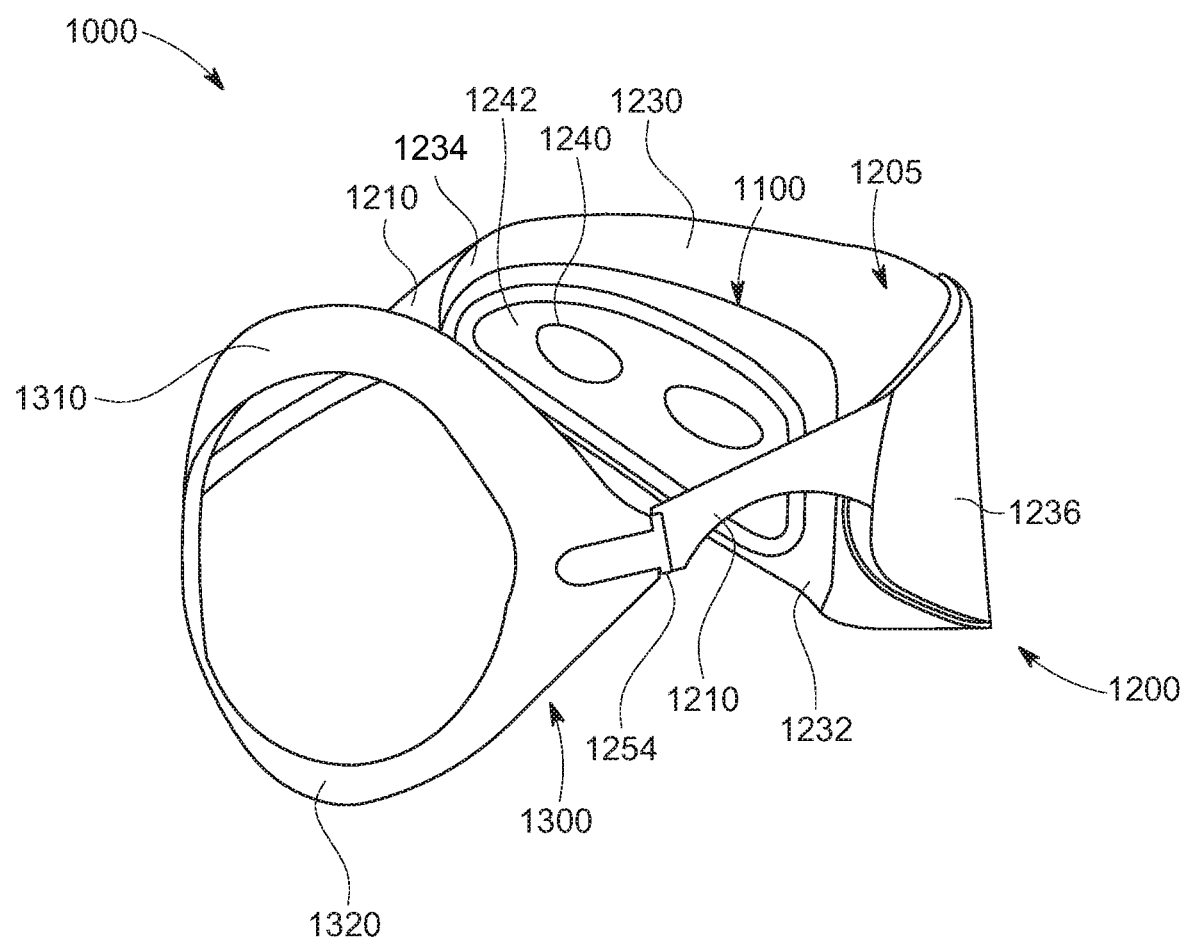

FIG. 4B shows a rear perspective view of the head-mounted display of FIG. 4A.

Figure 4C:
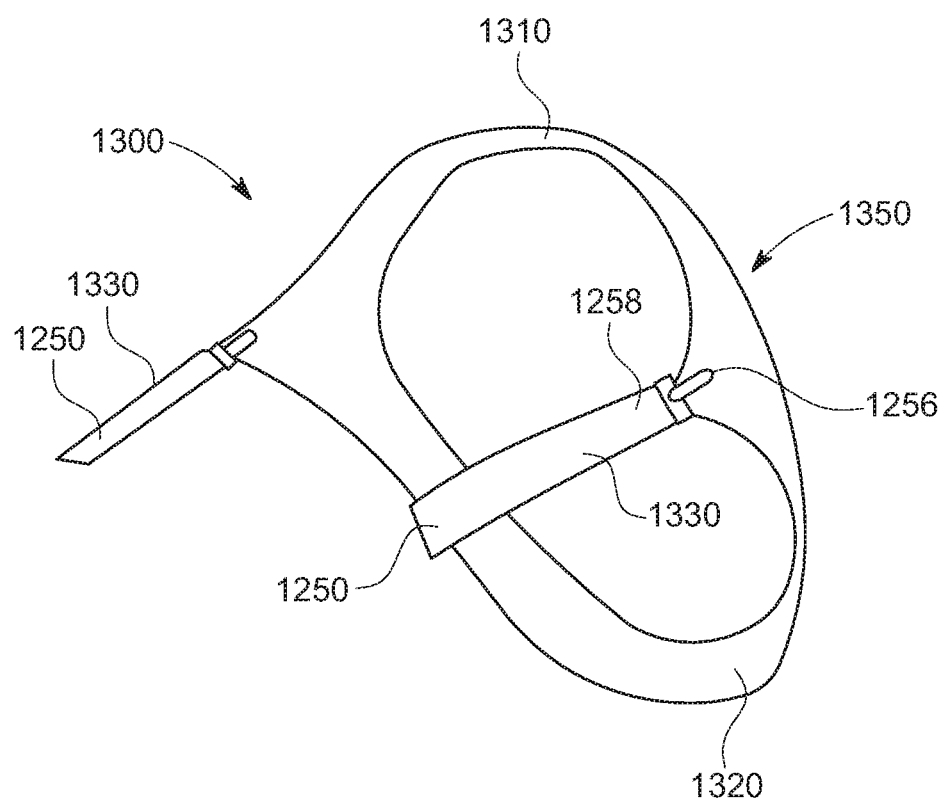

FIG. 4C shows a perspective view of a positioning and stabilizing structure used with the head-mounted display of FIG. 4A.

Figure 4D:
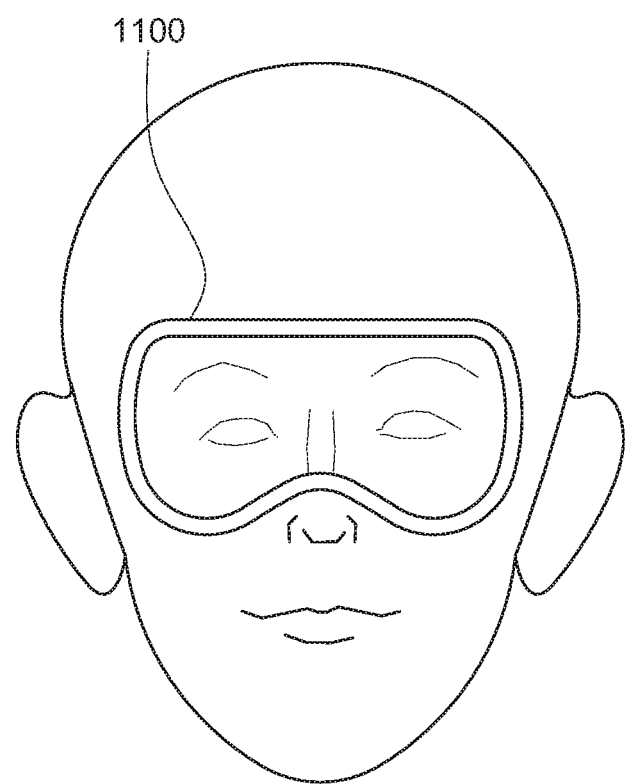

FIG. 4D shows a front view of a user's face, illustrating a location of an interfacing structure, in use.

4.5 Head-Mounted Augmented Reality Display

Figure 5A:
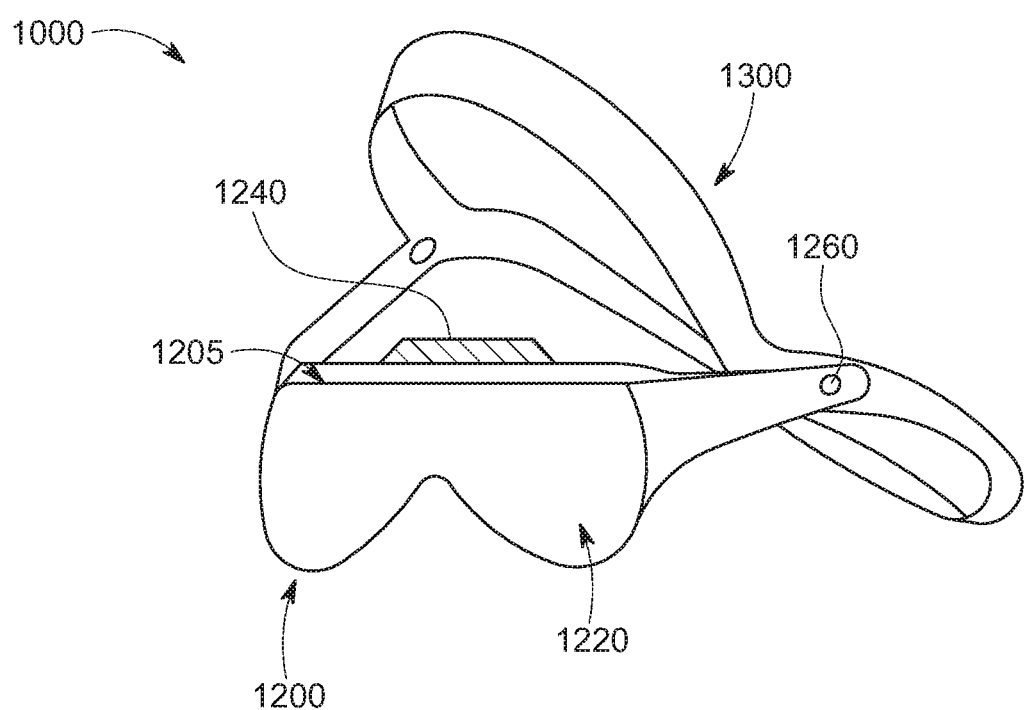

FIG. 5A shows a front perspective view of a head-mounted display interface in accordance with one form of the present technology.

Figure 5B:
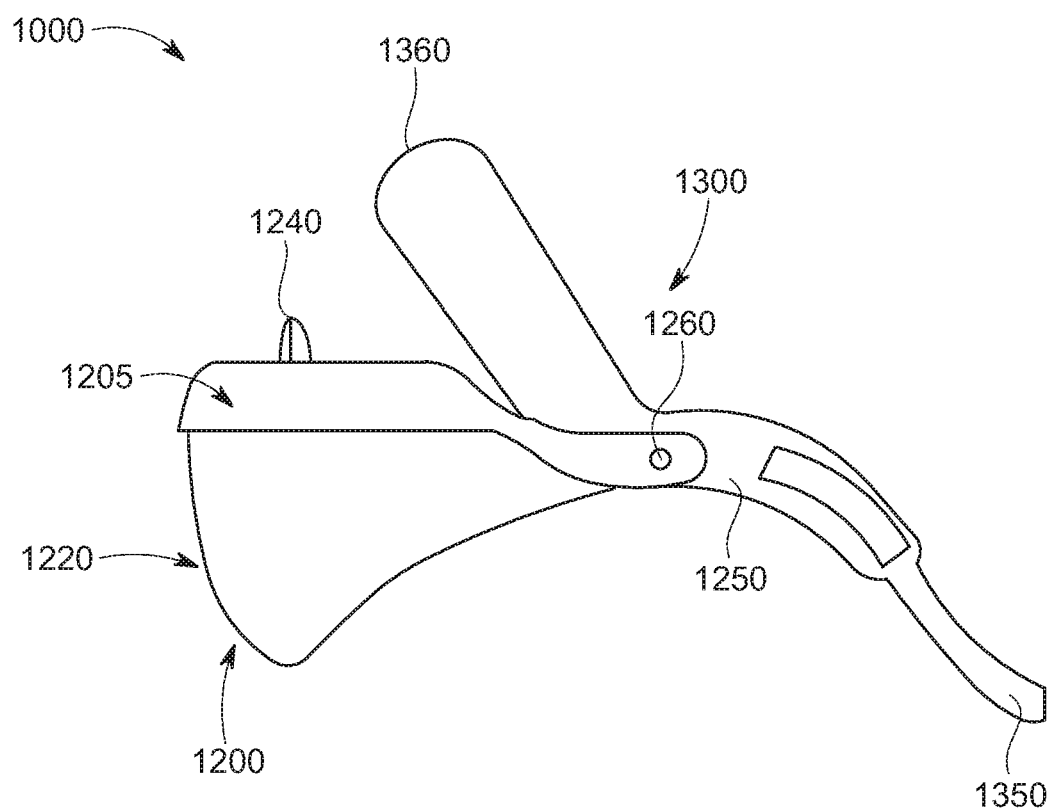

FIG. 5B shows a side view of the head-mounted display interface of FIG. 5A.

4.6 Controls

Figure 6:
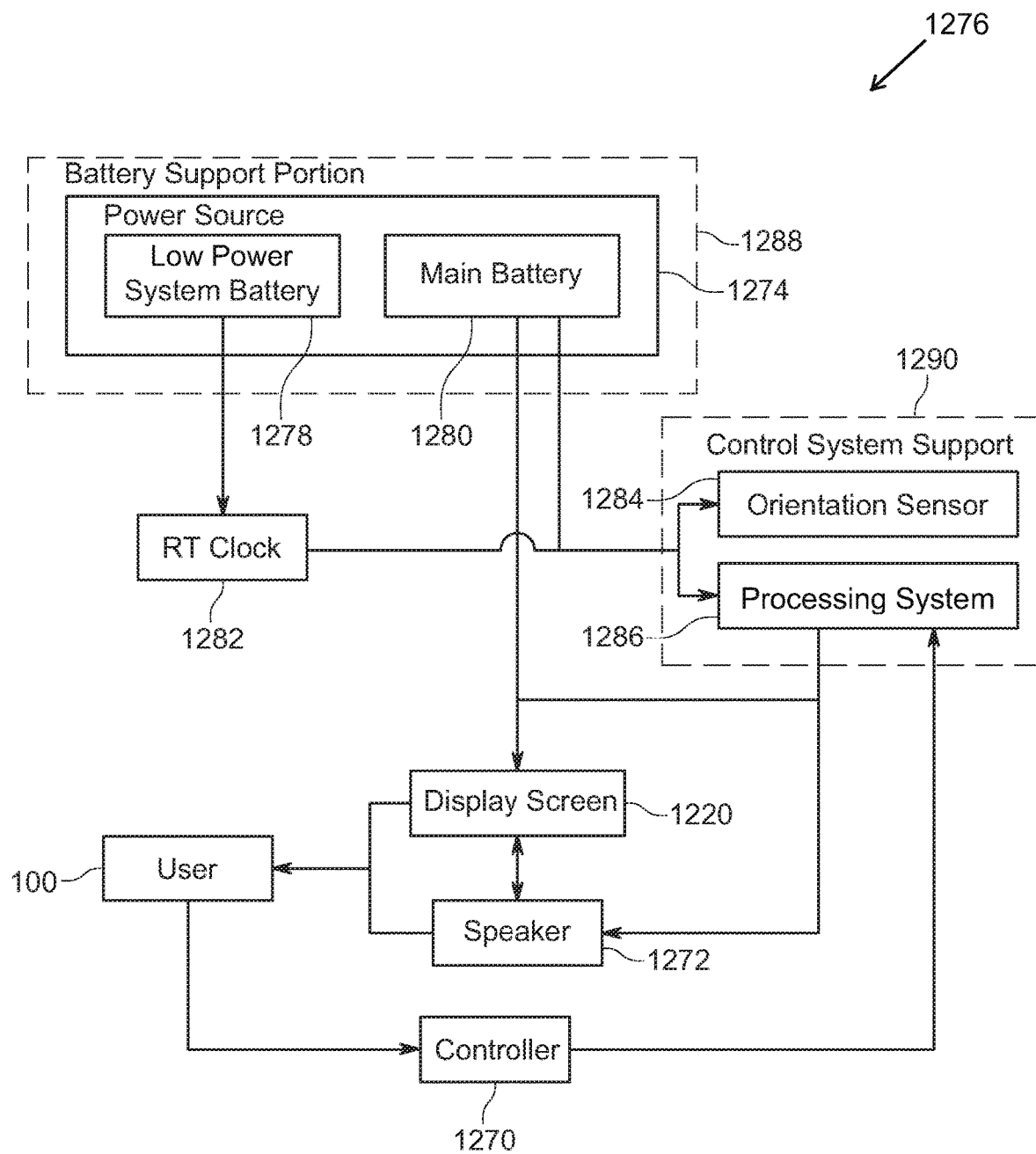

FIG. 6 shows a schematic view of a control system of one form of the present technology.

4.7 Interfacing Structure

Figure 7A:
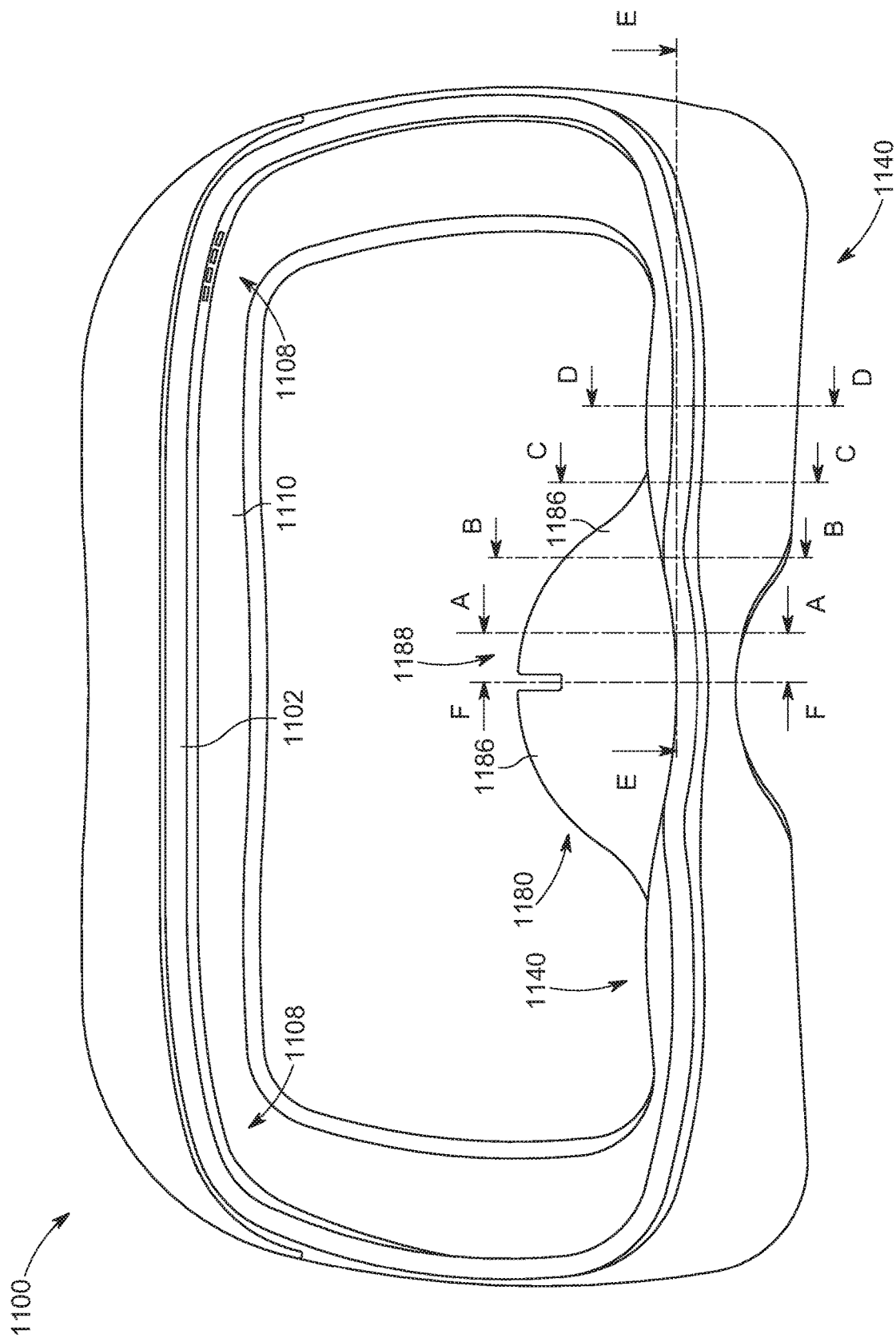

FIG. 7A is an anterior view illustration of an interfacing structure according to an example of the present technology.

Figure 7B:
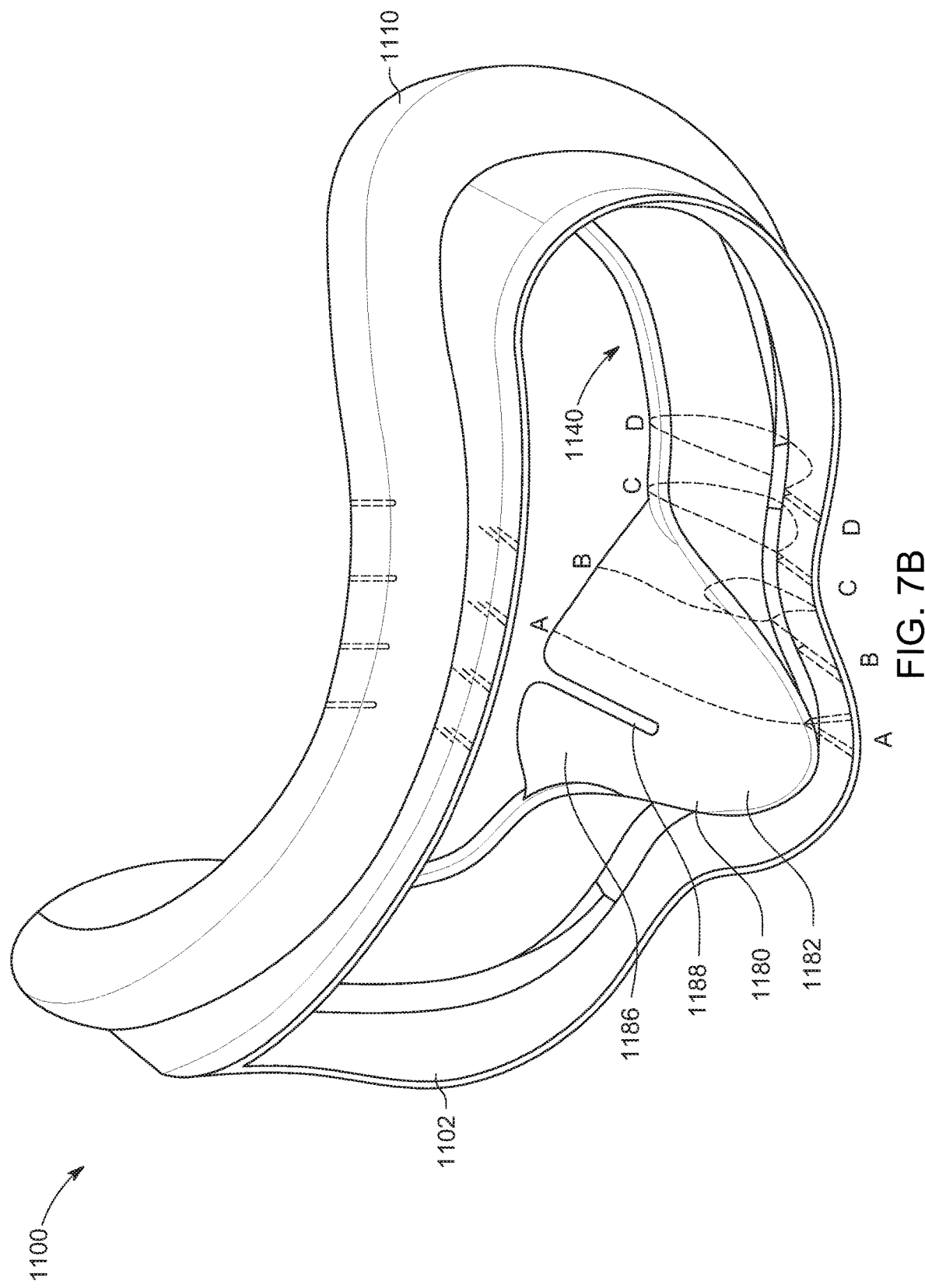

FIG. 7B is a perspective view illustration of the interfacing structure shown in FIG. 7A.

Figure 7C:
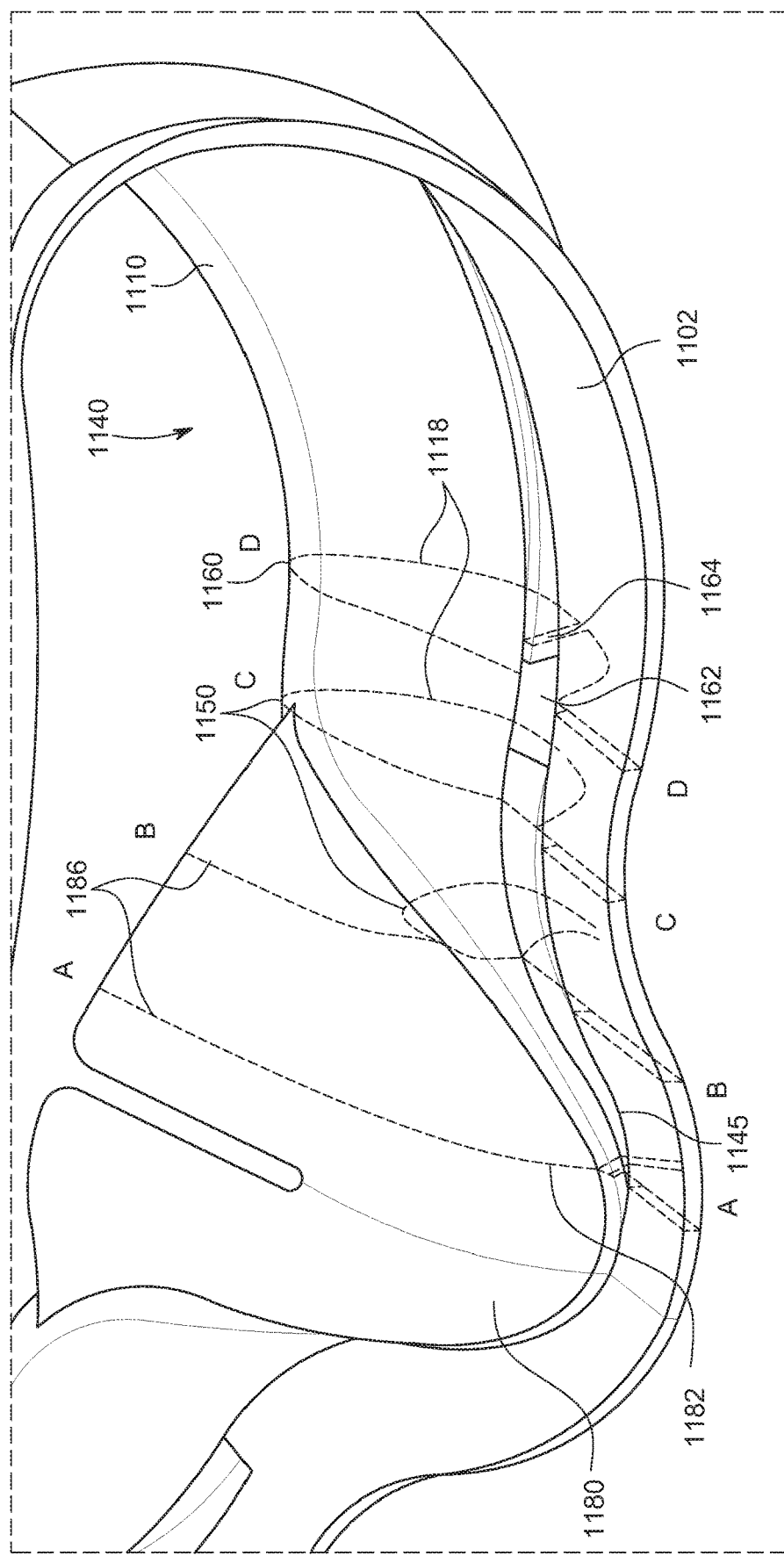

FIG. 7C is a perspective view illustration of a nasal portion and a cheek portion of the interfacing structure shown in FIG. 7A.

Figure 7D:
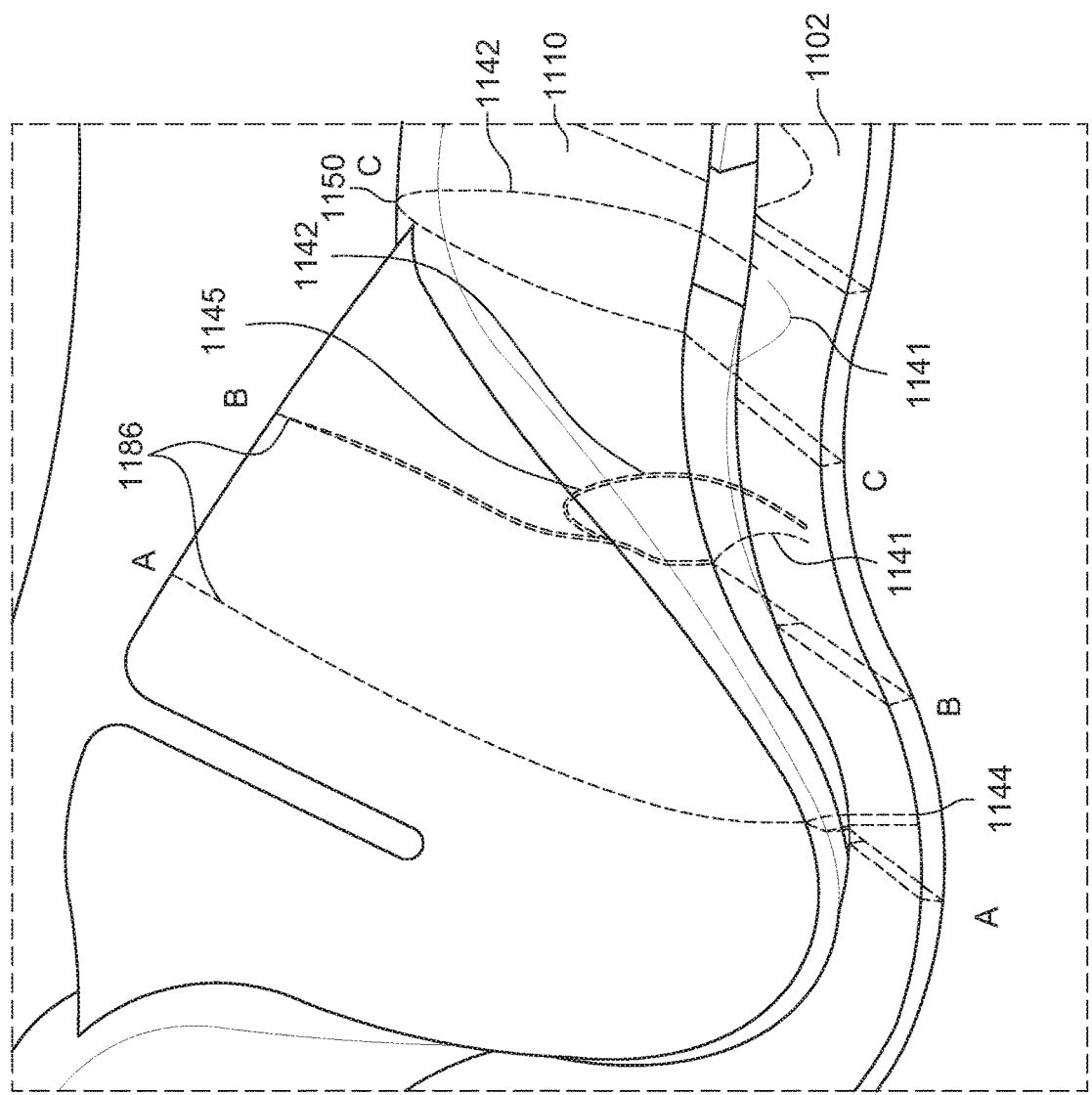

FIG. 7D is a perspective view illustration of a nasal portion of the interfacing structure shown in FIG. 7A.

Figure 7E:
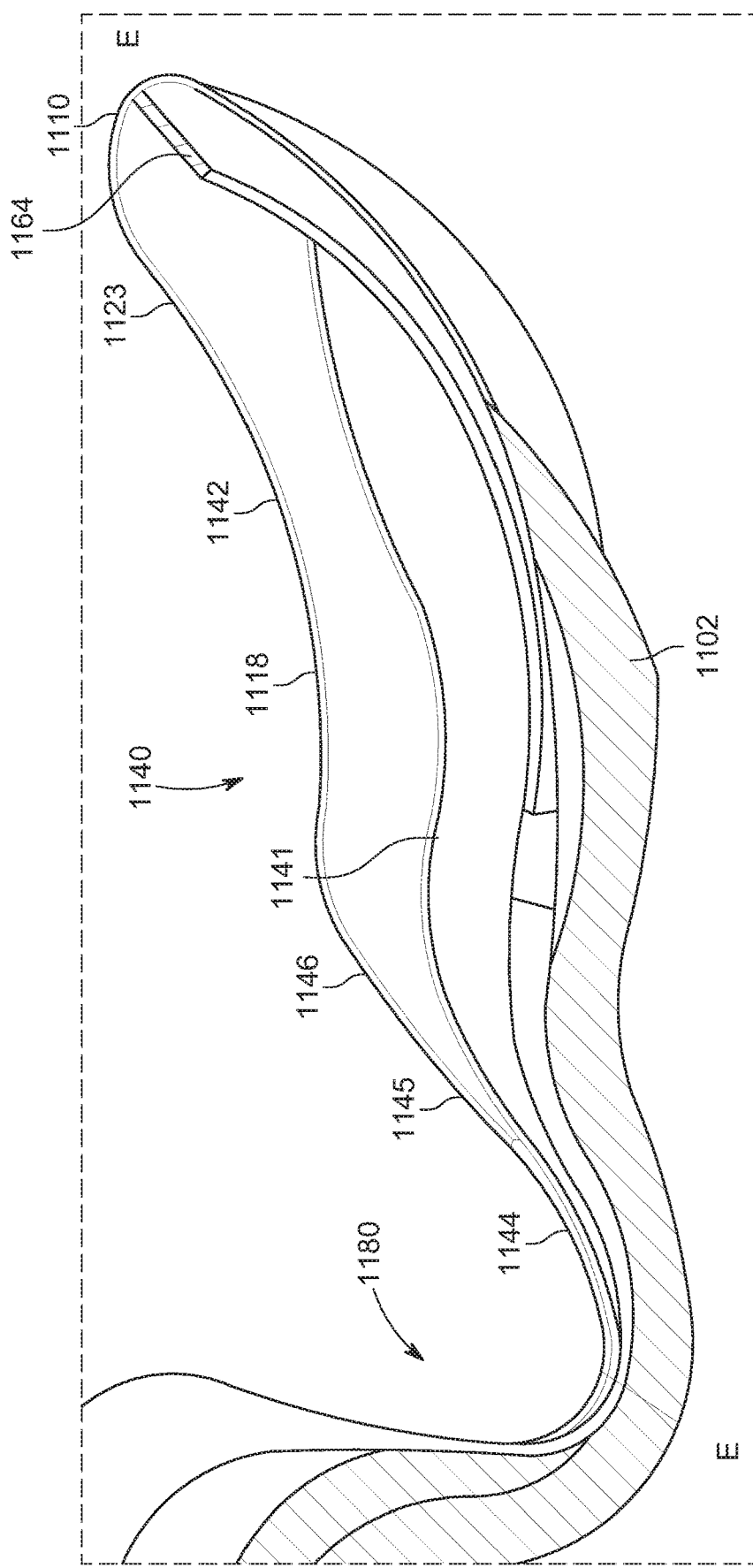

FIG. 7E is a perspective cutaway view illustration of the interfacing structure shown in FIG. 7A through cross section cut E-E as indicated in FIG. 7A.

Figure 7F:
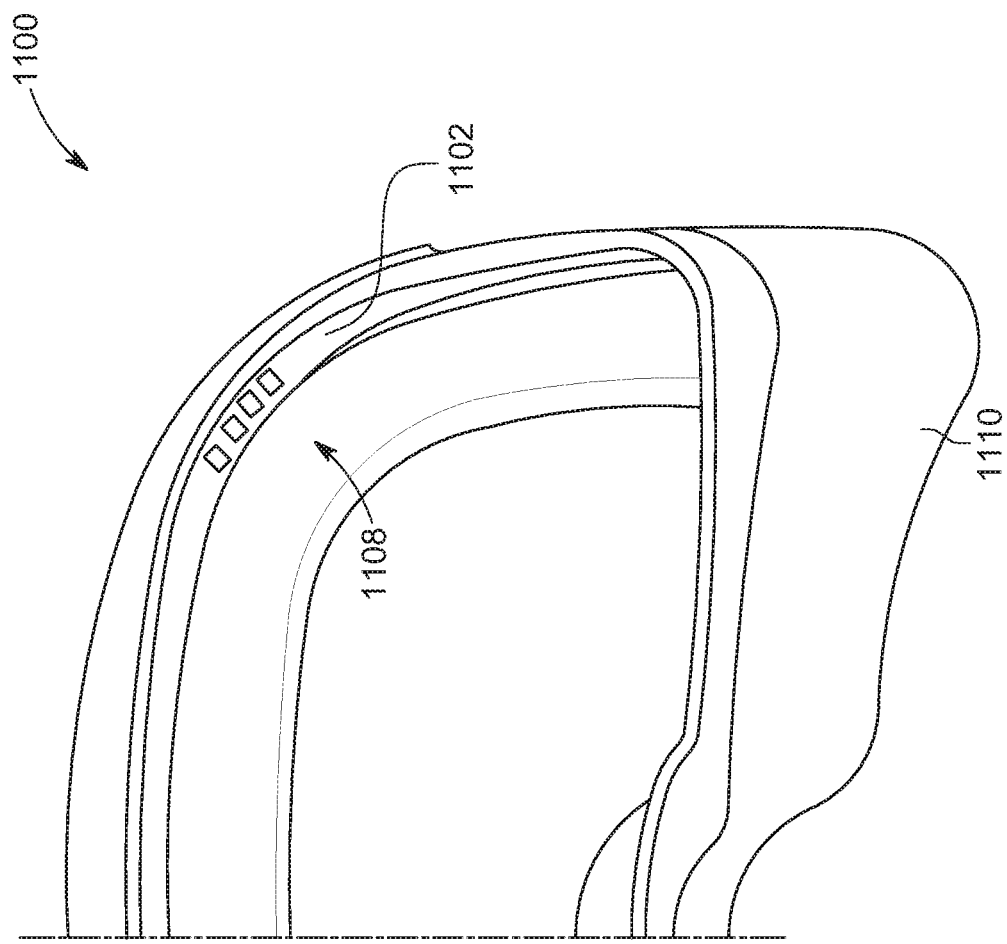

FIG. 7F is a partial anteroinferior view illustration of the interfacing structure shown in FIG. 7A.

Figure 7H:
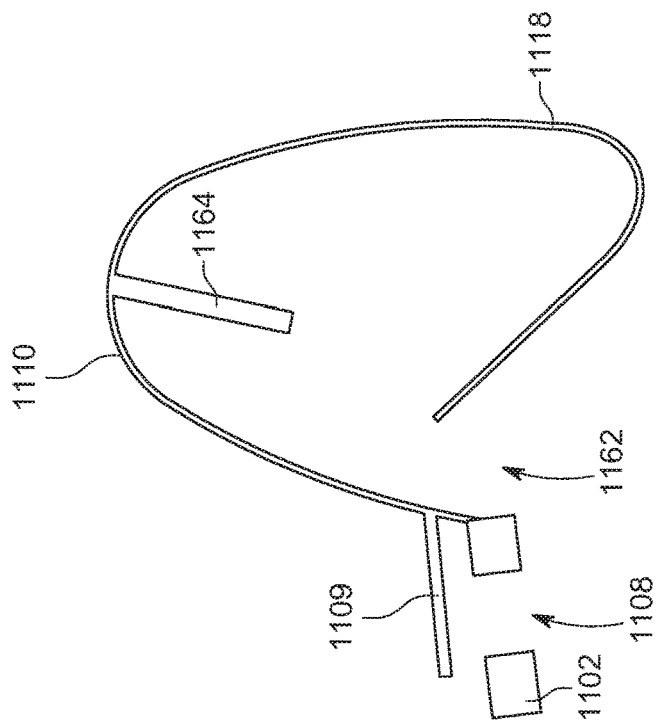
Figure 7G:
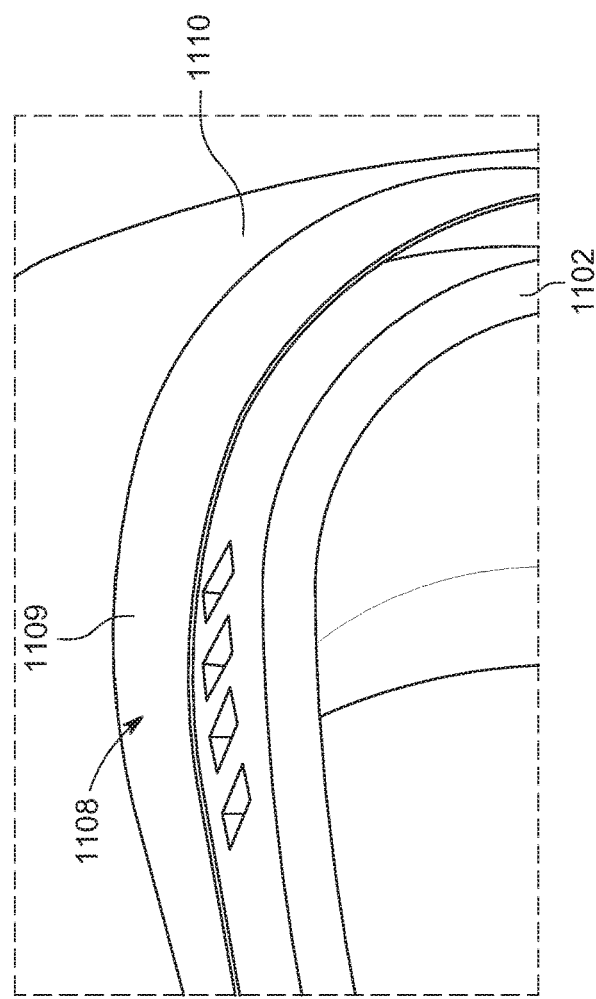

FIG. 7G is a perspective view illustration of a portion of a chassis portion of the interfacing structure shown in FIG. 7A having openings.

FIG. 7H is a cross section view through the interfacing structure shown in FIG. 7A through an opening in the chassis portion.

FIGS. 7I-7M show cross section views as identified in FIGS. 7A-7D.

4.8 Automatic Sizing

Figure 8:
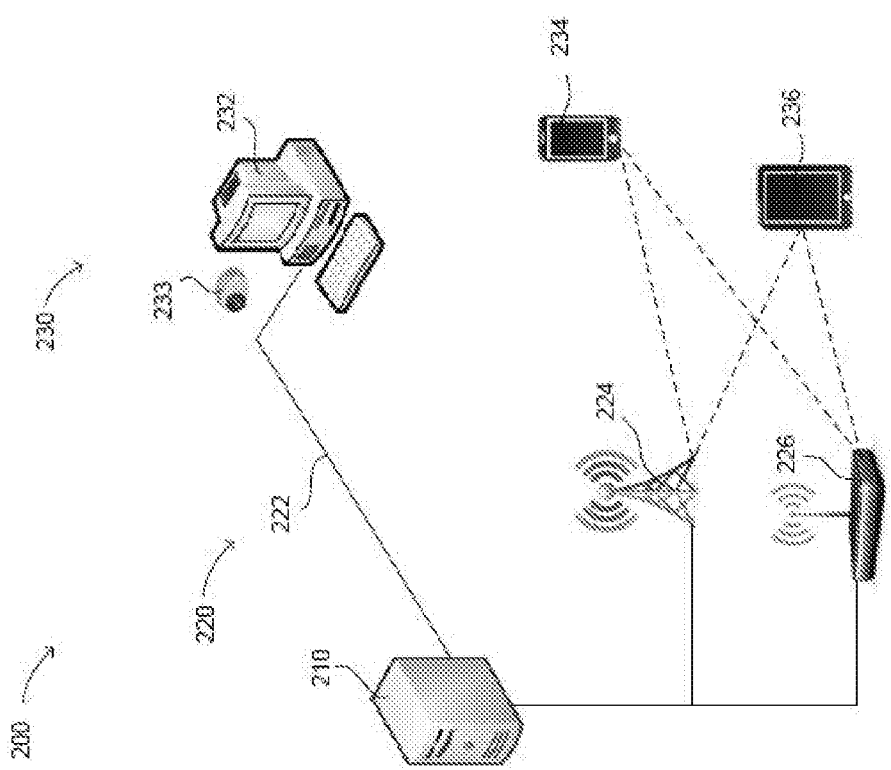

FIG. 8 is a diagram of an example system for automatically sizing a facial interface which includes a computing device.

Figure 9:
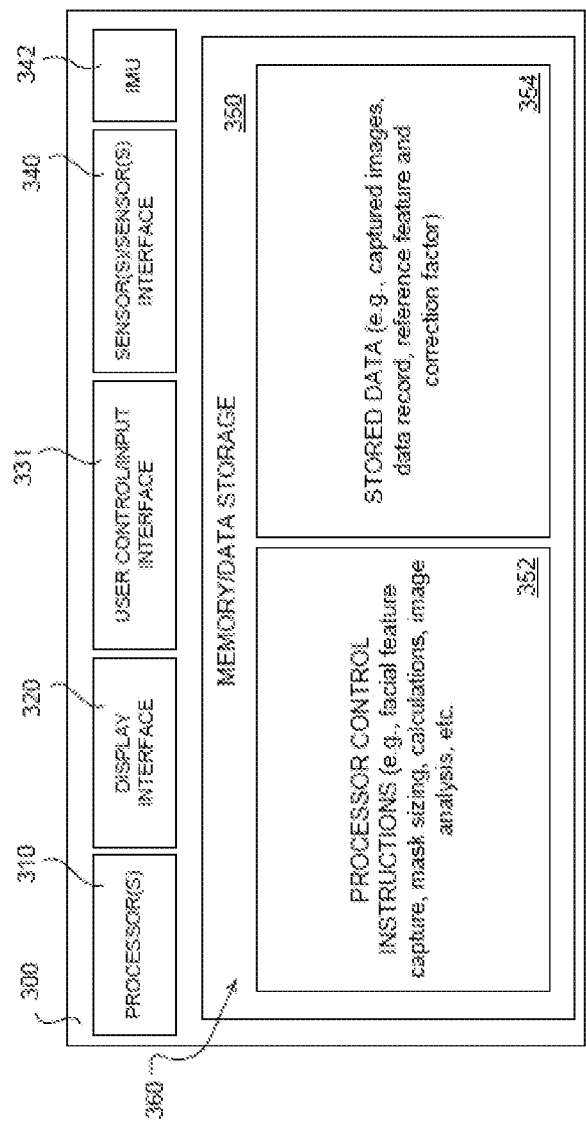

FIG. 9 is a block diagram of an example architecture of a computing device for the system of FIG. 8 including example components suitable for implementing the methodologies of the present technology.

Figure 10A:
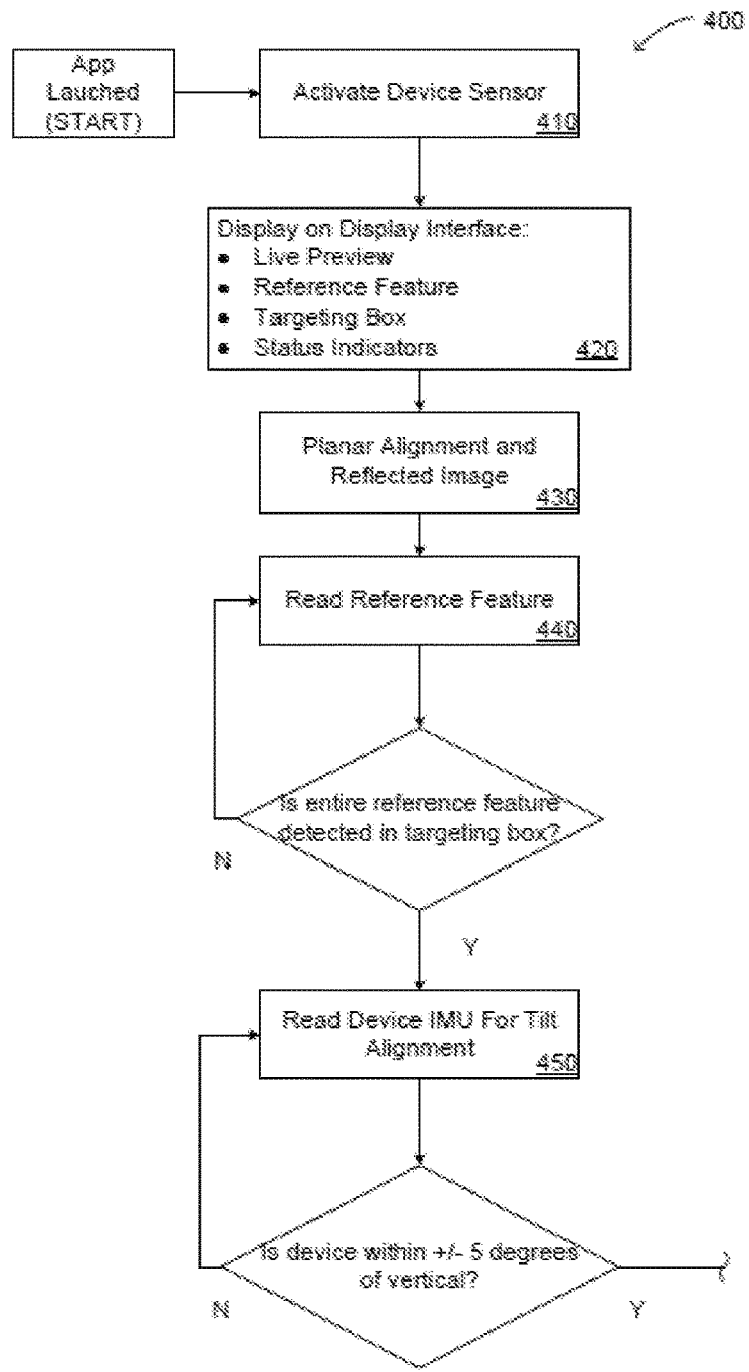

FIG. 10A is a flow diagram of a pre-capture phase method of an example version of the present technology.

Figure 10B:
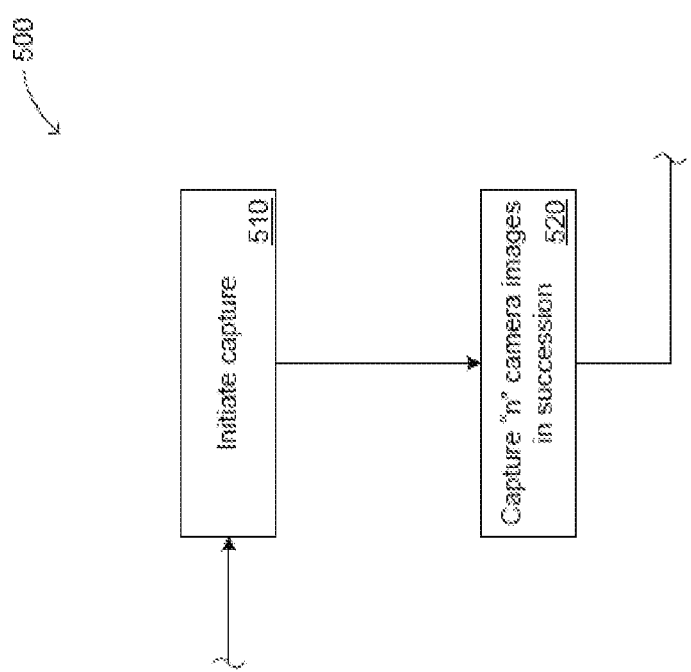

FIG. 10B is a flow diagram of a capture phase method of some versions of the present technology.

Figure 10C:
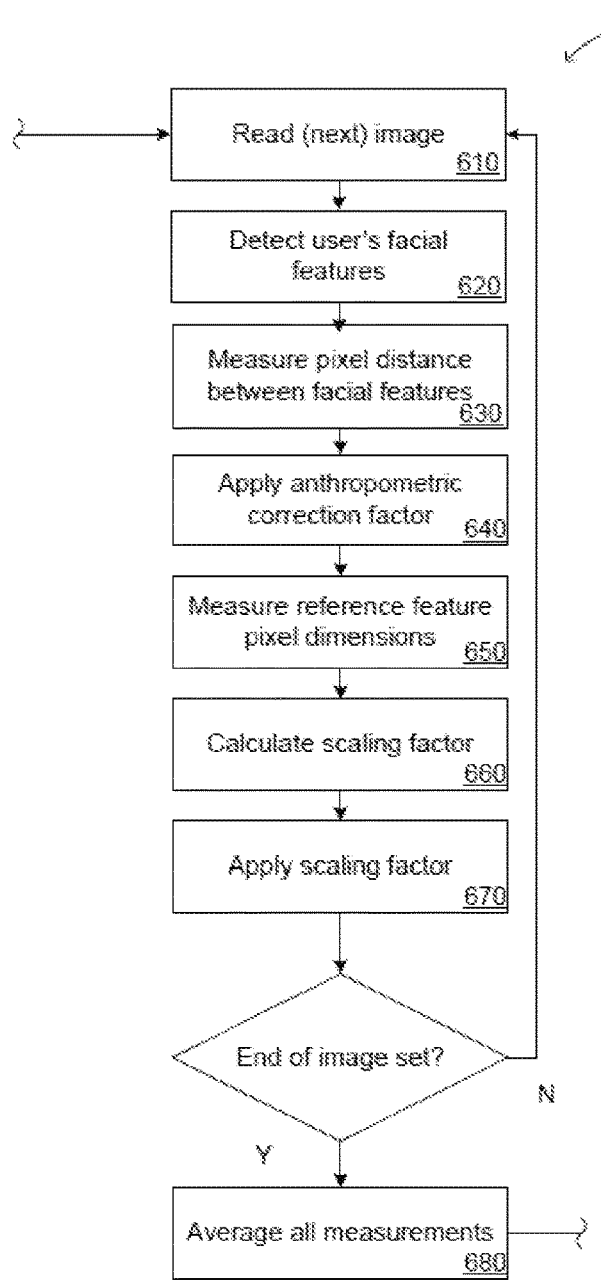

FIG. 10C is a flow diagram of a post-capture image processing phase method of some versions of the present technology.

Figure 10D:
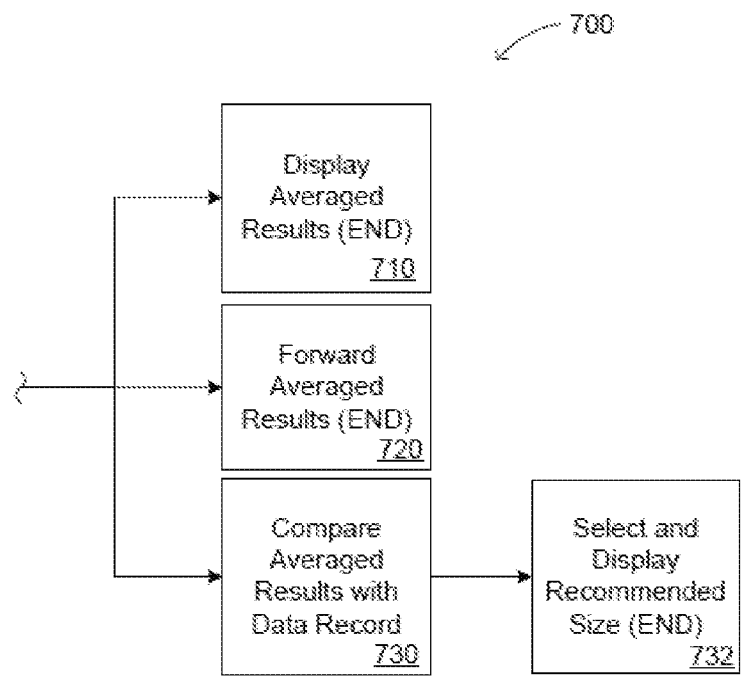

FIG. 10D is a flow diagram of a comparison and output phase method of some versions of an exemplary method embodiment of the present technology.

4.9 Further Interfacing Structure Examples

FIGS. 11A-11M show an interfacing structure according to a further example of the present technology.

Figure 12B:
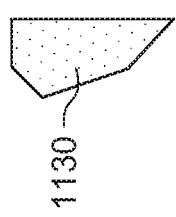
Figure 12C:
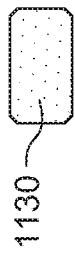
Figure 12D:
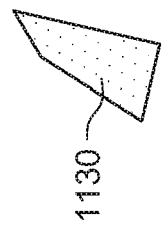
Figure 12A:
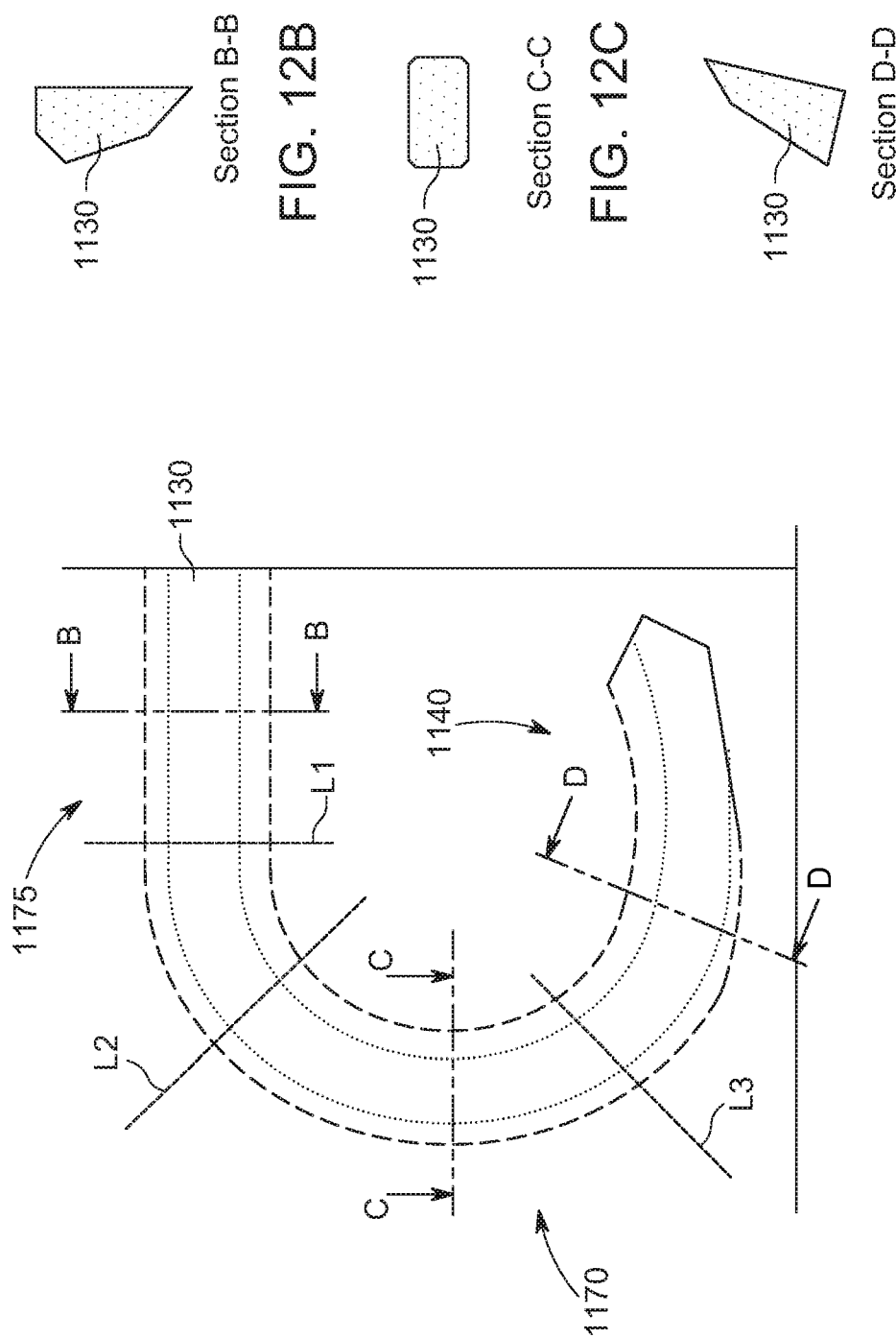

FIGS. 12A-2D schematically depict a cushion according to a further example of the present technology.

Figure 12E:
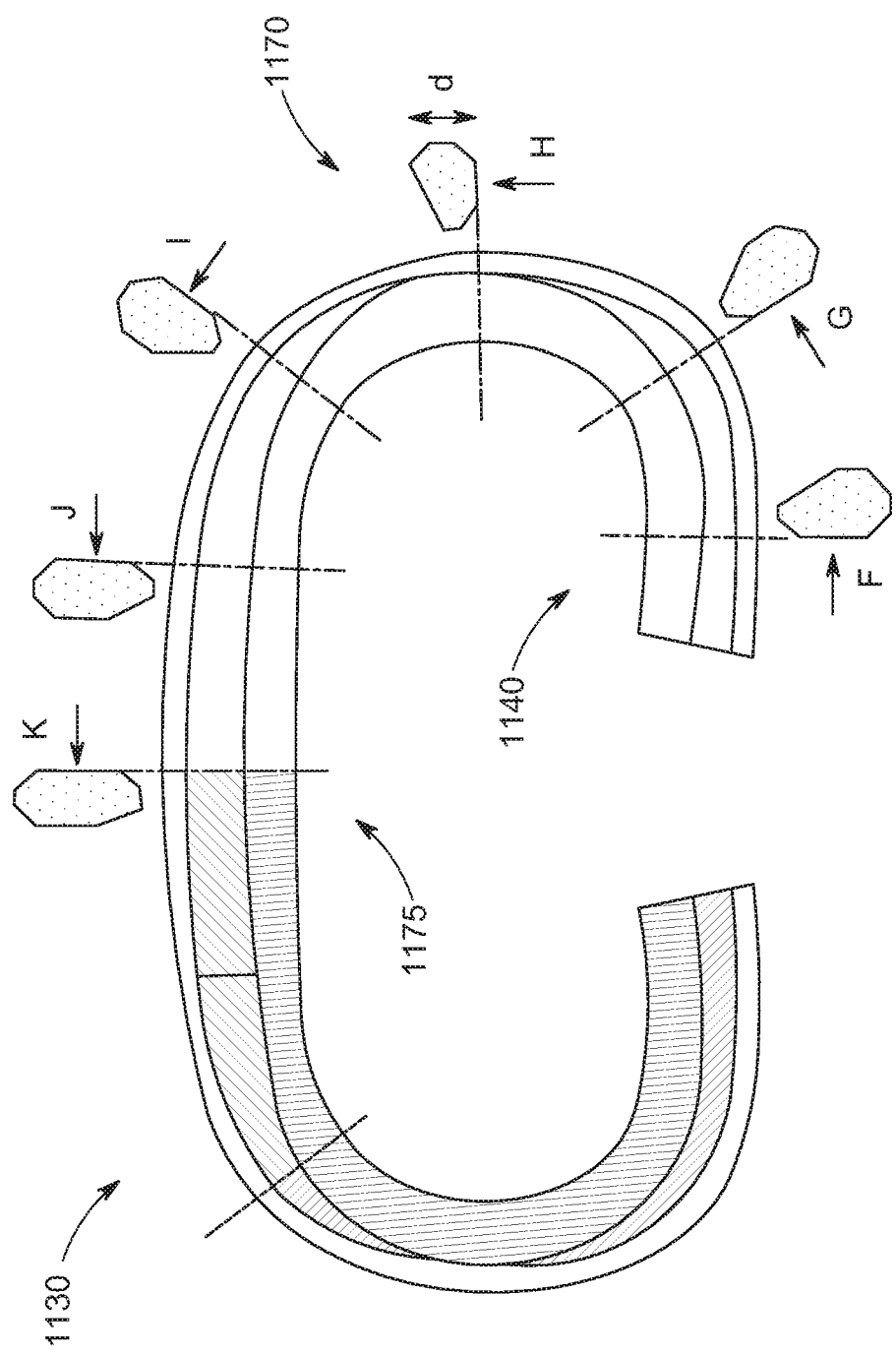

FIG. 12E schematically depicts a cushion according to a further example of the present technology.

Figure 12H:
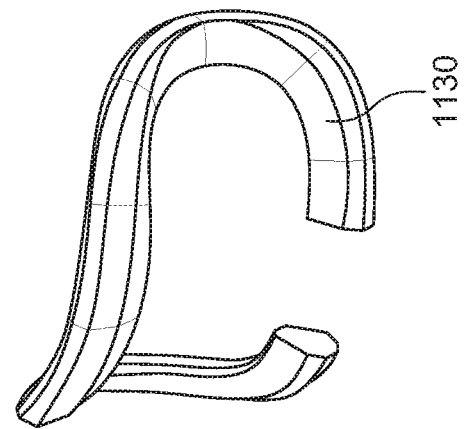
Figure 12G:
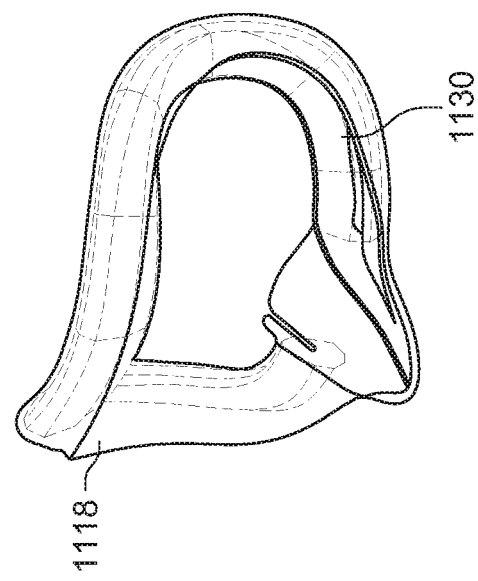
Figure 12F:
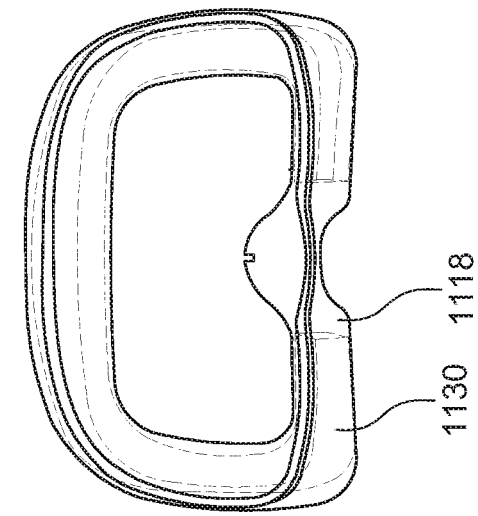

FIGS. 12F-12G show perspective views of an interfacing structure 1100 having a transparent face engaging flange 1118 to show a cushion 1130 within the face engaging flange 1118.

FIG. 12H shows the cushion 1130 of FIGS. 12E-12G in isolation in an in-use shape.

Figure 13A:
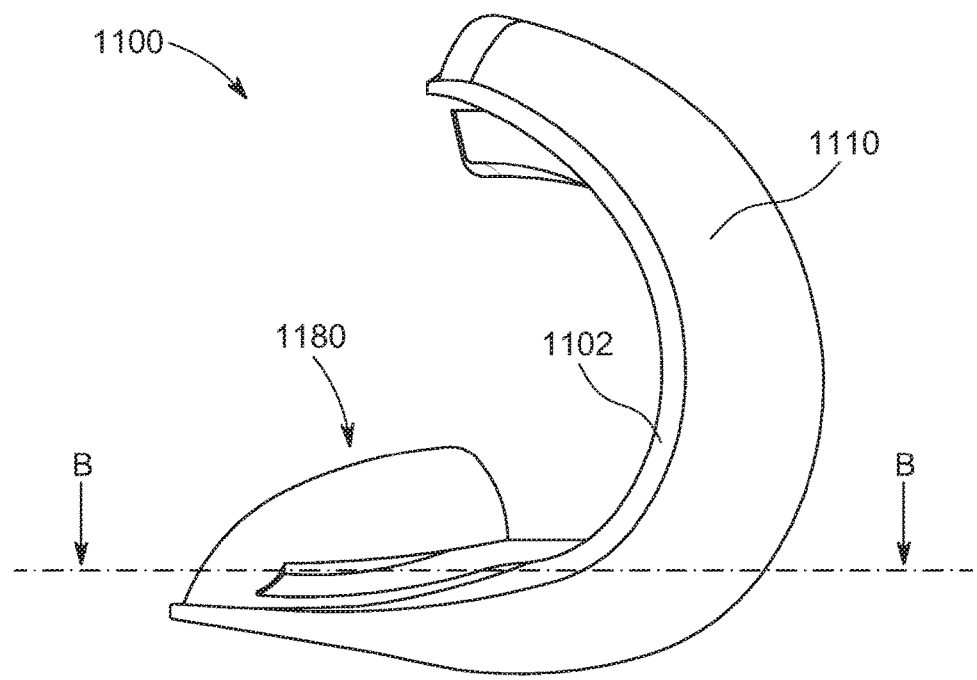
Figure 13B:
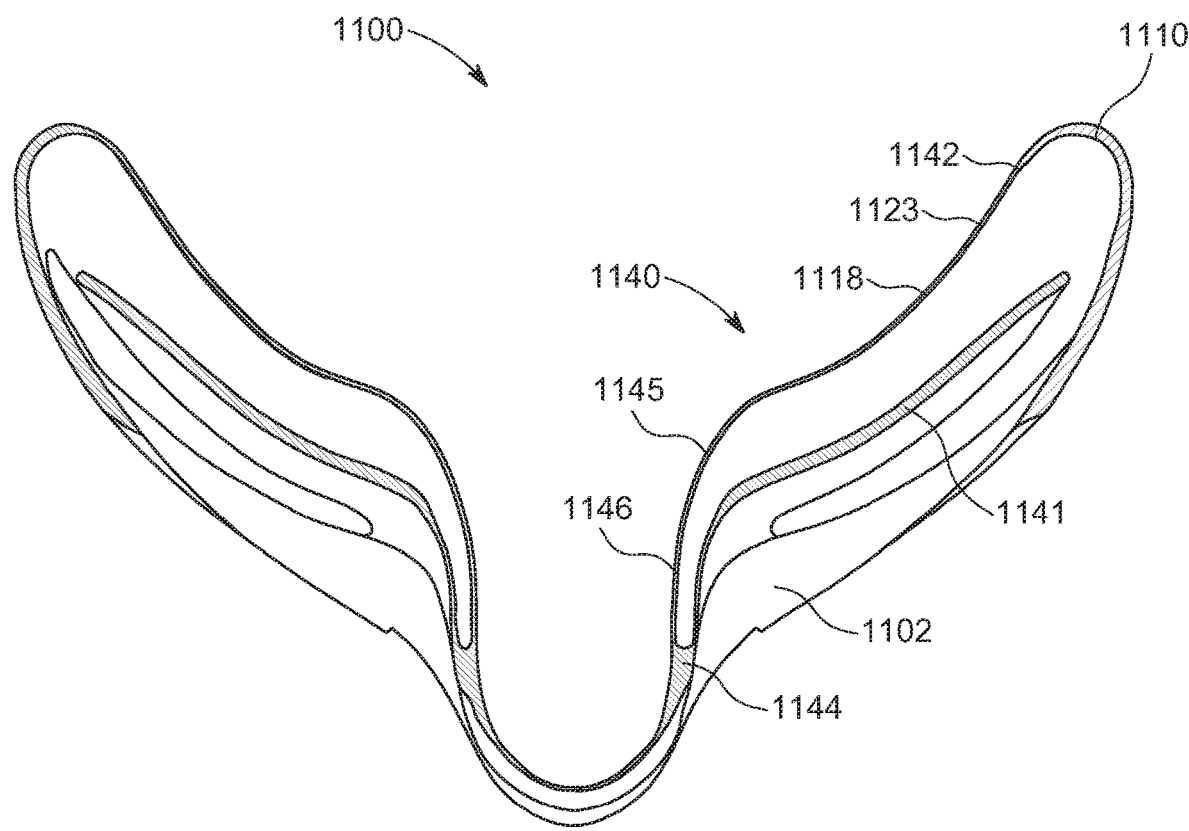

FIGS. 13A-13B show an interfacing structure according to a further example of the present technology, much or all of the nasal portion 1180 of the interfacing structure not being visible in FIG. 13B.

FIGS. 14A-14C show an interfacing structure according to a further example of the present technology.

FIGS. 15A-15G show an interfacing structure according to a further example of the present technology.

Figure 16:
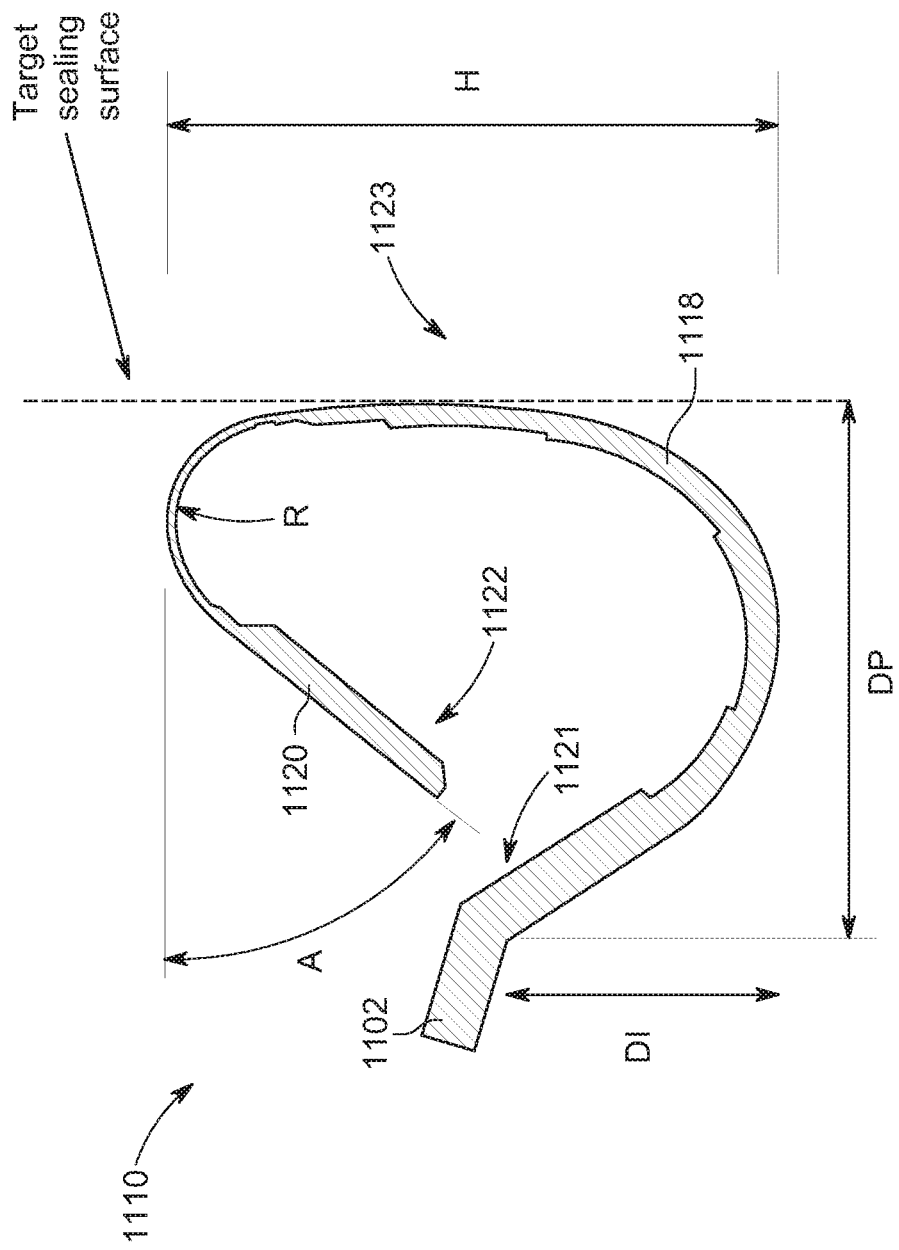

FIG. 16 is a cross section view of an interfacing structure according to a further example of the present technology.

Figure 17A:
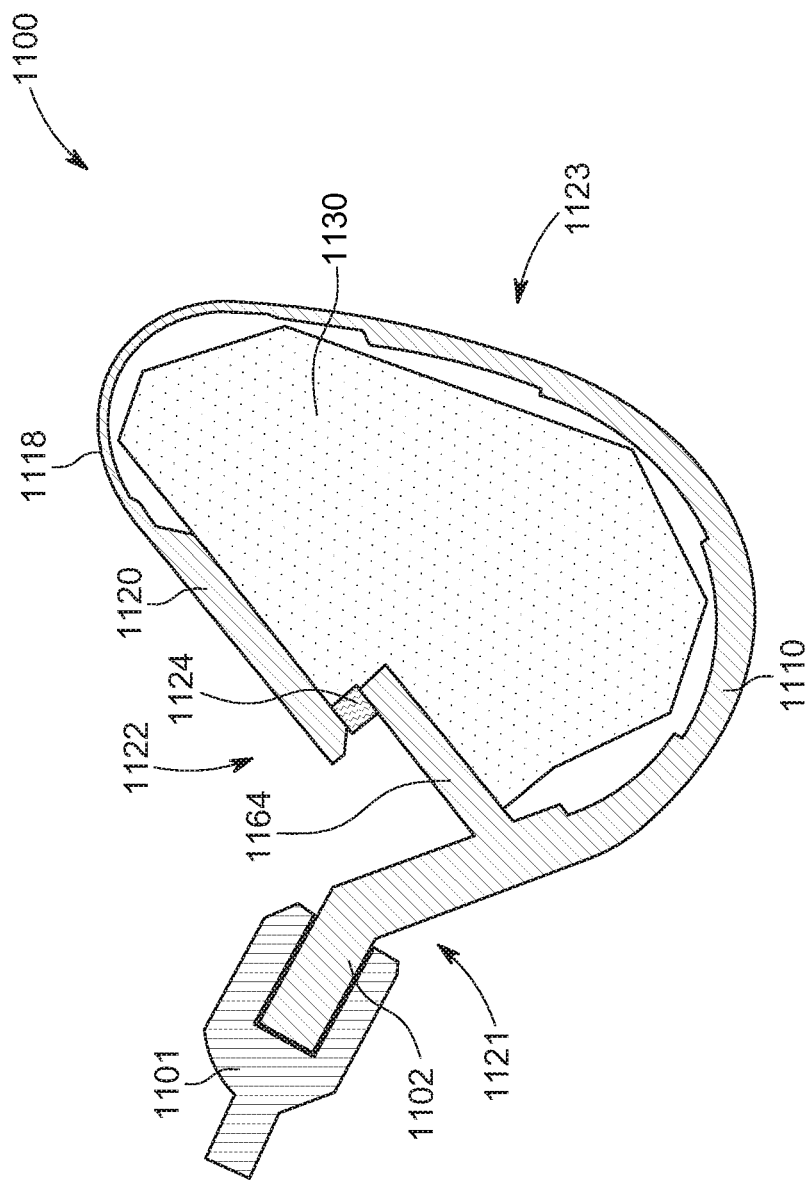
Figure 17C:
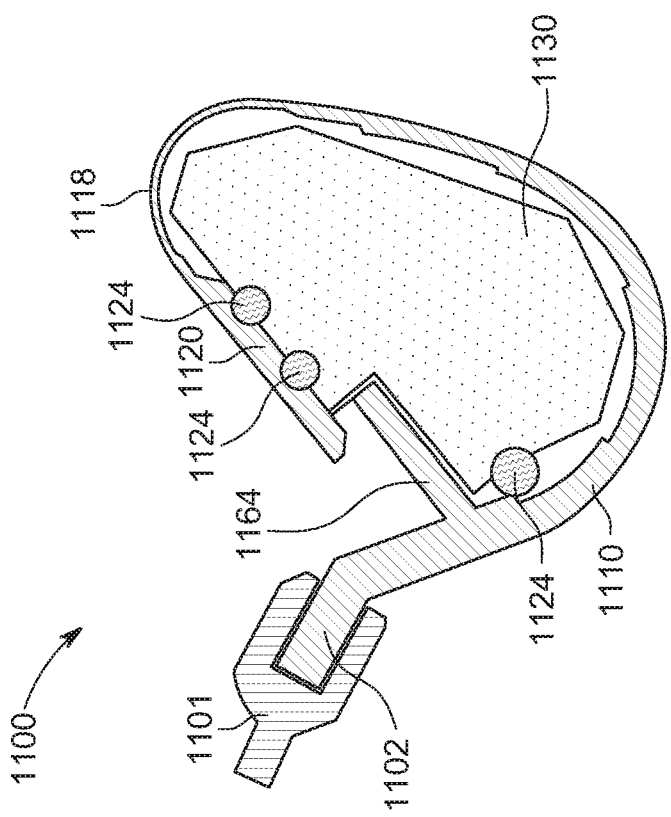
Figure 17B:
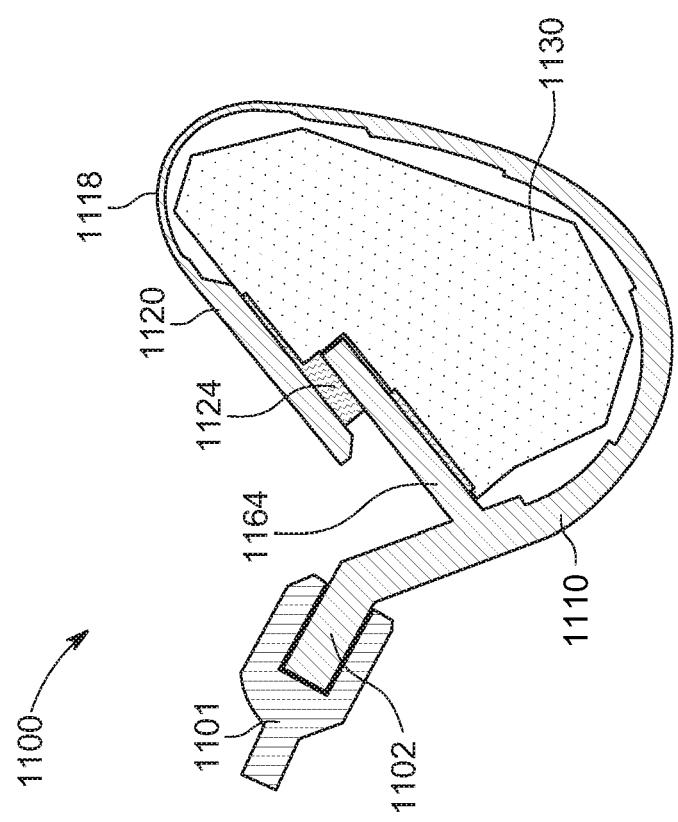

FIGS. 17A-17C are cross section views through interfacing structures according to further examples of the present technology.

FIGS. 17D-17J are views of an interfacing structure according to a further example of the present technology.

Figure 17E:
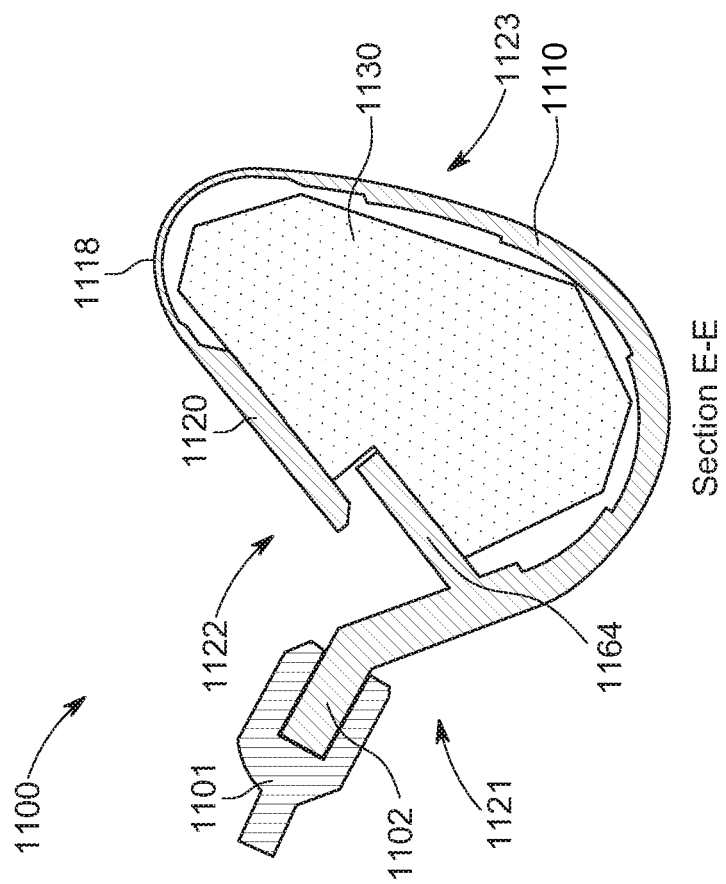
Figure 17D:
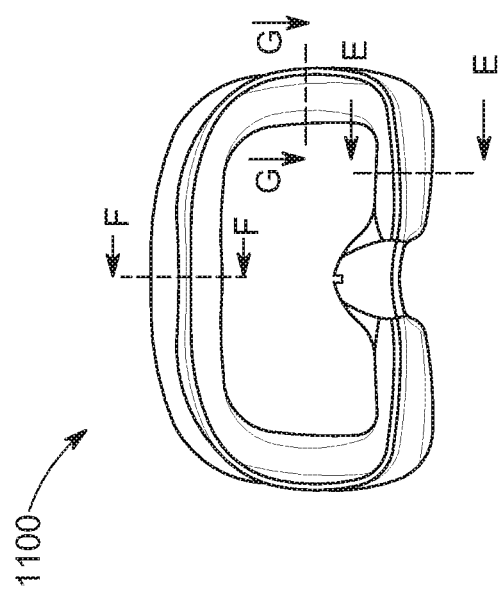
Figure 17I:
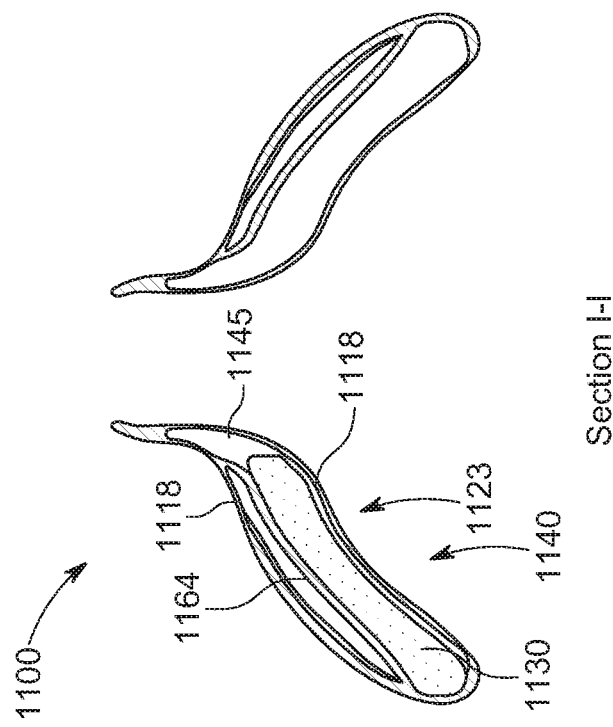
Figure 17H:
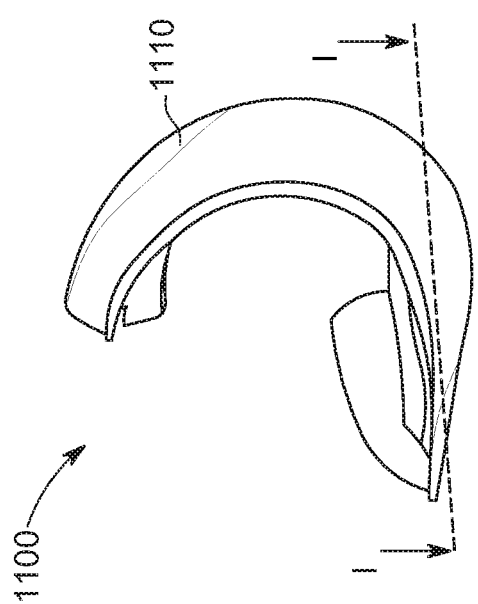
Figure 17L:
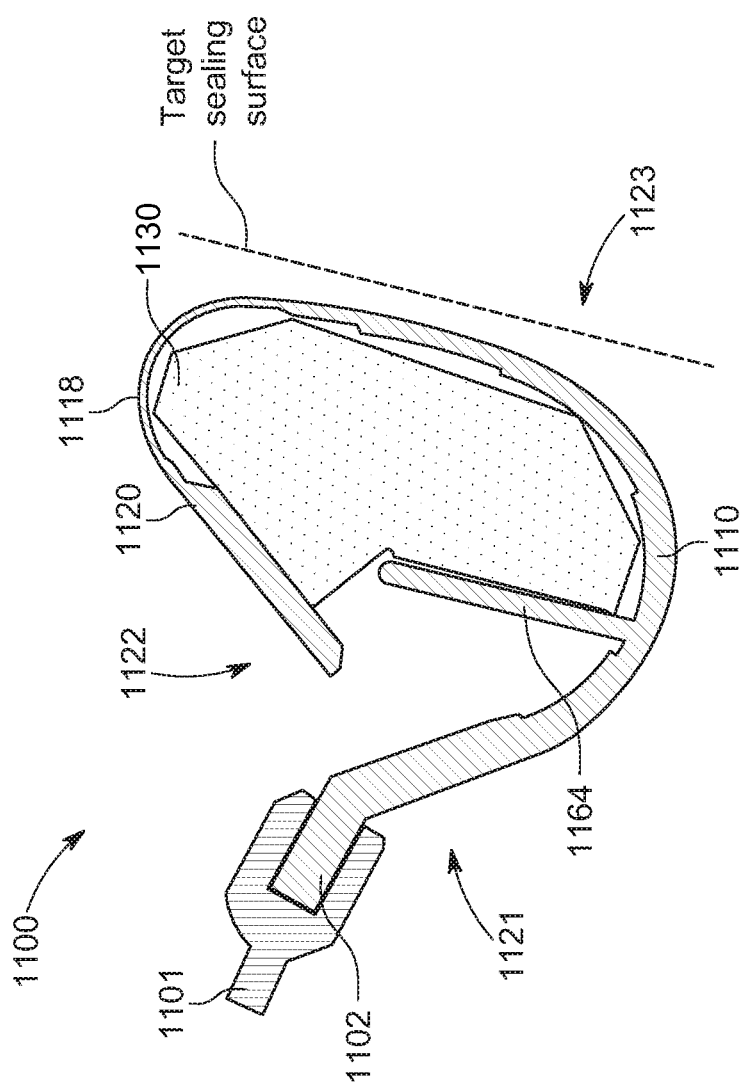

FIGS. 17K and 17L are cross section views through interfacing structures according to further examples of the present technology.

Figure 18A:
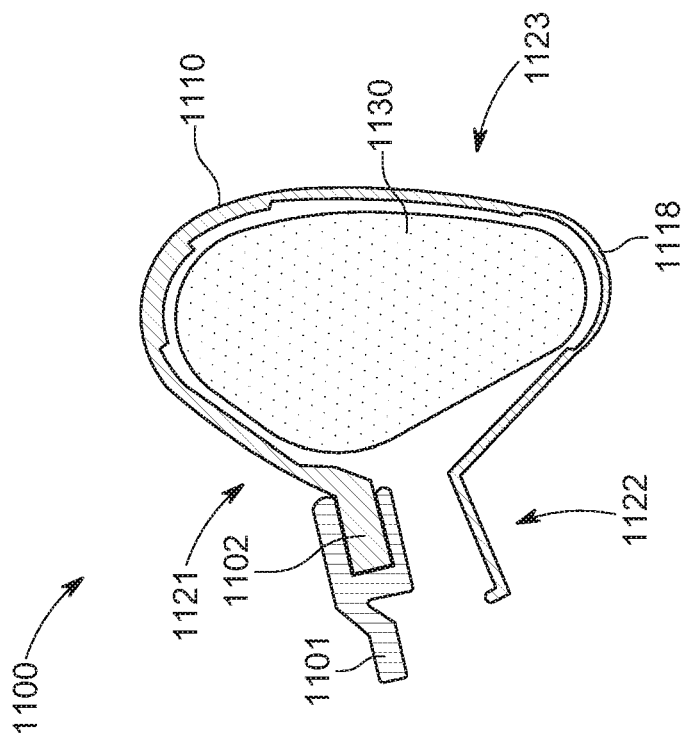
Figure 18B:
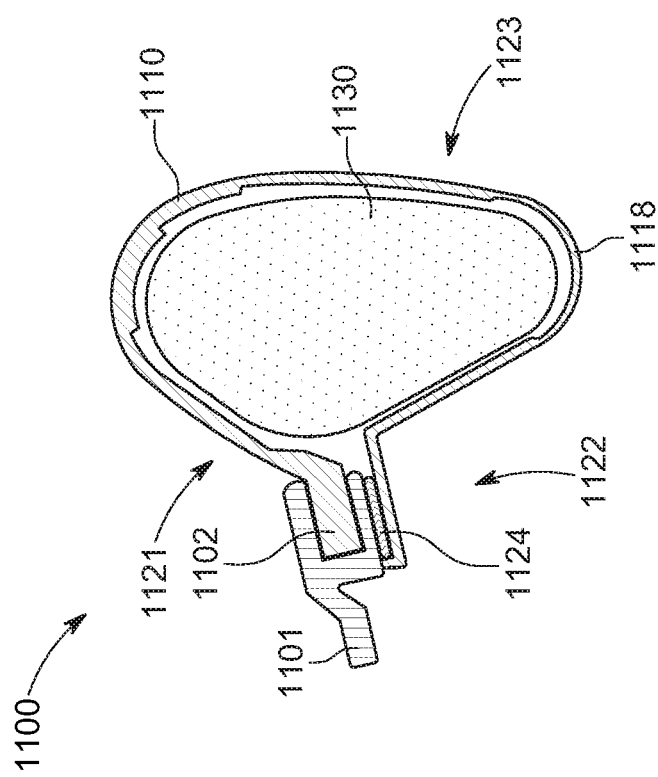

FIGS. 18A and 18B are cross section views of an interfacing structure according to a further example of the present technology.

FIGS. 18C and 18D are cross section views through interfacing structures according to further examples of the present technology.

Figure 18F:
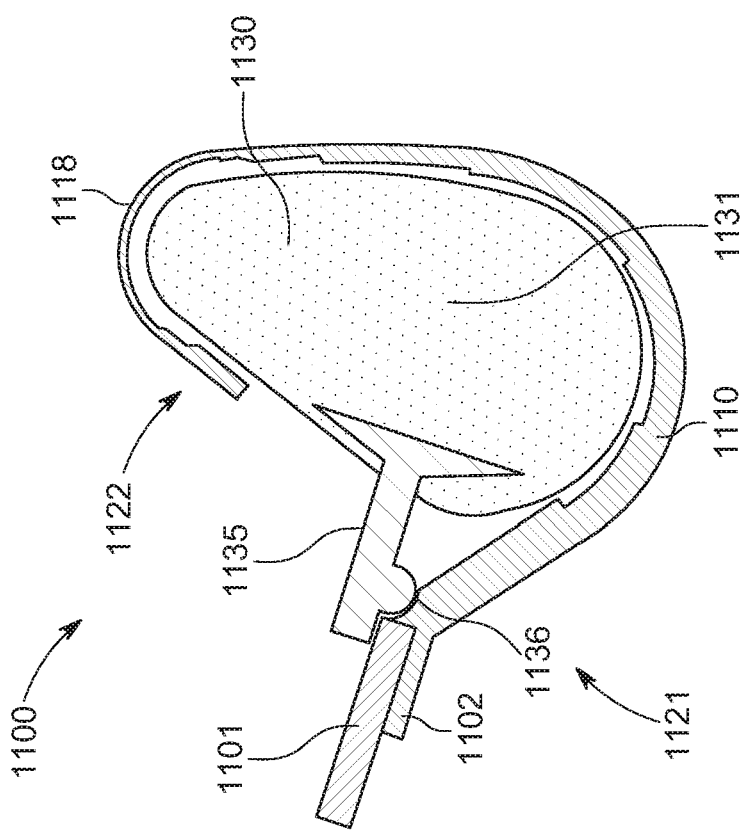
Figure 18E:
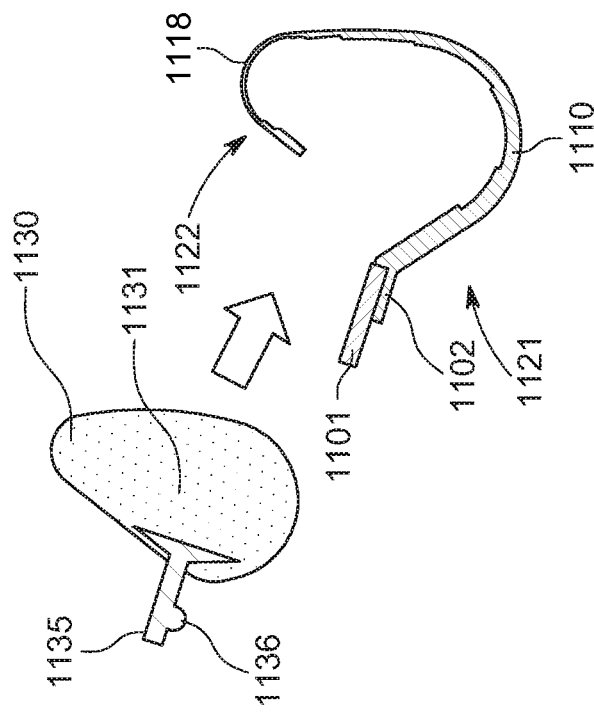

FIGS. 18E and 18F are, respectively, exploded and unexploded cross section views of an interfacing structure according to a further example of the present technology.

FIGS. 19A and 19B show cross section views of interfacing structure having cushions according to further examples of the present technology.

FIGS. 20A and 20B show front views of interfacing structures according to further examples of the present technology.

Figure 20E:
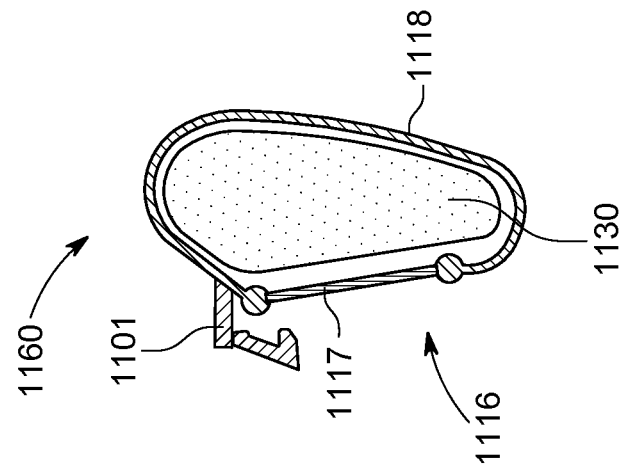
Figure 20D:
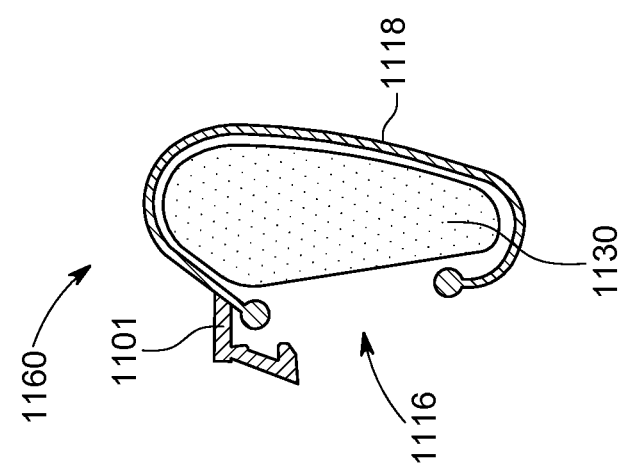
Figure 20C:
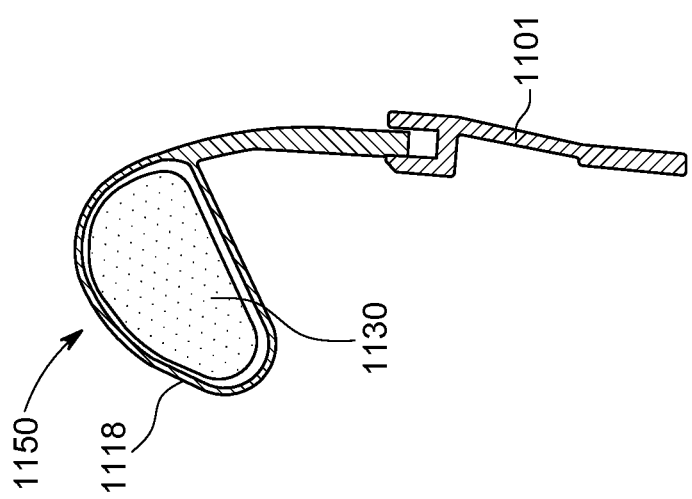

FIGS. 20C and 20D show cross section views through the interfacing structure of FIG. 20B.

FIG. 20E shows a cross section view through an interfacing structure according to a further example of the present technology, the cross section being at the same location as FIG. 20D.

FIGS. 21A-2C show cross section views of an interfacing structure according to a further example of the present technology.

5 DETAILED DESCRIPTION OF EXAMPLES OF THE TECHNOLOGY

Before the present technology is described in further detail, it is to be understood that the technology is not limited to the particular examples described herein, which may vary. It is also to be understood that the terminology used in this disclosure is for the purpose of describing only the particular examples discussed herein, and is not intended to be limiting.

The following description is provided in relation to various examples which may share one or more common characteristics and/or features. It is to be understood that one or more features of any one example may be combinable with one or more features of another example or other examples. In addition, any single feature or combination of features in any of the examples may constitute a further example.

In the following detailed description, reference is made to accompanying drawings which form a part of the detailed description. The illustrative embodiments described in the detailed description, depicted in the drawings and defined in the claims, are not intended to be limiting. Other embodiments may be utilised and other changes may be made without departing from the spirit or scope of the subject matter presented. It will be readily understood that the aspects of the present disclosure, as generally described herein and illustrated in the drawings can be arranged, substituted, combined, separated and designed in a wide variety of different configurations, all of which are contemplated in this disclosure.

5.1 Immersive Technologies

Immersive technologies may present a user with a combination of a virtual environment and the user's physical environment, or the real world. The user may interact with the resulting immersive or combined reality.

The device immerses the user by augmenting or replacing stimuli associated with one of the user's five senses with a virtual stimuli. Typically this is a virtual stimuli, although there could be additional stimuli that augment or replace stimuli associated with one of the additional four senses.

In some forms, a particular immersive technology may present a user with a combination of a virtual environment and the user's environment. At least a portion of the resulting environment may include a virtual environment. In some examples, the entire resulting environment may be a virtual environment (e.g., meaning the user's environment may be block from view or otherwise obstructed). In other forms, at least a portion of the user's physical environment may still be visually observable.

In some forms, the user may use different types of immersive technologies, which may include, but are not limited to, virtual reality (VR), augmented reality (AR), or mixed reality (MR). Each type of immersive technology may present the user with a different environment and/or a different way to interact with the environment.

In some forms, a display system may be used with each type of immersive technology. A display screen of the display system may provide a virtual environment component to the combination environment (i.e., the combination of the virtual and user's environments). In certain forms, the display screen may be an electronic screen.

In at least some types of immersive technologies (e.g., VR, AR, MR, etc.), positioning and stabilizing the electronic screen may be useful in operating a respective device. For example, the user may desire the electronic screen to be positioned close enough to their eyes to allow for easy viewing, but far enough away so as not to cause discomfort. Additionally, the electronic screen may need to be spaced far enough away so that users may simultaneously wear corrective lenses, like glasses. In addition, users may seek to maintain the orientation of the electronic screen relative to their eyes. In other words, users who walk, or otherwise move, while using these devices may not want the device to bounce or otherwise move on their head (e.g., particularly relative to their eyes), as this may cause dizziness and/or discomfort to the user. Therefore, these devices may be supported snuggly against the user's head in order to limit relative movement between the user's eyes and the device.

In one form, the present technology comprises a method for using a VR device comprising supporting the device on the user's head proximate to at least one of the user's eyes, and within the user's line of sight.

In certain examples of the present technology, a head-mounted display unit is supported in front of both of the user's eyes in order to block, obstruct, and/or limit ambient light from reaching the user's eyes.

Any features disclosed below in the context of a device configured for VR are to be understood as being applicable to devices configured for AR, unless the context clearly requires otherwise. Likewise features disclosed below in the context of a device configured for AR are to be understood as being applicable to devices configured for VR, unless the context clearly requires otherwise. For the avoidance of doubt, a feature disclosed in the context of a device that does not have a transparent display, through which the user can view the real world, is to be understood as being applicable to a device having such a transparent display unless the context clearly requires otherwise. Likewise a feature disclosed in the context of a device that has a transparent display, through which the real-world can be viewed, is to be understood to be applicable to a device in which the display is electronic and through which the real-world cannot be viewed directly through a transparent material.

5.2 Virtual Reality Display System

As shown in FIGS. 4A and 4B, a display apparatus, display system, display interface or head-mounted display system 1000 in accordance with one aspect of the present technology comprises the following functional aspects: an interfacing structure 1100, a head-mounted display unit 1200, and a positioning and stabilizing structure 1300. In some forms, a functional aspect may provide one or more physical components. In some forms, one or more physical components may provide one or more functional aspects. The head-mounted display unit 1200 may comprise a display. In use, the head-mounted display unit 1200 is arranged to be positioned proximate and anterior to the user's eyes, so as to allow the user to view the display.

In other aspects, the head-mounted display system 1000 may also include a display unit housing 1205, an optical lens 1240, a controller 1270, a speaker 1272, a power source 1274, and/or a control system 1276. In some examples, these may be integral pieces of the head-mounted display system 1000, while in other examples, these may be modular and incorporated into the head-mounted display system 1000 as desired by the user.

5.2.1 Head-Mounted Display Unit

The head-mounted display unit 1200 may include a structure for providing an observable output to a user. Specifically, the head-mounted display unit 1200 is arranged to be held (e.g., manually, by a positioning and stabilizing structure, etc.) in an operational position in front of a user's face.

In some examples, the head-mounted display unit 1200 may include a display screen 1220, a display unit housing 1205, an interfacing structure 1100, and/or an optical lens 1240. These components may be permanently assembled in a single head-mounted display unit 1200, or they may be separable and selectively connected by the user to form the head-mounted display unit 1200. Additionally, the display screen 1220, the display unit housing 1205, the interfacing structure 1100, and/or the optical lens 1240 may be included in the head-mounted display system 1000, but may not be part of the head-mounted display unit 1200.

5.2.1.1 Display Screen

Some forms of the head-mounted display unit 1200 include a display, for example a display screen—not shown in FIG. 4B, but provided within the display unit housing 1205. The display screen may include electrical components that provide an observable output to the user.

In one form of the present technology, a display screen provides an optical output observable by the user. The optical output allows the user to observe a virtual environment and/or a virtual object.

The display screen may be positioned proximate to the user's eyes, in order to allow the user to view the display screen. For example, the display screen may be positioned anterior to the user's eyes. The display screen can output computer generated images and/or a virtual environment.

In some forms, the display screen is an electronic display. The display screen may be a liquid crystal display (LCD), or a light emitting diode (LED) screen.

In certain forms, the display screen may include a backlight, which may assist in illuminating the display screen. This may be particularly beneficial when the display screen is viewed in a dark environment.

In some forms, the display screen may extend wider a distance between the user's pupils. The display screen may also be wider than a distance between the user's cheeks.

In some forms, the display screen may display at least one image that is observable by the user. For example, the display screen may display images that change based on predetermined conditions (e.g., passage of time, movement of the user, input from the user, etc.).

In certain forms, portions of the display screen may be visible to only one of the user's eyes. In other words, a portion of the display screen may be positioned proximate and anterior to only one of the user's eyes (e.g., the right eye), and is blocked from view from the other eye (e.g., the left eye).

In one example, the display screen may be divided into two sides (e.g., a left side and a right side), and may display two images at a time (e.g., one image on either side).

Each side of the display screen may display a similar image. In some examples, the images may be identical, while in other examples, the images may be slightly different.

Together, the two images on the display screen may form a binocular display, which may provide the user with a more realistic VR experience. In other words, the user's brain may process the two images from the display screen 1220 together as a single image. Providing two (e.g., un-identical) images may allow the user to view virtual objects on their periphery, and expand their field of view in the virtual environment.

In certain forms, the display screen may be positioned in order to be visible by both of the user's eyes. The display screen may output a single image at a time, which is viewable by both eyes. This may simplify the processing as compared to the multi-image display screen.

5.2.1.2 Display Housing

In some forms of the present technology as shown in FIGS. 4A and 4B, a display unit housing 1205 provides a support structure for the display screen, in order to maintain a position of at least some of the components of the display screen relative to one another, and may additionally protect the display screen and/or other components of the head-mounted display unit 1200. The display unit housing 1205 may be constructed from a material suitable to provide protection from impact forces to the display screen. The display unit housing 1205 may also contact the user's face, and may be constructed from a biocompatible material suitable for limiting irritation to the user.

A display unit housing 1205 in accordance with some forms of the present technology may be constructed from a hard, rigid or semi-rigid material, such as plastic.

In certain forms, the rigid or semi-rigid material may be at least partially covered with a soft and/or flexible material (e.g., a textile, silicone, etc.). This may improve biocompatibility and/or user comfort because the at least a portion of the display unit housing 1205 that the user engages (e.g., grabs with their hands) includes the soft and/or flexible material.

A display unit housing 1205 in accordance with other forms of the present technology may be constructed from a soft, flexible, resilient material, such as silicone rubber.

In some forms, the display unit housing 1205 may have a substantially rectangular or substantially elliptical profile. The display unit housing 1205 may have a three-dimensional shape with the substantially rectangular or substantially elliptical profile.

In certain forms, the display unit housing 1205 may include a superior face 1230, an inferior face 1232, a lateral left face 1234, a lateral right face 1236, and an anterior face 1238. The display screen 1220 may be held within the faces in use.

In certain forms, the superior face 1230 and the inferior face 1232 may have substantially the same shape.

In one form, the superior face 1230 and the inferior face 1232 may be substantially flat, and extend along parallel planes (e.g., substantially parallel to the Frankfort horizontal in use).

In certain forms, the lateral left face 1234 and the lateral right face 1236 may have substantially the same shape.

In one form, the lateral left face 1234 and the lateral right face 1236 may be curved and/or rounded between the superior and inferior faces 1230, 1232. The rounded and/or curved faces 1234, 1236 may be more comfortable for a user to grab and hold while donning and/or doffing the head-mounted display system 1000.

In certain forms, the anterior face 1238 may extend between the superior and inferior faces 1230, 1232. The anterior face 1238 may form the anterior most portion of the head-mounted display system 1000.

In one form, the anterior face 1238 may be a substantially planar surface, and may be substantially parallel to the coronal plane, while the head-mounted display system 1000 is worn by the user.

In one form, the anterior face 1238 may not have a corresponding opposite face (e.g., a posterior face) with substantially the same shape as the anterior face 1238. The posterior portion of the display unit housing 1205 may be at least partially open (e.g., recessed in the anterior direction) in order to receive the user's face.

In some forms, the display screen is permanently integrated into the head-mounted display system 1000. The display screen may be a device usable only as a part of the head-mounted display system 1000.

In some forms, the display unit housing 1205 may enclose the display screen, which may protect the display screen and/or limit user interference (e.g., moving and/or breaking) with the components of the display screen.

In certain forms, the display screen may be substantially sealed within the display unit housing 1205, in order to limit the collection of dirt or other debris on the surface of the display screen, which could negatively affect the user's ability to view an image output by the display screen. The user may not be required to break the seal and access the display screen, since the display screen is not removable from the display unit housing 1205.

In some forms, the display screen is removably integrated into the head-mounted display system 1000. The display screen may be a device usable independently of the head-mounted display system 1000 as a whole. For example, the display screen may be provided on a smart phone, or other portable electronic device.

In some forms, the display unit housing 1205 may include a compartment. A portion of the display screen may be removably receivable within the compartment. For example, the user may removably position the display screen in the compartment. This may be useful if the display screen performs additional functions outside of the head-mounted display unit 1200 (e.g., is a portable electronic device like a cell phone). Additionally, removing the display screen from the display unit housing 1205 may assist the user in cleaning and/or replacing the display screen.

Certain forms of the display housing include an opening to the compartment, allowing the user to more easily insert and remove the display screen from the compartment. The display screen may be retained within the compartment via a frictional engagement.

In certain forms, a cover may selectively cover the compartment, and may provide additional protection and/or security to the display screen 1220 while positioned within the compartment.

In certain forms, the compartment may open on the superior face. The display screen may be inserted into the compartment in a substantially vertical direction while the display interface is worn by the user.

5.2.1.3 Interfacing Structure

As shown in FIGS. 4A and 4B, some forms of the present technology include an interfacing structure 1100 is positioned and/or arranged in order to conform to a shape of a user's face, and may provide the user with added comfort while wearing and/or using the head-mounted display system 1000.

In some forms, the interfacing structure 1100 is coupled to a surface of the display unit housing 1205.

In some forms, the interfacing structure 1100 may extent at least partially around the display unit housing 1205, and may form a viewing opening. The viewing opening may at least partially receive the user's face in use. Specifically, the user's eyes may be received within the viewing opening formed by the interfacing structure 1100.

In some forms, the interfacing structure 1100 in accordance with the present technology may be constructed from a biocompatible material.

In some forms, the interfacing structure 1100 in accordance with the present technology may be constructed from a soft, flexible, and/or resilient material.

In certain forms, the interfacing structure 1100 in accordance with the present technology may be constructed from silicone rubber and/or foam.

In some forms, the interfacing structure 1100 may contact sensitive regions of the user's face, which may be locations of discomfort. The material forming the interfacing structure 1100 may cushion these sensitive regions, and limit user discomfort while wearing the head-mounted display system 1000.

In certain forms, these sensitive regions may include the user's forehead. Specifically, this may include the region of the user's head that is proximate to the frontal bone, like the Epicranius and/or the glabella. This region may be sensitive because there is limited natural cushioning from muscle and/or fat between the user's skin and the bone. Similarly, the ridge of the user's nose may also include little to no natural cushioning.

In some forms, the interfacing structure 1100 may comprise a single element. In some embodiments the interfacing structure 1100 may be designed for mass manufacture. For example, the interfacing structure 1100 may be designed to comfortably fit a wide range of different face shapes and sizes.

In some forms, the interfacing structure 1100 may include different elements that overlay different regions of the user's face. The different portions of the interfacing structure 1100 may be constructed from different materials, and provide the user with different textures and/or cushioning at different regions.

5.2.1.3.1 Light Shield

Some forms of the head-mounted display system 1000 may include a light shield that may be constructed from an opaque material and can block ambient light from reaching the user's eyes. The light shield may be part of the interfacing structure 1100 or may be a separate element. In some examples the interfacing structure 1100 may form a light shield by shielding the user's eyes from ambient light, in addition to providing a comfortable contacting portion for contact between the head-mounted display 1200 and the user's face. In some examples a light shield may be formed from multiple components working together to block ambient light.

In certain forms, the light shield can obstruct ambient light from reaching an eye region, which may be formed on regions of the Epicranius, the user's sphenoid, across the outer cheek region between the sphenoid to the left or right zygomatic arch, over the zygomatic arch, across the inner cheek region from the zygomatic arches towards the alar crests, and on the users' nasal ridge inferior to the sellion to enclose a portion of the users' face therebetween.

In one form, the light shield may not contact the user's face around its entire perimeter. For example, the light shield may be spaced from the user's nasal rigid. The width of this spacing may be substantially small, so as to substantially limit the ingress of ambient light. However, the user's nasal ridge may be sensitive and easily irritated. Thus, avoiding direct contact with the user's nasal ridge may improve user comfort while wearing the head-mounted display system 1000.

In certain forms, the light shield may be a portion of the display unit housing 1205, and may be integrally or removably coupled to the display unit housing 1205. In one form, if the display unit housing 1205 is usable with a display screen outputting AR or MR, and VR, the light shield may be removable from the display unit housing 1205, and only coupled to the display unit housing 1205 while using VR.

5.2.1.3.1.1 Seal-Forming Structure

As shown in FIG. 4D, in one form of the present technology, the interfacing structure 1100 acts as a seal-forming structure, and provides a target seal-forming region. The target seal-forming region is a region on the seal-forming structure where sealing may occur. The region where sealing actually occurs—the actual sealing surface—may change within a given session, from day to day, and from user to user, depending on a range of factors including but not limited to, where the display unit housing 1205 is placed on the face, tension in the positioning and stabilizing structure 1300, and/or the shape of a user's face.

In one form the target seal-forming region is located on an outside surface of the interfacing structure 1100.

In some forms, the light shield may form the seal-forming structure and seal against the user's face.

In certain forms, the entire perimeter of the light shield or interfacing structure 1100 may seal against the user's skin, and can block ambient light from reaching an eye region. The eye region may be formed on regions of the Epicranius, the user's sphenoid, across the outer cheek region between the sphenoid to the left or right zygomatic arch, over the zygomatic arch, across the inner cheek region from the zygomatic arches towards the alar crests, and on the users' nasal ridge inferior to the sellion to enclose a portion of the users' face therebetween.

When acting as a seal-forming structure, the light shield or interfacing structure 1100 may contact sensitive areas the user's face, like the user's nasal ridge. This contact may entirely prevent the ingress of ambient light. Sealing around the entire perimeter of the display unit housing 1205 may improve performance of the head-mounted display system 1000. Additionally, biocompatible materials may be selected so that direct contact with the user's nasal ridge does not significantly reduce user comfort while wearing the head-mounted display system 1000.

In certain forms of the present technology, a system is provided comprising more than one interfacing structure 1100, each being configured to correspond to a different size and/or shape range. For example the system may comprise one form of interfacing structure 1100 suitable for a large sized head, but not a small sized head and another suitable for a small sized head, but not a large sized head. The different interfacing structures 1100 may be removable and replaceable so that different users with different sized heads may use the same head-mounted display system 1000.

In some forms, the seal-forming structure may be formed on regions of the Epicranius, the user's sphenoid, across the outer cheek region between the sphenoid to the left or right zygomatic arch, over the zygomatic arch, across the inner cheek region from the zygomatic arches towards the alar crests, and on the users' nasal ridge inferior to the sellion to enclose a portion of the users' face therebetween. This defined region may be an eye region.

In certain forms, this may seal around the user's eyes. The seal created by the seal-forming structure or interfacing structure 1100 may create a light seal, in order to limit ambient light from reaching the user's eyes.

5.2.1.3.2 Material Biocompatibility

Biocompatible materials are considered to be materials that undergo a full evaluation of their biological responses, relevant to their safety in use, according to ISO 10993-1 standard. The evaluation considers the nature and duration of anticipated contact with human tissues when in-use. In some forms of the present technology, the materials utilised in the positioning and stabilizing structure and interfacing structure may undergo at least some of the following biocompatibility tests: Cytotoxicity—Elution Test (MeM Extract): ANSI/AAMI/ISO 10993-5; Skin Sensitisation: ISO 10993-10; Irritation: ISO 10993-10; Genotoxicity—Bacterial Mutagenicity Test: ISO 10993-3; Implantation: ISO 10993-6.

5.2.1.4 Optical Lenses

As shown in FIG. 4B, at least one lens 1240 may be disposed between the user's eyes and the display screen 1220. The user may view an image provided by the display screen 1220 through the lens 1240. The at least one lens 1240 may assist in spacing the display screen 1220 away from the user's face to limit eye strain. The at least one lens 1240 may also assist in better observing the image being displayed by the display screen 1220.

In some forms, the lenses 1240 are Fresnel lenses.

In some forms, the lens 1240 may have a substantially frustoconical shape. A wider end of the lens 1240 may be disposed proximate to the display screen 1220, and a narrower end of the lens 1240 may be disposed proximate to the user's eyes, in use.

In some forms, the lens 1240 may have a substantially cylindrical shape, and may have substantially the same width proximate to the display screen 1220, and proximate to the user's eyes, in use.

In some forms, the at least one lens 1240 may also magnify the image of the display screen 1220, in order to assist the user in viewing the image.

In some forms, the head-mounted display system 1000 includes two lenses 1240 (e.g., binocular display), one for each of the user's eyes. In other words, each of the user's eyes may look through a separate lens positioned anterior to the respective pupil. Each of the lenses 1240 may be identical, although in some examples, one lens 1240 may be different than the other lens 1240 (e.g., have a different magnification).

In certain forms, the display screen 1220 may output two images simultaneously. Each of the user's eyes may be able to see only one of the two images. The images may be displayed side-by-side on the display screen 1220. Each lens 1240 permits each eye to observe only the image proximate to the respective eye. The user may observe these two images together as a single image.

In some forms, the posterior perimeter of each lens 1240 may be approximately the size of the user's orbit. The posterior perimeter may be slightly larger than the size of the user's orbit in order to ensure that the user's entire eye can see into the respective lens 1240. For example, the outer edge of the each lens 1240 may be aligned with the user's frontal bone in the superior direction (e.g., proximate the user's eyebrow), and may be aligned with the user's maxilla in the inferior direction (e.g., proximate the outer cheek region).

The positioning and/or sizing of the lenses 1240 may allow the user to have approximately 360° of peripheral vision in the virtual environment, in order to closely simulate the physical environment.

In some forms, the head-mounted display system 1000 includes a single lens 1240 (e.g., monocular display). The lens 1240 may be positioned anterior to both eyes (e.g., so that both eyes view the image from the display screen 1220 through the lens 1240), or may be positioned anterior to only one eye (e.g., when the image from the displace screen 1220 is viewable by only one eye).

5.2.1.4.1 Lens Mounting

The lenses 1240 may be coupled to a spacer positioned proximate to the display screen 1220 (e.g., between the display screen 1220 and the interfacing structure 1100), so that the lenses 1240 are not in direct contact with the display screen 1220 (e.g., in order to limit the lenses 1240 from scratching the display screen 1220).

For example, the lenses 1240 may be recessed relative to the interfacing structure 1100 so that the lenses 1240 are disposed within the viewing opening. In use, each of the user's eyes are aligned with the respective lens 1240 while the user's face is received within the viewing opening (e.g., an operational position).

In some forms, the anterior perimeter of each lens 1240 may encompass approximately half of the display screen 1220. A substantially small gap may exist between the two lenses 1240 along a center line of the display screen 1220. This may allow a user looking through both lenses 1240 to be able to view substantially the entire display screen 1220, and all of the images being output to the user.

In certain forms, the center of the display screen 1220 (e.g., along the center line between the two lenses 1240) may not output an image. For example, in a binocular display (e.g., where each side of the display screen 1220 outputs substantially the same image), each image may be spaced apart on the display screen 1220. This may allow two lenses 1240 to be positioned in close proximity to the display screen 1220, while allowing the user to view the entirety of the image displayed on the display screen 1220.

In some forms, a protective layer 1242 may be formed around at least a portion of the lenses 1240. In use, the protective layer 1242 may be positioned between the user's face and the display screen 1220.

In some forms, a portion of each lens 1240 may project through the protective layer 1242 in the posterior direction. For example, the narrow end of each lens 1240 may project more posterior than the protective layer 1242 in use.

In some forms, the protective layer 1242 may be opaque so that light from the display screen 1220 is unable to pass through. Additionally, the user may be unable to view the display screen 1220 without looking through the lenses 1240.

In some forms, the protective layer 1242 may be non-planar, and may include contours that substantially match contours of the user's face. For example, a portion of the protective layer 1242 may be recessed in the anterior direction in order to accommodate the user's nose.

In certain forms, the user may not contact the protective layer 1242 while wearing the head-mounted display system 1000. This may assist in reducing irritation from additional contact with the user's face (e.g., against the sensitive nasal ridge region).

5.2.1.4.2 Corrective Lenses

In some examples, additional lenses may be coupled to the lenses 1240 so that the user looks through both the lens 1240 and the additional lens in order to view the image output by the display screen 1220.

In some forms, the additional lenses are more posterior than the lenses 1240, in use. Thus, the additional lenses are positioned closer to the user's eyes, and the user looks through the additional lenses before looking through the lenses 1240.

In some forms, the additional lenses may have a different magnification than the lenses 1240.

In some forms, the additional lenses, may be prescription strength lenses. The additional lenses may allow a user to view the display screen 1220 without glasses, which may be uncomfortable to wear while using the head-mounted display system 1000. The additional lenses may be removable so that users that do not require the additional lenses may still clearly view the display screen 1220.

5.2.2 Positioning and Stabilizing Structure

As shown in FIGS. 4A and 4B, the display screen 1220 and/or the display unit housing 1205 of the head-mounted display system 1000 of the present technology may be held in position in use by the positioning and stabilizing structure 1300.

To hold the display screen 1220 and/or the display unit housing 1205 in its correct operational position, the positioning and stabilizing structure 1300 is ideally comfortable against the user's head in order to accommodate the induced loading from the weight of the display unit in a manner that minimise facial markings and/or pain from prolonged use. There is also need to allow for a universal fit without trading off comfort, usability and cost of manufacture. The design criteria may include adjustability over a predetermined range with low-touch simple set up solutions that have a low dexterity threshold. Further considerations include catering for the dynamic environment in which the head-mounted display system 1000 may be used. As part of the immersive experience of a virtual environment, users may communicate, i.e. speak, while using the head-mounted display system 1000. In this way, the jaw or mandible of the user may move relative to other bones of the skull. Additionally, the whole head may move during the course of a period of use of the head-mounted display system 1000. For example, movement of a user's upper body, and in some cases lower body, and in particular, movement of the head relative to the upper and lower body.

In one form the positioning and stabilizing structure 1300 provides a retention force to overcome the effect of the gravitational force on the display screen 1220 and/or the display unit housing 1205.

In one form of the present technology, a positioning and stabilizing structure 1300 is provided that is configured in a manner consistent with being comfortably worn by a user. In one example the positioning and stabilizing structure 1300 has a low profile, or cross-sectional thickness, to reduce the perceived or actual bulk of the apparatus. In one example, the positioning and stabilizing structure 1300 comprises at least one strap having a rectangular cross-section. In one example the positioning and stabilizing structure 1300 comprises at least one flat strap.

In one form of the present technology, a positioning and stabilizing structure 1300 is provided that is configured so as not to be too large and bulky to prevent the user from comfortably moving their head from side to side.

In one form of the present technology, a positioning and stabilizing structure 1300 comprises a strap constructed from a laminate of a textile user-contacting layer, a foam inner layer and a textile outer layer. In one form, the foam is porous to allow moisture, (e.g., sweat), to pass through the strap. In one form, a skin contacting layer of the strap is formed from a material that helps wick moisture away from the user's face. In one form, the textile outer layer comprises loop material to engage with a hook material portion.

In certain forms of the present technology, a positioning and stabilizing structure 1300 comprises a strap that is extensible, e.g. resiliently extensible. For example the strap may be configured in use to be in tension, and to direct a force to draw the display screen 1220 and/or the display unit housing 1205 toward a portion of a user's face, particularly proximate to the user's eyes and in line with their field of vision. In an example the strap may be configured as a tie.

In one form of the present technology, the positioning and stabilizing structure 1300 comprises a first tie, the first tie being constructed and arranged so that in use at least a portion of an inferior edge thereof passes superior to an otobasion superior of the user's head and overlays a portion of a parietal bone without overlaying the occipital bone.

In one form of the present technology, the positioning and stabilizing structure 1300 includes a second tie, the second tie being constructed and arranged so that in use at least a portion of a superior edge thereof passes inferior to an otobasion inferior of the user's head and overlays or lies inferior to the occipital bone of the user's head.

In one form of the present technology, the positioning and stabilizing structure 1300 includes a third tie that is constructed and arranged to interconnect the first tie and the second tie to reduce a tendency of the first tie and the second tie to move apart from one another.

In certain forms of the present technology, a positioning and stabilizing structure 1300 comprises a strap that is bendable and e.g. non-rigid. An advantage of this aspect is that the strap is more comfortable against a user's head.

In certain forms of the present technology, a positioning and stabilizing structure 1300 comprises a strap constructed to be breathable to allow moisture vapour to be transmitted through the strap, In certain forms of the present technology, a system is provided comprising more than one positioning and stabilizing structure 1300, each being configured to provide a retaining force to correspond to a different size and/or shape range. For example the system may comprise one form of positioning and stabilizing structure 1300 suitable for a large sized head, but not a small sized head, and another, suitable for a small sized head, but not a large sized head.

In some forms, the positioning and stabilizing structure 1300 may include cushioning material (e.g., a foam pad) for contacting the user's skin. The cushioning material may provide added wearability to the positioning and stabilizing structure 1300, particularly if positioning and stabilizing structure 1300 is constructed from a rigid or semi-rigid material.

5.2.2.1 Temporal Connectors

As shown in FIG. 4C, some forms of the head-mounted display system 1000 or positioning and stabilizing structure 1300 include temporal connectors 1250 or arms, each of which may overlay a respective one of the user's temporal bones in use. A portion of the temporal connectors 1250, in-use, are in contact with a region of the user's head proximal to the otobasion superior, i.e. above each of the user's ears. In some examples, temporal connectors are strap portions of a positioning and stabilising structure 1300. In other examples, temporal connectors are arms of a head-mounted display unit 1200. In some examples a temporal connector of a head-mounted display system 1000 may be formed partially by a strap portion (e.g. a lateral strap portion 1330) of a positioning and stabilising structure 1300 and partially by an arm 1210 of a head-mounted display unit 1200.

The temporal connectors 1250 may be lateral portions of the positioning and stabilizing structure 1300, as each temporal connector 1250 is positioned on either the left or the right side of the user's head.

In some forms, the temporal connectors 1250 may extend in an anterior-posterior direction, and may be substantially parallel to the sagittal plane.

In some forms, the temporal connectors 1250 may be coupled to the display unit housing 1205. For example, the temporal connectors 1250 may be connected to lateral sides of the display unit housing 1205. For example, each temporal connector 1250 may be coupled to a respective one of the lateral left face 1234 and the lateral right face 1236.

In certain forms, the temporal connectors 1250 may be pivotally connected to the display unit housing 1205, and may provide relative rotation between each temporal connector 1250, and the display unit housing 1205.

In certain forms, the temporal connectors 1250 may be removably connected to the display unit housing 1205 (e.g., via a magnet, a mechanical fastener, hook and loop material, etc.).

In some forms, the temporal connectors 1250 may be arranged in-use to run generally along or parallel to the Frankfort Horizontal plane of the head and superior to the zygomatic bone (e.g., above the user's cheek bone).

In some forms, the temporal connectors 1250 may be positioned against the user's head similar to arms of eyeglasses, and be positioned more superior than the anti-helix of each respective ear.

In some forms, the temporal connectors 1250 may have a generally elongate and flat configuration. In other words, each temporal connector 1250 is far longer and wider (direction from top to bottom in the paper plane) than thick (direction into the paper plane).

In some forms, the temporal connectors 1250 may each have a three-dimensional shape which has curvature in all three axes (X, Y and Z). Although the thickness of each temporal connector 1250 may be substantially uniform, its height varies throughout its length. The purpose of the shape and dimension of each temporal connector 1250 is to conform closely to the head of the user in order to remain unobtrusive and maintain a low profile (e.g., not appear overly bulky).

In some forms, the temporal connectors 1250 may be constructed from a rigid or semi-rigid material, which may include plastic, hytrel (thermoplastic polyester elastomer), or another similar material. The rigid or semi-rigid material may be self-supporting and/or able to hold its shape without being worn. This can make it more intuitive or obvious for users to understand how to use the positioning and stabilizing structure 1300 and may contrast with a positioning and stabilizing structure 1300 that is entirely floppy and does not retain a shape. Maintaining the temporal connectors 1250 in the in-use state prior to use may prevent or limit distortion whilst the user is donning the positioning and stabilizing structure 1300 and allow a user to quickly fit or wear the head-mounted display system 1000.

In certain forms, the temporal connectors 1250 may be rigidizers, which may allow for a more effective (e.g., direct) translation of tension through the temporal connectors 1250 because rigidizers limit the magnitude of elongation or deformation of the arm while in-use.

In certain forms, the temporal connectors 1250 may be at least partially flexible in one direction and may be more rigid in another direction. A user may be able to bend or flex the temporal connector more in one direction than in another direction. For example, the temporal connectors 1250 may be at least partially flexible along an axis substantially parallel to the user's sagittal plane (e.g., in the superior-inferior direction while in use). This may allow the temporal connectors 1250 to conform to the shape of the user's head by moving in lateral directions toward or away from the user's head. The user also may be able to make multiple adjustments along the length of the temporal connectors 1250 to correspond to a variety of structures along the user's head. However, bending along an axis substantially parallel to the user's coronal plane (e.g., extending in the lateral direction in use) may be more difficult. The temporal connectors 1250 may resist bending in the superior-inferior direction.

In certain forms, the positioning and stabilizing structure 1300 may be designed so that the positioning and stabilizing structure 1300 springs 'out of the box' and generally into its in-use configuration. In addition, the positioning and stabilizing structure 1300 may be arranged to hold its in-use shape once out of the box (e.g., because rigidizers may be formed to maintain the shape of some or part of the positioning and stabilizing structure 1300). Advantageously, the orientation of the positioning and stabilizing structure 1300 is made clear to the user as the shape of the positioning and stabilizing structure 1300 is generally curved much like the rear portion of the user's head. That is, the positioning and stabilizing structure 1300 is generally dome shaped.

In certain forms, a flexible and/or resilient material may be disposed around the rigid or semi-rigid material of the temporal connectors 1250. The flexible material may be more comfortable against the user's head, in order to improve wearability and provide soft contact with the user's face. In one form, the flexible material is a textile sleeve at is permanently or removably coupled to each temporal connector 1250.

In one form, a textile may be over-moulded onto at least one side of the rigidizer. In one form, the rigidizer may be formed separately to the resilient component and then a sock of user contacting material (e.g., Breath-O-Prene™) may be wrapped or slid over the rigidizer. In alternative forms, the user contacting material may be provided to the rigidizer by adhesive, ultrasonic welding, sewing, hook and loop material, and/or stud connectors.

In some forms, the user contacting material may be on both sides of the rigidizer, or alternatively may only be on the user contacting side (e.g., the user contacting side) of the rigidizer to reduce bulk and cost of materials.

In some forms, the temporal connectors 1250 are constructed from a flexible material (e.g., a textile), which may be comfortable against the user's skin, and may not require an added layer to increase comfort.

5.2.2.2 Posterior Support Portion

As shown in FIG. 4C, some forms of the positioning and stabilizing structure 1300 may include a posterior support portion 1350 for assisting in supporting the display screen 1220 and/or the display unit housing 1205 (shown in FIG. 4B) proximate to the user's eyes. The posterior support portion 1350 may assist in anchoring the display screen and/or the display unit housing 1205 to the user's head in order to appropriately orient the display screen proximate to the user's eyes.

In some forms, the posterior support portion 1350 may be coupled to the display unit housing 1205 via the temporal connectors 1250.

In certain forms, the temporal connectors 1250 may be directly coupled to the display unit housing 1205 and to the posterior support portion 1350.

In some forms, the posterior support portion 1350 may have a three-dimensional contour curve to fit to the shape of a user's head. For example, the three-dimensional shape of the posterior support portion 1350 may have a generally round three-dimensional shape adapted to overlay a portion of the parietal bone and the occipital bone of the user's head, in use.

In certain forms, the posterior support portion 1350 may include a superior section 1310 and an inferior section 1320. The superior section 1310 and the inferior section 1320 may be continuous and form a round shape (e.g., circular, elliptical, etc.) of the posterior support portion.

In certain forms, the posterior support portion 1350 may be at least partially rigidized so that the round shape may be maintained even when not worn by the user. This may help the user don the posterior support portion 1350 as the rigidity may limit tangling.

In one form, the rigidity may provide "springiness" to the posterior support portion 1350. For example, the posterior support portion 1350 may "spring-to-life" after being compressed. In other words, the posterior support portion 1350 may be flexible enough to be folded but once a force is removed, the posterior support portion 1350 returns to its original shape (e.g., the three-dimensional round shape).

In some forms, the posterior support portion 1350 may be a posterior portion of the positioning and stabilizing structure 1300. The posterior support portion 1350 may provide an anchoring force directed at least partially in the anterior direction.

In certain forms, the inferior section 1320 of the posterior support portion 1350 is the inferior-most portion of the positioning and stabilizing structure 1300. For example, the posterior support portion 1350 may contact a region of the user's head between the occipital bone and the trapezius muscle. The posterior support portion 1350 may hook against an inferior edge of the occipital bone (e.g., the occiput). The posterior support portion 1350 may provide a force directed in the superior direction and/or the anterior direction in order to maintain contact with the user's occiput.

In certain forms, inferior section 1320 of the posterior support portion 1350 is the inferior-most portion of the entire head-mounted display system 1000. For example, the posterior support portion 1350 may be positioned at the base of the user's neck (e.g., overlaying the occipital bone and the trapezius muscle more inferior than the user's eyes) so that the posterior support portion 1350 is more inferior than the display screen 1220 and/or the display unit housing 1205.

In certain forms, the superior section 1310 may overlay the parietal bones when in contact with the user's head. The round shape of the posterior support portion 1350 may allow the posterior support portion 1350 to sit substantially flat on the user's head while the inferior section 1320 contacts the user's head as described above.

In some forms, the posterior support portion 1350 may include a padded material, which may contact the user's head (e.g., overlaying the region between the occipital bone and the trapezius muscle). The padded material may provide additional comfort to the user, and limit marks caused by the posterior support portion 1350 pulling against the user's head.

In certain forms, the posterior support portion 1350 may be constructed from a textile material and/or a foam material. The materials may be biocompatible and comfortable to a user's head.

In one form, the posterior support portion 1350 may be constructed from a foam material that is at least partially covered by a fabric material. The outer fabric material may provide the comfortable feeling for the user's skin. The inner foam layer may allow the posterior support portion 1350 to compress and improve comfort.

5.2.2.3 Forehead Support

Some forms of the positioning and stabilizing structure 1300 may include a forehead support or frontal support portion 1360 configured to contact the user's head superior to the user's eyes, while in use. The positioning and stabilising structure 1300 shown in FIG. 5B includes a forehead support 1360. In some examples the positioning and stabilising structure 1300 shown in FIG. 4A may include a forehead support 1360. The forehead support 1360 may overlay the frontal bone of the user's head. In certain forms, the forehead support 1360 may also be more superior than the sphenoid bones and/or the temporal bones. This may also position the forehead support 1360 more superior than the user's eyebrows.

In some forms, the forehead support 1360 may be an anterior portion of the positioning and stabilizing structure 1300, and may be disposed more anterior on the user's head than any other portion of the positioning and stabilizing structure 1300. The posterior support portion 1350 may provide a force directed at least partially in the posterior direction.

In some forms, the forehead support 1360 may include a cushioning material (e.g., textile, foam, silicone, etc.) that may contact the user, and may help to limit marks caused by the straps of the positioning and stabilizing structure 1300. The forehead support 1360 and the interfacing structure 1100 may work together in order to provide comfort to the user.

In some forms, the forehead support 1360 may be separate from the display unit housing 1205, and may contact the user's head at a different location (e.g., more superior) than the display unit housing 1205.

In some forms, the forehead support 1360 can be adjusted to allow the positioning and stabilizing structure 1300 to accommodate the shape and/or configuration of a user's face.

In some forms, the temporal connectors 1250 may be coupled to the forehead support 1360 (e.g., on lateral sides of the forehead support 1360). The temporal connectors 1250 may extend at least partially in the inferior direction in order to couple to the posterior support portion 1350.

In certain forms, the positioning and stabilizing structure 1300 may include multiple pairs of temporal connectors 1250. For example, one pair of temporal connectors 1250 may be coupled to the forehead support 1360, and one pair of temporal connectors 1250 may be coupled to the display unit housing 1205.

In some forms, the forehead support 1360 can be presented at an angle which is generally parallel to the user's forehead to provide improved comfort to the user. For example, the forehead support 1360 may position the user in an orientation that overlays the frontal bone, and is substantially parallel to the coronal plane. Positioning the forehead support substantially parallel to the coronal plane can reduce the likelihood of pressure sores which may result from an uneven presentation.

In some forms, the forehead support 1360 may be offset from a rear support or posterior support portion that contacts a posterior region of the user's head (e.g., an area overlaying the occipital bone and the trapezius muscle). In other words, an axis along a rear strap would not intersect the forehead support 1360, which may be disposed more inferior and anterior than the axis along the rear strap. The resulting offset between the forehead support 1360 and the rear strap may create moments that oppose the weight force of the display screen 1220 and/or the display unit housing 1205. A larger offset may create a larger moment, and therefore more assistance in maintaining a proper position of the display screen 1220 and/or the display unit housing 1205. The offset may be increased by moving the forehead support 1360 closer to the user's eyes (e.g., more anterior and inferior along the user's head), and/or increasing the angle of the rear strap so that it is more vertical.

In some forms, the forehead support 1360 may be constructed from a compressible material, which may offer support for the user when in use.

In certain forms, the forehead support 1360 may be constructed from silicone, foam, and/or textile. For example, a textile may be used in combination with either the silicone or the foam, although any of the materials may be used independently. When used together, the textile may be an outer layer of the forehead support 1360 and may contact the user's head. The foam and/or silicone may be an inner layer that compresses when the forehead support 1360 is under tension on the user's head.

5.2.2.4 Adjustable Straps

As shown in FIG. 4C, portions of the positioning and stabilizing structure 1300 may be adjustable, in order to impart a selective tensile force on the display screen 1220 and/or the display unit housing 1205 in order to secure a position of the display screen 1220 and/or the display unit housing 1205.

In some forms, the display unit housing 1205 may include at least one loop or eyelet 1254 (as shown in FIG. 4B), and at least one of the temporal connectors 1250 may be threaded through that loop, and doubled back on itself. The length of the temporal connector 1250 threaded through the respective eyelet 1254 may be selected by the user in order to adjust the tensile force provided by the positioning and stabilizing structure 1300. For example, threading a greater length of the temporal connector 1250 through the eyelet 1254 may supply a greater tensile force.

In some forms, at least one of the temporal connectors 1250 may include an adjustment portion 1256 and a receiving portion 1258 (as shown in FIG. 4C). The adjustment portion 1256 may be positioned through the eyelet 1254 on the display unit housing 1205, and may be coupled to the receiving portion 1258 (e.g., by doubling back on itself). The adjustment portion 1256 may include a hook material, and the receiving portion 1258 may include a loop material (or vice versa), so that the adjustment portion 1256 may be removably held in the desired position. In some examples, the hook material and the loop material may be Velcro.

In certain forms, adjusting the position of the adjustment portion 1256 relative to the receiving portion 1258 may apply a posterior force to the display screen 1220 and/or the display unit housing 1205, and increase or decrease a sealing force of the light shield against the user's head (e.g., when the light shield acts as a seal-forming structure).

In certain forms, the adjustment portion 1256 may be constructed from a flexible and/or resilient material, which may conform to a shape of the user's head and/or may allow the adjustment portion to be threaded through the eyelet 1254. For example, the adjustment portion(s) 1256 may be constructed from an elastic textile, which may provide an elastic, tensile force. The remainder of the temporal connectors 1250 may be constructed from the rigid or semi-rigid material described above (although it is contemplated that additional sections of the temporal connectors 1250 may also be constructed from a flexible material).

5.2.2.4.1 Top Strap

Figure 1A:
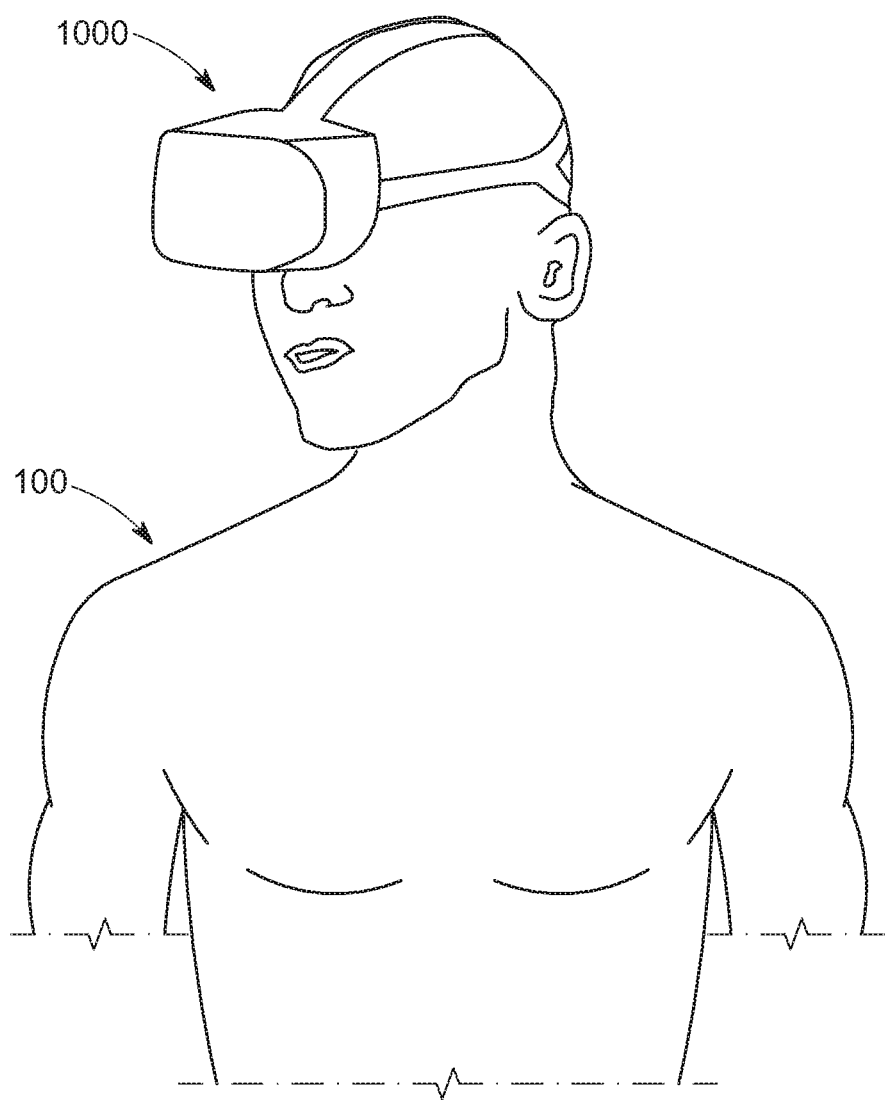
FIG. 1A shows a system including a user 100 wearing a head-mounted display system 1000, in the form of a face-mounted, virtual reality (VR) headset, displaying various images to the user 100. The user is standing while wearing the head-mounted display system 1000.

In some forms, the positioning and stabilizing structure 1300 may include a top strap portion, which may overlay a superior region of the user's head. The head-mounted display system 1000 shown in FIG. 1A has a top strap portion, for example.

In some forms, the top strap portion may extend between an anterior portion of the head-mounted display system 1000 and a posterior region of the head-mounted display system 1000.

In some forms, the top strap portion may be constructed from a flexible material, and may be configured to compliment the shape of the user's head.

In certain forms, the top strap portion may be connected to the display unit housing 1205. For example, the top strap portion may be coupled to the superior face 1230. The top strap portion may also be coupled to the display unit housing 1205 proximate to a posterior end of the display unit housing 1205.

In certain forms, the top strap portion may be coupled to the forehead support 1360. For example, the top strap portion may be coupled to the forehead support 1360 proximate to a superior edge. The top strap portion may be connected to the display unit housing 1205 through the forehead support 1360.

In some forms, the top strap portion may be connected to the posterior support portion 1350. For example, the top strap portion may be connected proximate to a superior edge of the posterior support portion 1350.

In some forms, the top strap portion may overlay the frontal bone and the parietal bone of the user's head.

In certain forms, the top strap portion may extend along the sagittal plane as it extends between the anterior and posterior portions of the head-mounted display system 1000.

In certain forms, the top strap portion may apply a tensile force oriented at least partially in the superior direction, which may oppose the force of gravity.

In certain forms, the top strap portion may apply a tensile force oriented at least partially in the posterior direction, which may pull the interfacing structure 1100 toward the user's face (and supply a portion of the sealing force when the light shield acts as a seal-forming structure).

In some forms, the top strap portion may be adjustable in order to impart a selective tensile force on the display screen 1220 and/or the display unit housing 1205 in order to secure a position of the display screen 1220 and/or the display unit housing 1205.

In certain forms, the display unit housing 1205 and/or the forehead support 1360 (as the case may be) may include at least one loop or eyelet 1254, and the top strap portion may be threaded through that eyelet 1254, and doubled back on itself. The length of the top strap portion threaded through the eyelet 1254 may be selected by the user in order to adjust the tensile force provided by the positioning and stabilizing structure 1300. For example, threading a greater length of the top strap portion through the eyelet 1254 may supply a greater tensile force.

In some forms, the top strap portion may include an adjustment portion and a receiving portion. The adjustment portion may be positioned through the eyelet 1254, and may be coupled to the receiving portion (e.g., by doubling back on itself). The adjustment portion may include a hook material, and the receiving portion may include a loop material (or vice versa), so that the adjustment portion may be removably held in the desired position. In some examples, the hook material and the loop material may be Velcro.

5.2.2.5 Rotational Control

In some forms, the display unit housing 1205 and/or the display screen 1220 may pivot relative to the user's face while the user has donned the positioning and stabilizing structure. This may allow the user to see the physical environment while still wearing the user interface 1000. This may be useful for users who want to take a break for viewing the virtual environment, but do not wish to doff the positioning and stabilizing structure 1300.

As illustrated in FIG. 5A, some forms of the user interface 1000 may include a pivot and/or flexible connection 1260 formed between ends of the arms 1210 and the posterior support portion 1350. The arms 1210 may pivot and/or flex with the display unit housing 1205 relative to the posterior support portion 1350.

In certain forms, a forehead support 1360 (see e.g., FIG. 5B) may provide a stop for the display unit housing 1205 and limit further rotation.

In certain forms, the thickness of the forehead support 1360 may be less than the distance between the posterior surface of the display unit housing 1205 and the user's head. The display unit housing may therefore freely rotate over the forehead support 1360 with limited to no interference.

In one form, the display unit housing 1205 may rotate about 90° between an operative position and a non-operative position. For example, FIG. 5B illustrates the operative position and a user may rotate the display unit housing up to about 90° (e.g., so that the display unit housing 1205 is disposed on top of the user's head).

In some forms, a pivot connection 1260 may be formed between a superior portion of the display unit housing 1205 and the positioning and stabilizing structure 1300. For example, the pivot connection 1260 may be formed on the superior face 1230 of the display unit housing 1205 (see e.g., FIG. 4A).

In certain forms, the pivot and/or flexible connection 1260 may allow the interfacing structure 1100 to remain in place while the display unit housing pivots out of the operative position.

In certain forms, the pivot connection 1260 may be coupled to the forehead support 1360. The display unit housing 1205 may be able to pivot about an inferior edge of the forehead support 1360.

In one form, the temporal connectors 1250 may be coupled to the forehead support 1360 in order to allow the display unit housing 1205 to pivot.

In some forms, the pivot connection 1260 may be a ratchet connection, and may maintain the display unit housing 1205 in a raised position without additional user intervention.

In some forms, the pivot and/or flexible connection 1260 may be rotatable through an infinite number of positions. The pivot connection 1260 may include a lock (e.g., a push button) that selectively holds the display unit housing 1205 in one or more desired positions (e.g., 2-5 settings).

5.2.3 Controller

As shown in FIG. 6, some forms of the head-mounted display system 1000 include a controller 1270 that can be engageable by the user in order to provide user input to the virtual environment and/or to control the operation of the head-mounted display system 1000. The controller 1270 can be connected to the head-mounted display unit 1200, and provide the user the ability to interact with virtual objects output to the user from the head-mounted display unit 1200.

5.2.3.1 Handheld Controller

In some forms, the controller 1270 may include a handheld device, and may be easily grasped by a user with a single hand.

In certain forms, the head-mounted display system 1000 may include two handheld controllers. The handheld controllers may be substantially identical to one another, and each handheld controller may be actuatable by a respective one of the user's hands.

In some forms, the user may interact with the handheld controller(s) in order to control and/or interact with virtual objects in the virtual environment.

In some forms, the handheld controller includes at least one button that may be actuatable by the user. For example, the user's fingers may be able to press the button(s) while grasping the handheld controller.

In some forms, the handheld controller may include a directional control (e.g., a joystick, a control pad, etc.). The user's thumb may be able to engage the directional control while grasping the handheld controller.

In certain forms, the controller 1270 may be wirelessly connected to the head-mounted display unit 1200. For example, the controller 1270 and the head-mounted display unit 1200 may be connected via Bluetooth, Wi-Fi, or any similar means.

In certain forms, the controller 1270 and the head-mounted display unit 1200 may be connected with a wired connection. The wired connection may provide electrical power to the controller 1270.

5.2.3.2 Fixed Controller

In some forms, at least a portion of the controller 1270 may be integrally formed on the display unit housing 1205.

In some forms, the controller 1270 may include control buttons that are integrally formed on the display unit housing 1205. For example, the control buttons may be formed on the superior face 1230 and/or the inferior face 1232, so as to be engageable by the user's fingers when holding the user's palm rests against the lateral left or right face 1234, 1236 of the display unit housing 1205. Control buttons may also be disposed on other faces of the display unit housing 1205.

In some forms, the user may interact with the control buttons in order to control at least one operation of the head-mounted display system 1000. For example, the control button may be an On/Off button, which may selectively control whether the display screen 1220 is outputting an image to the user.

In certain forms, control buttons may provide other functions like brightness control on the display screen 1220 and/or volume control on speakers 1272 provided in the display unit housing 1205.

In certain forms, the control buttons and the head-mounted display unit 1200 may be connected with a wired connection.

In some forms, the head-mounted display system 1000 may include both the handheld controller and the control buttons.

5.2.4 Speaker

With reference to FIG. 6, in some forms the head-mounted display system 1000 includes a sound system or speakers 1272 that may be connected to the head-mounted display unit 1200 and positionable proximate to the user's ears in order to provide the user with an auditory output.

In some forms, the speakers 1272 may be positionable around the user's ears, and may block or limit the user from hearing ambient noise. For example, the speakers may be formed like ear muffs.

In certain forms, each of the speakers 1272 may be connected to one of the pair of arms 1210. This may be a permanent connection or a removable connection.

In some forms, the speakers 1272 may be ear buds and fit inside of the user's ears. The ear buds may be usable only with the head-mounted display unit 1200, or they may be standard ear buds usable with other electronic devices (e.g., smart phones).

In certain forms, the speakers 1272 may be wirelessly connected to the head-mounted display unit 1200. For example, the speakers 1272 and the head-mounted display unit 1200 may be connected via Bluetooth, Wi-Fi, or any similar means.

In some forms, the speaker 1272 includes a left ear transducer and a right ear transducer. In some forms, the left and right ear transducers may output different signals, so that the volume and or noise heard by the user in one ear (e.g., the left ear) may be different than the volume and or noise heard by the user in the other ear (e.g., the right ear).

In some forms, the speaker 1272 (e.g., the volume of the speaker 1272) may be controlled using the controller 1270.

5.2.5 Power Source

With reference to FIG. 6, some forms of the head-mounted display system 1000 may include an electrical power source 1274 can provide electrical power to the head-mounted display unit 1200 and any other electrical components of the head-mounted display system 1000.

In certain forms, the power source 1274 may include a wired electrical connection that may be coupled to an external power source (e.g., a wall outlet, a computer, etc.), which may be fixed to a particular location.

In certain forms, the power source 1274 may include a portable battery that may provide power to the head-mounted display unit 1200. The portable battery may allow the user greater mobility than compared to a wired electrical connection. The portable battery may be replaceable and/or rechargeable.

In certain forms, the head-mounted display system 1000 and/or other electronic components of the head-mounted display system 1000 may include internal batteries, and may be usable without the power source 1274.

In one form, the head-mounted display system 1000 may be powered by either a portable battery or an external power source, and a user may selectively choose which type of power source to use.

In some forms, the head-mounted display system 1000 may include the power source 1274 in a position remote from the head-mounted display unit 1200. Electrical wires may extend from the distal location to the display unit housing 1205 in order to electrically connect the power source 1274 to the head-mounted display unit 1200.

In certain forms, the power source 1274 may be coupled to the positioning and stabilizing structure 1300. For example, the power source 1274 may be coupled to a strap of the positioning and stabilizing structure 1300, either permanently or removably. The power supply 1274 may be coupled to a posterior portion of the positioning and stabilizing structure 1300, so that it may be generally opposite the display unit housing 1205 and/or the head-mounted display unit 1200. The weight of the power source 1274, and the weight of the head-mounted display unit 1200 and the display unit housing 1205 may therefore be spread throughout the head-mounted display system 1000, instead of concentrated at the anterior portion of the head-mounted display system 1000. Shifting weight to the posterior portion of the head-mounted display system 1000 may limit the moment created at the user's face, which may improve comfort and allow the user to wear the head-mounted display system 1000 for longer periods of time.

In certain forms, the power source 1274 may be supported by a user distal to the user's head. For example, the power source 1274 may connected to the head-mounted display unit 1200 and/or the display unit housing 1205 only through an electrical connector (e.g., a wire). The power source 1274 may be stored in the user's pants pocket, on a belt clip, or a similar way which supports the weight of the power source 1274. This removes weight that the user's head is required to support, and may make wearing the head-mounted display system 1000 more comfortable for the user.

In some forms, the head-mounted display unit 1200 may include the power source 1274. For example, the display unit 1200 may be a cell phone, or other similar electronic device, which includes an internal power source 1274.

5.2.6 Control System

With reference to FIG. 6, some forms of the head-mounted display system 1000 include a control system 1276 that assists in controlling the output received by the user. Specifically, the control system 1276 can control visual output from the display screen 1220 and/or auditory output from the speakers 1272.

In some forms, the control system 1276 may include sensors that monitor different parameters (e.g., in the physical environment), and communicates measured parameters to a processor. The output received by the user may be affected by the measured parameters.

In some forms, the control system 1276 is integrated into the head-mounted display unit 1200. In other forms, the control system 1276 is housed in a control system support 1290 that is separate from, but connected to (e.g., electrically connected to) the head-mounted display unit 1200.

5.2.6.1 Power Source

In some forms, the control system 1276 may be powered by the power source 1274, which may be at least one battery used for powering components of the control system 1276. For example, sensors of the control system 1276 may be powered by the power source 1274.

In some forms, the at least one battery of the power source 1274 may be a low power system battery 1278 and a main battery 1280.

In certain forms, the low power system battery 1278 may be used to power a real time (RT) clock 1282 of the control system 1276.

5.2.6.1.1 Integrated Power Support Portion

In some forms, a battery support portion 1288 may support the low power system battery 1278 and/or the main battery 1280. The battery support portion 1288 may be directly supported on the head-mounted display system 1000.

In some forms, the battery support portion 1288 may be disposed within the display unit housing 1205.

In some forms, the battery support portion 1288 may be disposed on the positioning and stabilizing structure 1300. For example, the battery support portion 1288 may be coupled to the posterior support portion 1350. The weight of the head-mounted display system 1000 may be better balanced around the user's head. One form of a battery support portion 1288 is a battery pack housing, which will be described in more detail herein.

5.2.6.1.2 Remote Power Support Portion

In some forms, a battery support portion 1288 may support the low power system battery 1278 and/or the main battery 1280. The battery support portion 1288 may be coupled to the user independently of the positioning and stabilizing structure 1300 and/or the display unit housing 1205 (e.g., it may be coupled via a belt clip). The battery support portion 1288 also may be supported remote from the user's body (e.g., if the head-mounted display system 1000 receives power from a computer or video game console). A tether may couple the battery support portion 1288 to the control system 1276 and/or other electronics. The positioning of the battery support portion may improve comfort for the user, since the weight of the low power system battery 1278 and/or the main battery 1280 are not supported by the user's head.

5.2.6.2 Orientation Sensor

In some forms, the control system 1276 includes an orientation sensor 1284 that can sense the orientation of the user's body. For example, the orientation sensor 1284 may sense when the user rotates their body as a whole, and/or their head individually. In other words, the orientation sensor 1284 may measure an angular position (or any similar parameter) of the user's body. By sensing the rotation, the sensor 1284 may communicate to the display screen 1220 to output a different image.

In some examples, an external orientation sensor may be positioned in the physical environment where the user is wearing the head-mounted display system 1000. The external position sensor may track the user's movements similar to the orientation sensor 1284 described above. Using an external orientation sensor may reduce the weight required to be supported by the user.

5.2.6.2.1 Camera

In some forms, the control system 1276 may include at least one camera, which may be positioned to view the physical environment of the user.

In some forms, the orientation sensor 1284 is a camera, which may be configured to observe the user's physical environment in order to determine the orientation of the user's head (e.g., in what direction the user's head has tilted).

In some forms, the orientation sensor 1284 includes multiple cameras positioned throughout the head-mounted display system 1000 in order to provide a more complete view of the user's physical environment, and more accurately measure the orientation of the user's head.

In some forms, the cameras 1284 are coupled to the anterior face 1238 of the display unit housing 1205. The cameras 1284 may be positioned in order to in order to provide a "first-person" view.

In certain forms, the display screen 1220 may display the user's physical environment by using the cameras 1284, so that the user may feel as though they are viewing their physical environment without assistance from the head-mounted display system 1000 (i.e., the first person view). This may allow the user to move around their physical environment without removing the head-mounted display system 1000.

In one form, virtual objects may be displayed while the display screen 1220 is displaying the user's physical environment. The cameras 1284 may allow the head-mounted display system 1000 to operate as an MR device. The control system 1276 may include a control to switch operation between a VR device and an MR device.

5.2.6.3 Eye Sensor

In some forms, the control system 1276 may include an eye sensor that can track movement of the user's eyes. For example, the eye sensor may be able to measure a position of at least one of the user's eyes, and determine which direction at least one of the user's eyes are looking.

In some forms, the control system 1276 may include two eye sensors. Each sensor may correspond to one of the user's eyes.

In some forms, the eye sensors may be disposed in or proximate to the lenses 1240.

In some forms, the eye sensors may measure an angular position of the user's ears in order to determine the visual output from the display screen 1220.

5.2.6.4 Processing System

In some forms, the control system 1276 includes a processing system that may receive the measurements from the various sensors of the control system 1276.

In some forms, the processing system may receive measurements recorded by the orientation sensor 1284 and/or the eye sensors. Based on these measured values, the processor can communicate with the display screen 1220 in order to change the image being output. For example, if the user's eyes and/or the user's head pivots in the superior direction, the display screen 1220 may display a more superior portion of the virtual environment (e.g., in response to direction from the processing system).

5.3 Augmented Reality Display Interface

As shown in FIGS. 5A and 5B, a display apparatus or head-mounted display system 1000 in accordance with one aspect of the present technology comprises the following functional aspects: a display screen 1220, a display unit housing 1205, and a positioning and stabilizing structure 1300. In some forms, a functional aspect may provide one or more physical components. In some forms, one or more physical components may provide one or more functional aspects. In use, the display screen 1220 is arranged to be positioned proximate and anterior to the user's eyes, so as to allow the user to view the display screen 1220.

In other aspects, the head-mounted display system 1000 may also include an interfacing structure 1100, a controller 1270, a speaker 1272, a power source 1274, and/or a control system 1276. In some examples, these may be integral pieces of the head-mounted display system 1000, while in other examples, these may be modular and incorporated into the head-mounted display system 1000 as desired by the user.

5.3.1 Display Unit

The head-mounted display unit 1200 may include a structure for providing an observable output to a user. Specifically, the head-mounted display unit 1200 is arranged to be held (e.g., manually, by a positioning and stabilizing structure, etc.) in an operational position in front of a user's face.

In some examples, the head-mounted display unit 1200 may include a display screen 1220, a display unit housing 1205, and/or an interfacing structure 1100. These components may be integrally formed in a single head-mounted display unit 1200, or they may be separable and selectively connected by the user to form the head-mounted display unit 1200. Additionally, the display screen 1220, the display unit housing 1205, and/or the interfacing structure 1100 may be included in the head-mounted display system 1000, but may not be part of the head-mounted display unit 1200.

5.3.1.1 Display Screen

As shown in FIG. 5A, some forms of the head-mounted display unit 1200 include a display screen 1220. The display screen 1220 may include electrical components that provide an observable output to the user.

In one form of the present technology shown in FIG. 5A and FIG. 5B, a display screen 1220 provides an optical output observable by the user. The optical output allows the user to observe a virtual environment and/or a virtual object.

The display screen 1220 may be positioned proximate to the user's eyes, in order to allow the user to view the display screen 1220. For example, the display screen 1220 maybe positioned anterior to the user's eyes. The display screen 1220 can display computer generated images that can be view by the user in order to augment the user's physical environment (e.g., the computer generated images may appear as though they are present in the user's physical environment).

In some forms, the display screen 1220 is an electronic display. The display screen 1220 may be a liquid crystal display (LCD), or a light emitting diode (LED) screen.

In some forms, the computer generated image may be projected onto the display screen 1220.

In some forms, the display screen 1220 may extend wider a distance between the user's pupils. The display screen 1220 may also be wider than a distance between the user's cheeks.

In some forms, the display screen 1220 may display at least one image that is observable by the user. For example, the display screen 1220 may display images that change based on predetermined conditions (e.g., passage of time, movement of the user, input from the user, etc.).

In certain forms, portions of the display screen 1220 may be visible to only one of the user's eyes. In other words, a portion of the display screen 1220 may be positioned proximate and anterior to only one of the user's eyes (e.g., the right eye), and is blocked from view from the other eye (e.g., the left eye).

In one example, the display screen 1220 may be divided into two sides (e.g., a left side and a right side), and may display two images at a time (e.g., one image on either side).

Each side of the display screen 1220 may display a similar image. In some examples, the images may be identical, while in other examples, the images may be slightly different.

Together, the two images on the display screen 1220 may form a binocular display, which may provide the user with a more realistic AR or MR experience. In other words, the user's brain may process the two images from the display screen 1220 together as a single image. Providing two (e.g., un-identical) images may allow the user to view virtual objects on their periphery, and expand their field of view in the virtual environment.

In certain forms, the display screen 1220 may be positioned in order to be visible by both of the user's eyes. The display screen 1220 may output a single image at a time, which is viewable by both eyes. This may simplify the processing as compared to the multi-image display screen 1220.

In some forms, the head-mounted display system 1000 includes a single lens 1240 (e.g., monocular display). The lens 1240 may be positioned anterior to both eyes (e.g., so that both eyes view the image from the display screen 1220 through the lens 1240), or may be positioned anterior to only one eye (e.g., when the image from the displace screen 1220 is viewable by only one eye). This may be particularly useful in AR or MR, where the user may want limited virtual stimulation, and may wish to observe the physical environment without an overlayed virtual object.

In certain forms, particularly when using the display screen 1220 in an AR or MR environment, the display screen 1220 may be turned off while the user continues to wear the display screen 1220 and interact with the physical environment. This may allow the user to selectively choose when to receive the virtual stimulation, and when to observe only the physical environment.

In certain forms, the display screen 1220 may be transparent (or translucent). For example, the display screen 1220 may be glass, so the user can see through the display screen 1220. This may be particularly beneficial in AR or MR applications, so that the user can continue to see the physical environment.

5.3.1.1.1 Optical Lenses

As shown in FIG. 5A, the display screen 1220 may be disposed within a lens 1240. The user may view an image provided by the display screen 1220 through the lens 1240. The lens 1240 may be transparent and/or translucent along with the display screen 1220 so that the user may observe their physical environment while looking through the lens 1240. In some examples, the user may be able to observe (e.g., visually observe) their physical environment regardless of the presence or absence of a computer generated image output by the display screen 1220.

In some forms, the head-mounted display system 1000 includes two lenses 1240, one for each of the user's eyes. In other words, each of the user's eyes may look through a separate lens positioned anterior to the respective pupil. Each of the lenses 1240 may be identical, although in some examples, one lens 1240 may be different than the other lens 1240 (e.g., have a different magnification). For example, the lenses 1240 may be prescription lenses 1240, and each of the user's eyes may have a different prescription.

In certain forms, the display screen 1220 may output two images simultaneously. Each of the user's eyes may be able to see only one of the two images. The images may be displayed side-by-side on the display screen 1220. Each lens 1240 permits each eye to observe only the image proximate to the respective eye. The user may observe these two images together as a single image.

In certain forms, each lens 1240 may include a separate display screen 1220 that outputs different images. For example, different computer generated images may be displayed to the user's eyes.

In one form, the user may control whether both, one, or none of the display screens 1220 are outputting simultaneously. This may be beneficial to a user if they wish to switch which eye is observing the computer generated images.

In some forms, the head-mounted display system 1000 includes a single lens 1240 (e.g., monocular display). The lens 1240 may be positioned anterior to both eyes (e.g., so that both eyes view the image from the display screen 1220 through the lens 1240), or may be positioned anterior to only one eye (e.g., when the image from the displace screen 1220 is viewable by only one eye).

5.3.1.2 Display Housing

In some forms of the present technology as shown in FIGS. 5A and 5B, a display unit housing 1205 provides a support structure for the display screen 1220, in order to maintain a position of at least some of the components of the display screen 1220 relative to one another, and may additionally protect the display screen 1220 and/or other components of the head-mounted display unit 1200. The display unit housing 1205 may be constructed from a material suitable to provide protection from impact forces to the display screen 1220. The display unit housing 1205 may also contact the user's face, and may be constructed from a biocompatible material suitable for limiting irritation to the user.

A display unit housing 1205 in accordance with some forms of the present technology may be constructed from a hard, rigid or semi-rigid material, such as plastic.

In certain forms, the rigid or semi-rigid material may be at least partially covered with a soft and/or flexible material (e.g., a textile, silicone, foam, etc.). This may improve biocompatibility and/or user comfort because the at least a portion of the display unit housing 1205 that the user engages (e.g., grabs with their hands) includes the soft and/or flexible material.

A display unit housing 1205 in accordance with other forms of the present technology may be constructed from a soft, flexible, resilient material, such as silicone rubber.

In some forms, the display screen 1220 may project at least partially out of the display unit housing 1205. For example, unlike in a VR head-mounted display system 1000, the display screen 1220 in an AR (or MR) head-mounted display system 1000 may not be completely enclosed by the by the display unit housing 1205. The user may be able to directly view the display screen 1220, and may be able to look through the display screen 1220 (e.g., if the display screen 1220 is transparent or translucent).

In certain forms, the display unit housing 1205 may support sensors or other electronics described below. The display unit housing 1205 may provide protection to the electronics without substantially obstructing the user's view of the display screen 1220.

5.3.1.3 Interface Structure

As shown in FIGS. 5A and 5B, some forms of the present technology include an interfacing structure 1100 is positioned and/or arranged in order to conform to a shape of a user's face, and may provide the user with added comfort while wearing and/or using the head-mounted display system 1000.

In some forms, the interfacing structure 1100 is coupled to a surface of the display unit housing 1205.

In some forms, the interfacing structure 1100 in accordance with the present technology may be constructed from a biocompatible material.

In some forms, the interfacing structure 1100 in accordance with the present technology may be constructed from a soft, flexible, and/or resilient material.

In certain forms, the interfacing structure 1100 in accordance with the present technology may be constructed from silicone rubber and/or foam.

In some forms, the interfacing structure 1100 may contact sensitive regions of the user's face, which may be locations of discomfort. The material forming the interfacing structure 1100 may cushion these sensitive regions, and limit user discomfort while wearing the head-mounted display system 1000.

In certain forms, these sensitive regions may include the user's forehead. Specifically, this may include the region of the user's head that is proximate to the frontal bone, like the Epicranius and/or the glabella. This region may be sensitive because there is limited natural cushioning from muscle and/or fat between the user's skin and the bone. Similarly, the ridge of the user's nose may also include little to no natural cushioning.

In some forms, the interfacing structure 1100 can comprise a single element. In some embodiments the interfacing structure 1100 may be designed for mass manufacture. For example, the interfacing structure 1100 can be designed to comfortably fit a wide range of different face shapes and sizes.

In some forms, the interfacing structure 1100 may include different elements that overlay different regions of the user's face. The different portions of the interfacing structure 1100 may be constructed from different materials, and provide the user with different textures and/or cushioning at different regions.

In some forms, the interface structure 1100 may include nasal pads (e.g., as used in eye-glasses) that may contact the lateral sides of the user's nose. The nasal pads may apply light pressure to the user's nose to maintain the position of the head-mounted display system 1000, but may not apply a force that causes significant discomfort (e.g., the nasal pads may not receive a posterior directed tensile force).

5.3.2 Positioning and Stabilizing Structure

As shown in FIGS. 5A to 5B, the display screen 1220 and/or the display unit housing 1205 of the head-mounted display system 1000 of the present technology may be held in position in use by the positioning and stabilizing structure 1300.

To hold the display screen 1220 and/or the display unit housing 1205 in its correct operational position, the positioning and stabilizing structure 1300 is ideally comfortable against the user's head in order to accommodate the induced loading from the weight of the display unit in a manner that minimise facial markings and/or pain from prolonged use. There is also need to allow for a universal fit without trading off comfort, usability and cost of manufacture. The design criteria may include adjustability over a predetermined range with low-touch simple set up solutions that have a low dexterity threshold. Further considerations include catering for the dynamic environment in which the head-mounted display system 1000 may be used. As part of the immersive experience of a virtual environment, users may communicate, i.e. speak, while using the head-mounted display system 1000. In this way, the jaw or mandible of the user may move relative to other bones of the skull. Additionally, the whole head may move during the course of a period of use of the head-mounted display system 1000. For example, movement of a user's upper body, and in some cases lower body, and in particular, movement of the head relative to the upper and lower body.

In one form the positioning and stabilizing structure 1300 provides a retention force to overcome the effect of the gravitational force on the display screen 1220 and/or the display unit housing 1205.

In one form of the present technology, a positioning and stabilizing structure 1300 is provided that is configured in a manner consistent with being comfortably worn by a user. In one example the positioning and stabilizing structure 1300 has a low profile, or cross-sectional thickness, to reduce the perceived or actual bulk of the apparatus. In one example, the positioning and stabilizing structure 1300 comprises at least one strap having a rectangular cross-section. In one example the positioning and stabilizing structure 1300 comprises at least one flat strap.

In one form of the present technology, a positioning and stabilizing structure 1300 is provided that is configured so as not to be too large and bulky to prevent the user from comfortably moving their head from side to side.

In one form of the present technology, a positioning and stabilizing structure 1300 comprises a strap constructed from a laminate of a textile user-contacting layer, a foam inner layer and a textile outer layer. In one form, the foam is porous to allow moisture, (e.g., sweat), to pass through the strap. In one form, a skin contacting layer of the strap is formed from a material that helps wick moisture away from the user's face. In one form, the textile outer layer comprises loop material to engage with a hook material portion.

In certain forms of the present technology, a positioning and stabilizing structure 1300 comprises a strap that is extensible, e.g. resiliently extensible. For example the strap may be configured in use to be in tension, and to direct a force to draw the display screen 1220 and/or the display unit housing 1205 toward a portion of a user's face, particularly proximate to the user's eyes and in line with their field of vision. In an example the strap may be configured as a tie.

In one form of the present technology, the positioning and stabilizing structure 1300 comprises a first tie, the first tie being constructed and arranged so that in use at least a portion of an inferior edge thereof passes superior to an otobasion superior of the user's head and overlays a portion of a parietal bone without overlaying the occipital bone.

In one form of the present technology, the positioning and stabilizing structure 1300 includes a second tie, the second tie being constructed and arranged so that in use at least a portion of a superior edge thereof passes inferior to an otobasion inferior of the user's head and overlays or lies inferior to the occipital bone of the user's head.

In one form of the present technology, the positioning and stabilizing structure 1300 includes a third tie that is constructed and arranged to interconnect the first tie and the second tie to reduce a tendency of the first tie and the second tie to move apart from one another.

In certain forms of the present technology, a positioning and stabilizing structure 1300 comprises a strap that is bendable and e.g. non-rigid. An advantage of this aspect is that the strap is more comfortable against a user's head.

In certain forms of the present technology, a positioning and stabilizing structure 1300 comprises a strap constructed to be breathable to allow moisture vapour to be transmitted through the strap, In certain forms of the present technology, a system is provided comprising more than one positioning and stabilizing structure 1300, each being configured to provide a retaining force to correspond to a different size and/or shape range. For example the system may comprise one form of positioning and stabilizing structure 1300 suitable for a large sized head, but not a small sized head, and another, suitable for a small sized head, but not a large sized head.

In some forms, the positioning and stabilizing structure 1300 may include cushioning material (e.g., a foam pad) for contacting the user's skin. The cushioning material may provide added wearability to the positioning and stabilizing structure 1300, particularly if positioning and stabilizing structure 1300 is constructed from a rigid or semi-rigid material.

5.3.2.1 Temporal Connectors

As shown in FIG. 5B, some forms of the positioning and stabilizing structure 1300 include temporal connectors 1250, each of which may overlay a respective one of the user's temporal bones in use. A portion of the temporal connectors 1250, in-use, are in contact with a region of the user's head proximal to the otobasion superior, i.e. above each of the user's ears.

The temporal connectors 1250 may be lateral portions of the positioning and stabilizing structure 1300, as each temporal connector 1250 is positioned on either the left or the right side of the user's head.

In some forms, the temporal connectors 1250 may extend in an anterior-posterior direction, and may be substantially parallel to the sagittal plane.

In some forms, the temporal connectors 1250 may be coupled to the display unit housing 1205. For example, the temporal connectors 1250 may be connected to lateral sides of the display unit housing 1205.

In some forms, the temporal connectors 1250 may be arranged in-use to run generally along or parallel to the Frankfort Horizontal plane of the head and superior to the zygomatic bone (e.g., above the user's cheek bone).

In some forms, the temporal connectors 1250 may be positioned against the user's head similar to arms of eyeglasses, and be positioned more superior than the anti-helix of each respective ear.

In some forms, the temporal connectors 1250 may have a generally elongate and flat configuration. In other words, each temporal connector 1250 is far longer and wider (direction from top to bottom in the paper plane) than thick (direction into the paper plane).

In some forms, the temporal connectors 1250 may each have a three-dimensional shape which has curvature in all three axes (X, Y and Z). Although the thickness of each temporal connector 1250 may be substantially uniform, its height varies throughout its length. The purpose of the shape and dimension of each temporal connector 1250 is to conform closely to the head of the user in order to remain unobtrusive and maintain a low profile (e.g., not appear overly bulky).

In some forms, the temporal connectors 1250 may be constructed from a rigid or semi-rigid material, which may include plastic, Hytrel (thermoplastic polyester elastomer), or another similar material. The rigid or semi-rigid material may be self-supporting and/or able to hold its shape without being worn. This can make it more intuitive or obvious for users to understand how to use the positioning and stabilizing structure 1300 and may contrast with a positioning and stabilizing structure 1300 that is entirely floppy and does not retain a shape. Maintaining the temporal connectors 1250 in the in-use state prior to use may prevent or limit distortion whilst the user is donning the positioning and stabilizing structure 1300 and allow a user to quickly fit or wear the head-mounted display system 1000.

In certain forms, the temporal connectors 1250 may be rigidizers, which may allow for a more effective (e.g., direct) translation of tension through the temporal connectors 1250 because rigidizers limit the magnitude of elongation or deformation of the arm while in-use.

In certain forms, the temporal connectors 1250 may be at least partially flexible in one direction and may be more rigid in another direction. A user may be able to bend or flex the temporal connector more in one direction than in another direction. For example, the temporal connectors 1250 may be at least partially flexible along an axis substantially parallel to the user's sagittal plane (e.g., in the superior-inferior direction while in use). This may allow the temporal connectors 1250 to conform to the shape of the user's head by moving in lateral directions toward or away from the user's head. The user also may be able to make multiple adjustments along the length of the temporal connectors 1250 to correspond to a variety of structures along the user's head. However, bending along an axis substantially parallel to the user's coronal plane (e.g., extending in the lateral direction in use) may be more difficult. The temporal connectors 1250 may resist bending in the superior-inferior direction.

In certain forms, the positioning and stabilizing structure 1300 may be designed so that the positioning and stabilizing structure 1300 springs 'out of the box' and generally into its in-use configuration. In addition, the positioning and stabilizing structure 1300 may be arranged to hold its in-use shape once out of the box (e.g., because rigidizers may be formed to maintain the shape of some or part of the positioning and stabilizing structure 1300). Advantageously, the orientation of the positioning and stabilizing structure 1300 is made clear to the user as the shape of the positioning and stabilizing structure 1300 is generally curved much like the rear portion of the user's head. That is, the positioning and stabilizing structure 1300 is generally dome shaped.

In certain forms, a flexible and/or resilient material may be disposed around the rigid or semi-rigid material of the temporal connectors 1250. The flexible material may be more comfortable against the user's head, in order to improve wearability and provide soft contact with the user's face. In one form, the flexible material is a textile sleeve at is permanently or removably coupled to each temporal connector 1250.

In one form, a textile may be over-moulded onto at least one side of the rigidizer. In one form, the rigidizer may be formed separately to the resilient component and then a sock of user contacting material (e.g., Breath-O-Prene™) may be wrapped or slid over the rigidizer. In alternative forms, the user contacting material may be provided to the rigidizer by adhesive, ultrasonic welding, sewing, hook and loop material, and/or stud connectors.

In some forms, the user contacting material may be on both sides of the rigidizer, or alternatively may only be on the user contacting side (e.g., the user contacting side) of the rigidizer to reduce bulk and cost of materials.

In some forms, the temporal connectors 1250 are constructed from a flexible material (e.g., a textile), which may be comfortable against the user's skin, and may not require an added layer to increase comfort.

Some forms of the positioning and stabilizing structure 1300 may include only temporal connectors 1250. The temporal connectors 1250 may be shaped like temples or arms of eye-glasses, and may rest against the user's head in a similar manner. For example, the temporal arms 1250 may provide a force directed into lateral sides of the user's head (e.g., toward the respective temporal bone).

5.3.2.2 Posterior Support Portion

As shown in FIG. 5B, some forms of the positioning and stabilizing structure 1300 may include a rear support, e.g. a posterior support portion 1350 for assisting in supporting the display screen 1220 and/or the display unit housing 1205 proximate to the user's eyes. The posterior support portion 1350 may assist in anchoring the display screen 1220 and/or the display unit housing 1205 to the user's head in order to appropriately orient the display screen 1220 proximate to the user's eyes.

In some forms, the posterior support portion 1350 may be coupled to the display unit housing 1205 via the temporal connectors 1250.

In certain forms, the temporal connectors 1250 may be directly coupled to the display unit housing 1205 and to the posterior support portion 1350.

In some forms, the posterior support portion 1350 may have a three-dimensional contour curve to fit to the shape of a user's head. For example, the three-dimensional shape of the posterior support portion 1350 may have a generally round three-dimensional shape adapted to overlay a portion of the parietal bone and the occipital bone of the user's head, in use.

In certain forms, the posterior support portion 1350 may include a three-dimensional shape that is curved about at least two axes. For example, a rearmost portion of the posterior support portion 1350 (e.g., the portion configured to overlay the user's occipital bone) may include a concave shape with respect to the user's occipital bone. This may assist the posterior support portion 1350 in "cupping" the rear of the user's head in order to provide a secure fit. Additionally, the posterior support portion 1350 may be curved about an axis substantially parallel to the user's coronal plane. For example, this second curvature may be about an axis that is substantially perpendicular to an axis of the first curvature (i.e., the section of the posterior support configured to overlay the user's occipital bone). The section with the second curvature may extend from the respective temporal connector 1250. This section may therefore overlay the user's temporal bone and/or the user's occipital bone. As viewed from the side (e.g., in FIG. 5B), the second curvature may be positive (e.g., "concave up"). This may be opposite of the curvature in the temporal connector 1250, although the curvatures may be about substantially parallel axes. For example, the curvature of the temporal connectors 1250 may be negative (e.g., "concave down") as viewed in FIG. 5B. This may allow each temporal connector 1250 to curve about the respective user's ear.

In certain forms, the posterior support portion 1350 may be at least partially rigidized so that the round shape may be maintained even when not worn by the user. This may help the user don the posterior support portion 1350 as the rigidity may limit tangling.

In one form, the rigidity may provide "springiness" to the posterior support portion 1350. For example, the posterior support portion 1350 may "spring-to-life" after being compressed. In other words, the posterior support portion 1350 may be flexible enough to be folded but once a force is removed, the posterior support portion 1350 returns to its original shape (e.g., the three-dimensional round shape).

In some forms, the posterior support portion 1350 may be a posterior portion of the positioning and stabilizing structure 1300. The posterior support portion 1350 may provide an anchoring force directed at least partially in the anterior direction.

In certain forms, the inferior section 1320 the posterior support portion 1350 is the inferior-most portion of the positioning and stabilizing structure 1300. For example, the posterior support portion 1350 may contact a region of the user's head between the occipital bone and the trapezius muscle. The posterior support portion 1350 may hook against an inferior edge of the occipital bone (e.g., the occiput). The posterior support portion 1350 may provide a force directed in the superior direction and/or the anterior direction in order to maintain contact with the user's occiput.

In certain forms, the inferior section 1320 the posterior support portion 1350 is the inferior-most portion of the entire head-mounted display system 1000. For example, the posterior support portion 1350 may be positioned at the base of the user's neck (e.g., overlaying the occipital bone and the trapezius muscle more inferior than the user's eyes) so that the posterior support portion 1350 is more inferior than the display screen 1220 and/or the display unit housing 1205.

In certain forms, the superior section 1310 may overlay the parietal bones when in contact with the user's head. The round shape of the posterior support portion 1350 may allow the posterior support portion 1350 to sit substantially flat on the user's head while the inferior section 1320 contacts the user's head as described above.

In some forms, the posterior support portion 1350 may include a padded material, which may contact the user's head (e.g., overlaying the region between the occipital bone and the trapezius muscle). The padded material may provide additional comfort to the user, and limit marks caused by the posterior support portion 1350 pulling against the user's head.

In certain forms, the posterior support portion 1350 may be constructed from a textile material and/or a foam material. The materials may be biocompatible and comfortable to a user's head.

In one form, the posterior support portion 1350 may be constructed from a foam material that is at least partially covered by a fabric material. The outer fabric material may provide the comfortable feeling for the user's skin. The inner foam layer may allow the posterior support portion 1350 to compress and improve comfort.

5.3.2.3 Forehead Support

As shown in FIGS. 5A and 5B, some forms of the positioning and stabilizing structure 1300 may include a forehead support 1360 that can contact the user's head superior to the user's eyes, while in use. For example, the forehead support 1360 may overlay the frontal bone of the user's head. In certain forms, the forehead support 1360 may also be more superior than the sphenoid bones and/or the temporal bones. This may also position the forehead support 1360 more superior than the user's eyebrows.

In some forms, the forehead support 1360 may be an anterior portion of the positioning and stabilizing structure 1300, and may be disposed more anterior on the user's head than any other portion of the positioning and stabilizing structure 1300. The posterior support portion 1350 may provide a force directed at least partially in the posterior direction.

In some forms, the forehead support 1360 may include a cushioning material (e.g., textile, foam, silicone, etc.) that may contact the user, and may help to limit marks caused by the straps of the positioning and stabilizing structure 1300. The forehead support 1360 and the interfacing structure 1100 may work together in order to provide comfort to the user.

In some forms, the forehead support 1360 may be separate from the display unit housing 1205, and may contact the user's head at a different location (e.g., more superior) than the display unit housing 1205.

In some forms, the forehead support 1360 can be adjusted to allow the positioning and stabilizing structure 1300 to accommodate the shape and/or configuration of a user's face.

In some forms, the temporal connectors 1250 may be coupled to the forehead support 1360 (e.g., on lateral sides of the forehead support 1360). The temporal connectors 1250 may extend at least partially in the inferior direction in order to couple to the posterior support portion 1350.

In certain forms, the positioning and stabilizing structure 1300 may include multiple pairs of temporal connectors 1250. For example, one pair of temporal connectors 1250 may be coupled to the forehead support 1360, and one pair of temporal connectors 1250 may be coupled to the display unit housing 1205.

In some forms, the forehead support 1360 can be presented at an angle which is generally parallel to the user's forehead to provide improved comfort to the user. For example, the forehead support 1360 may position the user in an orientation that overlays the frontal bone, and is substantially parallel to the coronal plane. Positioning the forehead support substantially parallel to the coronal plane can reduce the likelihood of pressure sores which may result from an uneven presentation.

In some forms, the forehead support 1360 may be offset from a rear support that contacts a posterior region of the user's head (e.g., an area overlaying the occipital bone and the trapezius muscle). In other words, an axis along a rear strap would not intersect the forehead support 1360, which may be disposed more inferior and anterior than the axis along the rear strap. The resulting offset between the forehead support 1360 and the rear strap may create moments that oppose the weight force of the display screen 1220 and/or the display unit housing 1205. A larger offset may create a larger moment, and therefore more assistance in maintaining a proper position of the display screen 1220 and/or the display unit housing 1205. The offset may be increased by moving the forehead support 1360 closer to the user's eyes (e.g., more anterior and inferior along the user's head), and/or increasing the angle of the rear strap so that it is more vertical.

5.3.2.4 Adjustable Straps

Portions of the positioning and stabilizing structure 1300 may be adjustable, in order to impart a selective tensile force on the display screen 1220 and/or the display unit housing 1205 in order to secure a position of the display screen 1220 and/or the display unit housing 1205.

In some forms, the display unit housing 1205 may include at least one loop or eyelet 1254, and at least one of the temporal connectors 1250 may be threaded through that loop, and doubled back on itself (e.g., illustrated in FIG. 4B but applicable to FIGS. 5A and 5B). The length of a strap of the positioning and stabilizing structure 1300 threaded through the respective eyelet 1254 may be selected by the user in order to adjust the tensile force. For example, threading a greater length through the eyelet 1254 may supply a greater tensile force.

In some forms, at least one of the temporal connectors 1250 may include an adjustment portion 1256 and a receiving portion 1258. The adjustment portion 1256 may be positioned through the eyelet 1254 on the display unit housing 1205, and may be coupled to the receiving portion 1258 (e.g., by doubling back on itself). The adjustment portion 1256 may include a hook material, and the receiving portion 1258 may include a loop material (or vice versa), so that the adjustment portion 1256 may be removably held in the desired position. In some examples, the hook material and the loop material may be Velcro.

In certain forms, the strap may be constructed at least partially from a flexible and/or resilient material, which may conform to a shape of the user's head and/or may allow the adjustment portion to be threaded through the eyelet 1254. For example, the adjustment portion(s) 1256 may be constructed from an elastic textile, which may provide an elastic, tensile force. The remained of the temporal connectors 1250 may be constructed from the rigid or semi-rigid material described above (although it is contemplated that additional sections of the temporal connectors 1250 may also be constructed from a flexible material).

5.3.2.4.1 Top Strap Portion

In some forms, the positioning and stabilizing structure 1300 may include a top strap portion, which may overlay a superior region of the user's head.

In some forms, the top strap portion may extend between an anterior portion of the head-mounted display system 1000 and a posterior region of the head-mounted display system 1000.

In some forms, the top strap portion may be constructed from a flexible material, and may be configured to compliment the shape of the user's head.

In certain forms, the top strap portion may be connected to the display unit housing 1205. For example, the top strap portion may be coupled to the superior face 1230. The top strap portion may also be coupled to the display unit housing 1205 proximate to a posterior end of the display unit housing 1205.

In certain forms, the top strap portion may be coupled to the forehead support 1360. For example, the top strap portion may be coupled to the forehead support 1360 proximate to a superior edge. The top strap portion may be connected to the display unit housing 1205 through the forehead support 1360.

In some forms, the top strap portion may be connected to the posterior support portion 1350. For example, the top strap portion may be connected proximate to a superior edge of the posterior support portion 1350.

In some forms, the top strap portion may overlay the frontal bone and the pariental bone of the user's head.

In certain forms, the top strap portion may extend along the sagittal plane as it extends between the anterior and posterior portions of the head-mounted display system 1000.

In certain forms, the top strap portion may apply a tensile force oriented at least partially in the superior direction, which may oppose the force of gravity.

In some forms, the top strap portion may be adjustable in order to impart a selective tensile force on the display screen 1220 and/or the display unit housing 1205 in order to secure a position of the display screen 1220 and/or the display unit housing 1205.

In certain forms, the display unit housing 1205 and/or the forehead support 1360 may include at least one loop or eyelet 1254, and the top strap portion may be threaded through that eyelet 1254, and doubled back on itself. The length of the top strap portion threaded through the eyelet 1254 may be selected by the user in order to adjust the tensile force provided by the positioning and stabilizing structure 1300. For example, threading a greater length of the top strap portion through the eyelet 1254 may supply a greater tensile force.

In some forms, the top strap portion may include an adjustment portion and a receiving portion. The adjustment portion may be positioned through the eyelet 1254, and may be coupled to the receiving portion (e.g., by doubling back on itself). The adjustment portion may include a hook material, and the receiving portion may include a loop material (or vice versa), so that the adjustment portion may be removably held in the desired position. In some examples, the hook material and the loop material may be Velcro.

5.3.2.5 Rotational Control

In some forms, the display unit housing 1205 and/or the display screen 1220 may pivot relative to the user's face while the user has donned the positioning and stabilizing structure 1300. This may allow the user to see the physical environment without looking through the head-mounted display unit 1200 (e.g., without viewing computer generated images). This may be useful for users who want to take a break for viewing the virtual environment, but do not wish to doff the positioning and stabilizing structure 1300.

As illustrated in FIG. 5A, some forms of the user interface 1000 may include a pivot and/or flexible connection 1260 formed between ends of the arms 1210 and the posterior support portion 1350. The arms 1210 may pivot with the display unit housing 1205 relative to the posterior support portion 1350.

In certain forms, a forehead support 1360 (see e.g., FIG. 5B) may provide a stop for the display unit housing 1205 and limit further rotation.

In certain forms, the thickness of the forehead support 1360 may be less than the distance between the posterior surface of the display unit housing 1205 and the user's head. The display unit housing may therefore freely rotate over the forehead support 1360 with limited to no interference.

In one form, the display unit housing 1205 may rotate about 90° between an operative position and a non-operative position. For example, FIG. 5B illustrates the operative position and a user may rotate the display unit housing up to about 90° (e.g., so that the display unit housing 1205 is disposed on top of the user's head).

In certain forms, the pivot connection 1260 may be coupled to the temporal connectors 1250. The head-mounted display unit 1200 may be able to pivot about an axis extending between the temporal connectors 1250 (e.g., a substantially horizontal axis that may be substantially perpendicular to the Frankfort horizontal, in use).

In certain forms, the pivot connection 1260 may allow the interfacing structure 1100 to remain in place while the display unit housing pivots out of the operative position.

In certain forms, the display screen 1220 and/or the display unit housing 1205 includes a pair of arms 1210, which extend away from the display screen 1220 (e.g., in a cantilevered configuration), and may extend in the posterior direction, in use.

As illustrated in FIG. 5A, some forms of the user interface may include the axis extending through the free ends of the arms 1210. In other examples, the axis may be closer to the fixed end of the arms 1210 (e.g., so that only the display unit housing 1205 pivots relative to the arms 1210).

In certain forms, the pair of arms 1210 may extend at least partially along the temporal connectors 1250, and may connect to the temporal connectors 1250 at the pivot connection 1260.

In some forms, the pivot connection 1260 may be a ratchet connection, and may maintain the display unit housing 1205 in a raised position without additional user intervention.

In some forms, the display screen 1220 and/or the display unit housing 1205 may include a neutral position (see e.g., FIG. 5B; substantially horizontal in use) and a pivoted position (e.g., pivoted relative to the horizontal axis, in use).

In certain forms, the display screen 1220 and/or the display unit housing 1205 may pivot between approximately 0° and approximately 90° relative to the temporal connectors 1250. In certain forms, the display screen 1220 and/or the display unit housing 1205 may pivot between approximately 0° and approximately 80° relative to the temporal connectors 1250. In certain forms, the display screen 1220 and/or the display unit housing 1205 may pivot between approximately 0° and approximately 70° relative to the temporal connectors 1250. In certain forms, the display screen 1220 and/or the display unit housing 1205 may pivot between approximately 0° and approximately 60° relative to the temporal connectors 1250. In certain forms, the display screen 1220 and/or the display unit housing 1205 may pivot between approximately 0° and approximately 50° relative to the temporal connectors 1250. In certain forms, the display screen 1220 and/or the display unit housing 1205 may pivot between approximately 0° and approximately 45° relative to the temporal connectors 1250. At least at its maximum pivotal position, the display screen 1220 may be more superior than the user's eyes, so that the user does not have to look through the display screen 1220 to view the physical environment.

5.3.3 Controller

As shown in FIG. 6, some forms of the head-mounted display system 1000 include a controller 1270 that can be engagable by the user in order to provide user input to the virtual environment and/or to control the operation of the head-mounted display system 1000. The controller 1270 can be connected to the head-mounted display unit 1200, and provide the user the ability to interact with virtual objects output to the user from the head-mounted display unit 1200.

5.3.3.1 Handheld Controller

In some forms, the controller 1270 may include a handheld device, and may be easily grasped by a user with a single hand.

In certain forms, the head-mounted display system 1000 may include two handheld controllers. The handheld controllers may be substantially identical to one another, and each handheld controller may be actuatable by a respective one of the user's hands.

In some forms, the user may interact with the handheld controller(s) in order to control and/or interact with virtual objects in the virtual environment.

In some forms, the handheld controller includes a button that may be actuatable by the user. For example, the user's fingers may be able to press the button while grasping the handheld controller.

In some forms, the handheld controller may include a directional control (e.g., a joystick, a control pad, etc.). The user's thumb may be able to engage the directional control while grasping the handheld controller.

In certain forms, the controller 1270 may be wirelessly connected to the head-mounted display unit 1200. For example, the controller 1270 and the head-mounted display unit 1200 may be connected via Bluetooth, Wi-Fi, or any similar means.

In certain forms, the controller 1270 and the head-mounted display unit 1200 may be connected with a wired connection. The wired connection may provide electrical power to the controller 1270.

5.3.3.2 Fixed Controller

In some forms, at least a portion of the controller 1270 may be integrally formed on the display unit housing 1205.

In some forms, the controller 1270 may include control buttons that are integrally formed on the display unit housing 1205. For example, the control buttons may be formed on the superior face 1230 and/or the inferior face 1232, so as to be engageable by the user's fingers when holding the user's palm rests against the lateral left or right face 1234, 1236 of the display unit housing 1205. Control buttons may also be disposed on other faces of the display unit housing 1205.

In some forms, the user may interact with the control buttons in order to control at least one operation of the head-mounted display system 1000. For example, the control button may be an On/Off button, which may selectively control whether the display screen 1220 is outputting an image to the user.

In certain forms, control buttons may provide other functions like brightness control on the display screen 1220 and/or volume control on speakers 1272 provided in the display unit housing 1205.

In certain forms, the control buttons and the head-mounted display unit 1200 may be connected with a wired connection.

In some forms, the head-mounted display system 1000 may include both the handheld controller and the control buttons.

In some forms, having only control button(s) may be preferable in an AR or MR device. While wearing the AR or MR head-mounted display system 1000, the user may be interacting with their physical environment (e.g., walking around, using tools, etc.). Thus, the user may prefer to keep their hands free of controllers 1270.

5.3.4 Speaker

As shown in FIG. 6, some forms of the head-mounted display system 1000 includes a sound system or speakers 1272 that may be connected to the head-mounted display unit 1200 and positionable proximate to the user's ears in order to provide the user with an auditory output.

In some forms, the speakers 1272 be positionable around the user's ears, and may block or limit the user from hearing ambient noise. For example, the speakers may be formed like ear muffs.

In certain forms, each of the speakers 1272 may be connected to one of the pair of arms 1210. This may be a permanent connection or a removable connection.

In some forms, the speakers 1272 may be ear buds and fit inside of the user's ears. The ear buds may be usable only with the head-mounted display unit 1200, or they may be standard ear buds usable with other electronic devices (e.g., smart phones).

In certain forms, the speakers 1272 may be wirelessly connected to the head-mounted display unit 1200. For example, the speakers 1272 and the head-mounted display unit 1200 may be connected via Bluetooth, Wi-Fi, or any similar means.

In some forms, the speaker 1272 includes a left ear transducer and a right ear transducer. In some forms, the left and right ear transducers may output different signals, so that the volume and or noise heard by the user in one ear (e.g., the left ear) may be different than the volume and or noise heard by the user in the other ear (e.g., the right ear).

In some forms, the speaker 1272 (e.g., the volume of the speaker 1272) may be controlled using the controller 1270.

5.3.5 Power Source

As shown in FIG. 6, some forms of the head-mounted display system 1000 may include an electrical power source 1274 can provide electrical power to the head-mounted display unit 1200 and any other electrical components of the head-mounted display system 1000.

In certain forms, the power source 1274 may include a wired electrical connection that may be coupled to an external power source (e.g., a wall outlet, a computer, etc.), which may be fixed to a particular location.

In certain forms, the power source 1274 may include a portable battery that may provide power to the head-mounted display unit 1200. The portable battery may allow the user greater mobility than compared to a wired electrical connection. The portable battery may be replaceable and/or rechargeable.

In certain forms, the head-mounted display system 1000 and/or other electronic components of the head-mounted display system 1000 may include internal batteries, and may be usable without the power source 1274.

In one form, the head-mounted display system 1000 may be powered by either a portable battery or an external power source, and a user may selectively choose which type of power source to use.

In some forms, the head-mounted display system 1000 may include the power source 1274 in a position remote from the head-mounted display unit 1200. Electrical wires may extend from the distal location to the display unit housing 1205 in order to electrically connect the power source 1274 to the head-mounted display unit 1200.

In certain forms, the power source 1274 may be coupled to the positioning and stabilizing structure 1300. For example, the power source 1274 may be coupled to a strap of the positioning and stabilizing structure 1300, either permanently or removably. The power supply 1274 may be coupled to a posterior portion of the positioning and stabilizing structure 1300, so that it may be generally opposite the display unit housing 1205 and/or the head-mounted display unit 1200. The weight of the power source 1274, and the weight head-mounted display unit 1200 and the display unit housing 1205 may therefore be spread throughout the head-mounted display system 1000, instead of concentrated at the anterior portion of the head-mounted display system 1000. Shifting weight to the posterior portion of the display interface may limit the moment created at the user's face, which may improve comfort and allow the user to wear the head-mounted display system 1000 for longer periods of time.

In certain forms, the power source 1274 may be supported by a user distal to the user's head. For example, the power source 1274 may connected to the head-mounted display unit 1200 and/or the display unit housing 1205 only through an electrical connector (e.g., a wire). The power source 1274 may be stored in the user's pants pocket, on a belt clip, or a similar way which supports the weight of the power source 1274. This removes weight that the user's head is required to support, and may make wearing the head-mounted display system 1000 more comfortable for the user.

5.3.6 Control System

In some forms, the control system 1276 may be powered by the power source 1274 (e.g., at least one battery) used for powering components of the control system 1276. For example, sensors of the control system 1276 may be powered by the power source 1274.

In some forms, the at least one battery of the power source 1274 may be a low power system battery 1278 and a main battery 1280.

In certain forms, the low power system battery 1278 may be used to power a real time (RT) clock 1282 of the control system 1276.

5.3.6.1.1 Integrated Power Support Portion

In some forms, a battery support portion 1288 may support the low power system battery 1278 and/or the main battery 1280. The battery support portion 1288 may be directly supported on the head-mounted display system 1000.

In some forms, the battery support portion 1288 may be disposed within the display unit housing 1205.

In some forms, the battery support portion 1288 may be disposed on the positioning and stabilizing structure 1300. For example, the battery support portion 1288 may be coupled to the posterior support portion 1350. The weight of the head-mounted display system 1000 may be better balanced around the user's head.

5.3.6.1.2 Remote Power Support Portion

In some forms, a battery support portion 1288 may support the low power system battery 1278 and/or the main battery 1280. The battery support portion 1288 may be coupled to the user independently of the positioning and stabilizing structure 1300 and/or the display unit housing 1205 (e.g., it may be coupled via a belt clip). The battery support portion 1288 also may be supported remote from the user's body (e.g., if the head-mounted display system 1000 receives power from a computer or video game console). A tether may couple the battery support portion 1288 to the control system 1276 and/or other electronics. The positioning of the battery support portion may improve comfort for the user, since the weight of the low power system battery 1278 and/or the main battery 1280 are not supported by the user's head.

5.3.6.2 Orientation Sensor

In some forms, the control system 1276 includes an orientation sensor 1284 that can sense the orientation of the user's body. For example, the orientation sensor 1284 may sense when the user rotates their body as a whole, and/or their head individually. In other words, the orientation sensor 1284 may measure an angular position (or any similar parameter) of the user's body. By sensing the rotation, the sensor 1284 may communicate to the display screen 1220 to output a different image.

In some examples, an external orientation sensor may be positioned in the physical environment where the user is wearing the head-mounted display system 1000. The external position sensor may track the user's movements similar to the orientation sensor 1284 described above. Using an external orientation sensor may reduce the weight required to be supported by the user.

5.3.6.2.1 Camera

In some forms, the control system 1276 may include at least one camera, which may be positioned to view the physical environment of the user.

In some forms, the orientation sensor 1284 is a camera, which may be configured to observe the user's physical environment in order to measure and determine the orientation of the user's head (e.g., in what direction the user's head has tilted).

In some forms, the orientation sensor 1284 includes multiple cameras positioned throughout the head-mounted display system 1000 in order to provide a more complete view of the user's physical environment, and more accurately measure the orientation of the user's head.

5.3.6.3 Eye Sensor

In some forms, the control system 1276 may include an eye sensor that can track movement of the user's eyes. For example, the eye sensor may be able to measure a position of at least one of the user's eyes, and determine which direction at least one of the user's eyes are looking.

In some forms, the control system 1276 may include two eye sensors. Each sensor may correspond to one of the user's eyes.

In some forms, the eye sensors may be disposed in or proximate to the lenses 1240.

In some forms, the eye sensors may measure an angular position of the user's ears in order to determine the visual output from the display screen 1220.

In some forms, the user's eye may act as a controller, and the user may move their eyes in order to interact with virtual objects. For example, a virtual cursor may follow the position of the user's eyes. The eye sensor may track and measure the movement of the user's eyes, and communicate with a processing system 1286 (described below) in order to move the virtual cursor.

5.3.6.4 Processing System

In some forms, the control system 1276 includes a processing system 1286 (e.g., a microprocessor) that may receive the measurements from the various sensors of the control system 1276.

In some forms, the processing system 1286 may receive measurements recorded by the orientation sensor 1284 and/or the eye sensors. Based on these measured values, the processor can communicate with the display screen 1220 in order to change the image being output. For example, if the user's eyes and/or the user's head pivots in the superior direction, the display screen 1220 may display a more superior portion of the virtual environment (e.g., in response to direction from the processing system 1286).

5.4 Interfacing Structure

5.4.1 Interfacing Structure with Chassis and Face Engaging Portion

FIGS. 7A-7E, FIGS. 11A-11M and FIGS. 13-16 show interfacing structures 1100 according to further examples of present technology. FIGS. 12A-12E show cushions 1130 for an interfacing structure according to an example of the present technology. The interfacing structure 1100 is for a head-mounted display system 1000 comprising a head-mounted display unit 1200 comprising a display and the interfacing structure 1100, which is constructed an arranged to be in opposing relation to user's face in use. The head-mounted display system 1000 may otherwise have any of the features, configurations, aspects, functions and the like as described elsewhere herein. For example, the head-mounted display system 1000 may comprise a positioning and stabilising structure 1300 structured and arranged to hold the head-mounted display unit 1200 in an operable position on the user's head in use.

The interfacing structure 1100 may comprise a face engaging portion 1110 configured to engage the user's face in use. The face engaging portion 1110 may be flexible and resilient. The face engaging portion 1110 may be formed at least partially from an elastomeric material, such as silicone or a TPE, for example.

It is to be understood that, unless context requires otherwise, any features of an interfacing structure and/or face engaging portion (such as described with reference to FIGS.

4A-4B or FIGS. 5A-5B) described elsewhere herein may be applied to an interfacing structure 1100 such as that shown in FIGS. 7A-7E, FIGS. 11A-11M and FIGS. 13-16. These interfacing structures 1100 may be particularly suited to use in a head-mounted display system 1000 configured for VR, such as that described with reference to FIGS. 4A-4B. However, it is to be understood that the interfacing structures 1100 described with reference to FIGS. 7A-7E, FIGS. 11A-11M and FIGS. 13-16, or individual features thereof, may be applied in a head-mounted display system 1000 configured for use in any of VR, MR, AR or other artificial reality.

The interfacing structure 1100 may further comprise a chassis portion 1102 being stiffer than the face engaging portion 1110. The face engaging portion 1110 is attached to and may be supported by the chassis portion 1102. The chassis portion 1102 may be configured to attach the interfacing structure 1100 to the head-mounted display unit 1200. For example, the chassis portion 1102 may be configured to attach to a display unit housing 1205 of the head-mounted display unit 1200. In the examples shown in FIGS. 7A-7M, FIGS. 11A-11M and FIGS. 13-16 the chassis portion 1102 is thicker than the face engaging portion 1110. In other examples the chassis portion 1102 may be formed from a stiffer material than the face engaging portion 1110. In some examples the chassis portion 1102 may be formed from a thermoplastic material, such as polycarbonate, ABS, nylon or the like while the face engaging portion 1110 may be formed from an elastomeric material, such as silicone or a TPE. The chassis portion 1102 may additionally comprise a shape that requires a greater force to deform than the face engaging portion 1110.

Figure 11E:
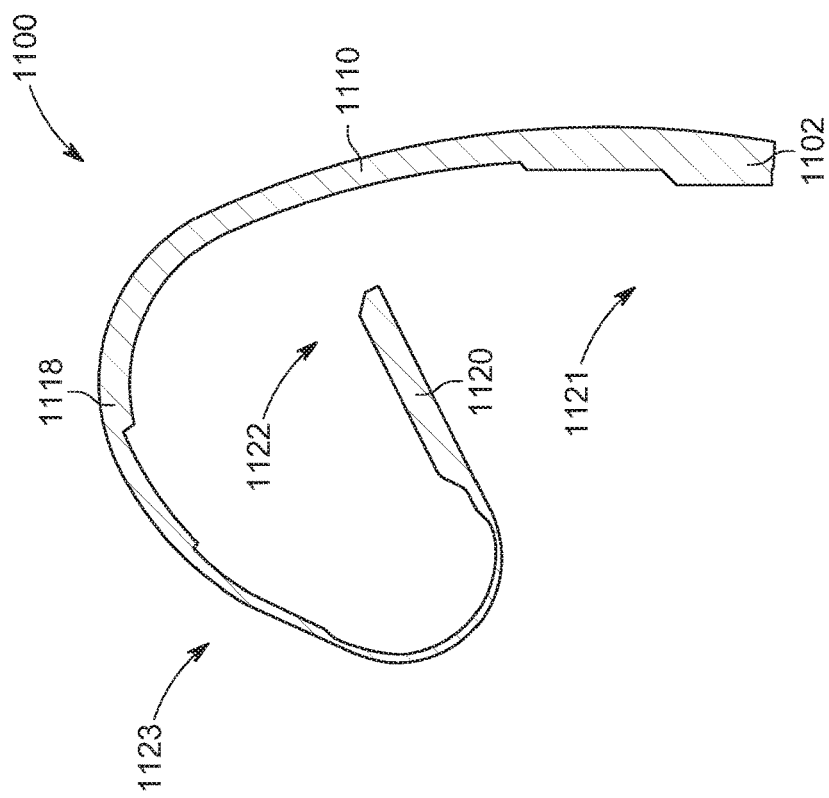
Figure 11C:
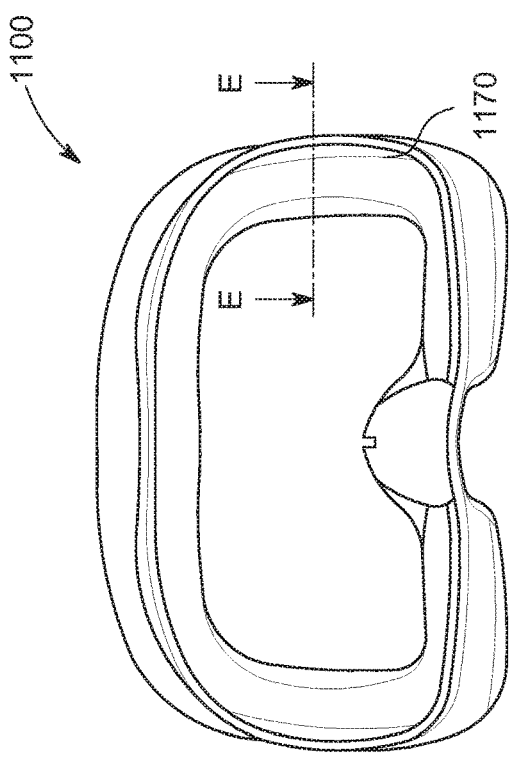
Figure 11D:
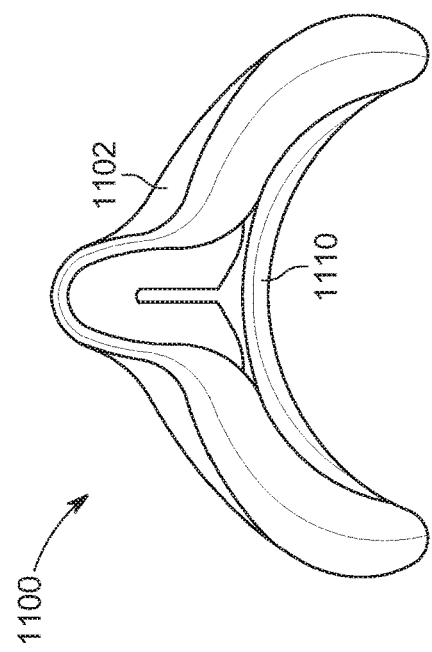

In some examples, the face engaging portion 1110 and chassis portion 1102 may comprise a singular component able to be releasably fastened to the head-mounted display unit 1200. The chassis portion 1102 may be configured to attach the interfacing structure 1100 to the head-mounted display unit 1200, for example by a snap fit. In other examples the chassis portion 1102 may attach to the head-mounted display unit 1200 by an interference fit, hook-and-loop fastening connection, a magnetic connection, with an interfacing structure clip or retainer that allows for a friction fit, interference fit, snap fit or any other suitable connection. In the examples illustrated in FIGS. 7A-7M, FIGS. 11A-11M and FIGS. 13-16 the chassis portion 1102 is configured to be attached to an interfacing structure clip 1101 as shown in FIG. 11M, for example by overmoulding, an adhesive, and/or press-fitting. The interfacing structure clip 1101 is able to form a snap fit connection to a display unit housing 1205 of a head-mounted display unit 1200.

In some forms, the interfacing clip structure 1101 may receive the chassis portion 1102 and may be separate from the cushion 1130. For example, as illustrated in FIG. 11M, the interfacing clip structure 1101 and the chassis portion 1102 are spaced apart from the cushion 1130. In this example, the face engaging portion 1100 includes an open loop structure and the interfacing clip structure 1101 does not contribute to enclosing the cushion 1130. In other examples where the face engaging portion 1100 is a closed loop, the interfacing clip structure 1101 may similarly not form part of the perimeter that encloses the cushion 1130.

The face engaging portion 1110 may be configured to engage the user's face around a periphery of the user's eyes in use. The face engaging portion 1110 may be configured to engage the sides of the user's face lateral of the user's eyes and engage the user's forehead in use. The face engaging portion 1110 may engage the user's cheeks, the sides of the user's face lateral of the user's eyes and the user's forehead.

The face engaging portion 1110 may engage the user's face at regions overlying the user's nose, maxilla, zygomatic bones, sphenoid bones and frontal bones. The face engaging portion 1110 may engage the user's face in region shown in FIG. 4D, for example. In some examples, the face engaging portion 1110 has a curved cross-section, such as the cross section shown in FIG. 7H (which will be described in more detail below).

5.4.1.1 Nasal Portion

With reference to FIGS. 7A-7M. FIGS. 11A-11M and FIGS. 13-16, the face engaging portion 1110 comprises a nasal portion 1180 configured to engage the user's nose in use. In these examples, the nasal portion 1180 is configured to at least partially block light from reaching the user's eyes from the user's nose region (e.g. block light travelling via a path proximate the surfaces of the user's nose). The nasal portion 1180 may for example be configured to engage anterior, superior and/or lateral surfaces of the user's nose in use.

The face engaging portion 1110 also comprises cheek portions 1140, provided on respective sides of the user's nose in use, configured to engage the user's cheeks in use, and medial support portions 1145 between the cheek portions 1140, which will be described in more detail below. The nasal portion 1180 is located between the cheek portions 1140 and may span between cheek portions 1140. The medial support portions 1145 may be spaced laterally apart across the sagittal plane of the user's head and may be located on respective lateral sides of the user's nose, adjacent the user's nasal ala for example. The nasal portion 1180 may be attached to the medial support portions 1145. The nasal portion 1180 may connect between the medial support portions 1145. The nasal portion 1180 may be medially adjacent to each medial support portion 1145 although it may be located superior to the medial support portions 1145 in use, for example superiorly and medially adjacent to the medial support portions 1145. In some examples, the nasal portion 1180 may be integrally formed with the cheek portions 1140. This may advantageously make the nasal portion 1180 and cheek portions 1140 easy to clean as the integrally formed structures may be easily wiped clean. The nasal portion 1180 may be integrally formed with the closed loop portions 1150 described in more detail below.

The interfacing structure 1100 may further comprise a medial anchor portion 1144 intersecting the sagittal plane of the user's head in use, the medial anchor portion 1144 being stiffer than the medial support portions 1145. Each medial support portion 1145 may connect between a respective lateral side of the medial anchor portion 1144 and a respective cheek portion 1140. FIGS. 7E, 11L and 13B show exemplary medial anchor portions 1144. Alternatively expressed, the medial anchor portion 1144 may connect the two medial support portions 1145.

In the examples illustrated in FIGS. 7A-7M, FIGS. 11A-11M and FIGS. 13-16, the nasal portion 1180 comprises a pronasale portion 1182 configured to be positioned proximate the user's pronasale in use. The pronasale portion 1182 may be connected to the medial anchor portion 1144 of the interfacing structure 1100 and may extend from the medial anchor portion 1144 in superior and posterior directions. In some examples, the pronasale portion 1182 may be connected to and extend from the medial support portions 1145 in medial and posterior directions. This configuration may provide for good light blocking in the area proximate the user's pronasale.

As shown in FIGS. 7B-7D and 15A-15G, for example, the pronasale portion 1182 is dome shaped in this this example.

The pronasale portion 1182 may occupy a space superior, anterior and/or laterally of the user's pronasale in use.

In the particular examples shown in FIGS. 7A-7M, the nasal portion 1180 comprises bridge portions 1186. The bridge portions 1186 may contact the user's nose along the nasal ridge, and may extend toward the user's sellion. The bridge portions 1186 extend completely to the user's sellion or may extend only partially along the user's nasal ridge. In some examples the nasal portion 1180 may contact a majority of the user's nasal ridge in use. The nasal portion 1180 may comprises a first bridge portion 1186 and a second bridge portion 1186 extending at least partially posteriorly from the pronasale portion 1182 to engage the user's nose. The first bridge portion 1186 is configured to bridge between one of the medial support portions 1145 and a first lateral side of the user's nose, and the second bridge portion 1186 is configured to bridge between the other of the medial support portions 1145 and a second lateral side of the user's nose. Accordingly the first bridge portion 1186 may be located on a first side of the sagittal plane of the user's head and the second bridge portion 1186 may be located on the second side of the sagittal plane of the user's head. The bridge portions 1186 may extend in superior and/or posterior directions from the pronasale portion 1182. The first and second bridge portions 1186 in the examples shown in FIGS. 7A-7M also bridge between check portions 1140 and respective lateral sides of the user's nose.

The first bridge portion 1186 and the second bridge portion 1186 may be separated by a slot 1188. The slot 1188 may extend between the bridge portions 1186 from a posterior edge of the nasal portion 1180 towards the pronasale portion 1182, as illustrated in FIG. 7B, for example. The bridge portions 1186 may be configured to engage respective lateral sides of the user's nose in use. For example, they may rest on the lateral sides of the user's nose. The bridge portions 1186 may function like flaps and may be lifted by the user's nose when the user dons the head-mounted display system 1000. Lifting of the bridge portions 1186 such that they rest against surfaces of the user's nose, may facilitate the bridge portions 1186 conforming well to the user's nose, providing a good light blocking effect. For example, the bridge portions 1186 may contact the user's nose with limited to no wrinkles as a result of the slot 1188.

In the example shown in FIGS. 7A-7E, there are no slots/cutouts at lateral sides of the nasal portion 1180. The first bridge portion 1186 and the second bridge portion 1186 are each connected to a respective medial support portion 1145 and check portion 1140 of the face engaging portion 1110 along an entirety of a lateral side of the respective bridge portion 1186. In other examples, outer slots are provided between the bridge portions 1186 and the medial support portion 1145, or more generally between the bridge portions 1186 and portions of the face engaging portion 1110 laterally adjacent the bridge portions 1186. In examples some examples the interfacing structure 1100 does not comprise medial support portions 1145 and, in some such examples, the nasal portion 1180 is attached at its lateral sides to cheek portions 1140 of the face engaging portion 1110.

The material forming the bridge portions 1186 may be thin to enable the bridge portions 1186 to at least partially conform to the user's nose despite connection to the medial support portions 1145. The bridge portions 1186 may be integrally formed with each other and may be integrally formed with the pronasale portion 1182. The nasal portion 1180 may be integrally formed with the medial support portions 1145 (and/or with the cheek portions 1140).

FIGS. 7A-7C show five cross sections A, B, C, D and F through the interfacing structure 1100 cut parallel to the sagittal plane of the user's head when the interfacing structure 1100 is in an in-use orientation. The planes at which the interfacing structure 1100 is cut are also indicated in FIG. 7A. In this example the interfacing structure 1100 is symmetrical across a central plane aligned with the sagittal plane of the user's head in use. These cross sections F-F, A-A, B-B, C-C and D-D are also shown in isolation in FIGS. 7I-7M respectively.

FIGS. 7C and 7D, in particular, show cross sections (cross sections A and B) through the nasal portion 1180 of the face engaging portion 1110. As shown in cross section A, the face engaging portion 1110 extends superiorly, posteriorly and medially to form the nasal portion 1180.

The interfacing structure 1100 shown in FIGS. 11A-11M has a nasal portion 1180 substantially the same as that of the interfacing structure 1100 shown in FIGS. 7A-7E.

5.4.1.2 Loop Portions

As described above, the face engaging portions 1110 in the examples shown in FIGS. 7A-7E, FIGS. 11A-11M and FIGS. 13-16 comprise a pair of cheek portions 1140 configured to engage the user's cheeks in use, and a pair of medial support portions 1145 located medially of a respective one of the cheek portions 1140. Each medial support portion 1145 is configured to provide support for the respective cheek portion 1140, as will be described in more detail below. As illustrated, the face engaging portion 1110 further comprises at least one face engaging flange 1118 in these examples, the face engaging flange 1118 forming one or more loop portions having an at least partially enclosed cross section.

The face engaging portion 1110 may also comprise loop portions (for example open loop portions or closed loop portions) in other regions, such as a forehead portion 1175 and/or sphenoid portions 1170 of the face engaging portion 1110.

The at least one face engaging flange 1118 of the face engaging portion 1110 may form a pair of closed loop portions 1150 on respective lateral sides of the face engaging portion 1110 each having an enclosed cross-section. As shown by cross sections B and C in FIGS. 7C and 7D and as shown in FIGS. 11J and 11K, the face engaging portion 1110 comprises a closed loop portion 1150 on each lateral side of the interfacing structure 1100 (and on each lateral side of the nasal portion 1180). The closed loop portion 1150 has an enclosed cross-section (e.g. a completely enclosed cross section whereby the material forming the closed loop portion 1150 forms a closed loop). In some examples, such as those shown in FIGS. 7A-7M for example, the closed loop portions 1150 are integrally formed in a continuous loop (e.g. moulded in the form of a loop as opposed to edges of a sheet-like structure being attached to each other to form a loop). This construction may limit seams or edges around the perimeter of the closed loop portion 1150. The closed loop portions 1150 may be adjacent the nasal portion 1180. The closed loop portions 1150 in the illustrated examples at least partially form the medial support portions 1145 of the face engaging portion 1110. In some examples, each of the pair of closed loop portions 1150 engages a lateral surface of the user's nose in use, for example a lateral surface of the user's nasal ala. This may assist in creating a light seal at the user's nose.

The at least one face engaging flange 1118 of the face engaging portion 1110 may also form a pair of open loop portions 1160 each having an open cross section (e.g. a partially open cross section whereby the material forming the open loop portion 1160 forms a loop that is not closed and may be partially but not fully enclosed). As shown by cross section D in FIG. 7C or FIG. 11E or 11I, the face engaging portion 1110 comprises an open loop portion 1160 within each cheek portion 1140. Each open loop portion 1160 may be laterally adjacent to a respective one of the closed loop portions 1150 and may be in a respective check portion 1140.

In each of the check portions 1140 the face engaging flange 1118 extends inferiorly from the chassis portion 1102 and then posteriorly, superiorly, and anteriorly. In each of the medial support portions 1145 the face engaging flange 1118 extends inferiorly from the chassis portion 1102 and then medially, superiorly and laterally. As illustrated, there is a gap 1162 in the open loop portion 1160 between the face engaging flange and the chassis portion 1102 such that the open loop portion 1160 does not form a closed loop. In contrast, in each of the closed loop portions 1150, after extending inferiorly from the chassis portion 1102 and then posteriorly, superiorly and anteriorly, the face engaging flange 1118 connects back to itself, for example at or proximate the chassis portion 1102. In other examples, the face engaging flange 1118 may not connect back to itself and may instead connect back to the chassis portion 1102. The face engaging flange 1118 may be formed from and elastomeric material, such as silicone or a TPE.

The face engaging portion 1110 may also comprise a forehead portion 1175 configured to engage the user's forehead in use, and a pair of sphenoid portions 1170 located on respective lateral sides of the interfacing structure 1100 connecting between the forehead portion 1175 and the cheek portions 1140 and configured to engage the user's head proximate the sphenoid bone. In the example shown in FIGS. 7A-7M, the open loop portions 1160 extend longitudinally along the interfacing structure 1100 from the check portions 1140 into the sphenoid portions 1170 and into the forehead portion 1175. The open loop portions 1160 may therefore be alternatively identified as a single open loop portion 1160 extending from within a first cheek portion 1140 into a first sphenoid portion 1170, then into the forehead portion 1175 and across to the other lateral side of the user's face, then into a second sphenoid portion 1170 and finally into a second check portion 1140. FIG. 7H shows a cross section view through the interfacing structure 1100 within the forehead portion 1175. As illustrated, the face engaging flange 1118 forms a partially enclosed cross section but does not join back to itself or the chassis portion 1102, leaving a gap 1162. The gap 1162 may be considered an opening into the partially enclosed cross section, or an opening into an interior of the face engaging portion 1110.

In each loop portion (e.g. the open loop portion 1160 and the closed loop portion 1150), the face engaging flange 1118 may comprise an anterior portion 1141 connected to the chassis portion 1102 and a posterior portion 1142 connected to the anterior portion 1141 and positioned posteriorly to the anterior portion 1141. The posterior portion 1142 is configured to be in contact with the user's face in use. The posterior portion 1142 may therefore comprise a face engaging region 1123 of the face engaging portion 1110. The anterior portions 1141 and posterior portions 1142 together form the closed loop portions 1150 and open loop portions 1160 of the face engaging portion 1110 of the interfacing structure 1100. FIG. 7E shows a view of cross section E, the cutting plane of which is indicated in FIG. 7A. With reference to FIGS. 7D and 7E, each of the closed loop portions 1150 and open loop portions 1160 comprise an anterior portion 1141 and a posterior portion 1142, the anterior portion 1141 being the anterior portion of the open or closed loop (as the case may be) and the posterior portion 1142 being the posterior portion of the loop (as the case may be).

As illustrated in FIG. 7C, the face engaging portion 1110 comprises a cushion support flange 1164 extending inwardly from the face engaging flange 1118 with respect to the loop formed by the open loop portion 1160 in each of the cheek portions. That is, the cushion support flange 1164 extends inwardly into an interior of the open loop portion 1160, e.g. the space partially enclosed by the face engaging flange 1118. Alternatively, or additionally, the face engaging portion 1110 may comprise a cushion support flange 1164 in the closed loop portion 1150.

In some examples, such as that shown in FIGS. 7A-7M, the cushion support flanges 1164 in the check portions 1140 extend longitudinally along the face engaging portion 1110 from the respective check portions 1140 into respective sphenoid portions 1170 and into the forehead portion 1175 and may meet in the forehead portion 1175 at the sagittal plane of the user's head in use, such that the face engaging portion 1110 comprises a single cushion support flange 1164 forming the cushion support flange 1164 in each check portion 1140. FIG. 7E shows the cushion support flange 1164 extending into the sphenoid portion 1170 and FIG. 7M shows the cushion support flange 1164 in the forehead portion. Accordingly, the face engaging portion 1110 may also be described as having a single cushion support flange 1164 extending along the face engaging portion 1110 from a first check portion 1140, into a first sphenoid portion 1170, into and across the forehead portion 1175 into a second sphenoid portion 1170 and then into the second cheek portion 1140.

The interfacing structure 1100 may comprise one or more cushions within a face engaging portion 1110, for example behind a face engaging flange 1118 (e.g. on an opposite side of a face engaging flange 1118 to a face engaging surface that contacts the user's face in use). For example, the interfacing structure 1100 may comprise one or more cushions supported by the cushion support flange 1164, for example between the cushion support flange 1164 and the posterior portion 1142 of the face engaging portion 1110. The cushion may comprise a material or structure that is readily compressible (e.g. soft) to provide a cushioning function in use. In some examples the one or more cushions are formed from foam. For example, the cushion support flange 1164 may support a foam cushion located within the face engaging portion 1110, as described in International (PCT) Application No. PCT/AU2021/050277, the entirety of which is hereby incorporated by reference herein. The face engaging portion 1110 may securely retain a foam cushion within the interfacing structure 1100. In the interfacing structure 1100 shown in FIGS. 7A-7M, the face engaging portion 1110 is configured to almost completely enclose a foam cushion, even in the open loop portions 1160 of the interfacing structure 1100. Alternatively, the one or more cushions may comprise a gel, for example gel encapsulated in a flexible plastic material, or may comprise another material able to provide a cushion function. In some examples the cushion may comprise a 3D printed structure, such as a 3D printed lattice. The cushion support flange 1164 may be formed from the same material as the face engaging flange 1118, such as an elastomeric material (e.g. silicone or a TPE). In the example shown in FIGS. 7A-7M, the cushion support flange 1164 is integrally formed with the face engaging flange 1118.

In some forms, the cushion support flange 1118 may be disposed within the face engaging portion 1110. For example, as illustrated in FIG. 7H, the cushion support flange 1164 is directed into the open loop configuration so that it may not form part of the outer perimeter. In other words, there may be a continuous length of material (or materials) around the face engaging portion 1110 and the face engaging flange 1118 that does not include the cushion support flange 1164.

Figure 11G:
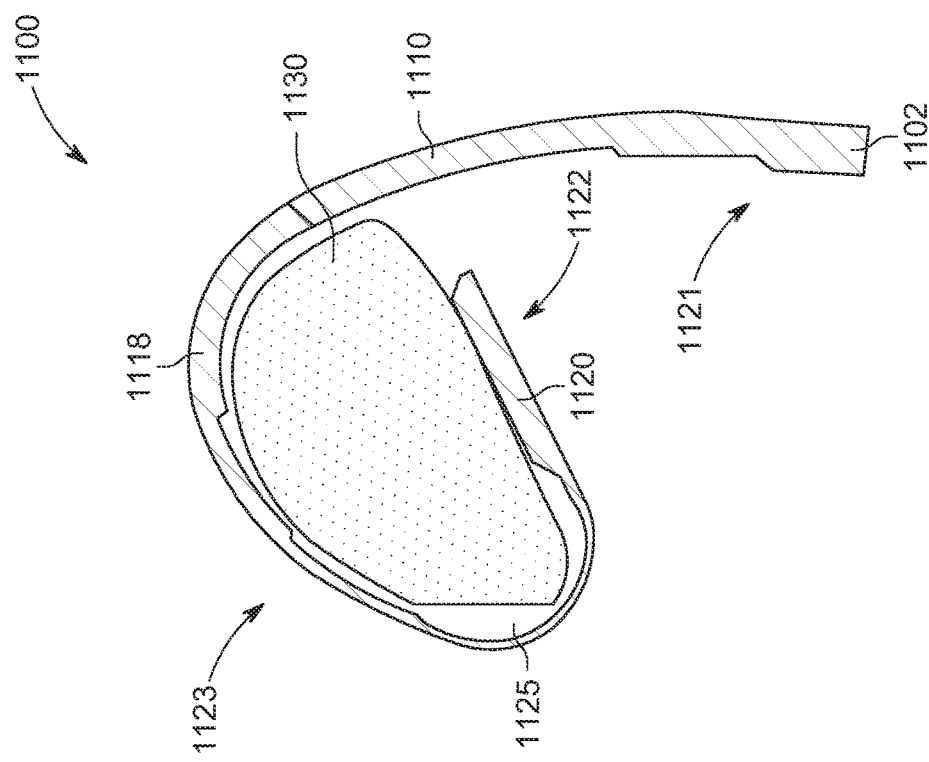
Figure 11F:
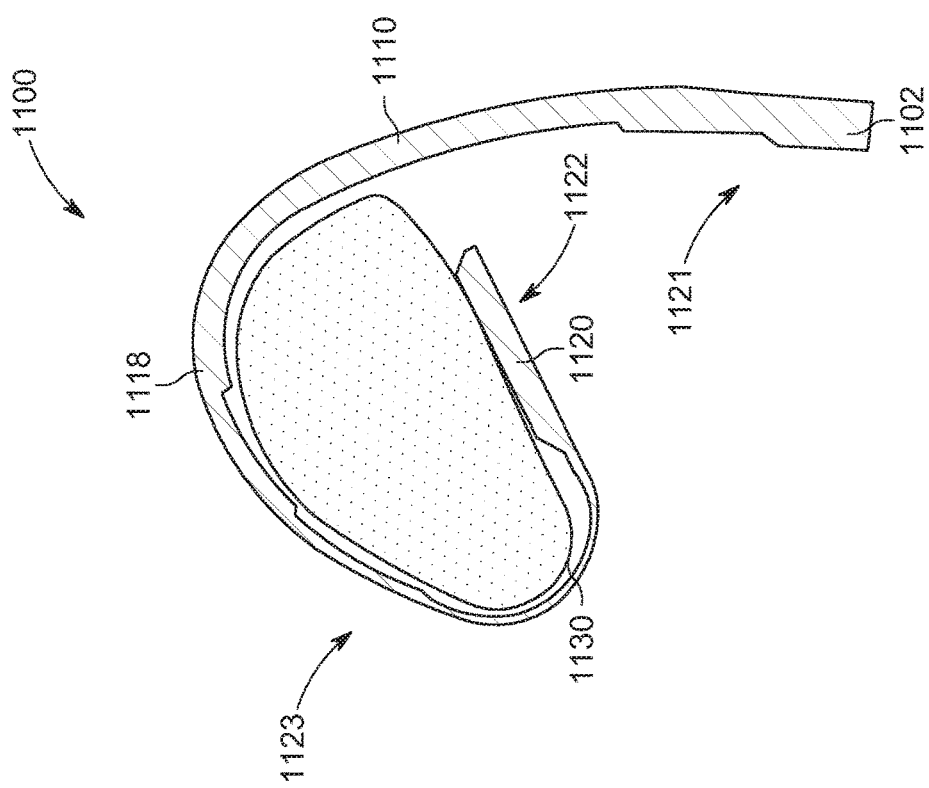

In other examples, as will be described below in more detail, the interfacing structure 1100 may not comprise a cushion support flange 1164 and instead may comprise a cushion 1130 connected directly to a surface of the face engaging flange 1118. FIGS. 11F, 11G and 14A show examples of this type of configuration.

As described above, the interfacing structure 1100 may have a face engaging portion 1110 engaging a user's face around a periphery of a user's eye region and around a periphery of a display of the head-mounted display unit 1200 in use. The face engaging portion 1110 may be formed by both open loop portions 1160 and closed loop portions 1150. The lengths of the face engaging portion 1110 around and along the periphery of the user's eye region formed by each of the open loop portions 1160 and closed loop portions 1150 may vary in examples of the present technology.

In some examples a majority of the length of the face engaging portion 1110 around the periphery of the user's eye region is formed by one or more closed loop portions 1150. Closed loop portions 1150 may have the advantage that they hold an enclosed cushion 1130 securely, may be easy to clean and aesthetically pleasing, and are not prone to a free end of a face engaging flange 1118 becoming dislodged. That said, a face engaging portion 1110 with a completely enclosed pocket may not be desired for some applications due to forces produced by compression of air in the pocket/bladder in use.

Accordingly, in some examples a majority of the face engaging portion 1110 is formed by one or more closed loop portions 1150 but comprises one or more open loop portions 1160. FIG. 20A shows a view of one such example. The face engaging portion 1110 comprises an open loop portion 1160 in a forehead portion 1175, for example intersecting the sagittal plane of the user's head in use. The face engaging portion 1110 in this example also comprises a pair of open loop portions 1160 at or proximate the cheek portions 1140, for example at or proximate the medial ends of the cheek portions 1140, e.g. adjacent a nasal portion 1180 or adjacent medial support portions 1145, for example. In some examples there is only one open loop portion 1160, or there may be two, four, or more. FIG. 20B shows another example of an interfacing structure 1100 having open loop portions 1160 in the forehead portion 1170 and on either lateral side of a nasal portion. In these examples, substantially all of the cheek portions 1140, forehead portion 1175 and sphenoid portions 1170 are formed by closed loop portions 1150, with the exception of the open loop portions.

In each of FIGS. 20A and 20B the open loop portions 1160 are formed by openings 1116 in the face engaging flange 1118. The openings 1116 allow for air exchange between the interior of the interfacing structure 1100 or face engaging portion 1110 and ambient, so that the compliance of the face engaging portion 1110 is not hindered by increasing air pressure within the closed loop portions 1150. FIGS. 20C and 20D show cross section views through a closed loop portion 1150 and open loop portion 1160 respectively, including showing the cushion 1130 fully and partially enclosed, respectively within the face engaging flange 1118. In the example shown in FIG. 20A the openings 1116 are located at a superior portion of the face engaging flange 1118 proximate the nasal portion 1180 while in the example shown in FIG. 20B the openings 1116 are located at an inferior portion of the face engaging flange 1118 proximate the nasal portion 1180. In the illustrated examples the openings 1116 are surrounded or defined by a bead formed in the face engaging flange 1118, the bead being a thickened portion of the face engaging flange 1118. In other examples there may be no bead.

In some examples, the openings 1116 may be closed by an additional component or process, for example to further protect the cushion 1130 and/or improve aesthetic appeal. FIG. 20E shows one such example in which the opening 1116 has been closed with a cap 1117. In some examples the cap 1117 may be formed from silicone, for example by applying a pool of liquid silicone to the opening 1116 and curing it. In other examples the cap 1117 may be a flexible or rigid insert inserted into the hole and either attaching to the periphery of the opening 1116 or lying between the face engaging flange 1118 and the cushion 11130, attached (e.g. glued) to the face engaging flange 1118 or the cushion 1130. In some examples the cap 1117 may be provided with one or more small holes, or may be formed by a mesh material, to allow for air exchange while protecting the cushion 1130. In some examples the material forming the cap 1117 may be formed from a waterproof breathable material, such as a material that allows air exchange but does not allow liquid water exchange. Some examples are Gortex® and Sympa-Tex®. This may advantageously enable the interfacing structure 1100 to be washed, e.g. by full submersion in water, while allowing air exchange between the interior and exterior of the face engaging flange 1118. In some examples, the interfacing structure 1100 may comprise a waterproof breathable material forming at least the cap(s) 1117 which may be moisture wicking to allow water or moisture generated by the face to be removed from the face engaging region 1123 of the interfacing structure 1100 and transported through the material to be evaporated.

5.4.1.3 Medial Support Portions

In some examples, the interfacing structure 1100 comprises a pair of medial support portions 1145, as shown in FIGS. 7C-7E by way of example as well as in FIGS. 11M, 13B and 14A. FIGS. 15A-15G also show an example interfacing structure 1100 with medial support portions 1145 identified. Each medial support portion 1145 is located medially of a respective one of the cheek portions 1140 and is configured to provide support for the respective cheek portion 1140. Each medial support portion 1145 may support a loop portion. That is, the medial support portion 1145 may provide support for either a closed loop portion 1150 or an open loop portion 1160, depending on the configuration of the cheek portion 1140 in a particular example of the present technology.

In the examples shown in FIGS. 7A-7E, FIGS. 11A-11M and FIGS. 13-16, each medial support portion 1145 is located between the nasal portion 1180 and a respective one of the cheek portions 1140. At each medial support portion 1145 the interfacing structure 1100 may curve anteriorly from a respective one of the cheek portions 1140, as depicted in FIG. 11L, FIGS. 13B and 14A for example. Each medial support portion 1145 may be integrally formed with the respective cheek portion 1140, although in other examples the medial support portions 1145 may be formed separately and then attached to the cheek portions 1140. The medial support portions 1145 are located medially adjacent the cheek portions 1140 and configured to support the cheek portions 1140.

The medial support portions 1145 may be configured to resist deformation of the cheek portions 1140. As shown in FIGS. 7E, 11K, 13B and 14A in particular, each of the medial support portions 1145 in these examples comprises a medially-facing wall 1146 located alongside the user's nose in use. Each of the cheek portions 1140 comprises a face engaging region 1123 configured to contact a respective one of the user's cheeks in use. In these examples, each medially-facing wall 1146 comprises a thickness that is the same or less than the face engaging regions 1123 of the cheek portions 1140. The thickness of the medially-facing walls 1146 in this example may be in the range of about 0.5 mm to about 1 mm, for example.

The medial support portions 1145 in these examples resist deformation of the cheek portions 1140 by resistance to elongation in the medially-facing wall 1146 in use. When the user dons the head-mounted display system 1000 and the interfacing structure 1100 engages the user's face, the cheek portions 1140 may tend to deform and the medial support portions 1145 (or at least the medially-facing wall 1146 thereof) may be pulled and/or stretched towards a posterior and lateral direction by the cheek portions 1140, which may tend to elongate the medial support portions 1145. The medial support portions 1145 in this example are structured and arranged to resist the elongation, thereby preventing excessive deformation of the cheek portions 1140. The medial support portions 1145 may become tensioned in reaction to anterior and lateral forces applied to the cheek portions 1140 by the user's face in use.

FIG. 14A shows a cross section view through a medial support portion 1145 and cheek portion 1140 and shows the shape and position of the medial support portion 1145 in an undeformed (e.g. untensioned) state indicated by the dotted line labelled 1145. Also shown is the medial support portion 1145 in a tensioned state (e.g. an in-use state) depicted by the dotted line labelled 1145'. The location of a foam cushion 1130 is also shown in this view. As illustrated the medial support portion 1145', especially the medially-facing wall 1146 thereof, is pulled by the face engaging region 1123 of the cheek portion 1140 laterally as the face engaging region 1123 is pushed anteriorly and laterally by the user's face in use. Point A in FIG. 14A indicates an approximate junction between the medially-facing wall 1146 and the face engaging region 1123 of the cheek portion 1140. During engagement with the user's face, point A may be pulled laterally (in the direction of the arrow attached to point A). The medial support portions 1145 in this example may resist this deformation of the face engaging portion 1110 by resisting tension as they are pulled towards a configuration indicated by line 1145' by the lateral movement of point A.

The low wall thickness in the medial support portions 1145 (or at least the medially-facing wall 1146 thereof) is also advantageous in this example because the medially-facing wall 1146 is particularly compliant and able to conform to lateral surfaces of the user's nasal ala in use, which may also help with light sealing in the user's nose region.

For example, a distance between the medially-facing walls 1146 prior to use may be smaller than an average width of a human's nose. The compliant material forming the medially-facing wall 1146 may stretch as the head-mounted display interface 1000 is donned by the user. The distance between the medially-facing walls 1146 may increase in order to accommodate the width of the respective user's nose. This may create a snug fit on each user in order to enhance the light sealing.

The medially-facing walls 1146 in this type of arrangement are flexible to allow the user's nose to displace the medially-facing walls 1146 laterally when the user dons the head-mounted display system 1000. After such displacement, portions of the medially-facing walls 1146 remain in contact with portions of the user's nose (e.g. at least the lateral peripheries of the user's nose). The medially-facing walls 1146 may be thin to allow them to be pushed out of the way by the user's nose, while the face engaging regions 1123 of the cheek portions 1140 may be thicker than the medially-facing walls 1146 to bear load between the user's cheeks and interfacing structure 1100. For example, the medially-facing walls 1146 may flex when the head-mounted display system 1000 is worn by the user. FIG. 15D in particular, discussed below, shows a view of the medially-facing walls 1146 and face engaging region of the cheek portions 1140 and the boundary therebetween. In some examples, ends of the cushion 1130 may be located at or proximate the boundaries between the medially-facing walls 1146 and the face engaging regions 1123 of the cheek portions 1140.

In some forms, the thinner medially-facing wall 1146 will not produce an excessive amount of pressure on the user's face, despite the complaint material assisting to enhance the light seal as described above.

FIGS. 15A-15G show thickness "heat maps" for an interfacing structure 1100 according to one example of the present technology. The different portions of the interfacing structure 1100 have thicknesses in the ranges identified in the accompanying legends. As shown in FIG. 15D in particular, the medial support portion 1145 and in particular the medially-facing wall 1146 thereof are shown as being thinner than adjacent portions. For example, the medially-facing wall 1146 is thinner than the face engaging region 1123 of the adjacent cheek portion 1140. It is also thinner than the medial anchor portion 1144. However, as indicated in FIGS. 15A-15G and also 11E, 11I and 11K, a portion of the face engaging flange 1118 at the inner periphery of the interfacing structure 1100 may be thinner than the medial support portions 1145.

5.4.1.4 Exemplary Cushions

In some examples, such as the examples shown in FIGS. 7A-7M and 11A-11M, FIGS. 13B and 14A, the interfacing structure 1100 comprises one or more cushions 1130. FIGS. 12A-12E schematically show a cushion 1130 according to one example of the present technology. The one or more cushions 1130 may be positioned at least at the cheek portions 1140. In some examples the interfacing structure 1100 comprises a single cushion 1130 shaped to be positioned in both cheek portions 1140, both sphenoid portions 1170 and the forehead portion 1175.

FIG. 12A shows the shape of the cushion 1130 in one example (the cushion 1130 being symmetrical across the indicated centreline) having indicated portions corresponding to cheek portions 1140, sphenoid portions 1170 and a forehead portion 1175. The cross-sectional shape of the cushion 1130 in the forehead portion 1175, sphenoid portions 1170 and cheek portions 1140 is shown schematically in FIGS. 12B, 12C and 12D respectively. As illustrated, the cushion 1130 may be thicker in the forehead portion 1175 than in the sphenoid portion 1170. The cushion 1130 may be thicker in the cheek portion 1140 than in the sphenoid portion 1170. This may advantageously provide for more compliance in the forehead portion 1175 and cheek portions 1140.

The cushion 1130 may taper down in thickness from the forehead portion 1175 into the sphenoid portions 1170. The cushion 1130 may taper down in thickness in the region between lines L1 and L2 shown in FIG. 12A. That is, the cushion 1130 may taper down in thickness at or proximate a junction of the forehead portion 1175 and each sphenoid portion 1170. The cushion 1130 may additionally, or alternatively, taper up in thickness from the sphenoid portions 1170 into the cheek portions 1140. The cushion 1130 may taper up in thickness in the region between lines L3 and the line D-D identifying the section D-D cut. That is, the cushion 1130 may taper up in thickness at or proximate a junction of each sphenoid portion 1170 and a respective cheek portion 1140. The shape and size of the cushion 1130 may correspond to a shape and size of a volume enclosed by the curled shape of the face engaging flange 1118. For example, the cross sectional shape of the cushion 1130 may substantially match the shape of an area at least partially enclosed by the face engaging flange 1118. A close match of the cushion 1130 to the shape of the face engaging flange 1118 may help maintain the shape of the face engaging portion 1110 in use (e.g. under load while conforming the user's face) by supporting the face engaging flange 1118.

When the head-mounted display system 1000 is donned by a user and the user's face engages the interfacing structure 1100, the cheek portions 1140 and forehead portion 1175 may take a greater load than the sphenoid portions 1170. This is because these portions are aligned more perpendicularly to the force exerted on the interfacing structure 1100 by the user's face (which is a force acting on the interfacing structure 1100 in an anterior direction) than the sphenoid portions 1170 which face more medially. In some examples the cheek portions 1140 and the forehead portion 1175 take a majority of the force exerted on the interfacing structure 1100. This higher force causes a greater amount of compression in the cushion 1130 in the cheek portions 1140 and forehead portion 1175 than in the sphenoid portion 1170. To tolerate this greater compression the cushion 1130 may advantageously be thicker in these regions. An additional advantage of a thin cushion 1130 in the sphenoid portions 1170 is that the cushion 1130 may be well suited to tolerate the presence of arms of reading glasses that the user may be wearing, which may facilitate a comfortable experience during use of the head-mounted display system 1000 while wearing glasses.

FIG. 12E shows a cushion 1130 according to another example of the present technology. The cushion 1130 is formed from foam in this example and shaped to fit inside a face engaging flange 1118 of an interfacing structure 1100 in the manner shown in FIG. 11F, 11G or 11M for example. FIGS. 12F-12G show the cushion 1130 positioned within a face engaging flange 1118 and FIG. 12H shows a perspective view of the cushion 1130 in isolation. In FIG. 12E six cross section views labelled F to K are shown schematically alongside the respective location of each cross section. Each cross section has a depth dimension d, which may be considered a thickness of the cushion 1130. The depth dimension d may be aligned generally with in the anterior-posterior axis of the user's head in use in cheek portions 1140 and forehead portion 1175, and may be aligned generally with the medial-lateral axis in the sphenoid portions 1170, due to the three dimensional shape/curvature of the cushion 1130 as shown in FIG. 12 in particular. In this example, the check portions 1140 are thicker than the forehead portion 1175 or at least the centre of the forehead portion 1175. The sphenoid portions 1170 may also be thicker than the forehead portion 1175 as shown in FIG. 12E (or may be thinner as described above in relation to FIGS. 12A-12D). The check portions 1140 and sphenoid portions 1170 may be the same thickness and may each have a thickness within the range of about 10 to about 15 mm, in some examples. In the illustrated example shown in FIG. 12E the thickness is about 12 mm. The forehead portion 1175 in some examples may have a thickness within the range of about 8 to about 15 mm and, in the illustrated example, the thickness is about 10 mm. The thickness may taper down in thickness towards the centre of the forehead portion 1175 from a location between the forehead portion 1175 and each sphenoid portion 1170. With reference to FIG. 12E, in this example the thickness of the cushion 1130 may taper down from the location of cross section I, where it has a thickness of about 12 mm, to cross section K, where it has a thickness of 10 mm. In this example the cushion 1130 may be shaped and sizes to fit in the face engaging flange 1118 with a small gap all around.

The one or more cushions 1130 may be formed from foam. The cushions 1130 may also help resist deformation of the check portions 1140 in addition to the medial support portions 1145. Additionally, one or more cushions 1130 located behind the face engaging region 1123 (e.g. within the loop portion(s) in the check portions 1140 formed by the face engaging flange 1118) may resist anteriorly directed forces on the face engaging region 1123 in the check portions 1140 in use, allowing the medial support portions 1145 to resist laterally directed forces on the face engaging region 1123. It may be particularly advantageous for a cushion 1130 to be provided in the check portions 1140 to take up anterior forces in the check portions 1140 while the medial support portions 1145 are thin to conform well to the user's nasal ala and also resist lateral movement of the cheek portions 1140 by tension in the medial support portions 1145.

While in some examples the cushion 1130 is formed from a body of material such as foam or silicone which provides compliance and spring return resulting from compression of the bulk material, in some examples the cushion 1130 comprises a structure than deforms in use to provide the cushioning function and may provide compliance as a result of the structural stiffness of the cushion 1130 provided by geometry of a structure as opposed to behaviour of bulk material. FIG. 19B shows such an alternative cushion 1130. In this example the cushion 1130 comprises a cushion flange 1139. The cushion flange 1139 is shaped to comply in use to the user's face by bending (e.g. deformation of the structure of the cushion flange 1139) rather than bulk material compression. During use the face engaging flange 1118 may be pressed against and supported by the cushion flange 1139. In this example the cushion 1130 is formed from an elastomer such as silicone or TPE. This type of cushion 1130 may be attached to the interfacing structure 1100 permanently (e.g. by overmoulding or gluing) or may be removably attached to the interfacing structure (e.g. by a cushion clip 1135).

5.4.1.5 Alternative Medial Support Portions

In other examples, the medially-facing wall 1146 of each the medial support portion 1145 may comprise a greater thickness than the face engaging regions 1123 of the cheek portions 1140. The thickness of the medially-facing walls 1146 in this example may be in the range of about 1 mm to about 2 mm, for example. In this type of arrangement the medial support portions 1145 may resist deformation of the cheek portions 1140 by resistance to bending (as opposed to primarily by resistance to elongation/tension) in the medially-facing wall 1146 in use. In such an example, when the user dons or doffs the head-mounted display system 1000, the cheek portions 1140 (e.g. the closed loop portion 1150 and open loop portions 1160), may be compressed and the surface that contacts the user's face may move in at least the anterior-posterior directions. There may also be a lateral component to this movement or the forces tending to cause this movement. The medial support portions 1145 may bend in partially anterior-posterior directions and partially medial-lateral directions to facilitate this movement. However, the medial support portions 1145 may also partially resist this compression of the check portions 1140, for example to avoid excessive deformation/collapse and/or to help the check portions 1140 comply to the user's face. The medial support portions 1145 in this type of example may be thick (e.g. thicker than the face engaging region 1123 of the check portions 1140) to provide this resistance and therefore provide support for the cheek portions 1140. The medial support portions 1145 may be thicker at their anterior/medial ends than at their posterior/lateral ends which connect to the face engaging regions 1123 in the check portions 1140. The medial support portions 1145 and foam cushion 1130 (if provided), may provide a predetermined level of resistance to compression of the face engaging portion 1110 in the check portions 1140 to provide a balance between compliance and stiffness. The medial support portions 1145 in this example may also be configured to resist movement of the check portions 1140 in particular in the superior-inferior directions. The medial support portions 1145 having the form of a vertical wall sufficiently thick and resistant to deformation in the superior-inferior directions may enable the medial support portions 1145 to resist superior and inferior movement of the check portions 1140 which may be undesirable during setup.

5.4.1.6 Further Features of Interfacing Structure

Figure 1B:
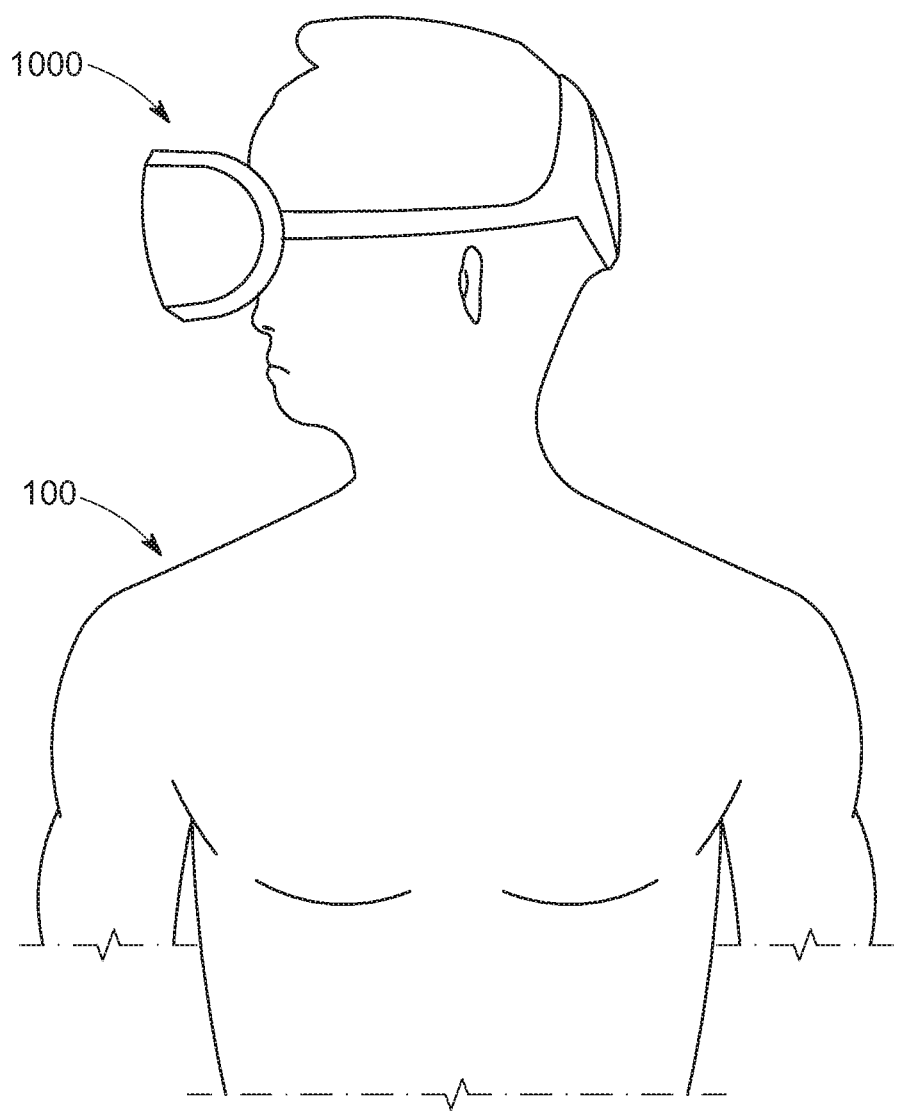
FIG. 1B shows a system including a user 100 wearing a head-mounted display system 1000, in the form of a floating virtual reality (VR) headset, displaying various images to the user. The user is sitting while wearing the display interface 100.
Figure 1C:
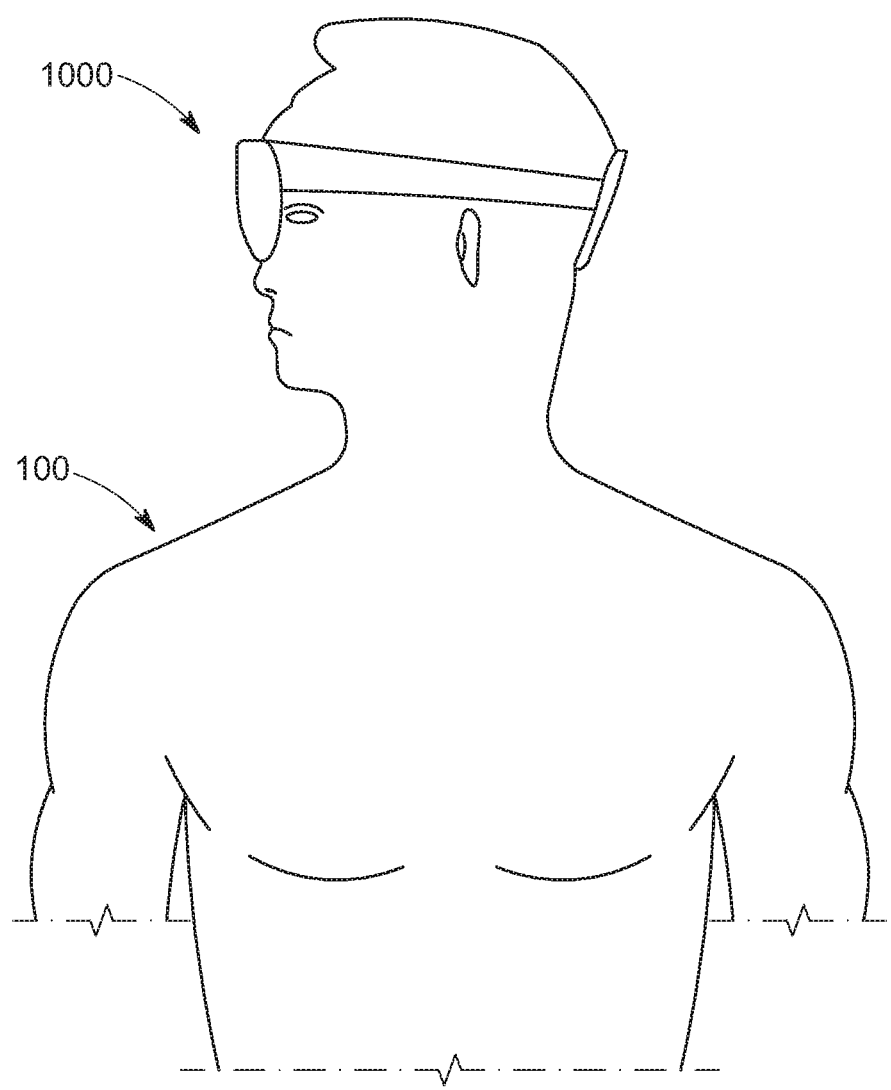
FIG. 1C shows a system including a user 100 wearing a head-mounted display system 1000, in the form of a floating augmented reality (AR) headset, displaying various images to the user. The user is standing while wearing the head-mounted display system 1000.

In examples in which the medial support portions 1145 are thin, the face engaging flange 1118 may be thick on its anterior-facing and/or inferior-facing portions to provide resistance to superior-inferior movement of the face engaging region 1123 of the check portions 1140 in use or during setup. FIGS. 15A-15G illustrate this aspect and FIG. 1l1 shows a cross section view of this configuration. The portion of the face engaging flange 1118 opposite the face engaging region 1123 is thick to provide resistance to superior-inferior forces acting on the face engaging region 1123 during setup or in use. FIG. 14C also shows this configuration. As illustrated, the portion of the face engaging flange 1118 proximate the chassis portion 1102, e.g. an anterior portion 1141 of the face engaging flange 1118, is thicker than the face engaging region 1123 of the face engaging flange 1118 on the posterior portion 1142 of the face engaging flange 1118. Upon application of a superiorly directed force $F_s$ as indicated in FIG. 14C, the face engaging flange 1118 may deform to the shape shown in phantom and indicated by 1118'. As illustrated, the thicker portion of the face engaging flange 1118, e.g. the anterior portion 1141, limits the overall deformation of the face engaging flange 1118 due to its high stiffness relative to the face engaging region 1123 (which in this example is due to the high thickness).

As shown in FIGS. 7D, 7K and 7L for example, the closed loop portion 1150 may reduce in size in the medial support portion 1145. A spacing between the anterior portion 1141 and the posterior portion 1142 of the face engaging flange 1118 may reduce towards the medial ends of the medial support portions 1145 until each joins to a medial anchor portion 1144, as show in FIG. 13B as well. In each closed loop portion 1150, the anterior portion 1141 and the posterior portion 1142 of the face engaging flange 1118 may meet at the medial anchor portion 1144. The medial anchor portion 1144 may be aligned in use with the sagittal plane of the user's head. The medial anchor portion 1144 may be stiffer than the medial support portions 1145. Each medial support portion 1145 may connect between a respective lateral side of the medial anchor portion 1144 and a respective cheek portion 1140. The medial anchor portion 1144 may function as an anchor for the medial support portions 1145. In examples in which the medial support portions 1145 are thin and support the check portions 1140 by resistance to tension, the medial anchor portion 1144 may be a stable portion able to resist being pulled by the medial support portions 1145. In examples in which the medial support portions 1145 are thick and support the cheek portions 1140 by resisting bending, the medial anchor portion 1144 may be a stable portion able to hold the medial/anterior ends of the medial support portions 1145 in place such that the medial support portions bend laterally in the manner of cantilever beams, albeit connected to the check portions 1140.

The medial support portions 1145 may be formed from the same material as the cheek portions 1140 and, in this example, are integrally formed with the cheek portions 1140. In other examples the medial support portions 1145 may be formed from a different material to the check portions 1140, for example a stiffer material resulting in the medial support portions 1145 being more resistant to deformation than the cheek portions 1140.

The medial support portions 1145 may provide a greater resistance to movement of the cheek portions 1140 in one direction than in another direction. In the example shown in FIGS. 7A-7M, the medial support portions 1145 provide a greater resistance to deformation of the check portions 1140 in the superior-inferior directions and/or in the lateral direction than in the anterior-posterior directions. That is, the medial support portions 1145 tend to resist the cheek portions 1140 or portions thereof moving anteriorly and posteriorly to a lesser extent than they tend to resist the cheek portions 1140 or portions thereof moving superiorly or inferiorly.

In the examples shown in FIGS. 7A-7M, 11A-11M and 13-16, each medial support portion 1145 comprises a medially-facing wall 1146 having a height in the superior-inferior directions. Each medially-facing wall 1146 may also curve laterally and posteriorly from a medial location, such as the medial anchor portion 1144 in this example. As shown in FIG. 7E in particular the curvature of the medial support portions 1145 allow them to follow the shape of the user's nose.

Where the face engaging portion 1110 comprises a closed loop portion 1150 and open loop portion 1160 on each lateral side of the nasal portion 1180, the closed loop portions 1150 may be in or adjacent to the medial support portions 1145. The closed loop portions 1150 may reduce in size in the medial support portions 1145. As illustrated in FIG. 7E, in each closed loop portion 1150, the posterior portion 1142 and the anterior portion 1141 of the face engaging flange 1118 meet at the medial anchor portion 1144. The medial support portion 1145 may be located proximate a junction between the anterior portion 1141 and the posterior portion 1142 of the face engaging flange 1118. A majority of the medially-facing wall 1146 of each medial support portion 1145 may face medially, e.g. towards the user's nose in use. This is shown in FIGS. 11L, 13B, 14A and 15D for example. The medially-facing walls 1146 may be laterally adjacent to the nasal portion 1180. A lateral portion of the medially-facing wall 1146 of each medial support portion 1145 may face partially posteriorly as the interfacing structure 1100 transitions away from the nasal portion 1180 and into the majority of the cheek portion 1140 on each side.

The medial support portion 1145 may be formed from an elastomeric material, such as silicone or TPE, for example. In the example shown in FIGS. 7A-7M, the medial support portions 1145 are integrally formed with the cheek portions 1140.

5.4.2 Airflow Through Interfacing Structure

In some forms of the present technology, an interfacing structure 1100 may comprise a chassis portion 1102 configured to permit air transfer into, and from, the space between the interfacing structure 1100 and the user, e.g. within the interior volume formed between the user's face and the display and bounded at its periphery by the interfacing structure 1100. Heat may be generated during use, for example by the user as the result of user activity, and/or by the electronic components of the head-mounted display unit 1200. This heat may build up within this space and cause discomfort to the user. Enabling airflow to and from this space may assist with avoiding excess heat build-up and may also help to avoid excessive humidity build-up.

In some forms the chassis portion 1102 is formed from an elastomeric material, such as silicone or TPE, and may be formed from the same material as the face engaging flange 1118. In other forms the chassis portion 1102 may be formed from a stiffer material than the face engaging flange, such as a more rigid thermoplastic material such as ABS, nylon, polycarbonate or the like. In some forms, the chassis portion 1102 may be permeable or semi-permeable and the material may allow airflow to pass through. For example, a foam and/or textile material may allow airflow to pass through while maintaining a solid shape.

In some examples, one or more superior openings may be provided in the chassis portion 1102, permitting airflow between the external environment and the space within the interfacing structure 1100. In some examples, one or more inferior openings may be provided in the chassis portion 1102. In examples, the chassis portion 1102 may comprise one lateral openings, one or more superior openings, and/or one or more inferior openings. An opening in the chassis portion 1102 to allow airflow may be known as a vent or air flow port.

Various chassis opening/vent configurations are disclosed in International (PCT) Application No. PCT/AU2021/050277. Openings having any those configurations may be applied to the chassis portion 1102 of the interfacing structure 1100 disclosed herein.

FIGS. 7F-7H show selected portions of the interface structure 1100 shown in FIGS. 7A-7E. The interfacing structure 1100 is part of a head-mounted display system 1000 and is constructed and arranged to be in opposing relation with the user's face in use. As described in more detail elsewhere herein, the head-mounted display system 1000 may comprise a head-mounted display unit 1200 comprising a display, and a positioning and stabilising structure 1300 structured and arranged to hold the head-mounted display unit 1200 in an operable position on the user's head in use.

As illustrated in FIGS. 7F-7H, the interfacing structure 1100 comprises a chassis portion 1102 having one or more openings 1108. The openings 1108 are configured to allow airflow into a volume anterior to the user's eyes defined at least partially by the head-mounted display unit and the user's face in use. The interfacing structure 1100 comprises a face engaging portion 1110 connected to the chassis portion 1102 configured to engage the user's face in use. The face engaging portion 1110 may be flexible and resilient.

In this particular example of the present technology, the interfacing structure 1100 comprises a cover portion 1109 configured to at least partially block light from passing through the openings 1108 in the chassis portion 1102. The cover portion 1109 may extend anteriorly from the face engaging portion 1110 to cover the openings 1108. Forming openings in the chassis portion 1102 may have the potential to allow light to enter the volume between the user's eyes and the display in use. Advantageously, the cover portion 1109 may reduce or eliminate the risk of light passing through the openings 1108 and interfering with the user's view of the display, allowing for openings 1108 to be provided in the chassis portion 1102 for cooling purposes.

As described elsewhere herein, the face engaging portion 1110 of the interfacing structure 1100 may be configured to engage the user's face around a periphery of the user's eyes in use. For example, the interfacing structure 1100 may be configured to engage the sides of the user's face lateral of the user's eyes and engage the user's forehead in use. As previously described, the face engaging portion 1110 may comprise a face engaging flange 1118 extending from the chassis portion 1102 to engage the user's face in use.

In the example shown in FIGS. 7F-7H, the cover portion 1109 is in the form of a cover flange extending anteriorly from the face engaging flange 1118 to cover the openings 1108. The cover flange may be a thin piece or portion of material extending away from the face engaging flange, as shown in cross section in FIG. 7H. The cover flange may be substantially flat. In other examples the cover portion may not be thin or flat and may be, for example, triangular shaped in cross section. The cover flange and the face engaging flange 1118 may be integrally formed. For example, the face engaging flange 1118 and cover flange may be moulded together in the same moulding step/shot. The face engaging portion 1110 may be formed from an elastomeric material, such as silicone, TPE or the like. The cover portion 1109 may be formed from the same material as the face engaging portion 1110, e.g. the same elastomeric material that forms the face engaging portion 1110.

In the example shown in FIGS. 7F-7H, the face engaging portion 1110 comprises a forehead portion configured to engage the user's forehead in use. In this example the interfacing structure 1100 comprises a plurality of openings 1108 in the chassis portion 1102 proximate the forehead portion of the face engaging portion 1110. The openings 1108 may open in a superior direction in use. The face engaging flange 1118 in this example comprises an anterior portion extending at least partially superiorly from the chassis portion 1102 proximate the forehead portion of the face engaging portion 1110. FIG. 7H shows a cross section view through the interfacing structure 1100 in the forehead portion. As illustrated, the cover flange forming the cover portion 1109 extends in an anterior direction from the anterior portion of the face engaging flange 1118. In some examples, the cover portion 1109 may intersect an axis of an opening 1108 to cover the opening 1108. In some examples, the cover portion 1109 may cover an opening 1108 such that it is not possible for a light ray to travel in a straight line, from away from the head-mounted display system 1000, through the opening 1108 and into the volume anterior to the user's eyes. An anterior edge of the cover portion 1109 may be spaced anteriorly from an anterior edge of the opening 1108 so as to overhang the opening 1108. Any reference to the manner in which a cover portion 1109 is described as covering a singular opening 1108 is to be understood to be a manner in which a cover portion 1109 (or multiple cover portions 1109) may cover a plurality of openings 1108.

In some examples, the opening(s) 1108 may be angled such that an outside end of the opening faces at least partially towards a join between the cover portion 1109 and the face engaging portion 1110. This may further prevent light from passing through the opening 1108. The combination of openings 1108 in the chassis portion 1102 and the cover portion 1109 extending over the openings 1108 may advantageously allow for airflow into the interior of the interfacing structure 1100 while some or all of the light that may otherwise pass through the openings 1108 is blocked by the cover portion 1109 from reaching the user's eyes.

The face engaging portion 1110 in the example shown in FIGS. 7F-7H also comprises a pair of cheek portions 1140 (which have been described in more detail with reference to FIGS. 7A-7E) configured to engage the user's cheeks in use. The face engaging portion 1110 also comprises a pair of sphenoid portions 1170 (see e.g., FIG. 11A) located on respective lateral sides of the interfacing structure 1100 connecting between the forehead portion and the cheek portions 1140 and configured to engage the user's head proximate the sphenoid bone in use. In some examples openings 1108 may be formed in the chassis portion 1102 proximate the sphenoid portions 1170 and/or cheek portions 1140.

In the example shown in FIGS. 7A-7M, the chassis portion 1102 comprises two sets of openings 1108. FIG. 7A shows the two sets of openings 1108. Each set of openings 1108 is provided on a respective lateral side of the interfacing structure 1100. In other examples the interfacing structure 1100 may comprise only one set of openings 1108, or the sets of openings 1108 may be provided in different locations. In some examples the interfacing structure 1100 may comprise a plurality of openings 1108 provided along most or all of the length of the chassis portion 1102 proximate the chassis portion 1102. In further examples the chassis portion 1102 may not comprise sets of openings 1108 and may instead comprise a single opening 1108 or a plurality of openings 1108 each spaced from the others. The interfacing structure 1100 in this example comprises a single cover portion 1109 extending from one lateral side of the interfacing structure to the other to cover both sets of openings. In other examples the interfacing structure 1100 may comprise multiple cover portions 1109, for example one cover portion 1109 per opening 1108.

As shown in FIG. 7H, the openings 1108 in this example open towards an at least partially superior direction and the cover portion 1109 extends anteriorly, which is substantially perpendicular to the superior direction in which the openings 1108 open. More generally, the one or more openings 1108 may open towards a first direction and the cover portion 1109 may extend in a second direction from the face engaging portion 1110, the second direction being perpendicular to the first direction. This arrangement may advantageously an amount of light able to reach the user's eyes, since any such light would have to permeate through a tortuous path to enter the space between the cover portion 1109 and opening 1108 and then pass through the opening 1108. In some examples, the opening 1108 may be closer to the face engaging flange 1118 than shown in FIG. 7H and/or the cover portion 1109 may extend further in an anterior direction past the opening 1108 than shown in FIG. 7H to further reduce an amount of light that may enter through the openings 1108. The openings 1108 may be provided in the chassis portion 1102 adjacent the face engaging portion 1110 of the interfacing structure 1100.

5.4.3 Interfacing Structure with Cushion Attachment Portion and Other Features

FIGS. 11A-11M and 15A-15G show interfacing structures 1100 according to further examples of the present technology. The interfacing structure 1100 is for a head-mounted display system 1000 comprising a head-mounted display unit 1200 comprising a display and a positioning and stabilising structure 1300 structured and arranged to hold the head-mounted display unit 1200 in an operable position on the user's head in use. The head-mounted display unit 1200 may comprise a display unit housing 1205 and the interfacing structure 1100 connected to the display unit housing 1205. The interfacing structure 1100 is constructed and arranged to be in opposing relation with the user's face in use.

The interfacing structure 1100 in these examples comprises a face engaging flange 1118. The face engaging flange 1118 is provided around a periphery of an eye region of the user's face and configured to engage the user's face in use. The face engaging flange 1118 may be flexible and resilient and may be formed from an elastomer, such as silicone or TPE for example.

The face engaging flange 1118 may form a face engaging portion 1110 of the interfacing structure 1100. The interfacing structure 1100 may further comprise a chassis portion 1102. The chassis portion 1102 may be a thick or thickest part of the interfacing structure 1100 and may be configured to connect the face engaging portion 1110 to a display unit housing 1205 of the head-mounted display system 1000 and support the face engaging portion 1110 in an in use position. In some examples the chassis portion 1102 is connected to or configured to attach to an interfacing structure clip 1101, as shown in FIG. 11M which forms a snap fit connection to the display unit housing 1205. In other example, the clip 1101 may further include a magnetic member or a magnetic member may replace the clip 1101 so that the face engaging portion 1110 and the chassis portion 1102 connect to one another with a magnetic connection. The chassis portion 1102 may have any features or properties described elsewhere herein with reference to other examples. The chassis portion 1102 may be integrally formed with the face engaging flange 1118. In some examples the chassis portion 1102 may not be the thickest part of the face engaging portion 1110 and may instead be stiffened by its connection to the interfacing structure clip 1101.

In some forms, the chassis portion 1102 may not form part of the perimeter of the loop. For example, the closed loop may be formed around the cushion 1130 without the assistance of the chassis portion 1102. This allows the clip 1101 (or magnet or other connector) to connect to the chassis portion 1102 without forming part of the closed loop perimeter. In examples where the interfacing structure 1100 is an open loop, the chassis portion 1102 may still be oriented in such a way so that the connected clip 1101 is spaced apart from the cushion 1130.

5.4.3.1 Face Engaging Flange

The face engaging flange 1118 in the example shown in FIGS. 11A-11M, and as shown in cross section in FIGS. 11E-11G, 11I, 11K and 11M, has a cross section comprising a first end 1121 connected to the display unit housing 1205. The first end 1121 may be indirectly connected to the display unit housing 1205 and/or may be removably attached to the display unit housing 1205. In one example the first end 1121 is attached to an interfacing structure clip 1101 as shown in FIG. 11M (which may be relatively rigid, for example formed from a thermoplastic material) that forms a removable snap fit to a corresponding portion of the display unit housing 1205. In this example, the first end 1121 may be an end with a chassis portion 1102 that facilitates the connection with the interfacing structure clip 1101. The second end 1122 may be a free cantilevered end of the face engaging flange 1118 along some or all of the interfacing structure 1100 around the periphery of the user's eye region.

Between the first end 1121 and the second end 1122 the face engaging flange may curve, for example to extend towards the user's face and then curl inwards towards the user's eyes and then away from the user's face. The cross-sectional shape may comprise a face engaging region 1123 at which the face engaging flange 1118 contacts the user's face in use. The face engaging region 1123 may be located between the first end 1121 and a cushion attachment portion 1120. The cushion attachment portion 1120 is a portion at which a cushion 1130 is attached (to be described in detail below).

In some examples, the face engaging flange 1118 curves or curls between the first end 1121 and the second end 1122 to form an at least partially enclosed cross-sectional area. A cushion 1130 may be positioned within the at least partially enclosed cross-sectional area and may be attached the face engaging flange 1118. The cushion 1130 may be attached to the interfacing structure 1100 in various places in different examples, as will be describe below, such as a cushion attachment portion 1120, a portion of the face engaging flange 1118, a cushion support flange 1164, the interfacing structure clip 1101, or may not be attached to the interfacing structure 1100 (e.g. it may lie within a volume enclosed by the face engaging flange 1118 but may not be adhered or otherwise directly attached to anything).

The face engaging flange 1118 in this example (and in the FIG. 7A-7M examples) is shaped to curl towards the user's face between the first end 1121 and the face engaging region 1123 and is shaped to curl away from the user's face between the face engaging region 1123 and the second end 1122. That is, the first end 1121 may be positioned in use spaced from the user's face and the face engaging flange 1118 may curl towards and then away from the user's face to form a face engaging region 1123.

FIG. 16 shows a cross section view of a face engaging flange 1118 according to an example of the present technology with certain dimensions labelled. The cross-sectional shape of the face engaging flange 1118 may comprise a height dimension H in a direction parallel to a target sealing surface on the user's face and parallel to the sagittal plane of the user's head that is within the range of about 10 mm to about 40 mm, about 15 mm to about 30 mm, or about 20 to about 25 mm. In one example the height dimension H is about 23.5 mm. A direction parallel to a target sealing surface is to be understood to mean generally parallel to the surface of the user's face at the target sealing location, or parallel to a tangent to curvature of the user's face at the target sealing location. The face engaging flange 1118 may extend from the first end 1121 at least partially inferiorly a distance DI of between about 10% and about 80% of the height dimension H measured parallel to the height dimension H. In other examples the distance DI is between about 20% and about 60% or between about 40% and about 50% of the height dimension H. In one example the distance DI is about 45% of the height H. The distance DI may be about 10.5 mm in one example. The cross-sectional shape of the face engaging flange 1118 may comprise a depth dimension DP in a direction perpendicular to the target sealing surface and parallel to the sagittal plane of the user's head, between the first end 1121 of the face engaging flange 1118 and the face engaging region 1123, that is within the range of about 5 mm to about 40 mm, about 10 to about 30 mm, or about 15 to about 25 mm. In one example the depth dimension DP is about 20.5 mm.

FIG. 16 also indicates a radius of curvature R at a location proximate the face engaging region 1123 of the face engaging flange 1118 between the face engaging region 1123 and the second end 1122 of the face engaging flange 1118. The radius of curvature R at this location may be between about 1 mm and about 10 mm in some examples of the present technology, or between about 2 mm and about 6 mm, or between about 3 mm and about 5 mm. In one example the radius of curvature R is about 4 mm.

FIG. 16 also shows an angle A formed by the cross sectional shape of the face engaging flange 1118 between a length axis of the cushion attachment portion 1120 along the face engaging flange 1118 in cross section and a direction perpendicular to the target sealing surface (e.g. parallel to the depth dimension DP). Explained differently, the face engaging flange 1118 may have a cross sectional shape in which the face engaging flange extends from the first end 1121 towards the user's face then curls inwardly with respect to the periphery around the user's eyes (e.g. curls towards the user's eye region, then curls anteriorly away from the user's and then curls partially towards an outward direction with respect to the periphery around the user's eyes to orient the cushion attachment portion 1120 at an angle A with respect to a direction perpendicular to the target sealing surface, which may be the anterior direction in some of the forehead and cheek regions. As shown in FIG. 16, the face engaging flange 1118 may have a cross-sectional shape having a height axis (e.g. along which the height dimension H is measured) and a depth axis (e.g. along which the depth dimension DP is measured). The length of the cushion attachment portion 1120 along the face engaging flange 1118 in cross section may be oriented at an angle A to the height axis. The A may be in the range of about 20 to about 90 degrees, about 40 to about 75 degrees, about 45 to about 60 degrees, or about 45 to about 55 degrees, for example. In one example the angle A is about 51 degrees. The dimensions disclosed with reference to FIG. 16 may be applied to any interfacing structure 1100 disclosed herein.

The interfacing structure 1100 may comprise a pair of sphenoid portions 1170 each configured to engage the user's head proximate the sphenoid bone in use. The sphenoid portions 1170 may be lateral portions of the interfacing structure 1100. FIG. 11E shows a cross section view of the interfacing structure 1100 in a sphenoid portion 1170. In each sphenoid portion 1170 the face engaging flange 1118 extends posteriorly from the first end 1121 and curls medially into the face engaging region 1123 and then curls anteriorly and then laterally away from the user's face into the cushion attachment portion 1120.

The interfacing structure 1100 also comprises a pair of cheek portions 1140 each configured to engage a respective one of the user's cheeks in use. FIGS. 11I and 11K show cross section views of the interfacing structure 1100 within a cheek portion 1140. In each cheek portion 1140 the face engaging flange 1118 extends at least partially inferiorly from the first end and curls posteriorly and superiorly into the face engaging region 1123 and then curls anteriorly away from the user's face into the cushion attachment portion 1120.

The interfacing structure 1100 may also comprise a nasal portion 1180 located proximate the user's nose in use. The interfacing structure 1100 may further comprise a pair of closed loop portions 1150 each located on a respective side of the nasal portion 1180. FIG. 11K shows a cross section view of the interfacing structure 1100 at one of the closed loop portions 1150. In each closed loop portion 1150 the second end 1122 of the face engaging flange 1118 connects back to the first end 1121 of the face engaging flange 1118 to form in cross section a closed loop. Laterally adjacent each closed loop portion 1150 is an open loop portion 1160, as shown in cross section in FIG. 11I. Features of the open loop portions 1160, closed loop portions 1150 and nasal portion 1180 disclosed in the FIG. 7A-7M examples are to be understood to be applicable to the FIG. 11A-11M example, and vice versa.

FIG. 15A-15G show an interfacing structure 1100 having the above features (and features described below, such as the cushion attachment portion 1120. It is to be understood that an interfacing structure 1100 according to the present technology may vary from that shown in FIGS. 15A-15G. FIGS. 15A-15G are to be understood to disclose not only one example of the present technology but relative differences in the thickness in any given region with respect to any other region. For example, as shown in FIGS. 15A-15G, the anterior facing portion of the forehead portion 1175 of the interface structure 1100 is thinner than the lateral facing portions of the sphenoid portions 1170. This relative difference in thickness is not intended to be a feature of the present technology that is inextricably linked to every other relative difference in thickness depicted in FIGS. 15A-15G. Likewise, other relative differences in thickness discernible in FIGS. 15A-15G are to be understood to be independently applicable to other examples of the present technology.

Figure 15A:
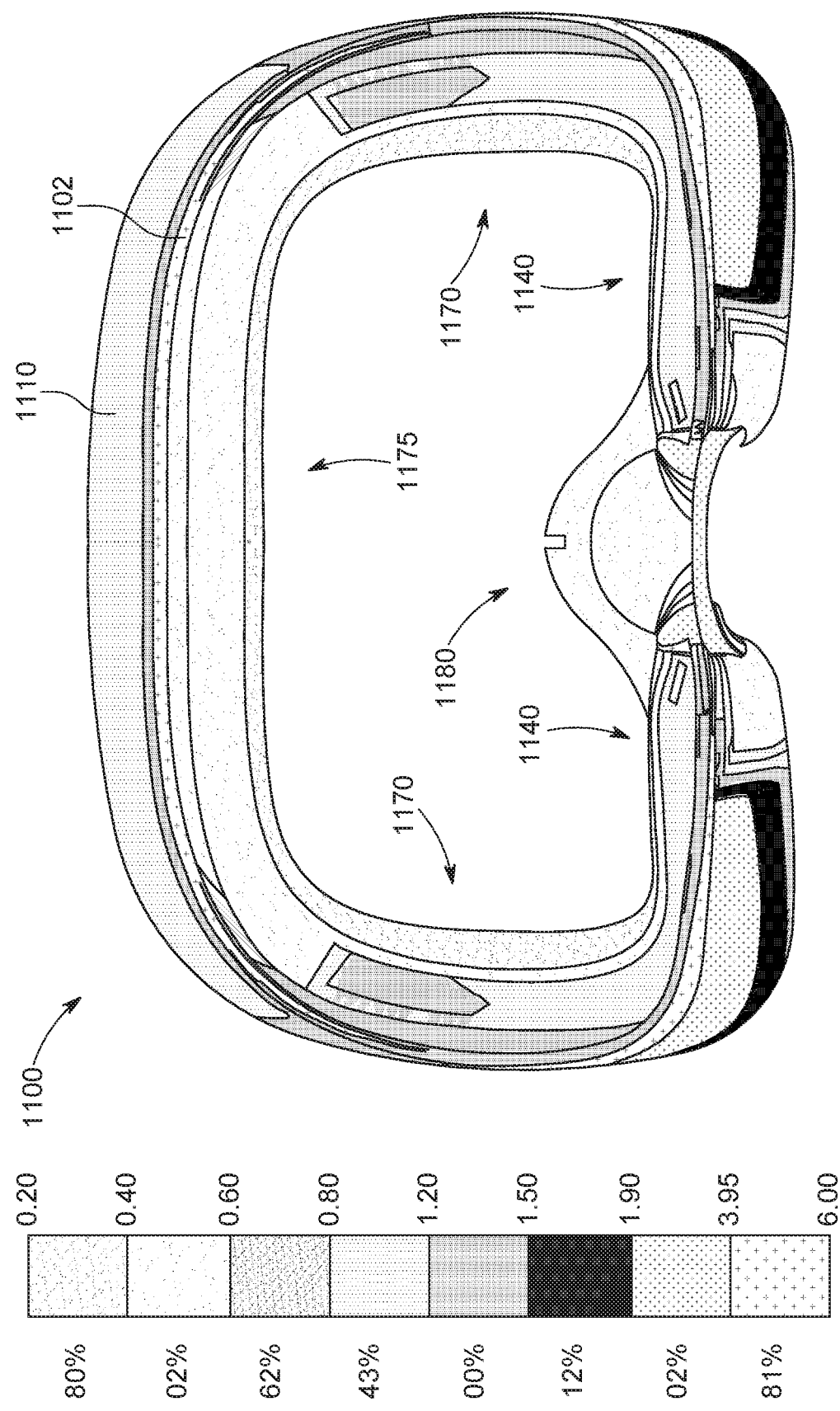
Figure 15C:
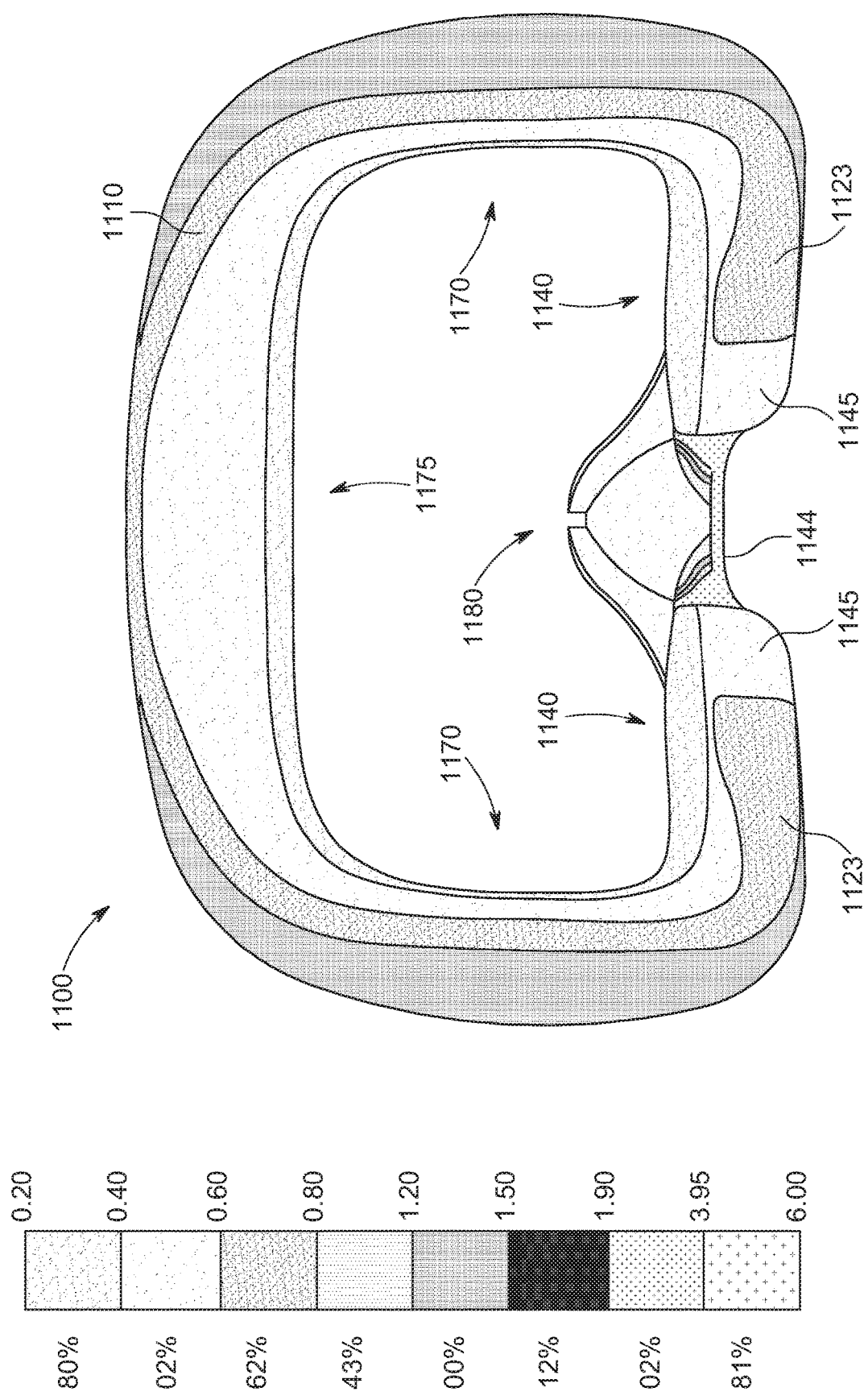
Figure 15D:
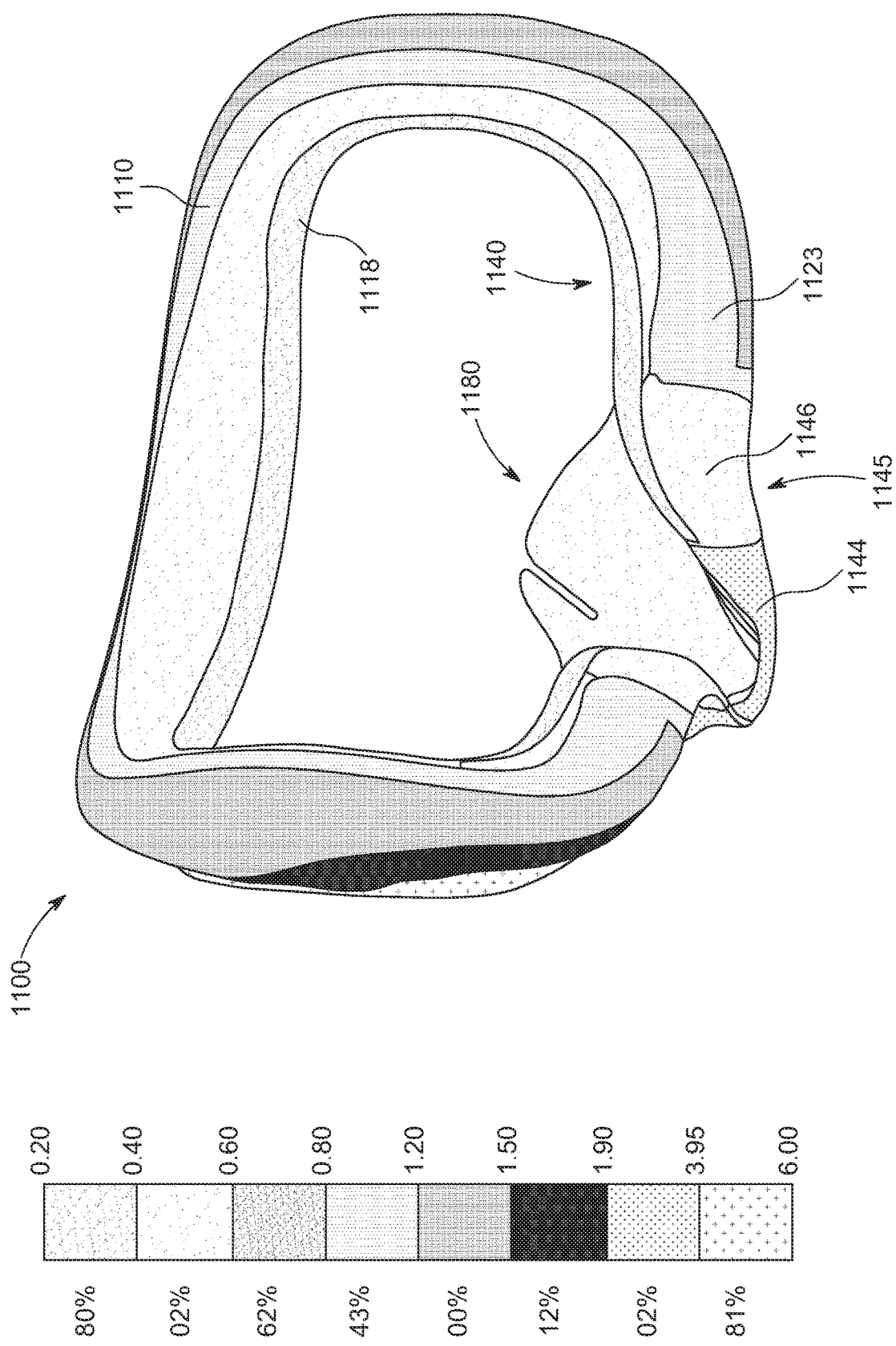
Figure 15E:
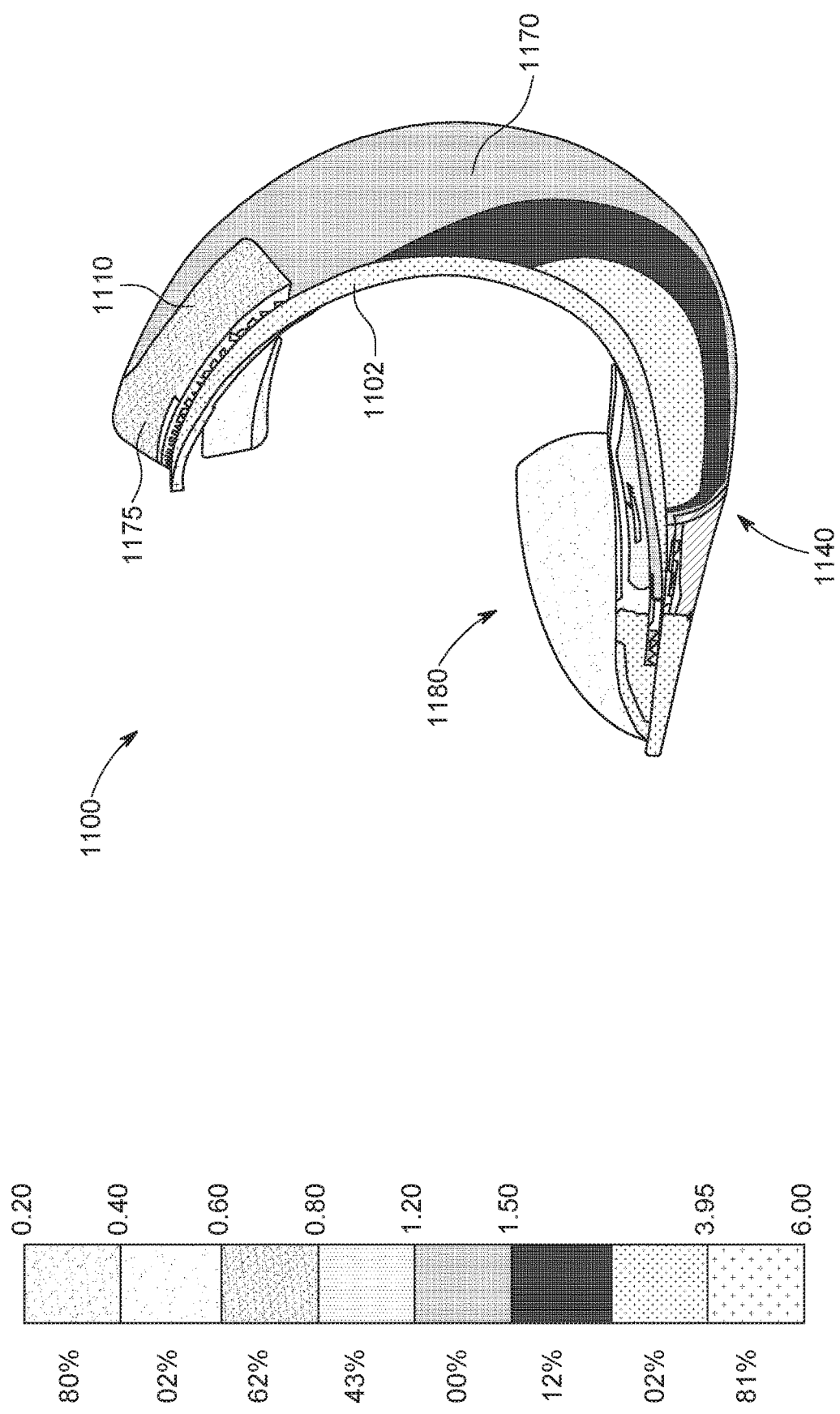
Figure 15F:
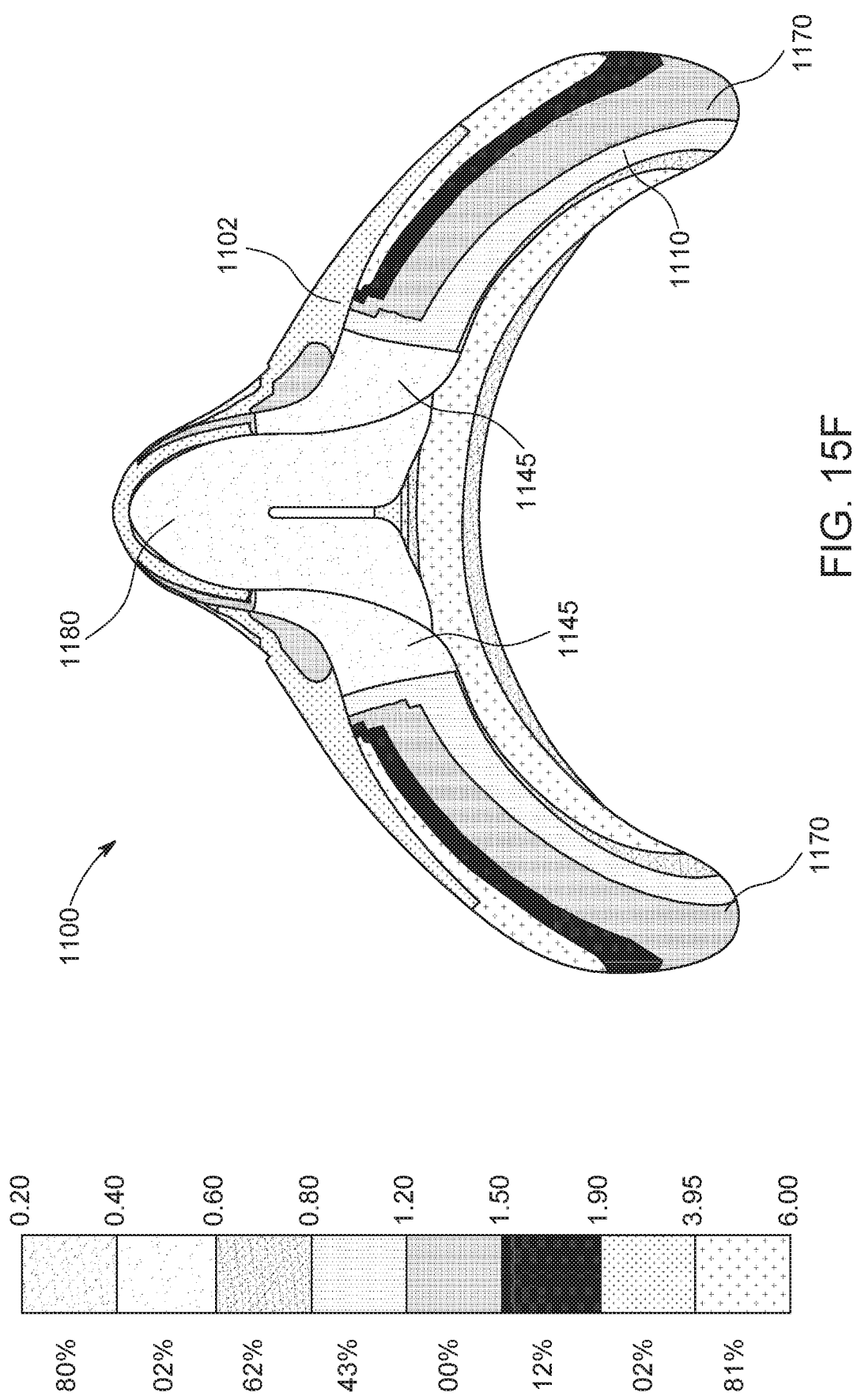
Figure 15G:
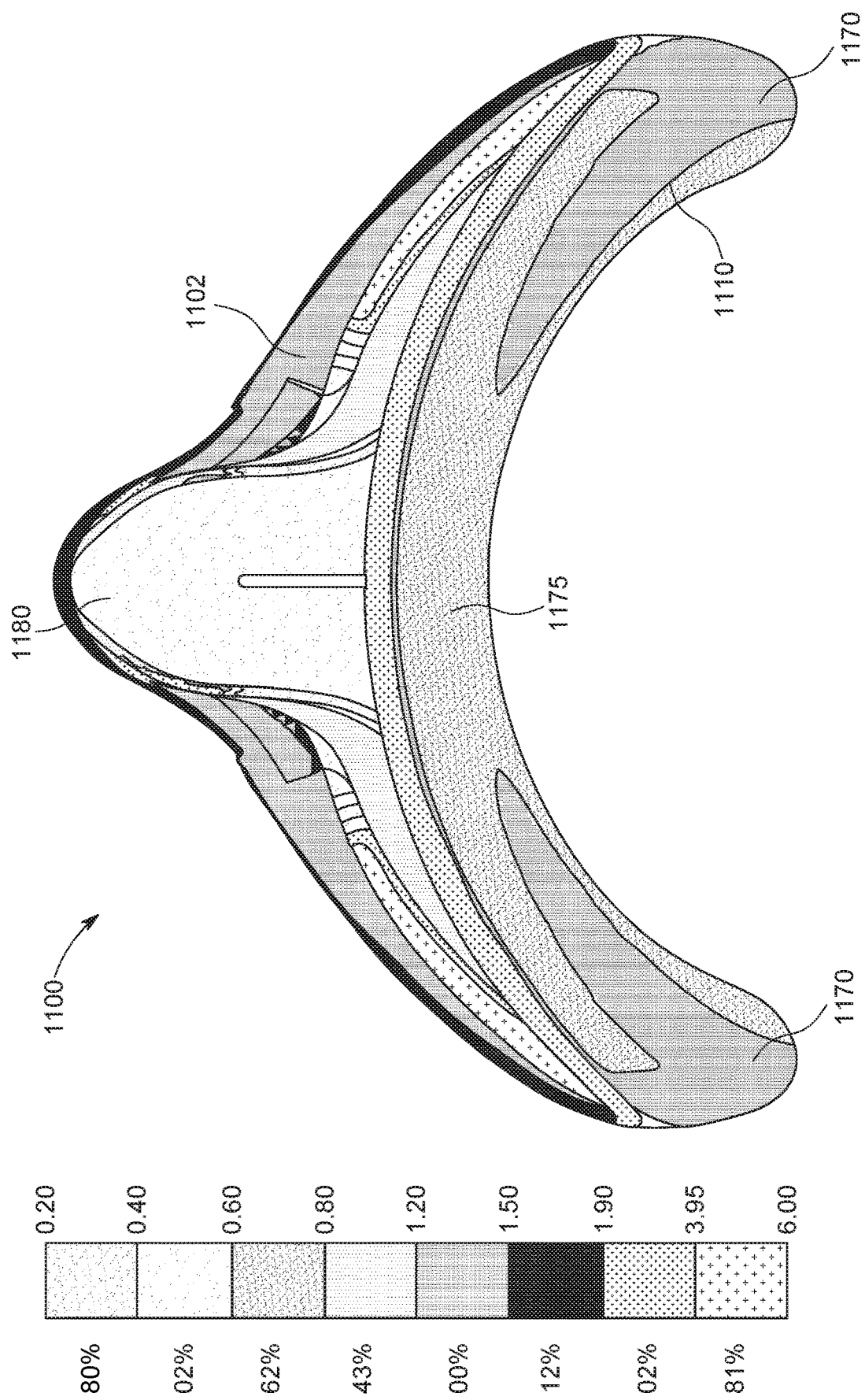

The greater thickness in the sphenoid portions 1170 and/or check portions 1140 on the user-facing and/or non-user facing sides, as shown in FIGS. 15C and 15E for example, with respect to the forehead portion 1175 may advantageously provide for targeted support where it is required. The face engaging flange 1118 may resist forces applied to the forehead portion 1175 primarily by resistance to tension. Accordingly, excess thickness in the forehead portion 1175 may add unnecessary resistance to tension. The lower portions of the interfacing structure 1100, such as the sphenoid portions 1170 and the cheek portions 1140, may resist forces primarily by bending. Accordingly, additional thickness in these regions advantageously provides targeted stiffness to enable these regions to provide the necessary support. The sphenoid portions 1170 (or at least a junction between the cheek portions 1140 and the sphenoid portions 1170), may advantageously be thicker than adjacent regions to prevent the face engaging flange 1118 from bulging outwards in use.

In some examples, between the face engaging region 1123 and the second end 1122 of the face engaging flange 1118, the face engaging flange 1118 curls over a portion of the cushion 1130. The face engaging flange 1118 may curl or wrap over a cushion 1130 between the face engaging region 1123 and the second end 1122 of the face engaging flange 1118 whether or not there is also a cushion attachment portion 1120 (described below) at or proximate the second end 1122. By way of example, as shown in FIGS. 7H, 7M, 18D and 21A-21C the face engaging flange 1118 curls over a cushion 1130 (not shown) after forming a face engaging region 1123 and does not have a cushion attachment portion 1120. FIGS. 21A-21C show cross sections through the interfacing structure 1100 at forehead, sphenoid and cheek portions, respectively. Alternatively stated, FIG. 21A shows an alternative to the cross section shown in FIG. 11M, FIG. 21B shows an alternative to the cross section shown in FIG. 11I and FIG. 21 C shows an alternative to the cross section shown in FIG. 11E.

The extra length of the face engaging flange 1118 that curls over a portion of the cushion 1130 may help resist buckling of the face engaging flange 1118 due to extra material and increased second moment of area, especially produced by the curled shape. This may be particularly advantageous in examples in which the face engaging flange 1118 is not attached directly to the cushion 1130. In some examples the face engaging flange 1118 is not fixed to the cushion 1130. This may allow the face engaging flange 1118 to better conform to the user's face as it is less restrained than if it was attached to the cushion 1130 which may be preferable in some applications.

In the examples shown in FIGS. 11A-11M the face engaging flange 1118 curls over a portion of the cushion 1130 between the face engaging region 1123 and the second end 1122. In those examples the face engaging flange 1118 curls over a portion of the cushion 1130 between the face engaging region 1123 and the cushion attachment portion 1120. It is to be understood that in a variation of the examples shown in FIGS. 11A-11M the cushion attachment portion 1120 is made short or non-existent and that the length of the face engaging flange 1118 after curling over a portion of the cushion 1130 may vary. In the example shown in FIG. 18D there is no cushion attachment portion 1120 and second end 1122 of the face engaging flange 1118 is located proximate the portion of the cushion 1130 that the face engaging flange 1118 curls over.

In some examples, such as those shown in FIGS. 18E, 18F and 21A-21C, the face engaging flange 1118 does not comprise a cushion attachment portion 1120 but still comprises a thickened portion at or proximate the second end 1122. As shown in FIGS. 21A-21C the face engaging flange comprises a bead 1119 at the free end. This thickened portion or bead 1119 may have a greater thickness than the portion of the face engaging flange 1118 that curls over a portion of the cushion 1130 proximate the face engaging region 1123. The thickened portion may help resist tearing of the face engaging flange 1118, may help keep the second end of the face engaging flange 1118 in place against a surface of the cushion 1130 by resisting rolling back of the face engaging flange 1118 and/or may further increase the stiffness of the face engaging flange 1118 by increasing second moment of area of the cross section.

In the examples shown in FIGS. 21A-21C the cushion support flange 1164 (described below in more detail) provides the majority of support for the cushion 1130.

5.4.3.1.1 Cushion Attachment Portion

The interfacing structure 1100 described with reference to FIGS. 11A-11M comprises a face engaging flange 1118 having a cross sectional shape further comprising a cushion attachment portion 1120 located at or proximate the second end 1122 of the face engaging flange 1118. The face engaging region 1123 is located between the first end 1121 and the cushion attachment portion 1120 in this example. Cross section views in FIGS. 11E, 11F, 11G, 11I and 11K show these features. The cushion attachment portion 1120 may be separate from the face engaging region 1123 such that the user's face does not contact the cushion attachment portion 1120 in use. The interfacing structure 1100 in this example comprises a cushion 1130 as shown in FIG. 11G. Another cushion 1130 is shown in FIGS. 12A-12D and is described above. The cushion 1130 may formed from foam and in other examples may be a cushion comprising gel or may be formed from another suitable material, for example a material or combination of materials having behaviour similar to foam. In some examples the cushion 1130 may be formed from a 3D-printed lattice.

FIG. 11F shows the interfacing structure 1100 comprising a cushion 1130 having an alternative shape. The cushion 1130 may be attached to the face engaging flange 1118 at the cushion attachment portion 1120. In this particular example the cushion 1130 is attached to the face engaging flange 1118 only at the cushion attachment portion 1120. The cushion 1130 advantageously may contribute to the compliance of the interfacing structure 1100 and may also advantageously help prevent buckling or crinkling of the face engaging flange 1118. The presence of the cushion 1130 may also advantageously allow the face engaging flange 1118 to be thinner, which may facilitate the face engaging flange 1118 conforming well to the user's face and being comfortable.

In this particular arrangement, the cushion attachment portion 1120 being located outside of the face engaging region 1123 advantageously means that any rigidising of the face engaging flange 1118 or hard spots at the cushion attachment portion 1120 caused by attachment of the cushion 1130 and which could cause discomfort is away from the user's face in use. In particular, in some examples the cushion 1130 is glued to the face engaging flange 1118 at the cushion attachment portion 1120. In the event the glue causes stiffening or hardening of the face engaging flange 1118, the hardened portions are not in contact with the user's face due to the positioning of the cushion attachment portion 1120 clear of the face engaging region 1123. Furthermore, the shape of the example face engaging flange 1118 (as illustrated and as described above in more detail) almost completely encloses the cushion 1130. This may advantageously shield the cushion 1130, keeping it clean and making the interfacing structure 1100 generally easy to clean (since the elastomeric face engaging flange 1118 is more wipeable than the cushion 1130 and may shield the cushion 1130).

The attachment of the cushion 1130 to the face engaging flange 1118 in the above manner may also advantageously constrain the cushion 1130 in a predetermined position with respect to the face engaging flange 1118. This may advantageously prevent the cushion 1130 from migrating during active use to an unintended position within the face engaging portion 1110. This may be particularly advantageous if the cushion 1130 is not accessible to the user.

In some examples the cushion 1130 is attached to the face engaging flange 1118 along substantially all of the length of the cushion 1130, for example in all of the cheek portions 1140, sphenoid portions 1170 and forehead portion 1175. FIG. 11M shows a cross section view through the forehead portion 1175 of an interfacing structure 1100.

The attachment of the cushion 1130 to the face engaging flange 1118 may have an effect of stiffening the face engaging portion 1110 such that the face engaging portion 1110 is more resistant to tension along the length of the face engaging portion 1110 (e.g. along its length around the periphery of the user's eye region). Accordingly, in some examples the face engaging portion 1110 is constructed to have a predetermined in-use elasticity along its length in use when the cushion 1130 is connected to the face engaging flange 1118. The face engaging flange 1118 may constructed to have a greater elasticity along its length than the predetermined in-use stiffness so that when the cushion 1130 is attached to the face engaging flange 1118, the face engaging flange 1118 becomes less elastic and the overall elasticity of the face engaging portion 1110 becomes the predetermined in-use elasticity.

The face engaging flange 1118 may comprise a greater thickness in the cushion attachment portion 1120 than in the face engaging region 1123. As shown in the cross section views 11E-11G, 11I and 11K and in FIGS. 15A-15G, the cushion attachment portion 1120 is thicker than some or all of the face engaging region 1123. As illustrated, the face engaging flange 1118 may reduce in thickness from the first end 1121 towards the cushion attachment portion 1120. In some examples, the thickness of the face engaging flange at the first end 1121 is within the range of about 0.2 to about 4 mm, within the range of about 1 to about 3 mm or within the range of about 1.5 to about 2.5 mm. In some examples the thickness is within the range of about 1.8 to about 2.2 mm. In the illustrated example the thickness is about 2 mm. The face engaging flange 1118 may comprise a thickness in the face engaging region 1123 in the range of about 0.2 to about 2.5 mm, within the range of about 0.5 to about 2.2 mm or within the range of about 0.5 mm to about 1.5 mm, for example.

The thinnest portion of the face engaging flange 1118 between the first end 1121 and the cushion attachment portion 1120 may be within the range of about 0.2 to about 0.5 mm and, in some examples, may be within the range of about 0.25 to about 0.4 mm. In the illustrated example the thinnest portion is about 0.3 mm in thickness. The face engaging flange may be formed from an elastomer, which may be silicone or a TPE for example. In the illustrated examples the face engaging flange 1118 is formed from silicone. The silicone material may have a Shore A Durometer hardness of 40. In some examples the face engaging flange 1118 may have a Shore A Durometer hardness within the range of about 25 to about 70, or within the range of about 30 to about 50.

As shown in the drawings, the face engaging flange 1118 may comprise a series of stepped reductions in thickness from the first end 1121 towards the cushion attachment portion 1120. In examples, the face engaging flange 1118 may comprise two, three, four, five, six or more stepped reductions in thickness from the first end 1121 towards the cushion attachment portion 1120. The face engaging flange 1118 may comprise one or more intermediate thicknesses selected from the values of 1.6 mm, 1.25 mm, 1 mm, 0.8 mm, and 0.5 mm, as examples. FIGS. 15A-15G show relative thicknesses between different regions of the interfacing structure 1100.

The cushion attachment portion 1120 may comprise a thickness within the range of about 0.75 to about 2 mm. In some examples it comprises a thickness within the range of about 1 mm to about 1.5 mm. In the illustrated example the cushion attachment portion 1120 is about 1.2 mm in thickness. Advantageously, a thick cushion attachment portion 1120 may provide for a smooth appearance and may be less likely to crinkle or buckle than if the cushion attachment portion 1120 is thin. In other examples, the cushion attachment portion 1120 may have a thickness within the range of about 0.2 to about 4 mm, or within the range of about 0.5 to about 3 mm, for example.

5.4.3.1.2 Spacing from Face Engaging Flange

FIG. 11F shows a cushion 1130 within the interfacing structure 1100. The cushion 1130 substantially fills the space within the interfacing structure 1100 (e.g. enclosed by the curled shape of the face engaging flange 1118). The cushion 1130 may comprise an outer shape, in cross section, that generally matches the inner shape of the face engaging flange 1118 on at least some or most sides. However, in some examples, such as that shown in FIG. 11G, the cushion 1130 and the face engaging flange 1118 are constructed and arranged to leave a spacing 1125 between the face engaging flange 1118 and the cushion 1130 at or proximate an end of the face engaging region 1123 located inside of the periphery of the user's eye region in use, at least in an at-rest state prior to donning of the head-mounted display system by the user. This spacing 1125 may make the interfacing structure 1100 more comfortable for the user. The spacing 1125 is located at or proximate an inner boundary of the face engaging region 1123. That is, at the location where the face engaging flange 1118 curls away from the user's skin. The spacing 1125 may be located at the thinnest portion of the face engaging flange 1118.

Another feature which advantageously provides for user comfort is that at the location of the spacing 1125 between the face engaging flange 1118 and the cushion 1130 (e.g. at or proximate an end of the face engaging region 1123 located inside of the periphery of the user's eye region in use), where the face engaging flange 1118 curls away from the user's face, the face engaging flange 1118 has a generous radius of curvature. This may also advantageously provide a low likelihood of facial markings. In some examples the radius of curvature is about 2 mm or more, about 3 mm or more, or about 4 mm or more. In some examples the radius is within the range of about 3 to about 5 mm, or within the range of about 3.5 mm to about 4.5 mm. This radius of curvature may also be provided at the thinnest portion of the face engaging flange 1118.

5.4.3.2 Cushion Attachment Portion and Cushion Support Flange

In some examples of the present technology the interfacing structure 1100 comprises both a cushion attachment portion 1120 and a cushion support flange 1164. FIGS. 17A-17L show example interfacing structures 1100 comprising a cushion support flange 1164 configured to support a cushion 1130 and further comprising a cushion attachment portion 1120.

In these examples of the present technology, the face engaging flange 1118 may be as described in other examples, for example provided around a periphery of an eye region of the user's face and configured to engage the user's face in use. It may be flexible and resilient and have a cross-sectional shape comprising a first end 1121 for connection to display unit housing (for example via a chassis portion 1102 and/or an interfacing structure clip 1101) and a second end 1122. The interfacing structure 1100 in the examples shown in FIGS. 17A-17L may comprise a face engaging region 1123 at which the face engaging flange 1118 contacts the user's face in use, the face engaging region 1123 located between the first end 1121 and the second end 1122.

The face engaging flange 1118 may curl between the first end 1121 and the second end 1122 to form an at least partially enclosed cross-sectional area. A cushion 1130 may be within the at least partially enclosed cross-sectional area. As shown in FIGS. 17A-17L for example, the cushion support flange 1164 may extend from the face engaging flange 1118 inwardly with respect to the cross-sectional area and may be configured to contact the cushion 1130.

The cushion support flange 1164 may extend from the face engaging flange 1118 at or proximate the first end 1121 of the face engaging flange 1118, such as at or proximate the chassis portion 1102. In FIGS. 17A, 17B and 17C the chassis portion 1102 is illustrated assembled to an interfacing structure clip 1101. The cushion 1130 may be attached to the face engaging flange 1118. A cushion attachment portion 1120 may be located at or proximate the second end 1122 of the face engaging flange 1118. The cushion attachment portion 1120 and cushion support flange 1164 may each be as described elsewhere herein. For example, the cushion support flange 1164 may be integrally formed, e.g. moulded together with, the face engaging flange 1118. The cushion attachment portion 1120 may be a thickened portion of the face engaging flange 1118, for example thicker than one or more adjacent regions of the face engaging flange 1118.

In some examples, the cushion 1130 is attached to the face engaging flange 1118 at the cushion attachment portion 1120. In some examples the cushion 1130 may be adhered to the cushion attachment portion 1120. In some examples the cushion 1130 is attached to the cushion support flange 1164 and may be glued to the cushion support flange 1164. In other examples the cushion 1130 may be attached to the cushion attachment portion 1120 using silicone as adhesive, with double sided tape or by a mechanical connection, for example a tongue and groove attachment, or by another suitable method.

FIG. 17A shows the location of glue 1124 in one example. The glue 1124 in this example is applied to connect all three of the cushion 1130, cushion support flange 1164 and cushion attachment portion 1120 together. The cushion 1130 is attached to the cushion support flange 1164 and the cushion 1130 is attached to the face engaging flange 1118. The face engaging flange 1118 and the cushion support flange 1164 are also attached in this example. The face engaging flange 1118 and the cushion support flange 1164 may be glued together or at least connected by glue (e.g. a bead of glue or spots of glue), as shown in FIG. 17A. In this example the glue 1124 is located at a single location within the cross section of the interfacing structure 1100. The applied glue 1124 may be one or more continuous beads or a series of discrete spots along the length of the interfacing structure (e.g. along the interfacing structure 1100 around the periphery of the user's eye region in use). This may advantageously be an efficient use of glue and may provide for a quick processing step during manufacturing of the interfacing structure 1100. Furthermore, in this arrangement the cushion attachment portion 1120 and cushion support flange 1164 almost completely enclose the cushion 1130 within the face engaging flange 1118, which may advantageously protect the cushion 1130 (e.g. a foam cushion) during use and cleaning and may be aesthetically pleasing. The combination of the cushion attachment portion 1120, cushion support flange 1164 and glue 1124 in this particular example may completely enclose the cushion 1130.

In some forms, the cushion attachment portion 1120 and the cushion support flange 1164 may at least partially overlap when connected with the glue 1124. This may at least partially hide or obscure the glue 1124, which create a more aesthetically pleasing view and may help protect the glue 1124.

FIG. 17B shows the location of glue 1124 in another example. In this example the glue 1124 is also applied to connect all three of the cushion 1130, cushion support flange 1164 and cushion attachment portion 1120 together. However, in this example glue 1124 is also applied to connect the cushion support flange 1164 to the cushion 1130 on an opposite side of the cushion support flange 1164 to the cushion attachment portion 1120. Additionally, in this example glue 1124 may be applied along a partial or full length of the cushion attachment portion 1120. In this example the interfacing structure 1100 may comprise a first glue portion connecting the cushion attachment portion 1120 to the cushion support flange 1164, a second glue portion connecting the cushion attachment portion 1120 to the cushion 1130 and a third glue portion connecting the cushion support flange 1164 to the cushion 1130. The first glue portion and second glue portion may be adjoining, e.g. both formed by a single application/dispensing of glue. This configuration of glue 1124 may be highly robust and resistant to peeling open of the face engaging flange 1118 (e.g. at the cushion attachment portion 1120) or movement of the cushion 1130.

In some forms, the position of the glue 1124 against the cushion 1130 may create a "seamless" appearance as the glue 1124 may not be visible. This may create a more aesthetically pleasing look and may assist in creating a stronger connection because the glue 1124 may not be accidentally removed.

FIG. 17C shows the location of glue 1124 in another example. In this configuration the glue 1124 is applied to connect the cushion attachment portion 1120 to the cushion 1130 and applied to connect the cushion 1130 to the face engaging flange 1118 proximate the cushion support flange 1164. The glue 1124 is provided at discrete locations within the cross section of the interfacing structure 1100 in this example, three discrete locations in particular. The applied glue 1124 may be one or more continuous beads or a series of discrete spots along the length of the interfacing structure (e.g. along the interfacing structure 1100 around the periphery of the user's eye region in use). Glue 1124 may be applied at two or more locations along the length in cross section of the cushion attachment portion 1120. For example, FIG. 17C shows glue 1124 at two locations along the length in cross section of the cushion attachment portion 1120. Advantages of this configuration of glue 1124 include ease of manufacture and low sensitivity to accurate placement of glue 1124. The glue may add little extra weight to the interfacing structure 1100 in this example. The interfacing structure 1100 in this example may also be aesthetically pleasing, for example because the glue may not be visible. An advantage of the interfacing structures 1100 shown in FIGS. 17A and 17B is that the location of the glue 1124 may prevent the end of the face engaging flange 1118 from being peeled away to reveal the cushion 1130.

In some forms, the glue 1124 applied between the cushion attachment portion 1120 and the cushion support flange 1164 may travel onto at least a portion of the cushion 1130 before drying. The glue 1124 may provide an additional sealing force between the cushion 1130 and the cushion attachment portion 1120.

5.4.3.2.1 Overlap Between Face Engaging Flange and Cushion Support Flange

In some examples, the face engaging flange 1118 and the cushion support flange 1164 overlap to cover the cushion. In the examples shown in FIGS. 17A-17L the face engaging flange 1118 and cushion support flange 1164 overlap to hide the cushion 1130 from view, for example by limiting the size and opening direction of an angle from which the cushion 1130 can be viewed to a size and opening direction which is impossible for a user to access due to the presence of other portions of the interfacing structure 1100 (e.g. the first end 1121 of the face engaging flange 1118, the chassis portion 1102, the interfacing structure clip 1101). Hiding the cushion form view may provide for an aesthetically pleasing interfacing structure 1100.

The face engaging flange 1118 and the cushion support flange 1164 may overlap to prevent the user from touching the cushion 1130. For example, there may be a spacing between overlapping portions of the face engaging flange 1118 and the cushion support flange 1164 that is sufficiently small to prevent the user from touching the cushion 1130 through the spacing between the overlapping portions. Preventing the cushion 1130 from being touched may help keep the cushion 1130 clean, and may prevent damage to the cushion 1130. A covered cushion 1130 may also provide for a highly cleanable interfacing structure 1100.

As shown in FIGS. 17A-17L, the cushion support flange 1164 may comprise a fixed end attached to the face engaging flange 1118 and a free end opposite the fixed end along a length of the cushion support flange 1164 in cross section. The cushion support flange 1164 may be structured as a cantilever beam extending from the face engaging flange 1118. The cushion support flange 1164 extends into an interior region defined by the face engaging flange 1118.

As illustrated especially in FIGS. 17D-17H, the second end 1122 of the face engaging flange 1118 may be spaced from the free end of the cushion support flange 1164. Despite this spacing, the face engaging flange 1118 and cushion support flange 1164 overlap to hide the cushion 1130 from view and prevent the cushion from being touched.

As illustrated in the examples shown in FIGS. 17A-17C, 17E and 17G in particular, the cushion support flange 1164 may be aligned parallel to a portion of the face engaging flange 1118 proximate the second end 1122 of the face engaging flange 1118, in cross section. The cushion support flange 1164 and the face engaging flange 1118 overlap, in these examples, such that in a direction parallel to the length of the cushion support flange 1164 (in cross section) the second end 1122 of the face engaging flange 1118 is located between the fixed end and the free end of the cushion support flange. For example, along a theoretical axis aligned parallel to the length of the cushion support flange 1164, the second end 1122 of the face engaging flange 1118 is between the fixed end and free end of the cushion support flange 1164.

In some particular examples, the second end 1122 of the face engaging flange 1118 may be spaced from the free end of the cushion support flange 1164 by more than 0.5 mm in the direction parallel to the length of the cushion support flange 1164. In some examples, the second end 1122 of the face engaging flange 1118 may be spaced from the free end of the cushion support flange 1164 by more than 1 mm in the direction parallel to the length of the cushion support flange 1164, or by 2 mm or more. A large spacing of the second end 1122 of the face engaging flange 1118 from the free end of the cushion support flange 1164 is desirable for good cover of the cushion 1130 although very large overlap may affect manufacturability.

In some particular examples, the second end 1122 of the face engaging flange 1118 is spaced from the cushion support flange 1164 by less than 6 mm in a direction perpendicular to the length of the cushion support flange 1164. In some examples, the second end 1122 of the face engaging flange 1118 is spaced from the cushion support flange 1164 by less than 5 mm in the direction perpendicular to the length of the cushion support flange 1164, or by less than 4 mm, or by 3 mm, or less. A small spacing of the second end 1122 of the face engaging flange 1118 from the cushion support flange 1164 in a direction perpendicular to the cushion support flange 1164 is desirable for good cover of the cushion 1130 although very small spacings may affect manufacturability.

In some forms, free ends of the cushion attachment portion 1120 and the cushion support flange 1164 may be thinner than the remainder of the respective structure. When the cushion attachment portion 1120 and the cushion support flange 1164 overlap, as described above, the reduced thicknesses of each may form a combined thickness that is substantially equal to the thickness of the cushion attachment portion 1120 and the cushion support flange 1164 independently. Because the glue 1124 is positioned on the inside proximate to the cushion 1130, the cushion attachment portion 1120 and the cushion support flange 1164 may appear uniform (e.g., a single, continuous structure).

5.4.3.2.2 Cushion Support Flange Resists Compression of Interfacing Structure

The cushion support flange 1164 may help retain the cushion 1130 in position, especially if the cushion 1130 is attached (e.g. adhered, glued or otherwise attached) to the cushion support flange 1164. In addition, the cushion support flange 1164 may be configured to contribute to the compliance of the interfacing structure 1100. The cushion support flange 1164 may resist movement of the cushion 1130 when the interfacing structure 1100 complies to the user's face. For the cheek and forehead regions the cushion support flange 1164 may resist movement of the cushion 1130 towards the interfacing structure clip 1101, for example. More generally, the cushion support flange 1164 may be structured to resist compression of the interfacing structure 1100 in use.

The cushion support flange 1164 may be configured to bend in use to resist compression of the interfacing structure 1100. The cushion support flange 1164 may be structured to bend away from the surface of the user's face/towards the head-mounted display unit 1200 during compression of the interfacing structure 1100. It is to be understood that the resistance of the cushion support flange 1164 to compression does not require that the cushion support flange 1164 prevents the interfacing structure 1100 or cushion 1130 from compressing. However, the cushion support flange 1164 may increase the overall stiffness of the interfacing structure 1100 and provide a reaction force to the cushion 1130 during compression to urge the cushion 1130 and face engaging flange 1118 to conform to the surface of the user's face.

The cushion support flange 1164 may provide these functions whether or not the face engaging flange 1118 also comprises a cushion attachment portion 1120. It is to be understood that in some examples the interfacing structure 1100 comprises a cushion support flange 1164 but does not comprise a cushion attachment portion on a face engaging flange 1118. This type of example is shown in FIGS. 7H and 7M for example, along with FIGS. 21A-21C.

FIG. 17J shows cross section view of the interfacing structure 1100 in a cheek portion 1140, showing the face engaging flange 1118 and cushion support flange 1164 in an undeformed state. The face engaging flange 1118 and cushion support flange 1164 are also shown in a deformed state, indicated by reference numerals 1118' and 1164' respectively, caused by application of force applied to the face engaging region 1123. The direction and location of the forces are indicated by the arrows in FIG. 17J. This is a force that may be applied to the interfacing structure by the user's cheek during use of the head-mounted display system 1000. As shown, the face engaging flange 1118 deforms towards the interfacing structure clip 1101, and towards the head-mounted display unit 1200 to which the interfacing structure 1100 is connected and takes the shape indicated by 1118'. The cushion support flange 1164 deforms due to compression and/or movement of the cushion 1130 and takes the shape indicated by 1164'. The cushion support flange 1164 may provide resistance to this deformation to contribute to the overall resilience of the interfacing structure 1100. The cushion support flange 1164 may resist this deformation through bending forces and/or stretch forces.

For example, the cushion support flange 1164 may be stiffer than the remainder of the interfacing structure 1100. This may be a result of a thicker structure, a different material, an additional support, or any other similar reason. As illustrated by the deformed shape in dashed lines, the deformed face engaging flange 1118' deforms more than the deformed cushion support flange 1164'. The cushion support flange 1164 may act as a backstop for the cushion 1130 and limit the total compression in at least a portion of the cushion 1130. For example, resistance in the cushion support flange 1164' may limit or prevent contact between the cushion support flange 1164' and the chassis 1102, thereby limiting discomfort caused by this potential occurrence.

In some forms, the cushion support flange 1164 does not contact the second end 1122 so that the cushion 1130 is not formed within a completely enclosed area. However, other examples may include a cushion 1130 that is fully enclosed.

In certain forms, the second end 1122 may at least partially overlap with the cushion support flange 1164. This may limit or prevent a user from touching the cushion 1130 despite not being completely enclosed.

In certain forms, the disconnection between the second end 1122 and the cushion support flange 1164 may allow for the differences in deformation illustrated in FIG. 17J. For example, a distance between the second end 1122 and the cushion support flange 1164 may be different (e.g., smaller) in the undeformed position as compared to the deformed position (i.e., 1118' and 1164'). The disconnection may not limit the more deformable face engaging flange 1118' because of the more deformable cushion support flange 1164'.

In certain forms, the cushion support flange 1164 contacts only a portion of the cushion 1130 along a particular side. For example, FIG. 17J illustrates that the section of the cushion 1130 between the second end 1122 and the face engaging flange 1118 may be unsupported by the cushion support flange 1164. This may allow the cushion 1130 to deform different amounts.

With reference to FIGS. 17H and 17I, a medial end of the cushion support flange 1164 on each side of the interfacing structure 1100 is joined to the face engaging flange 1118 in this particular example. As illustrated, the cushion support flange 1164 is joined to an anterior portion of the face engaging flange 1118. In this example the cushion support flange 1164 curls towards the anterior direction to intersect with the face engaging flange 1118. The cushion support flange 1164 may join to the face engaging flange 1118 proximate the first end 1121 of the face engaging flange 1118. This arrangement may advantageously help obscure the cushion 1130 and provide more resistance to deformation at the medial end of the cheek portion 1140 when the cushion 1130 is compressed.

In the examples shown in FIGS. 17E-17G, the cushion support flange 1164 is oriented at an oblique angle to a target sealing surface of the user's face. FIG. 17L shows an alternative configuration in which the cushion support flange 1164 is designed to have a low impact on compliance of the interfacing structure 1100. In this example the cushion support flange 1164 is aligned substantially parallel to a target sealing surface of the user's face, as shown in FIG. 17L. This configuration may be advantageous as it may have a low likelihood of causing areas of discomfort if the foam is relatively soft. The cushion support flange 1164 may be substantially parallel to a face engaging portion 1110 of the face engaging flange 1118, in this example.

In some examples, the cushion support flange 1164 is generously long to provide a large amount of support for the cushion 1130. A long cushion support flange 1164 may be effective at preventing the cushion 1130 from becoming dislodged from within the face engaging portion 1118, which may be particularly advantageous in examples in which the cushion is not adhered to the face engaging flange 1118. In some examples, the cushion 1130 may comprise a first side in contact with or adjacent to a face engaging flange 1118 of an interfacing structure 1100 and a second side opposite the first side, the second side being in contact with a cushion support flange 1164. In some examples the cushion support flange 1164 may have a length which extends along more than 50% of the second side of the cushion 1130. In some examples the length may extend along more than 60%, 70%, 80% or 90% of the cushion 1130.

5.4.3.2.3 Biased Cushion Support Flange

In some examples, the cushion support flange 1164 is configured to bias the cushion 1130 against the face engaging flange 1118. FIG. 17K shows a cross section view of another example interfacing structure 1100 having a cushion support flange 1164 that is constructed to apply a force against the cushion 1130 to bias it towards the face engaging flange 1118 even prior to a user donning the head-mounted display system 1000 comprising the interfacing structure 1100.

The cushion support flange 1164 in this example has a first configuration prior to assembly of the cushion 1130 with the face engaging flange 1118. The cushion support flange 1164 in the first configuration is indicated by reference numeral 1164'. The cushion support flange 1164 may be moulded in the first configuration 1164', e.g. the face engaging portion 1110 may be moulded with the cushion support flange 1164 in the first configuration. The cushion 1130 may be formed separately and inserted into the cross sectional area partially enclosed by the face engaging flange 1118 and cushion support flange 1164. The cushion support flange 1164 may be deformed by the cushion 1130 into a second configuration (indicated by reference numeral 1164) during assembly of the cushion 1130 with the face engaging flange 1118 (e.g. assembly of the cushion 1130 into the space partially defined by the face engaging flange 1118).

In the first configuration indicated by 1164' the free end of the cushion support flange 1164 is closer to the face engaging region 1123 than it is in the second configuration indicated by 1164. When the presence of the cushion 1130 deforms the cushion support flange to the configuration indicated by 1164, the cushion support flange bends and/or stretches, Due to tension and/or compression of the material forming the cushion support flange 1164 resulting from this deformation, the cushion support flange 1164 applies a force back on the cushion 1130, which biases the cushion 1130 towards the face engaging region 1123. This may advantageously hold the cushion 1130 in place.

In the first configuration indicated by 1164', the free end of the cushion support flange 1164 is spaced further from the second end 1122 of the face engaging flange 1118 than in the second configuration indicated by 1164. As shown in FIG. 17K, in the first configuration the cushion support flange indicated by 1164' is generally spaced by a distance X from the second end 1122 of the face engaging flange 1118. In the second configuration the cushion support flange indicated by 1164 is generally spaced by a lesser amount than X from the second end 1122 of the face engaging flange 1118. Another advantage of this configuration is that a large spacing between the cushion support flange 1164 and the second end of the face engaging flange 1118 during moulding may provide for robust tool construction.

In the first configuration, the cushion support flange 1164' is, in cross section, oriented at an angle to a portion of the face engaging flange 1118 proximate the second end 1122 of the face engaging flange 1118. This portion of the face engaging flange 1118 proximate the second end 1122 may be the cushion attachment portion 1120 described elsewhere herein. In the second configuration, the cushion support flange 1164 is oriented substantially parallel to said portion of the face engaging flange 1118. The cushion support flange 1164' may be less likely to resist deformation of the cushion 1130 and/or face engaging portion 1110 as a whole, in this configuration.

5.4.3.2.4 Second End of Face Engaging Flange Fixed Proximate First End

FIG. 18A shows a cross section view of an interfacing structure 1100 according to another example. The interfacing structure 1100 in this example comprises a face engaging flange 1118 having a cross-sectional shape comprising a first end 1121 connected to a display unit housing of the head-mounted display system (in use), a second end 1122 and a face engaging region 1123 at which the face engaging flange 1118 contacts the user's face in use. The face engaging region 1123 is located between the first end 1121 and the second end 1122 and curls between the first end 1121 and second end 1122. In this example the second end 1122 of the face engaging flange 1118 is fixed in place proximate the first end 1121 to form an enclosed cross-sectional area. The interfacing structure 1100 in this example comprises a cushion 1130 within the enclosed cross-sectional area.

The second end 1122 of the face engaging flange 1118 being fixed in place proximate the first end 1121 to form an enclosed cross-sectional area to contain the cushion 1130 may have multiple advantages. For example, the cushion 1130 is not visible or touchable by the user. This may provide for a pleasing aesthetic and protect the cushion 1130 from damage, which may be particularly advantageous where the cushion 1130 is formed from foam. Furthermore, if the cushion 1130 is formed from foam, the cushion 1130 may be more difficult to clean. Fully enclosing the cushion 1130 with the face engaging flange 1118 (which may be an easily wipeable/cleanable material such as silicone or TPE) may make the interfacing structure 1100 easier to clean.

FIG. 18C shows another example interfacing structure in which the second end 1122 of a face engaging flange 1118 is fixed in place proximate the first end 1121 thereof to form an enclosed cross-sectional area, with a cushion 1130 within the enclosed area. In the examples shown in FIGS. 18A and 18C, the interfacing structure 1100 comprises a chassis portion 1102 configured to attach to the display unit housing, and a face engaging portion 1110 connected to the chassis portion 1102. The face engaging portion 1110 comprises the face engaging flange 1118. In these examples the face engaging flange 1118 and the chassis portion 1102 are integrally formed. The second end 1122 of the face engaging flange 1118 may be attached to the chassis portion 1102. As shown in FIG. 18C for example, the second end 1122 of the face engaging flange 1118 is attached with glue 1124 to the chassis portion 1102, which is at or proximate the first end 1121 of the face engaging flange 1118.

In each of FIGS. 18A and 18C the interfacing structure 1100 comprises an interfacing structure clip 1101 configured to attach the chassis portion 1102 (and thereby the interfacing structure 1100 as a whole) to the display unit housing of the head-mounted display system. In the example shown in FIG. 18A, the second end 1122 of the face engaging flange 1118 is attached to the interfacing structure clip 1101. As illustrated, in this example the second end 1122 of the face engaging flange 1118 is attached with glue 1124 to the interfacing structure clip 1101.

In some forms, the interfacing clip structure 1101 includes an opening receiving the end of the chassis portion 1102. The interfacing clip structure 1101 may be spaced apart from the cushion 1130. For example, the clip interfacing structure 1101 may not be in contact with the cushion 1130 during use.

As shown in FIG. 18C, certain forms of the interfacing clip structure 1101 may be entirely outside of the inner volume of the face engaging portion 1110. In other words, the interfacing clip structure 1101 may form no part of the perimeter of a closed loop, like what is illustrated in FIG. 18C.

In the examples shown in FIGS. 18A and 18C, the interfacing structure 1100 comprises a first surface and the face engaging flange 1118 comprises a second surface proximate the second end 1122. The second surface in these examples is shaped and sized to correspond to the first surface and the first and second surfaces are adhered together in an assembled state of the interfacing structure 1100. In some examples, the face engaging flange 1118 is formed in an unassembled state in which the second surface is unattached to the first surface. FIG. 18B shows the interfacing structure 1100 of FIG. 18A in a partially assembled/constructed state. In FIG. 18B, the face engaging flange 1118 is shown in the unassembled state in which the second surface is unattached to the first surface (and in this example is spaced from the first surface). In this example the first surface is on the interfacing structure clip 1101 and the second surface is an end portion of the face engaging flange 1118.

The face engaging flange 1118 may be moulded in the unassembled state. During assembly, the cushion 1130 is able to be inserted between the first surface and the second surface into the enclosed cross-sectional area. After this, the first surface and second surface are adhered together (to arrive at the assembled state shown in FIG. 18A). FIG. 18C shows a portion of the face engaging flange 1118 proximate the second end 1122 in an unassembled stated in phantom and indicated by the reference numeral 1122'. The second surface is proximate the second end 1122'. As illustrated, the second surface is not attached to another portion of the interfacing structure 1100. After insertion of the cushion 1130 into the cross-sectional area partially enclosed by the face engaging flange 1118 the second surface proximate the second end 1122' of is attached to the first surface, in the position indicated by reference numeral 1122.

As illustrated, in the FIG. 18A-18C examples the face engaging flange 1118 is not adhered to the cushion 1130. However, in some examples the face engaging flange 1118 may be attached to the cushion 1130, and may also be attached to another portion of the interfacing structure 1100, such as to a chassis portion 1102 of the face engaging portion 1110 or to an interfacing structure clip 1101. In an alternative example shown in FIG. 18D, the face engaging flange 1118 is attached to the cushion 1130. In this example the face engaging flange 1118 is not attached to any other portions of the interfacing structure 1100.

In the FIG. 18D example the face engaging flange 1118 does not comprise a thicker cushion attachment portion 1120 of the same type as in other examples, such as the example shown in FIGS. 11A-11M for example. In the FIG. 18D example the face engaging flange 1118 comprises a face engaging region 1123 configured to contact the user's face in use and does not cover a side of the cushion 1130 opposite the face engaging region 1123. The face engaging flange 1118 may leave a majority of the side of the cushion 1130 opposite the face engaging region 1123 uncovered. However, the face engaging flange 1118 may curl over an edge of the cushion 1130 proximate the face engaging region 1123 (for example between the face engaging region 1123 and the second end 1122 of the face engaging flange 1118, which may provide resistance to buckling, which may improve the ability of the interfacing structure to block light.

The face engaging flange 1118 may be attached to the cushion 1130 at one or more locations along the cross-sectional length of the face engaging flange 1118 and may be adhered to the cushion 1130. As shown in FIG. 18D, the cushion 1130 is adhered to the face engaging flange 1118 at three points by glue 1124. The glue may be discrete spots of or may be beads extending along lengths of the face engaging flange along the interfacing structure around the periphery of the user's eye region. The FIG. 18D arrangement may advantageously be easier and/or cheaper to manufacture due to the large gap between the first end 1121 and second end 1122 of the face engaging flange 1118 through which the cushion 1130 can be inserted. Less face engaging flange 1118 material may advantageously reduce weight. Despite less encapsulation of the cushion 1130, the face engaging flange 1118 may still advantageously be supported in shape by the cushion 1130.

5.4.3.2.5 Cushion Attached to Interfacing Structure Clip

FIGS. 18E and 18F show an alternative manner in which the cushion 1130 may be attached within the interfacing structure 1100. The interfacing structure 1100 in this example comprises an interfacing structure clip 1101 configured to attach the interfacing structure 1100 to a display unit housing of a head-mounted display system 1000. The interfacing structure 1100 further comprises a face engaging flange 1118 having a cross sectional shape comprising a first end 1121 attached to the interfacing structure clip 1101, a second end 1122 and a face engaging region 1123 at which the face engaging flange 1118 contacts the user's face in use, located between the first end 1121 and the second end 1122. The face engaging flange 1118 may curl between the first end 1121 and the second end 1122 around the cushion body 1131. The second end of the face engaging flange is located on an opposite side of the cushion to the face engaging region 1123. The interfacing structure 1100 further comprises a cushion 1130 positioned against or proximate the face engaging region 1123 of the face engaging flange 1118 in use. In this example the cushion 1130 is attached to the interfacing structure clip 1101.

In some forms, the interfacing clip structure 1101 may be attached to the cushion 1130 such that they are no movable relative to one another. The interfacing clip structure 1101 and the cushion 1130 may be movable relative to the face engaging portion 1110. For example, as illustrated in FIG. 18E, the interfacing clip structure 1101 and the cushion 1130 may be moved together into their proper position.

The interfacing structure clip 1101 may be removably attachable to the display unit housing. Advantageously, this may enable the interfacing structure 1100 to be removed from the display unit housing for cleaning, replacement and the like. The interfacing structure clip 1101 may be structured to form a snap fit connection with the display unit housing, or may form a press fit connection, or another suitable connection. The interfacing structure clip 1101 may be stiffer than the face engaging flange 1118, for example formed from a stiffer material, and may function not only to enable removable attachment to the display unit housing but also as an anchor or base from which the face engaging flange 1118 can extend. The interfacing structure clip 1101 may be formed from a thermoplastic material in some examples and may be permanently connected to the face engaging flange 1118. For example by the face engaging flange 1118 may be formed from an elastomer (e.g. silicone, a TPE or the like) and may be overmoulded to the interfacing structure clip 1101.

The cushion 1130 may comprise a compressible cushion body 1131, which may be formed from a compressible material or compressible structure (e.g. foam, gel, a 3D-printed lattice or the like), and may comprise a cushion clip 1135. The cushion clip 1135 may be configured to attach to the interfacing structure clip 1101. The cushion clip 1135 may be removably attachable to the interfacing structure clip 1101. This may advantageously enable the cushion 1130 to be removed from the user for reasons such as cleaning, disinfection, replacement, changing sizes and the like. The cushion clip 1135 may form a snap fit connection with the interfacing structure clip 1101.

As shown in FIGS. 18E and 18F the cushion 1130 can be inserted attached to the interfacing structure 1100 by inserting the cushion 1130 into the area partially enclosed by the face engaging flange 1118 by pushing the cushion 1130 between the first end 1121 and the second end 1122 of the face engaging flange 1118. The cushion clip 1135 then forms a snap fit connection with the interfacing structure clip 1101 in this example. As illustrated, the cushion clip 1135 comprises a lip 1136 configured to fit behind an inside edge of the interfacing structure clip 1101 to retain the cushion 1130 between the interfacing structure clip 1101 and the face engaging region 1123 and more generally within the face engaging flange 1118.

The cushion body 1131 may be overmoulded to the cushion clip 1135. The cushion clip 1135 may be formed from a thermoplastic elastomer and should have mechanical properties to enable it to engage with the interfacing structure clip 1101 and not overly impede compression of the cushion body 1131. For example, the cushion clip 1135 may be formed from a thermoplastic elastomer having a Shore-A Durometer hardness of 90. In other examples is may be formed from a sufficiently stiff silicone or a thermoplastic material. The cushion clip 1135 may also hold the cushion body 1131 in a predetermined shape (e.g. a 3D shape complimentary to the shape of the human face around a periphery of the eye region).

The FIGS. 18E and 18F interfacing structure 1100 may advantageously be easier, cheaper and/or quicker to manufacture because the cushion clip 1135 may facilitate easy insertion of the cushion 1130 into the face engaging flange 1118 by hand or robotic assembly. In examples in which the cushion body 1131 is formed from foam (or another mouldable material), the cushion body 1131 can be overmoulded to the cushion clip 1135, which may avoid the need for a separate assembly step and may provide for a robust connection between cushion body 1131 and cushion clip 1135. Furthermore, the cushion body 1131 may be pre-shaped to an in-use shape and held in this shape by the cushion clip 1135, before assembly. The removable cushion 1130 means that the cushion 1130 can be removed, replaced, changed, optimised and/or personalised to alter characteristics.

5.4.3.2.5.1 Cushion Inserts

Another application of a removably attachable cushion 1130 of the type shown in FIGS. 18E and 18F is that multiple cushion options can be made available for use in a head-mounted display system 1000 depending on intended application. The user can select or be provided with an optimised or tailored cushion 1130 based on intended use. In some examples an outer portion or layer of an interfacing structure 1100 (e.g. a face engaging flange 1118) may be consistent and compatible with a plurality of cushion inserts (e.g. removable and substitutable cushions 1130). Advantageously, the head-mounted display system 1000 can then be used in multiple use scenarios by switching inserts. It is also to be understood that in some examples the entire interfacing structure 1100 is replaceable instead of just a cushion insert.

In one example the head-mounted display system 1000 may comprise a cushion insert in the form of a cushion 1130 configured to be washable (e.g. machine washable) and/or sterilisable (e.g. by autoclave). In one such example the cushion insert comprises a cushion 1130 having a cushion body 1131 formed from silicone. This type of cushion insert may also be useful for medical use.

In another example the head-mounted display system 1000 may comprise a cushion insert in the form of a cushion 1130 tailored to a particular anthropometric "subgroup". The subgroup may be a gender or ethnicity subgroup for example. The cushion 1130 may comprise a shape intended to conform well to an average face shape of the particular subgroup.

In another example the head-mounted display system 1000 may comprise a cushion insert in the form of a cushion 1130 configured for active use. FIG. 19A shows one such example. The cushion 1130 may comprise a cushion body 1131 having two portions: a first portion 1137 having a first stiffness and a second portion 1138 on an opposite side of the first portion 1137 to the user's face having a second stiffness greater than the first stiffness. The first portion 1137 may accommodate anthropometric variation while the second portion 1138 provides a firmer positioning "datum" (e.g. a less moveable base) so that the head-mounted display system 1000 rests securely in a predetermined position and does not move excessively under pulsing dynamic loads caused by active (e.g. vigorous) use. More generally it is to be understood that any of the cushions 1130 disclosed herein may comprise a plurality of portions having a plurality of different stiffnesses, such as a first portion 1137 or layer having a first stiffness and a second portion 1138 or layer having a second stiffness greater than the first stiffness. In the example shown in FIG. 19A the second portion 1138 is attached to a cushion attachment portion 1120 of a face engaging flange 1118. In other examples the second portion 1138 may be connected by a cushion clip 1135 to the interfacing structure 1100, for example to an interfacing structure clip 1101.

In another example the head-mounted display system 1000 may comprise a cushion insert in the form of a cushion 1130 with comfort for long periods of wear prioritised over other characteristics. In some such examples the cushion 1130 may be configured to provide an even contact pressure, for example by being highly conformable.

In another example the head-mounted display system 1000 may comprise a cushion insert in the form of a cushion 1130 with varying compliance and/or spring characteristics for different facial zones. In some such examples the cushion 1130 may comprise a relatively higher stiffness at medial cheek portions and a medial forehead portion and a relatively lower stiffness at lateral cheek portions. In some examples the cushion 1130 may comprise a relatively higher stiffness at facial areas that bear dynamic vertical loads (e.g. forehead) and medial-lateral loads (e.g. temples). The varying compliance may be provided by a variable thickness silicone portion or other elastomer, for example. FIG. 19B shows an example of a silicone cushion 1130 comprising a cushion flange 1139. The cushion flange 1139 may vary in geometry (e.g. shape and/or thickness) around the periphery of the interfacing structure 1100 to provide different stiffness in different areas. The FIG. 19B example is described above in more detail.

In another example the head-mounted display system 1000 may comprise a cushion insert in the form of a cushion 1130 that is tailored to the unique shape of the user's face shape, with the resultant even contact pressure for one or more of the following properties: high comfort, compliance properties tuned to active use (e.g. relatively high stiffness to minimise movement) and high control/predictability of the position of the head-mounted display unit 1200 on the user's face (which may be advantageous in applications in which the optical focal distance needs to be highly controlled). Such a cushion 1130 (or interfacing structure 1100 more generally) may be provided using the technology discussed in the "Automatic Sizing" section below.

5.5 Automatic Sizing

Interfacing structures 1100 (which may also be known as "facial interfaces") according to examples of the present technology (e.g. the example shown in FIGS. 7A-7M or in any other example disclosed herein), may be provided in a range of sizes so that users can select a most optimal size from the range of sizes when purchasing or using a head-mounted display system. Described below are systems and methods to assist users in determining the correct or most optimal size interfacing structure 1100. It is to be understood that in some examples the systems and methods may be applied to selection of other components of a head-mounted display system, such as a positioning and stabilising structure.

In a beneficial embodiment, the present technology may employ an application downloadable from a manufacturer or third party server to a smartphone or tablet with an integrated camera. When launched, the application may provide visual and/or audio instructions. When prompted or otherwise, the user may activate a process using an image sensor (such as a camera function) to scan or capture one or more images of the user's face, and a facial interface size may be recommended based on an analysis of the captured image or video by a processor of the phone or a cloud. In an alternative embodiment, instead of capturing images of a subject in real-time, the user may be prompted to select and/or upload a pre-exiting image of the user's face for image processing and analysis for sizing. In one example, the image is a 2D image of the user's face. In another example, the image is a 3D image (i.e. contains depth information on selected portion) of the face. This may allow for a correct or optimal size of the facial interface identified quickly and conveniently for a user which improves user fit and comfort.

As described further below, the present technology allows a user to capture an image or series of images of their facial structure. Instructions provided by an application stored on a computer-readable medium, such as when executed by a processor, detect various facial landmarks within the images, measure and scale the distance between such landmarks, compare these distances to a data record, and recommend an appropriate facial interface size. Thus, an automated device of a consumer may permit accurate facial interface selection, such as in the home, to permit customers to determine sizing without trained associates or fitting.

5.5.1 System

FIG. 8 depicts an example system 200 that may be implemented for automatic facial feature measuring and facial interface sizing. System 200 may generally include one or more of servers 210, a communication network 220, and a computing device 230. Server 210 and computing device 230 may communicate via communication network 220, which may be a wired network 222, wireless network 224, or wired network with a wireless link 226. In some versions, server 210 may communicate one-way with computing device 230 by providing information to computing device 230, or vice versa. In other embodiments, server 210 and computing device 230 may share information and/or processing tasks. The system may be implemented, for example, to permit automated purchase of facial interfaces where the process may include automatic sizing processes described in more detail herein. For example, a customer may order a facial interface online after running a facial interface selection process that automatically identifies a suitable facial interface size by image analysis of the customer's facial features.

5.5.1.1 Computing Device

Computing device 230 can be a desktop or laptop computer 232 or a mobile device, such as a smartphone 234 or tablet 236. FIG. 9 depicts the general architecture 300 of computing device 230. Device 230 may include one or more processors 310. Device 230 may also include a display interface 320, user control/input interface 331, sensor 340 and/or a sensor interface for one or more sensor(s), inertial measurement unit (IMU) 342 and non-volatile memory/data storage 350.

Sensor 340 may be one or more cameras (e.g., a CCD charge-coupled device or active pixel sensors) that are integrated into computing device 230, such as those provided in a smartphone or in a laptop. Alternatively, where computing device 230 is a desktop computer, device 230 may include a sensor interface for coupling with an external camera, such as the webcam 233 depicted in FIG. 4. Other exemplary sensors that could be used to assist in the methods described herein that may either be integral with or external to the computing device include stereoscopic cameras, for capturing three-dimensional images, or a light detector capable of detecting reflected light from a laser or strobing/structured light source. In one embodiment, the sensor 340 comprises an Apple iphone's 3D TrueDepth Camera or similar sensors employed in other mobile devices capable of 3D facial scanning.

User control/input interface 331 allows the user to provide commands or respond to prompts or instructions provided to the user. This could be a touch panel, keyboard, mouse, microphone, and/or speaker, for example.

Display interface 320 may include a monitor, LCD panel, or the like to display prompts, output information (such as facial measurements or interface size recommendations), and other information, such as a capture display, as described in further detail below.

Memory/data storage 350 may be the computing device's internal memory, such as RAM, flash memory or ROM. In some embodiments, memory/data storage 350 may also be external memory linked to computing device 230, such as an SD card, server, USB flash drive or optical disc, for example. In other embodiments, memory/data storage 350 can be a combination of external and internal memory. Memory/data storage 350 includes stored data 354 and processor control instructions 352 that instruct processor 310 to perform certain tasks. Stored data 354 can include data received by sensor 340, such as a captured image, and other data that is provided as a component part of an application. Processor control instructions 352 can also be provided as a component part of an application.

5.5.1.2 Application for Facial Feature Measuring and Facial Interface Sizing One such application is an application for facial feature measuring and/or facial interface sizing 360, which may be an application downloadable to a mobile device, such as smartphone 234 and/or tablet 236. The application 360, which may be stored on a computer-readable medium, such as memory/data storage 350, includes programmed instructions for processor 310 to perform certain tasks related to facial feature measuring and/or facial interface sizing. The application also includes data that may be processed by the algorithm of the automated methodology. Such data may include a data record, reference feature, and correction factors, as explained in additional detail below.

5.5.2 Method for Automatic Measuring and Sizing

As illustrated in the flow diagrams of FIGS. 10A-10D, one aspect of the present technology is a method for controlling a processor, such as processor 310, to measure user's facial features using two-dimensional or three-dimensional images and to recommend or select an appropriate facial interface size, such as from a group of standard sizes, based on the resultant measurements. The method may generally be characterized as including three or four different phases: a pre-capture phase 400, a capture phase 500, a post-capture image processing phase 600, and a comparison and output phase 700.

In some cases, the application for facial feature measuring and facial interface sizing may control a processor 310 to output a visual display that includes a reference feature on the display interface 320. The user may position the feature adjacent to their facial features, such as by movement of the camera. The processor may then capture and store one or more images of the facial features in association with the reference feature when certain conditions, such as alignment conditions are satisfied. This may be done with the assistance of a mirror 330. The mirror 330 reflects the displayed reference feature and the user's face to the camera. The application then controls the processor 310 to identify certain facial features within the images and measure distances therebetween. By image analysis processing a scaling factor may then be used to convert the facial feature measurements, which may be pixel counts, to standard facial interface measurement values based on the reference feature. Such values may be, for example, standardized unit of measure, such as a meter or an inch, and values expressed in such units suitable for interface sizing. Additional correction factors may be applied to the measurements. The facial feature measurements may be compared to data records that include measurement ranges corresponding to different interface sizes for particular interface forms. The recommended size may then be chosen and be output to the user/based on the comparison(s) as a recommendation. Such a process may be conveniently effected within the comfort of the user's own home, if the user so chooses. The application may perform this method within seconds. In one example, the application performs this method in real time. A manufacturer or supplier may arrange for the facial interface of the recommended size to be shipped to a user nominated address automatically.

5.6 Cleaning

In some forms, the head-mounted display system 1000 or at least a portion thereof, is designed to be used by a single user, and cleaned in a home of the user, e.g., washed in soapy water, without requiring specialised equipment for disinfection and sterilisation. Specifically, the positioning and stabilizing structure 1300 and the interfacing structure 1100 are designed to be cleaned, as they are both in direct contact with the user's head.

In some other forms, the components of the positioning and stabilizing structure 1300 and interfacing structure 1100 are used in labs, clinics and hospitals wherein a single head-mounted display may be reused on multiple persons or used during medical procedures. In each of the labs, clinics and hospitals the head-mounted displays, or relevant components thereof, can be reprocessed and be exposed to, for example, processes of thermal disinfection, chemical disinfection and sterilisation. As such, the design of the positioning and stabilizing structure and interfacing structure may need to be validated for disinfection and sterilisation of the mask in accordance with ISO17664.

Materials may be chosen to withstand reprocessing. For example, robust materials may be used in the positioning and stabilizing structure 1300 to withstand exposure to high level disinfection solutions and agitation with a brush. Further, some components of the positioning and stabilizing structure are separable, and in-use may be disconnected to improve the reprocessing efficacy.

In some examples, the interfacing structure 1100 may, in use, be in contact with the user's head and therefor may become dirty (e.g., from sweat). The interfacing structure 1100 may be designed to be removed from the display unit housing 1205, to provide the ability to remove it for cleaning and/or replacement. It may be desirable to wash the interfacing structure 1100 while not getting the positioning and stabilizing structure 1300 wet. Alternatively or in addition, the positioning and stabilizing structure 1300 may be dirty from contact with the user's head, and may be removed for cleaning and/or replacement independently of the interfacing structure 1100. In either case, this may be facilitated by allowing these components to disconnect for such a purpose.

In some examples, a cover (e.g., constructed from a textile, silicone, etc.) may be removably positioned over the interfacing structure and can be removed to be cleaned and/or replaced after each use. The cover may allow the interface structure 1200 to remain fixed to the display unit housing 1205, and still provide a surface that can be easily cleaned after being used.

In some forms, the overlap of the cushion attachment portion 1120 and the cushion support flange 1164 may limit cleaning fluids from contacting the glue 1124 and/or the cushion 1130 during the cleaning process.

5.7 External Computer

In some forms, the head-mounted display system 1000 (e.g., VR, AR, and/or MR) may be used in conjunction with a separate device, like a computer or video game console. For example, the display interface may be electrically connected to the separate device.

In some forms, at least some processing for the head-mounted display system 1000 may be performed by the separate device. The separate device may include a larger and/or more powerful processor than could be comfortably supported by the user (e.g., the processor of the separate device may be too heavy for the user to comfortably support on their head).

6 GLOSSARY

For the purposes of the present technology disclosure, in certain forms of the present technology, one or more of the following definitions may apply. In other forms of the present technology, alternative definitions may apply.

6.1 General

Ambient: In certain forms of the present technology, the term ambient will be taken to mean (i) external of the display interface and/or user, and (ii) immediately surrounding the display interface and/or user.

For example, ambient light with respect to a display interface may be the light immediately surrounding the user, e.g. the light in the same and/or adjacent room as a user, and/or natural light from the sun.

In certain forms, ambient (e.g., acoustic) noise may be considered to be the background noise level in the room where a user is located, other than for example, noise generated by the display device or emanating from speakers connected to the display device. Ambient noise may be generated by sources outside the room.

Leak: The word leak will be taken to be an unintended exposure to light. In one example, leak may occur as the result of an incomplete seal between a display unit and a users' face.

Noise, radiated (acoustic): Radiated noise in the present document refers to noise which is carried to the user by the ambient air. In one form, radiated noise may be quantified by measuring sound power/pressure levels of the object in question according to ISO 3744.

User: A person operating the display interface and/or viewing images provided by the display interface. For example, the person may be wearing, donning, and/or doffing the display interface.

6.1.1 Materials

Silicone or Silicone Elastomer: A synthetic rubber. In this specification, a reference to silicone is a reference to liquid silicone rubber (LSR) or a compression moulded silicone rubber (CMSR). One form of commercially available LSR is SILASTIC (included in the range of products sold under this trademark), manufactured by Dow Corning. Another manufacturer of LSR is Wacker. Unless otherwise specified to the contrary, an exemplary form of LSR has a Shore A (or Type A) indentation hardness in the range of about 35 to about 45 as measured using ASTM D2240

Polycarbonate: a thermoplastic polymer of Bisphenol-A Carbonate.

6.1.2 Mechanical Properties

Resilience: Ability of a material to absorb energy when deformed elastically and to release the energy upon unloading.

Resilient: Will release substantially all of the energy when unloaded. Includes e.g. certain silicones, and thermoplastic elastomers.

Hardness: The ability of a material per se to resist deformation (e.g. described by a Young's Modulus, or an indentation hardness scale measured on a standardised sample size).

'Soft' materials may include silicone or thermo-plastic elastomer (TPE), and may, e.g. readily deform under finger pressure.

'Hard' materials may include polycarbonate, polypropylene, steel or aluminium, and may not e.g. readily deform under finger pressure.

Stiffness (or rigidity) of a structure or component: The ability of the structure or component to resist deformation in response to an applied load. The load may be a force or a moment, e.g. compression, tension, bending or torsion. The structure or component may offer different resistances in different directions. The inverse of stiffness is flexibility.

Floppy structure or component: A structure or component that will change shape, e.g. bend, when caused to support its own weight, within a relatively short period of time such as 1 second.

Rigid structure or component: A structure or component that will not substantially change shape when subject to the loads typically encountered in use. An example of such a use may be setting up and maintaining a user interface in sealing relationship.

As an example, an I-beam may comprise a different bending stiffness (resistance to a bending load) in a first direction in comparison to a second, orthogonal direction. In another example, a structure or component may be floppy in a first direction and rigid in a second direction.

6.2 Materials

Closed-cell foam: Foam comprising cells that are completely encapsulated, i.e. closed cells.

Elastane: A polymer made from polyurethane.

Elastomer: A polymer that displays elastic properties. For example, silicone elastomer.

Ethylene-vinyl acetate (EVA): A copolymer of ethylene and vinyl acetate.

Fiber: A filament (mono or poly), a strand, a yarn, a thread or twine that is significantly longer than it is wide. A fiber may include animal-based material such as wool or silk, plant-based material such as linen and cotton, and synthetic material such as polyester and rayon. A fiber may specifically refer to a material that can be interwoven and/or interlaced (e.g., in a network) with other fibers of the same or different material.

Foam: Any material, for example polyurethane, having gas bubbles introduced during manufacture to produce a lightweight cellular form.

Neoprene: A synthetic rubber that is produced by polymerization of chloroprene. Neoprene is used in trade products: Breath-O-Prene.

Nylon: A synthetic polyamide that has elastic properties and can be used, for example, to form fibres/filaments for use in textiles.

Open-cell foam: Foam comprising cells, i.e. gas bubbles that aren't completely encapsulated, i.e. open cells.

Polycarbonate: a typically transparent thermoplastic polymer of Bisphenol-A Carbonate.

Polyethylene: A thermoplastic that is resistant to chemicals and moisture.

Polyurethane (PU): A plastic material made by copolymerizing an isocyanate and a polyhydric alcohol and, for example, can take the form of foam (polyurethane foam) and rubber (polyurethane rubber).

Semi-open foam: Foam comprising a combination of closed and open (encapsulated) cells.

Silicone or Silicone Elastomer: A synthetic rubber. In this specification, a reference to silicone is a reference to liquid silicone rubber (LSR) or a compression moulded silicone rubber (CMSR). One form of commercially available LSR is SILASTIC (included in the range of products sold under this trademark), manufactured by Dow Corning. Another manufacturer of LSR is Wacker. Unless otherwise specified to the contrary, an exemplary form of LSR has a Shore A (or Type A) indentation hardness in the range of about 35 to about 45 as measured using ASTM D2240.

Spacer Fabric: A composite construction comprised of two outer textile substrates joined together and kept apart by an intermediate layer of monofilaments.

Spandex: An elastic fibre or fabric, primarily comprised of polyurethane. Spandex is used in trade products: Lycra.

Textile: A material including at least one natural or artificial fiber. In this specification, a textile may refer to any material that is formed as a network of interwoven and/or interlaced fibers. A type of textile may include a fabric, which is constructed by interlacing the fibers using specific techniques. These include weaving, knitting, crocheting, knotting, tatting, tufting, or braiding. Cloth may be used synonymously with fabric, although may specifically refer to a processed piece of fabric. Other types of textiles may be constructed using bonding (chemical, mechanical, heat, etc.), felting, or other nonwoven processes. Textiles created through one of these processes are fabric-like, and may be considered synonymous with fabric for the purposes of this application.

Thermoplastic Elastomer (TPE): Are generally low modulus, flexible materials that can be stretched at room temperature with an ability to return to their approximate original length when stress is released. Trade products that use TPE include: Hytrel, Dynaflex, Medalist Thermoplastic Polyurethane (TPU): A thermoplastic elastomer with a high durability and flexibility.

6.3 Mechanical Properties

Resilience: Ability of a material to absorb energy when deformed elastically and to release the energy upon unloading.

Resilient: Will release substantially all of the energy when unloaded. Includes e.g. certain silicones, and thermoplastic elastomers.

Hardness: The ability of a material per se to resist deformation (e.g. described by a Young's Modulus, or an indentation hardness scale measured on a standardised sample size).

- 'Soft' materials may include silicone or thermo-plastic elastomer (TPE), and may, e.g. readily deform under finger pressure.
- 'Hard' materials may include polycarbonate, polypropylene, steel or aluminium, and may not e.g. readily deform under finger pressure.

Stiffness (or rigidity) of a structure or component: The ability of the structure or component to resist deformation in response to an applied load. The load may be a force or a moment, e.g. compression, tension, bending or torsion. The structure or component may offer different resistances in different directions.

Floppy structure or component: A structure or component that will change shape, e.g. bend, when caused to support its own weight, within a relatively short period of time such as 1 second.

Rigid structure or component: A structure or component that will not substantially change shape when subject to the loads typically encountered in use.

- As an example, an I-beam may comprise a different bending stiffness (resistance to a bending load) in a first direction in comparison to a second, orthogonal direction. In another example, a structure or component may be floppy in a first direction and rigid in a second direction.

6.4 Anatomy

The following definitions correspond references identified in FIGS. 1-2.

6.4.1 Anatomy of the Face

Ala: the external outer wall or "wing" of each nostril (plural: alar)

Alare: The most lateral point on the nasal ala.

Alar curvature (or alar crest) point: The most posterior point in the curved base line of each ala, found in the crease formed by the union of the ala with the cheek.

Auricle: The whole external visible part of the ear.

(nose) Bony framework: The bony framework of the nose comprises the nasal bones, the frontal process of the maxillae and the nasal part of the frontal bone.

Bridge (nasal): The nasal bridge is the midline prominence of the nose, extending from the Sellion to the Pronasale.

(nose) Cartilaginous framework: The cartilaginous framework of the nose comprises the septal, lateral, major and minor cartilages.

Cheilion: A point located at the corner of the mouth.

Columella: the strip of skin that separates the nares and which runs from the pronasale to the upper lip.

Columella angle: The angle between the line drawn through the midpoint of the nostril aperture and a line drawn perpendicular to the Frankfort horizontal while intersecting subnasale.

Endocanthion: The point at which the upper and lower eyelids meet, proximal to the Sellion.

Epicranius: The Epicranius, or frontal belly, refers to structures that cover the cranium.

External occipital protuberance: A protuberance on the outer surface of the occipital bone.

Frankfort horizontal plane: A line extending from the most inferior point of the orbital margin to the left tragion. The tragion is the deepest point in the notch superior to the tragus of the auricle.

Glabella: Located on the soft tissue, the most prominent point in the midsagittal plane of the forehead.

Interpupillary Distance: The distance between the centres of the pupils of the eyes.

Lateral nasal cartilage: A generally triangular plate of cartilage. Its superior margin is attached to the nasal bone and frontal process of the maxilla, and its inferior margin is connected to the greater alar cartilage.

Lip, inferior (labrale inferius): A point on the face between the mouth and supramenton, lying in the median sagittal plane.

Lip, superior (labrale superius): A point on the face between the mouth and nose, lying in the median sagittal plane.

Greater alar cartilage: A plate of cartilage lying below the lateral nasal cartilage. It is curved around the anterior part of the naris. Its posterior end is connected to the frontal process of the maxilla by a tough fibrous membrane containing three or four minor cartilages of the ala.

Nares (Nostrils): Approximately ellipsoidal apertures forming the entrance to the nasal cavity. The singular form of nares is naris (nostril). The nares are separated by the nasal septum.

Naso-labial sulcus or Naso-labial fold: The skin fold or groove that runs from each side of the nose to the corners of the mouth, separating the cheeks from the upper lip.

Naso-labial angle: The angle between the columella and the upper lip, while intersecting subnasale.

Otobasion inferior: The lowest point of attachment of the auricle to the skin of the face.

Otobasion superior: The highest point of attachment of the auricle to the skin of the face.

Pronasale: the most protruded point or tip of the nose, which can be identified in lateral view of the rest of the portion of the head.

Philtrum: the midline groove that runs from lower border of the nasal septum to the top of the lip in the upper lip region.

Pogonion: Located on the soft tissue, the most anterior midpoint of the chin.

Ridge (nasal): The nasal ridge is the midline prominence of the nose, extending from the Sellion to the Pronasale.

Sagittal plane: A vertical plane that passes from anterior (front) to posterior (rear). The midsagittal plane is a sagittal plane that divides the body into right and left halves.

Sellion: Located on the soft tissue, the most concave point overlying the area of the frontonasal suture.

Septal cartilage (nasal): The nasal septal cartilage forms part of the septum and divides the front part of the nasal cavity.

Subalare: The point at the lower margin of the alar base, where the alar base joins with the skin of the superior (upper) lip.

Subnasal point: Located on the soft tissue, the point at which the columella merges with the upper lip in the midsagittal plane.

Supramenton: The point of greatest concavity in the midline of the lower lip between labrale inferius and soft tissue pogonion.

Superciliary arch: A protuberance of the frontal bone above the eye.

Temporalis muscle: A muscle in the temporal fossa that serves to raise the lower jaw.

Temporomandibular joint: A freely moveable joint between the temporal bone and mandible that allows for the opening, closing, protrusion, retraction, and lateral movement of the mandible.

Vermillion, upper: A red part of the lips covered with stratified squamous epithelium which is in continuity with the oral mucosa of the gingivolabial groove.

6.4.2 Anatomy of the Skull

Frontal bone: The frontal bone includes a large vertical portion, the squama frontalis, corresponding to the region known as the forehead.

Lateral cartilage: Portion of cartilage lateral of the Septal cartilage and inferior to the Nasal bones.

Mandible: The mandible forms the lower jaw. The mental protuberance is the bony protuberance of the jaw that forms the chin.

Masseter minor: A lower portion of the Masseter muscle of which raises the lower jaw.

Maxilla: The maxilla forms the upper jaw and is located above the mandible and below the orbits. The frontal process of the maxilla projects upwards by the side of the nose, and forms part of its lateral boundary.

Nasal bones: The nasal bones are two small oblong bones, varying in size and form in different individuals; they are placed side by side at the middle and upper part of the face, and form, by their junction, the "bridge" of the nose.

Nasion: The intersection of the frontal bone and the two nasal bones, a depressed area directly between the eyes and superior to the bridge of the nose.

Occipital bone: The occipital bone is situated at the back and lower part of the cranium. It includes an oval aperture, the foramen magnum, through which the cranial cavity communicates with the vertebral canal. The curved plate behind the foramen magnum is the squama occipitalis.

Orbit: The bony cavity in the skull to contain the eyeball.

Parietal bones: The parietal bones are the bones that, when joined together, form the roof and sides of the cranium.

Septal cartilage: Cartilage of the nasal septum.

Sphenoid bone: A wedge shaped bone of the base of the cranium.

Supraorbital foramen: An opening in the inferior bone of the orbit for the passage of the Supraorbital nerve, artery and vein.

Temporal bones: The temporal bones are situated on the bases and sides of the skull, and support that part of the face known as the temple.

Trapezius minor: A triangular-shaped superficial muscle of the upper back.

Zygomatic bones: The face includes two zygomatic bones, located in the upper and lateral parts of the face and forming the prominence of the cheek.

6.5 User Interface

Frame: Frame will be taken to mean a display housing unit that bears the load of tension between two or more points of connection with a headgear and/or a hoop. The frame may seal against the user's face in order to limit and/or prevent the ingress and/or egress of light.

Hoop: Hoop will be taken to mean a form of positioning and stabilizing structure designed for use on a head. For example the hoop may comprise a collection of one or more struts, ties and stiffeners configured to locate and retain a user interface in position on a users' face for holding a display unit in an operational position in front of a user's face. Some ties are formed of a soft, flexible, elastic material such as a laminated composite of foam and fabric/textile. In some forms, the term headgear may be synonymous with the term hoop.

Membrane: Membrane will be taken to mean a typically thin element that has, preferably, substantially no resistance to bending, but has resistance to being stretched.

Seal: May be a noun form ("a seal") which refers to a structure, or a verb form ("to seal") which refers to the effect. Two elements may be constructed and/or arranged to 'seal' or to effect 'sealing' therebetween without requiring a separate 'seal' element per se.

Shell: A shell will be taken to mean a curved, relatively thin structure having bending, tensile and compressive stiffness. For example, a curved structural wall of a mask may be a shell. In some forms, a shell may be faceted. In some forms a shell may be airtight. In some forms a shell may not be airtight.

Stiffener: A stiffener will be taken to mean a structural component designed to increase the bending resistance of another component in at least one direction.

Strut: A strut will be taken to be a structural component designed to increase the compression resistance of another component in at least one direction.

Swivel (noun): A subassembly of components configured to rotate about a common axis, preferably independently, preferably under low torque. In one form, the swivel may be constructed to rotate through an angle of at least 360 degrees. In another form, the swivel may be constructed to rotate through an angle less than 360 degrees.

Tie (noun): A structure designed to resist tension.

6.6 Shape of Structures

Products in accordance with the present technology may comprise one or more three-dimensional mechanical structures, for example a mask cushion or an impeller. The three-dimensional structures may be bounded by two-dimensional surfaces. These surfaces may be distinguished using a label to describe an associated surface orientation, location, function, or some other characteristic. For example a structure may comprise one or more of an anterior surface, a posterior surface, an interior surface and an exterior surface. In another example, a seal-forming structure may comprise a face-contacting (e.g. outer) surface, and a separate non-face-contacting (e.g. underside or inner) surface. In another example, a structure may comprise a first surface and a second surface.

To facilitate describing the shape of the three-dimensional structures and the surfaces, we first consider a cross-section through a surface of the structure at a point, p. See FIG. 3A to FIG. 3E, which illustrate examples of cross-sections at point p on a surface, and the resulting plane curves. FIGS. 3A to 3E also illustrate an outward normal vector at p. The outward normal vector at p points away from the surface. In some examples we describe the surface from the point of view of an imaginary small person standing upright on the surface.

6.6.1 Curvature in One Dimension

The curvature of a plane curve at p may be described as having a sign (e.g. positive, negative) and a magnitude (e.g. 1/radius of a circle that just touches the curve at p).

Positive curvature: If the curve at p turns towards the outward normal, the curvature at that point will be taken to be positive (if the imaginary small person leaves the point p they must walk uphill). See FIG. 3A (relatively large positive curvature compared to FIG. 3B) and FIG. 3B (relatively small positive curvature compared to FIG. 3A). Such curves are often referred to as concave.

Zero curvature: If the curve at p is a straight line, the curvature will be taken to be zero (if the imaginary small person leaves the point p, they can walk on a level, neither up nor down). See FIG. 3C.

Negative curvature: If the curve at p turns away from the outward normal, the curvature in that direction at that point will be taken to be negative (if the imaginary small person leaves the point p they must walk downhill). See FIG. 3D (relatively small negative curvature compared to FIG. 3E) and FIG. 3E (relatively large negative curvature compared to FIG. 3F). Such curves are often referred to as convex.

6.6.2 Curvature of Two Dimensional Surfaces

A description of the shape at a given point on a two-dimensional surface in accordance with the present technology may include multiple normal cross-sections. The multiple cross-sections may cut the surface in a plane that includes the outward normal (a "normal plane"), and each cross-section may be taken in a different direction. Each cross-section results in a plane curve with a corresponding curvature. The different curvatures at that point may have the same sign, or a different sign. Each of the curvatures at that point has a magnitude, e.g. relatively small. The plane curves in FIGS. 3A to 3E could be examples of such multiple cross-sections at a particular point.

Principal curvatures and directions: The directions of the normal planes where the curvature of the curve takes its maximum and minimum values are called the principal directions. In the examples of FIG. 3A to FIG. 3E, the maximum curvature occurs in FIG. 3A, and the minimum occurs in FIG. 3E, hence FIG. 3A and FIG. 3E are cross sections in the principal directions. The principal curvatures at p are the curvatures in the principal directions.

Region of a surface: A connected set of points on a surface. The set of points in a region may have similar characteristics, e.g. curvatures or signs.

Saddle region: A region where at each point, the principal curvatures have opposite signs, that is, one is positive, and the other is negative (depending on the direction to which the imaginary person turns, they may walk uphill or downhill).

Dome region: A region where at each point the principal curvatures have the same sign, e.g. both positive (a "concave dome") or both negative (a "convex dome").

Cylindrical region: A region where one principal curvature is zero (or, for example, zero within manufacturing tolerances) and the other principal curvature is non-zero.

Planar region: A region of a surface where both of the principal curvatures are zero (or, for example, zero within manufacturing tolerances).

Edge of a surface: A boundary or limit of a surface or region.

Path: In certain forms of the present technology, 'path' will be taken to mean a path in the mathematical—topological sense, e.g. a continuous space curve from f(0) to f(1) on a surface. In certain forms of the present technology, a 'path' may be described as a route or course, including e.g. a set of points on a surface. (The path for the imaginary person is where they walk on the surface, and is analogous to a garden path).

Path length: In certain forms of the present technology, 'path length' will be taken to mean the distance along the surface from f(0) to f(1), that is, the distance along the path on the surface. There may be more than one path between two points on a surface and such paths may have different path lengths. (The path length for the imaginary person would be the distance they have to walk on the surface along the path).

Straight-line distance: The straight-line distance is the distance between two points on a surface, but without regard to the surface. On planar regions, there would be a path on the surface having the same path length as the straight-line distance between two points on the surface. On non-planar surfaces, there may be no paths having the same path length as the straight-line distance between two points. (For the imaginary person, the straight-line distance would correspond to the distance 'as the crow flies')

6.6.3 Space Curves

Space curves: Unlike a plane curve, a space curve does not necessarily lie in any particular plane. A space curve may be closed, that is, having no endpoints. A space curve may be considered to be a one-dimensional piece of three-dimensional space. An imaginary person walking on a strand of the DNA helix walks along a space curve. A typical human left ear comprises a helix, which is a left-hand helix, see FIG. 3M. A typical human right ear comprises a helix, which is a right-hand helix, see FIG. 3N. FIG. 3O shows a right-hand helix. The edge of a structure, e.g. the edge of a membrane or impeller, may follow a space curve. In general, a space curve may be described by a curvature and a torsion at each point on the space curve. Torsion is a measure of how the curve turns out of a plane. Torsion has a sign and a magnitude. The torsion at a point on a space curve may be characterised with reference to the tangent, normal and binormal vectors at that point.

Tangent unit vector (or unit tangent vector): For each point on a curve, a vector at the point specifies a direction from that point, as well as a magnitude. A tangent unit vector is a unit vector pointing in the same direction as the curve at that point. If an imaginary person were flying along the curve and fell off her vehicle at a particular point, the direction of the tangent vector is the direction she would be travelling.

Unit normal vector: As the imaginary person moves along the curve, this tangent vector itself changes. The unit vector pointing in the same direction that the tangent vector is changing is called the unit principal normal vector. It is perpendicular to the tangent vector.

Binormal unit vector: The binormal unit vector is perpendicular to both the tangent vector and the principal normal vector. Its direction may be determined by a right-hand rule (see e.g. FIG. 3L), or alternatively by a left-hand rule (FIG. 3K).

Osculating plane: The plane containing the unit tangent vector and the unit principal normal vector. See FIGS. 3K and 3L.

Torsion of a space curve: The torsion at a point of a space curve is the magnitude of the rate of change of the binormal unit vector at that point. It measures how much the curve deviates from the osculating plane. A space curve which lies in a plane has zero torsion. A space curve which deviates a relatively small amount from the osculating plane will have a relatively small magnitude of torsion (e.g. a gently sloping helical path). A space curve which deviates a relatively large amount from the osculating plane will have a relatively large magnitude of torsion (e.g. a steeply sloping helical path). With reference to FIG. 3O, since T2>T1, the magnitude of the torsion near the top coils of the helix of FIG. 3O is greater than the magnitude of the torsion of the bottom coils of the helix of FIG. 3O With reference to the right-hand rule of FIG. 3M, a space curve turning towards the direction of the right-hand binormal may be considered as having a right-hand positive torsion (e.g. a right-hand helix as shown in FIG. 3O). A space curve turning away from the direction of the right-hand binormal may be considered as having a right-hand negative torsion (e.g. a left-hand helix).

Equivalently, and with reference to a left-hand rule (see FIG. 3K), a space curve turning towards the direction of the left-hand binormal may be considered as having a left-hand positive torsion (e.g. a left-hand helix). Hence left-hand positive is equivalent to right-hand negative.

6.6.4 Holes

A surface may have a one-dimensional hole, e.g. a hole bounded by a plane curve or by a space curve. Thin structures (e.g. a membrane) with a hole, may be described as having a one-dimensional hole. See for example the one dimensional hole in the surface of structure shown in FIG. 3F, bounded by a plane curve.

A structure may have a two-dimensional hole, e.g. a hole bounded by a surface. For example, an inflatable tyre has a two dimensional hole bounded by the interior surface of the tyre. In another example, a bladder with a cavity for air or gel could have a two-dimensional hole. In a yet another example, a conduit may comprise a one-dimension hole (e.g. at its entrance or at its exit), and a two-dimension hole bounded by the inside surface of the conduit. See also the two dimensional hole through the structure shown in FIG. 3H, bounded by a surface as shown.

6.7 Other Remarks

A portion of the disclosure of this patent document contains material which is subject to copyright protection. The copyright owner has no objection to the facsimile reproduction by anyone of the patent document or the patent disclosure, as it appears in Patent Office patent files or records, but otherwise reserves all copyright rights whatsoever.

Unless the context clearly dictates otherwise and where a range of values is provided, it is understood that each intervening value, to the tenth of the unit of the lower limit, between the upper and lower limit of that range, and any other stated or intervening value in that stated range is encompassed within the technology. The upper and lower limits of these intervening ranges, which may be independently included in the intervening ranges, are also encompassed within the technology, subject to any specifically excluded limit in the stated range. Where the stated range includes one or both of the limits, ranges excluding either or both of those included limits are also included in the technology.

Furthermore, where a value or values are stated herein as being implemented as part of the technology, it is understood that such values may be approximated, unless otherwise stated, and such values may be utilized to any suitable significant digit to the extent that a practical technical implementation may permit or require it.

Unless defined otherwise, all technical and scientific terms used herein have the same meaning as commonly understood by one of ordinary skill in the art to which this technology belongs. Although any methods and materials similar or equivalent to those described herein can also be used in the practice or testing of the present technology, a limited number of the exemplary methods and materials are described herein.

When a particular material is identified as being used to construct a component, obvious alternative materials with similar properties may be used as a substitute. Furthermore, unless specified to the contrary, any and all components herein described are understood to be capable of being manufactured and, as such, may be manufactured together or separately.

It must be noted that as used herein and in the appended claims, the singular forms "a", "an", and "the" include their plural equivalents, unless the context clearly dictates otherwise.

All publications mentioned herein are incorporated herein by reference in their entirety to disclose and describe the methods and/or materials which are the subject of those publications. The publications discussed herein are provided solely for their disclosure prior to the filing date of the present application. Nothing herein is to be construed as an admission that the present technology is not entitled to antedate such publication by virtue of prior invention. Further, the dates of publication provided may be different from the actual publication dates, which may need to be independently confirmed.

The terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The subject headings used in the detailed description are included only for the ease of reference of the reader and should not be used to limit the subject matter found throughout the disclosure or the claims. The subject headings should not be used in construing the scope of the claims or the claim limitations.

Although the technology herein has been described with reference to particular examples, it is to be understood that these examples are merely illustrative of the principles and applications of the technology. In some instances, the terminology and symbols may imply specific details that are not required to practice the technology. For example, although the terms "first" and "second" may be used, unless otherwise specified, they are not intended to indicate any order but may be utilised to distinguish between distinct elements. Furthermore, although process steps in the methodologies may be described or illustrated in an order, such an ordering is not required. Those skilled in the art will recognize that such ordering may be modified and/or aspects thereof may be conducted concurrently or even synchronously.

It is therefore to be understood that numerous modifications may be made to the illustrative examples and that other arrangements may be devised without departing from the spirit and scope of the technology.

6.8 Selected Reference Signs List

100 User
1000 Head-mounted display system
1100 Interfacing structure
1102 Chassis portion
1108 Opening
1109 Cover portion
1110 Face engaging portion
1118 Face engaging flange
1120 Cushion attachment portion
1121 First end of face engaging flange
1122 Second end of face engaging flange
1123 Face engaging region
1130 Cushion
1140 Cheek portion
1141 Anterior portion of the face engaging flange
1142 Posterior portion of the face engaging flange
1144 Medial anchor portion
1145 Medial support portion
1150 Closed loop portion
1160 Open loop portion
1162 Gap
1164 Cushion support flange
1170 Sphenoid portion
1175 Forehead portion
1180 Nasal portion
1182 Pronasale portion
1186 Bridge portions
1188 Central slot
1200 Head-mounted display unit
1205 Display unit housing
1220 Display screen
1230 Superior face
1232 Inferior face
1234 Lateral left face
1236 Lateral right face
1238 Anterior face
1240 Lens
1250 Temporal connector
1254 Eyelet
1256 Adjustment portion
1258 Receiving portion
1260 Pivot connection
1270 Controller
1272 Speaker
1274 Power source
1276 Control system
1278 Low power system battery
1280 Main battery
1282 Real time clock
1284 Orientation sensor
1286 Processing system
1288 Battery support portion
1290 Control system support
1300 Positioning and stabilising structure
1350 Posterior support portion
1360 Forehead support

The invention claimed is:

1. A head-mounted display system, comprising:
a head-mounted display unit comprising a display, the head-mounted display unit comprising an interfacing structure constructed and arranged to be in opposing relation to the user's face in use; and
a positioning and stabilising structure structured and arranged to hold the head-mounted display unit in an operable position on the user's head in use,
wherein the interfacing structure comprises a face engaging portion configured to engage the user's face in use, the face engaging portion being flexible and resilient and comprising:
a pair of cheek portions configured to engage the user's cheeks in use, and
a pair of medial support portions, each medial support portion located medially of a respective one of the cheek portions and configured to provide support for the respective cheek portion;
wherein the face engaging portion comprises at least one face engaging flange, the face engaging flange forming one or more loop portions each having an at least partially enclosed cross section, wherein the face engaging flange is shaped to form an at least partially enclosed loop in cross section to form each of the one or more loop portions, and
wherein the at least one face engaging flange of the face engaging portion forms a pair of closed loop portions on respective lateral sides of the face engaging portion, each closed loop portion having an enclosed cross section.

2. The head-mounted display system of claim 1, wherein the face engaging portion is configured to engage the user's face around a periphery of the user's eyes in use including the sides of the user's face lateral of the user's eyes and including the user's forehead.

3. The head-mounted display system of claim 1, wherein at each medial support portion, the interfacing structure curves anteriorly from a respective one of the cheek portions.

4. The head-mounted display system of claim 1, wherein each medial support portion is integrally formed with the respective cheek portion.

5. The head-mounted display system of claim 1, wherein the medial support portions are configured to resist deformation of the cheek portions.

6. The head-mounted display system of claim 5, wherein each of the medial support portions comprises a medially-facing wall located alongside the user's nose in use and each of the cheek portions comprises a face engaging region configured to contact a respective one of the user's cheeks in use.

7. The head-mounted display system of claim 6, wherein each medially-facing wall comprises a thickness that is the same as or less than the face engaging regions of the cheek portions.

8. The head-mounted display system of claim 7, wherein the medial support portions resist deformation of the cheek portions by resistance to elongation in the medially-facing wall in use.

9. The head-mounted display system of claim 7, wherein the interfacing structure comprises one or more cushions positioned at least at the cheek portions.

10. The head-mounted display system of claim 9, wherein the one or more cushions are formed from foam.

11. The head-mounted display system of claim 5, wherein each medially-facing wall comprises a greater thickness than face engaging regions of the cheek portions.

12. The head-mounted display system of claim 11, wherein the medial support portions resist deformation of the cheek portions by resistance to bending in the medially facing walls in use.

13. The head-mounted display system of claim 1, wherein the medial support portions provide a greater resistance to movement of the cheek portions in the superior-inferior directions or in the lateral direction than in the anterior-posterior directions.

14. The head-mounted display system of claim 1, wherein the closed loop portions are in the pair of medial support portions of the face engaging portion.

15. The head-mounted display system of claim 1, wherein the interfacing structure further comprises a chassis portion being stiffer than the face engaging portion, the face engaging portion being attached to and supported by the chassis portion.

16. The head-mounted display system of claim 15, wherein in each of the cheek portions the face engaging flange extends inferiorly from the chassis portion and then posteriorly, superiorly, and anteriorly.

17. The head-mounted display system of claim 1, wherein the closed loop portions reduce in size in the pair of medial support portions.

18. The head-mounted display system of claim 1, wherein the medial support portions provide a greater resistance to movement of the cheek portions in the superior-inferior directions and in the lateral direction than in the anterior-posterior directions.

19. A head-mounted display system, comprising:
  a head-mounted display unit comprising a display, the head-mounted display unit comprising an interfacing structure constructed and arranged to be in opposing relation to the user's face in use; and
  a positioning and stabilising structure structured and arranged to hold the head-mounted display unit in an operable position on the user's head in use,
  wherein the interfacing structure comprises a face engaging portion configured to engage the user's face in use, the face engaging portion being flexible and resilient and comprising:
    a pair of cheek portions configured to engage the user's cheeks in use, and
    a pair of medial support portions, each medial support portion located medially of a respective one of the cheek portions and configured to provide support for the respective cheek,
  wherein the face engaging portion comprises at least one face engaging flange, the face engaging flange forming one or more loop portions each having an at least partially enclosed cross section, wherein the face engaging flange is shaped to form an at least partially enclosed loop in cross section to form each of the one or more loop portions, and
  wherein the interfacing structure comprises a medial anchor portion intersecting the sagittal plane of the user's head in use and connecting the pair of medial support portions, the medial anchor portion being stiffer than the medial support portions.

20. The head-mounted display system of claim 19, wherein the at least one face engaging flange of the face engaging portion forms a pair of open loop portions each having a partially open cross section.

21. The head-mounted display system of claim 20, wherein each open loop portion is laterally adjacent to a respective one of the closed loop portions.

22. The head-mounted display system of claim 20, wherein each open loop portion is in a respective cheek portion.

* * * * *